US011884863B2

(12) United States Patent
Hirschmann et al.

(10) Patent No.: US 11,884,863 B2
(45) Date of Patent: *Jan. 30, 2024

(54) LIQUID-CRYSTALLINE MEDIUM

(71) Applicant: MERCK PATENT GMBH, Darmstadt (DE)

(72) Inventors: Harald Hirschmann, Darmstadt (DE); Sabine Schoen, Herten (DE)

(73) Assignee: MERCK PATENT GMBH, Darmstadt (DE)

( * ) Notice: Subject to any disclaimer, the term of this patent is extended or adjusted under 35 U.S.C. 154(b) by 34 days.

This patent is subject to a terminal disclaimer.

(21) Appl. No.: 16/518,521

(22) Filed: Jul. 22, 2019

(65) Prior Publication Data

US 2019/0345389 A1 Nov. 14, 2019

Related U.S. Application Data

(62) Division of application No. 15/304,980, filed as application No. PCT/EP2016/000425 on Mar. 10, 2016, now abandoned.

(30) Foreign Application Priority Data

Mar. 13, 2015 (EP) .................................... 15000742

(51) Int. Cl.
*C09K 19/34* (2006.01)
*C09K 19/12* (2006.01)
(Continued)

(52) U.S. Cl.
CPC .......... *C09K 19/3405* (2013.01); *C09K 19/12* (2013.01); *C09K 19/3003* (2013.01);
(Continued)

(58) Field of Classification Search
CPC ...................................................... C09K 19/34
See application file for complete search history.

(56) References Cited

U.S. PATENT DOCUMENTS 7,018,685 B2 * 3/2006 Schmidt ............... C09K 19/582 428/1.1
7,371,437 B2 5/2008 Klasen-Memmer et al.
(Continued)

FOREIGN PATENT DOCUMENTS

DE 102004012970 A1 10/2004
EP 1752510 B1 11/2008
(Continued)

OTHER PUBLICATIONS

International Search Report dated Jun. 17, 2016, issued in corresponding PCT/EP2016/000425, 2 pages.
(Continued)

*Primary Examiner* — Chanceity N Robinson
(74) *Attorney, Agent, or Firm* — MILLEN WHITE ZELANO AND BRANIGAN, PC; Csaba Henter

(57) ABSTRACT

A liquid-crystalline medium having least one compound of the formula I,

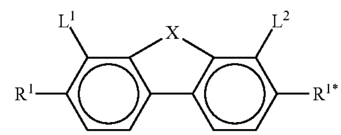

I and at least one compound of the formulae ST-1 to ST-17,

ST-1

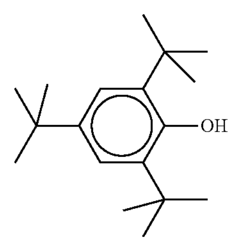

ST-2

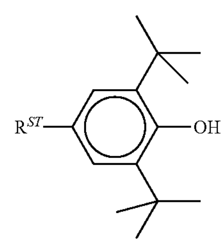

ST-3

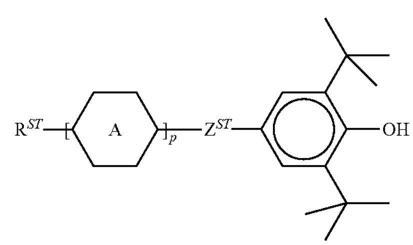

ST-4

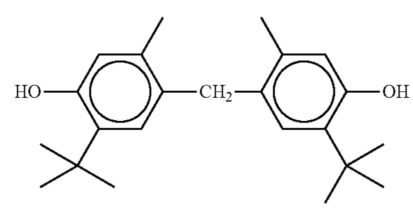

(Continued)

-continued
ST-5
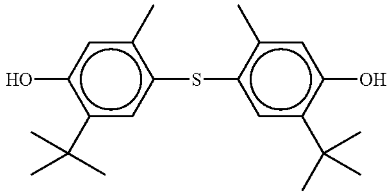
ST-6
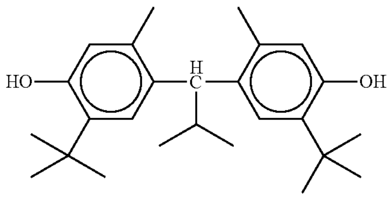
ST-7
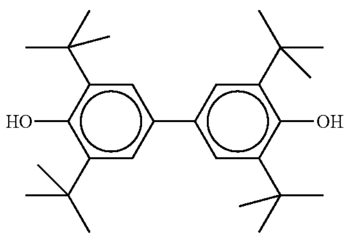
ST-8
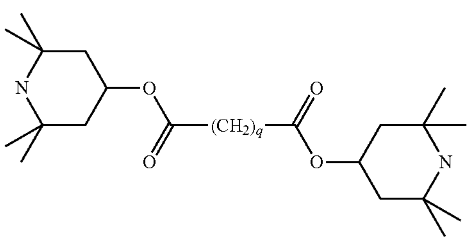
ST-9
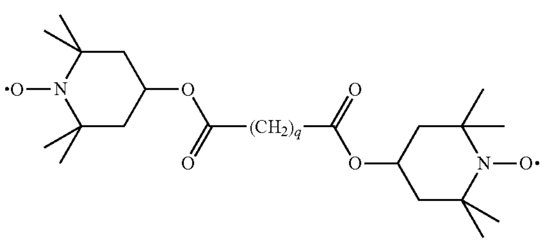
ST-10
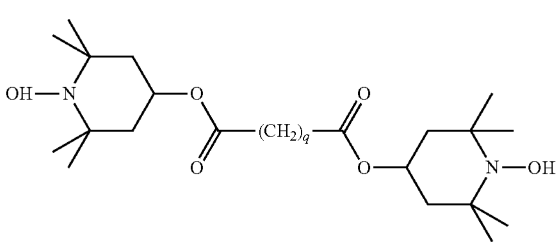
-continued
ST-11
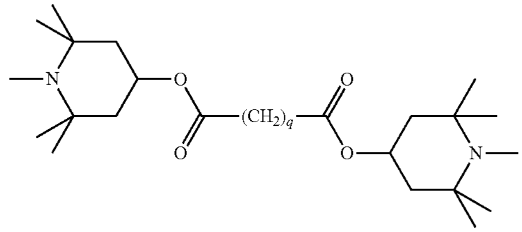
ST-12
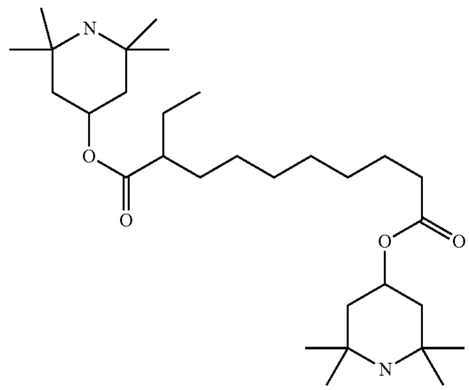
ST-13
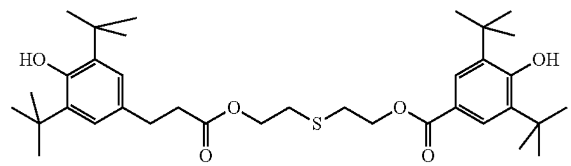
ST-14
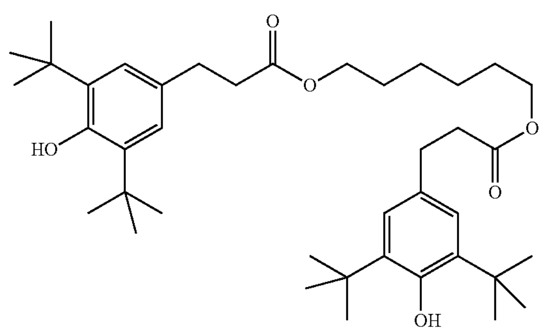
ST-15
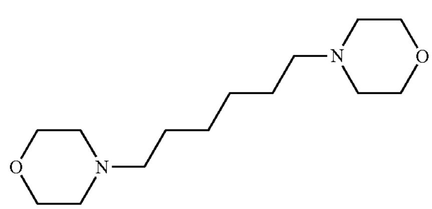

-continued

ST-16

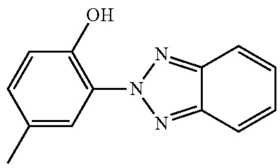

ST-17

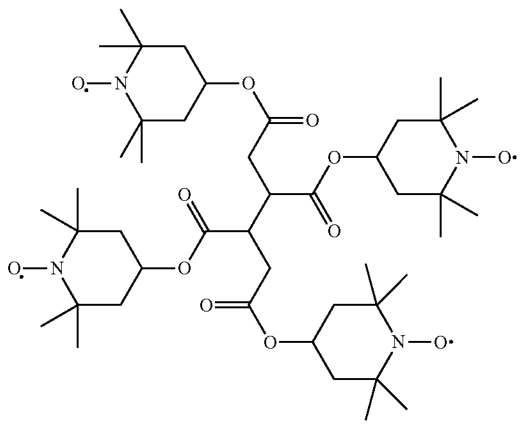

in which $R^1$ and $R^{1*}$, $A^1$ and $A^{1*}$, $Z^1$ and $Z^{1*}$, X, $L^1$ and $L^2$, $R^{ST}$, ring A, $Z^{ST}$, p and q have the meanings indicated in claim 1, and the use thereof for an active-matrix display, in particular based on the VA, PSA, PA-VA, SS-VA, SA-VA, PS-VA, PALC, IPS, PS-IPS, UB-FFS, U-IPS, FFS or PS-FFS effect.

9 Claims, No Drawings

(51) Int. Cl.

| | |
|---|---|
| ***C09K 19/30*** | (2006.01) |
| ***C09K 19/32*** | (2006.01) |
| ***C09K 19/44*** | (2006.01) |
| ***G02F 1/1362*** | (2006.01) |
| ***C09K 19/04*** | (2006.01) |

(52) U.S. Cl.
CPC .......... *C09K 19/3098* (2013.01); *C09K 19/32* (2013.01); *C09K 19/3491* (2013.01); *C09K 19/44* (2013.01); *G02F 1/1362* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3016* (2013.01); *C09K 2019/3027* (2013.01); *C09K 2019/3408* (2013.01); *C09K 2019/3425* (2013.01)

(56) References Cited

U.S. PATENT DOCUMENTS

| | | | | |
|---|---|---|---|---|
| 7,514,127 | B2 | 4/2009 | Lietzau et al. | |
| 8,025,935 | B2 | 9/2011 | Klasen-Memmer et al. | |
| 2004/0124399 | A1 | 7/2004 | Schmidt | |
| 2007/0051920 | A1 | 3/2007 | Klasen-Memmer et al. | |
| 2009/0103011 | A1 * | 4/2009 | Bernatz | C09K 19/12 252/299.61 |
| 2009/0309066 | A1 * | 12/2009 | Klasen-Memmer | C09K 19/42 252/299.61 |
| 2011/0255048 | A1 * | 10/2011 | Goetz | C09K 19/3048 349/182 |
| 2012/0326084 | A1 * | 12/2012 | Klasen-Memmer | C09K 19/42 252/299.61 |
| 2014/0110630 | A1 | 4/2014 | Goebel et al. | |
| 2014/0111730 | A1 | 4/2014 | Goebel et al. | |
| 2016/0090533 | A1 | 3/2016 | Hirschmann et al. | |
| 2016/0122301 | A1 | 5/2016 | Furusato et al. | |
| 2016/0122647 | A1 | 5/2016 | Furusato et al. | |
| 2016/0145491 | A1 | 5/2016 | Furusato et al. | |
| 2016/0264865 | A1 * | 9/2016 | Hirschmann | C09K 19/3003 |
| 2016/0319194 | A1 | 11/2016 | Hirschmann et al. | |

FOREIGN PATENT DOCUMENTS

| | | | |
|---|---|---|---|
| EP | 2937401 | B1 | 4/2017 |
| JP | 2004529867 | A | 9/2004 |
| JP | 2004315819 | A | 11/2004 |
| JP | 2007092033 | A | 4/2007 |
| JP | 2014084460 | A | 5/2014 |
| JP | 2014084462 | A | 5/2014 |
| JP | 2014091697 | A | 5/2014 |
| WO | 07017180 | A1 | 2/2007 |
| WO | 14208318 | A1 | 12/2014 |
| WO | 14208320 | A1 | 12/2014 |
| WO | 15001916 | A1 | 1/2015 |
| WO | 15139827 | A1 | 9/2015 |

OTHER PUBLICATIONS

Office Action in corresponding CN application No. 201680011198.0 dated Aug. 26, 2020 (pp. 1-11).
Decision of Rejection in corresponding JP 2017-548151 dated Dec. 22, 2020 (pp. 1-7).
Notice for reasons of rejection in corresponding JP 2017-548151 dated Jan. 14, 2020 (pp. 1-8).
Search Report issued in corresponding ROC (Taiwan) Patent Application No. 105107664, dated Sep. 26, 2019 (pp. 1-4).
English translation of Office Action in corresponding Korean Patent Appln. No. 2017-7021850 dated Apr. 10, 2023 (pp. 1-7).

* cited by examiner

LIQUID-CRYSTALLINE MEDIUM

The invention relates to a liquid-crystalline medium which comprises at least one compound of the formula I,

I

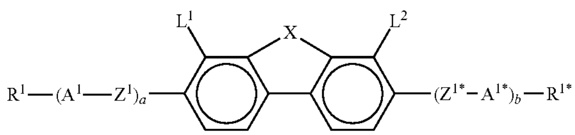

in which $R^1$ and $R^{1*}$ each, independently of one another, denote H, an alkyl or alkoxy radical having 1 to 15 C atoms, where, in addition, one or more $CH_2$ groups in these radicals may each be replaced, independently of one another, by —C≡C—, —$CF_2O$—, —$OCF_2$—, —CH═CH—,

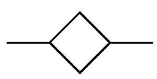, 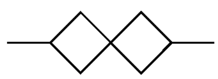,

—O—, —CO—O—, —O—CO— in such a way that O atoms are not linked directly to one another, and in which, in addition, one or more H atoms may be replaced by halogen, $A^1$ and $A^{1*}$ each, independently of one another, denote a) a 1,4-cyclohexenylene or 1,4-cyclohexylene radical, in which one or two non-adjacent $CH_2$ groups may be replaced by —O— or —S—, b) a 1,4-phenylene radical, in which one or two CH groups may be replaced by N, c) a radical from the group piperidine-1,4-diyl, 1,4-bicyclo[2.2.2]-octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) may be mono- or polysubstituted by halogen atoms, $Z^1$ and $Z^{1*}$ each, independently of one another, denote —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, X denotes-S— or —O—, and $L^1$ and $L^2$ each, independently of one another, denote F, Cl, $CF_3$ or $CHF_2$, and at least one compound selected from the group of the compounds of the formulae ST,

ST-1

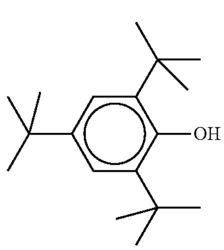

-continued

ST-2

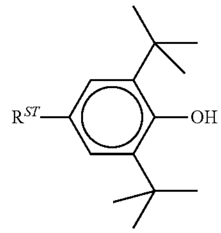

ST-3

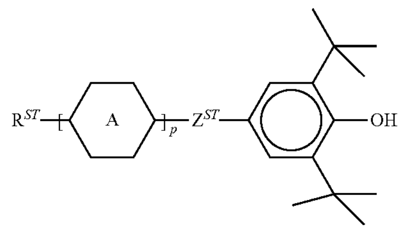

ST-4

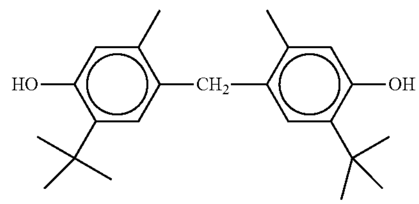

ST-5

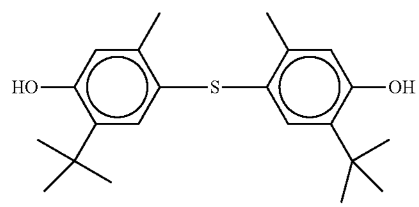

ST-6

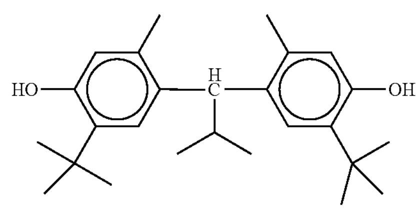

ST-7

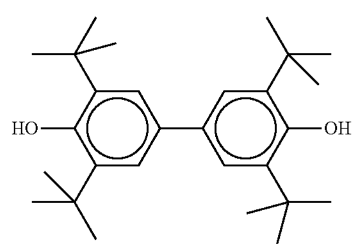

ST-8

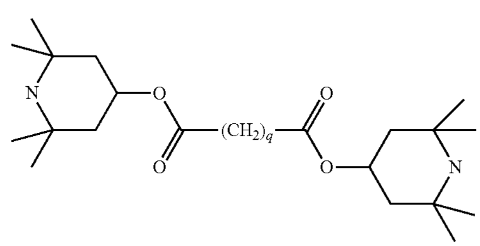

-continued

ST-9

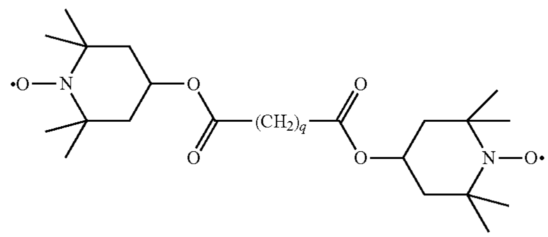

ST-10

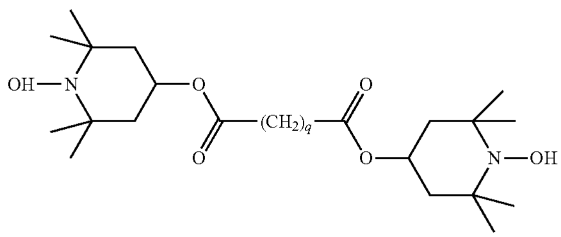

ST-11

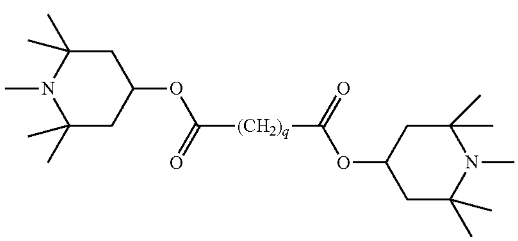

ST-12

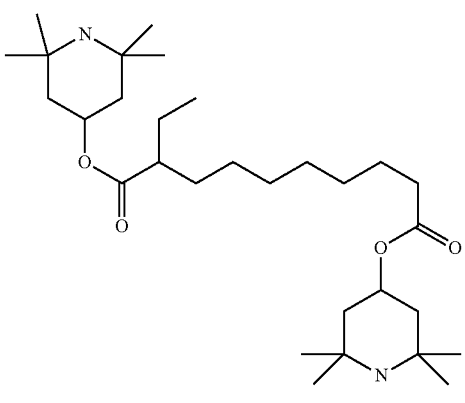

ST-13

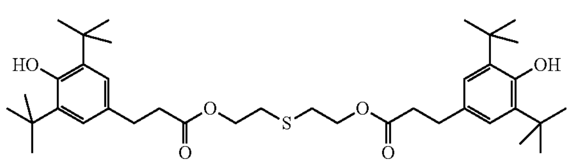

-continued

ST-14

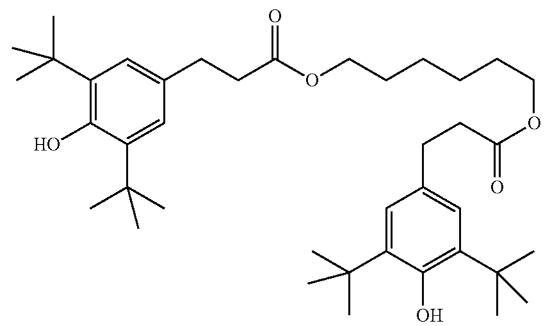

ST-15

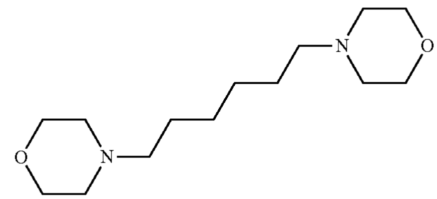

ST-16

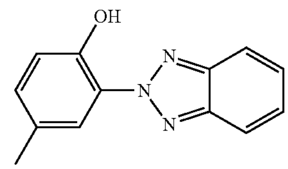

ST-17

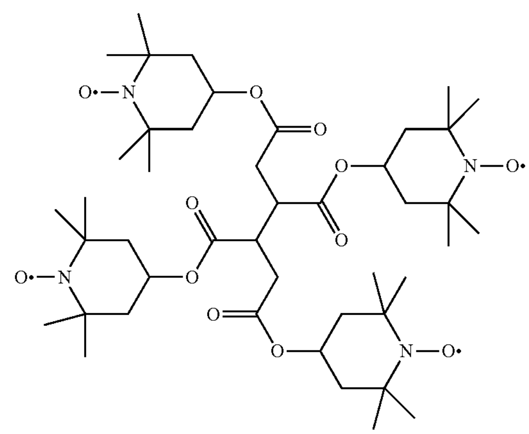

in which $R^{ST}$ denotes H, an alkyl or alkoxy radical having 1 to 15 C atoms, where, in addition, one or more $CH_2$ groups in these radicals may each be replaced, independently of one another, by —C≡C—, —$CF_2O$—, —$OCF_2$—, —CH═CH—,

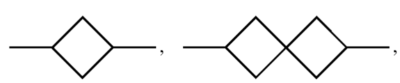

—O—, —CO—O—, —O—CO— in such a way that O atoms are not linked directly to one another, and in which, in addition, one or more H atoms may be replaced by halogen,

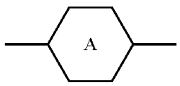
denotes
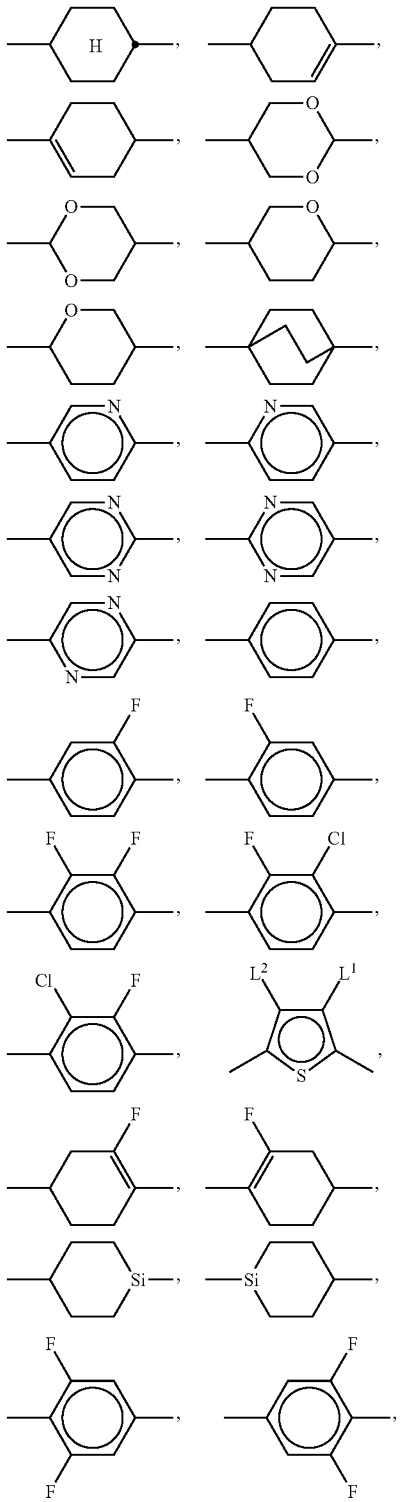
-continued
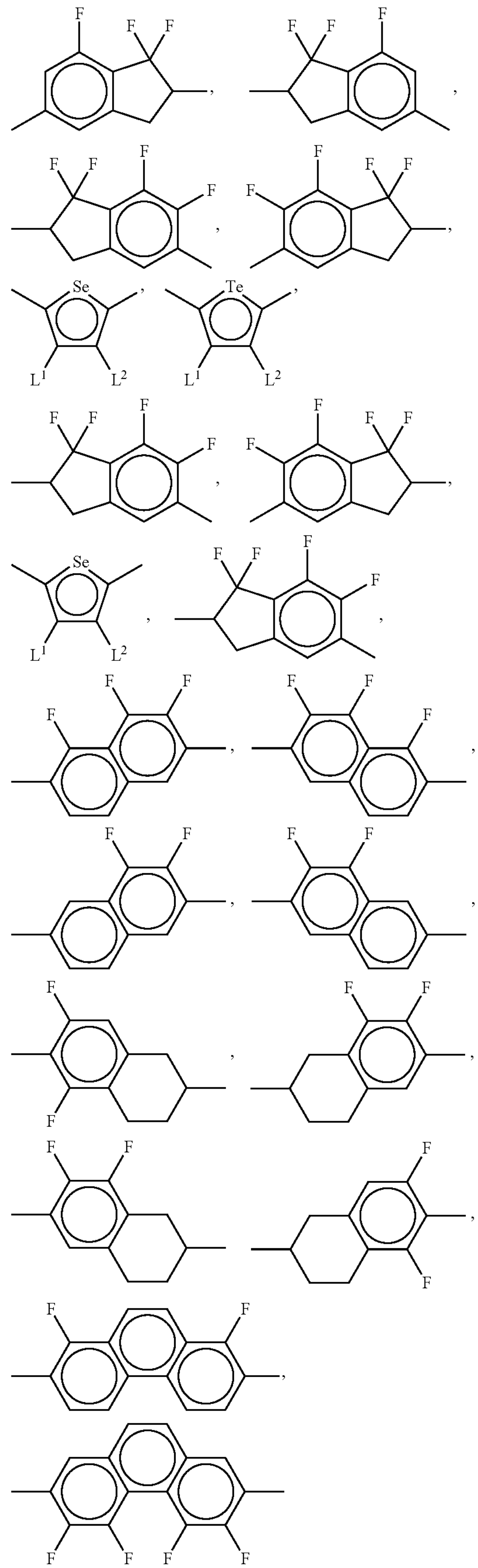

-continued

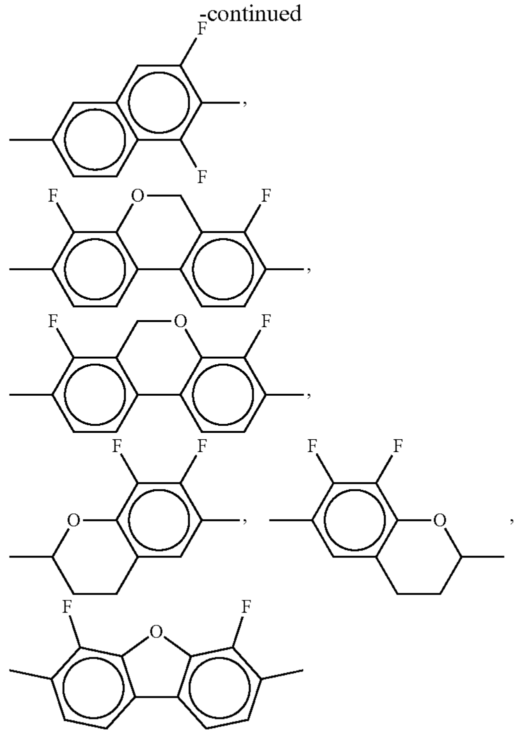

$Z^{ST}$ each, independently of one another, denote —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, $L^1$ and $L^2$ each, independently of one another, denote F, Cl, $CF_3$ or $CHF_2$, P denotes 1 or 2, q denotes 1, 2, 3, 4, 5, 6, 7, 8, 9 or 10.

Media of this type can be used, in particular, for electro-optical displays having active-matrix addressing based on the ECB effect and for IPS (in-plane switching) displays or FFS (fringe field switching) displays.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy Δn and values for the dielectric anisotropy of $\Delta\varepsilon \leq -0.5$ in order to be suitable for use in high-information display elements based on the ECB effect. Electro-optical display elements based on the ECB effect have a homeotropic edge alignment (VA technology= vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:

1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated nonlinear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September. 1984: A 210-288 Matrix LCD Controlled by Double Stage Diode Rings, pp. 141 ff., Paris; STROMER, M., Proc. Eurodisplay 84, September. 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There is thus still a great demand for MLC displays having very high specific resistance at the same time as a large working-temperature range, short response times and a low threshold voltage, with the aid of which various grey shades can be generated.

The disadvantage of the MLC-TN displays frequently used is due to their comparatively low contrast, the relatively high viewing-angle dependence and the difficulty of generating grey shades in these displays.

The market for VA, PS-VA, IPS, FFS and UB-FFS applications is looking for LC mixtures having fast response times and very high reliability. One approach for achieving fast response times is the identification of highly polar LC materials having low rotational viscosities, whose use in LC mixtures facilitates the desired effect. However, the use of highly polar LC materials of this type has an adverse effect on the reliability parameters, in particular after exposure to light.

The invention is based on the object of providing liquid-crystal mixtures, in particular for monitor and TV applications, based on the ECB, UB-FFS, IPS or FFS effect, which do not have the disadvantages indicated above, or only do so to a reduced extent. In particular, it must be ensured for monitors and televisions that they also work at extremely high and extremely low temperatures and at the same time have very short response times and at the same time have an improved reliability behaviour, in particular exhibit no or significantly reduced image sticking after long operating times.

Surprisingly, it is possible to obtain fast response times of LC mixtures at the same time as good reliability through the use of the compounds of the formula I if suitable stabilisers are added. A reliability parameter which can be specifically influenced here is the voltage holding ratio after exposure to light, such as, for example, exposure to UV light (sun test) or exposure by the backlighting of an LCD. The use of stabilisers of this type increases the voltage holding ratio after exposure to light.

The invention thus relates to a liquid-crystalline medium which comprises at least one compound of the formula I and at least one compound from the group of the compounds of the formulae ST-1 to ST-16.

The mixtures according to the invention preferably exhibit very broad nematic phase ranges with clearing points ≥70° C., preferably ≥75° C., in particular ≥80° C., very favourable values of the capacitive threshold, relatively high values of the holding ratio and at the same time very good low-temperature stabilities at −20° C. and −30° C., as well as very low rotational viscosity values and short response times. The mixtures according to the invention are furthermore distinguished by the fact that, in addition to the improvement in the rotational viscosity $\gamma_1$, relatively high values of the elastic constants $K_{33}$ for improving the response times can be observed. The use of the compounds of the formula I in LC mixtures, preferably having negative dielectric anisotropy, the ratio of rotational viscosity $\gamma_1$ and elastic constants $K_i$ is reduced.

Some preferred embodiments of the mixtures according to the invention are indicated below.

In the compounds of the formula I, $R^1$ and $R^{1*}$ preferably each, independently of one another, denote straight-chain alkoxy, in particular $OCH_3$, n-$C_2H_5O$, n-$OC_3H_7$, n-$OC_4H_9$, n-$OC_5H_{11}$, n-$OC_6H_{13}$, furthermore alkenyl, in particular $CH_2{=}CH_2$, $CH_2CH{=}CH_2$, $CH_2CH{=}CHCH_3$, $CH_2CH{=}CHC_2H_5$, branched alkoxy, in particular $OC_3H_6CH(CH_3)_2$, and alkenyloxy, in particular $OCH{=}CH_2$, $OCH_2CH{=}CH_2$, $OCH_2CH{=}CHCH_3$, $OCH_2CH{=}CHC_2H_5$.

$R^1$ and $R^{1*}$ particularly preferably each, independently of one another, denote straight-chain alkoxy having 1-6 C atoms, in particular methoxy, ethoxy, propoxy, butoxy, pentoxy, hexoxy.

$L^1$ and $L^2$ in formula I preferably both denote F.

Preferred compounds of the formula I are the compounds of the formulae I-1 to I-20,

I-1

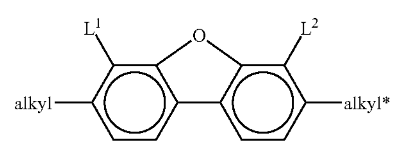

I-2

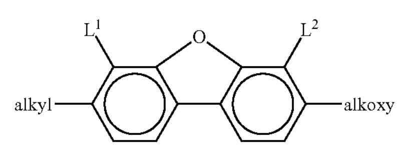

-continued

I-3

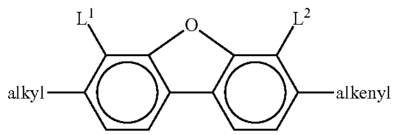

I-4

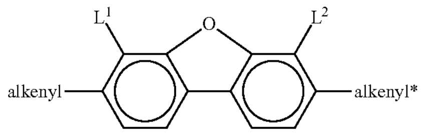

I-5

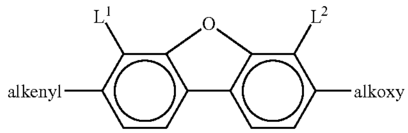

I-6

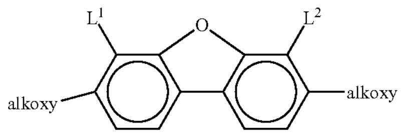

I-7

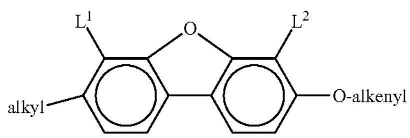

I-8

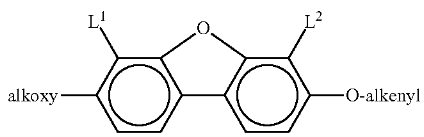

I-9

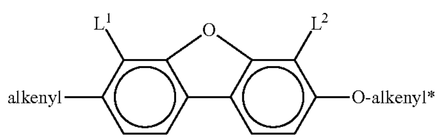

I-10

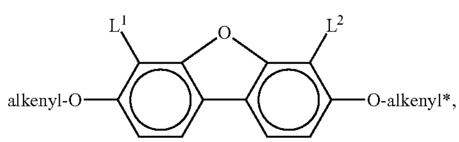

I-11

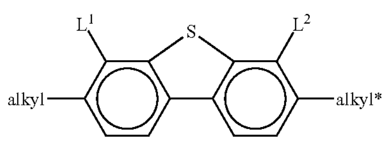

I-12

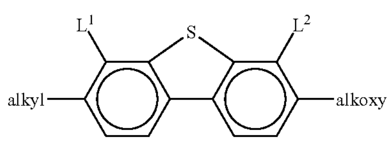

I-13

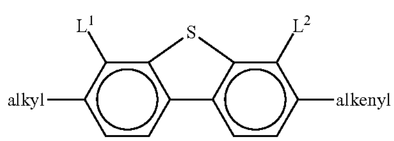

-continued

I-14

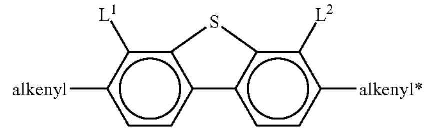

I-15

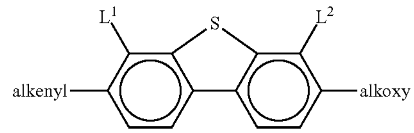

I-16

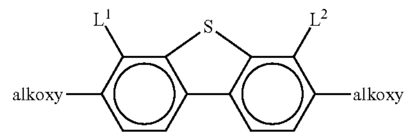

I-17

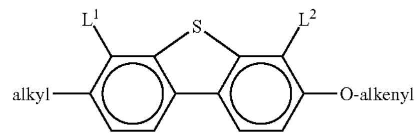

I-18

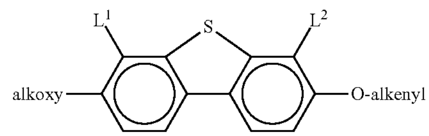

I-19

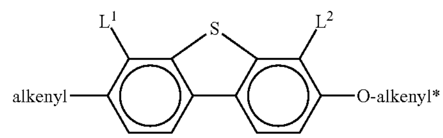

I-20

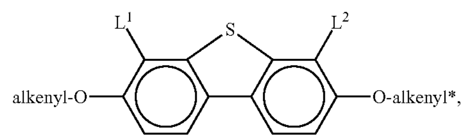

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl.

In the compounds of the formulae I-1 to I-20, $L^1$ and $L^2$ preferably each, independently of one another, denote F or Cl, in particular $L^1$=$L^2$=F. Particular preference is given to the compounds of the formulae I-2 and I-6. In the compounds of the formulae I-2 and I-6, preferably $L^1$=$L^2$=F.

The mixture according to the invention very particularly preferably comprises at least one compound selected from the group of the compounds of the formulae I-1A, I-2A, I-4A, I-6A, I-6B, I-11A, I-12-A, I-14A and I-16A shown below:

I-1A
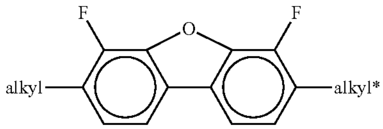
I-2A
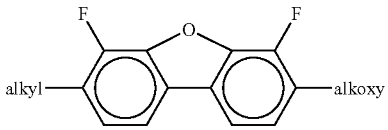
I-4A
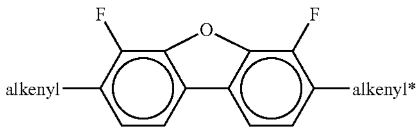
I-6A
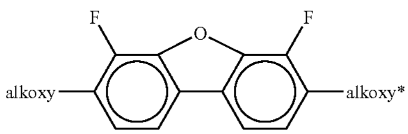
I-6B
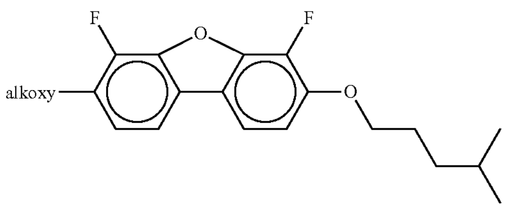
I-11A
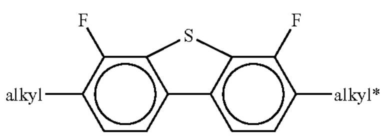
I-12A
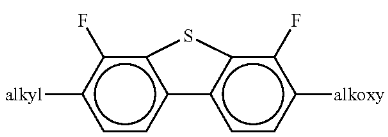
I-14A
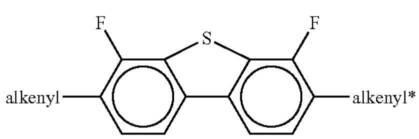
I-16A
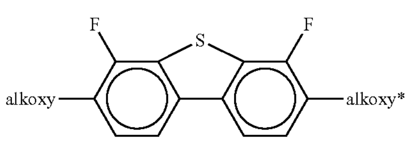
Very particularly preferred mixtures comprise at least one compound selected from the group of the compounds of the formulae I-2.1 to I-2.49, I-6.1 to I-6.28, I-12.1 to I-12.49 and I-16.1 to I-16.28:
I-2.1
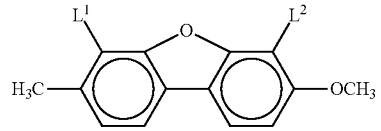
I-2.2
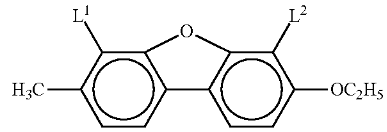
I-2.3
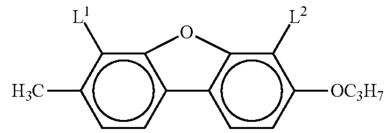
I-2.4
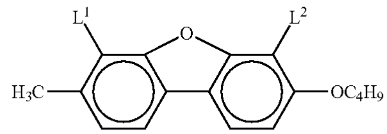
I-2.5
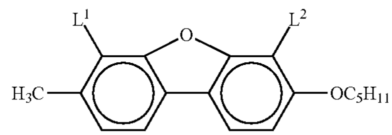
I-2.6
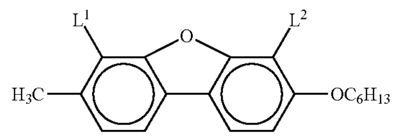
I-2.7
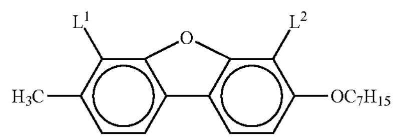
I-2.8
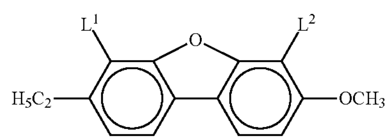
I-2.9
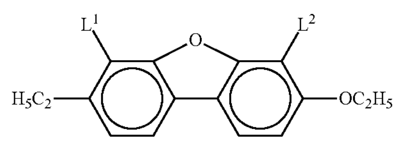
I-2.10
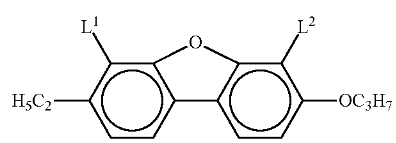
I-2.11
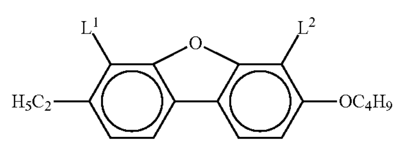

-continued
I-2.12
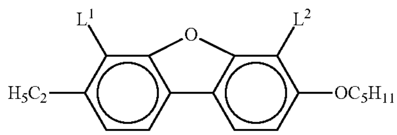
I-2.13
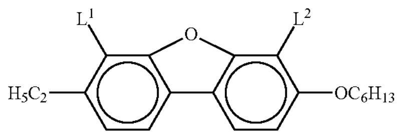
I-2.14
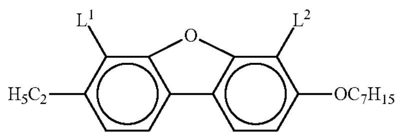
I-2.15
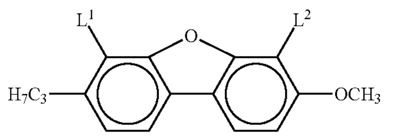
I-2.16
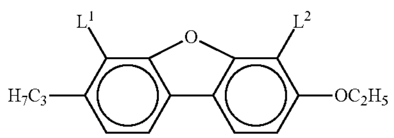
I-2.17
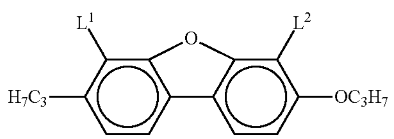
I-2.18
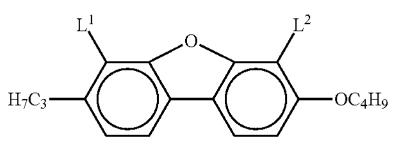
I-2.19
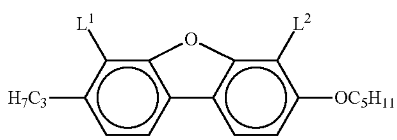
I-2.20
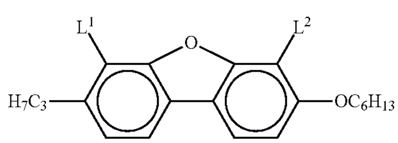
I-2.21
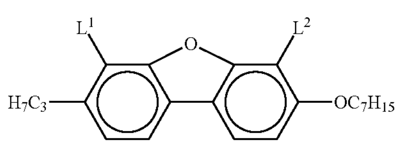
I-2.22
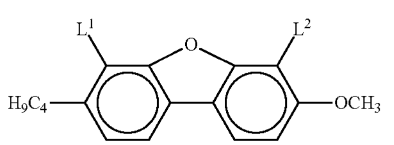
-continued
I-2.23
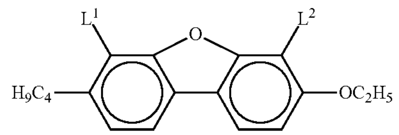
I-2.24
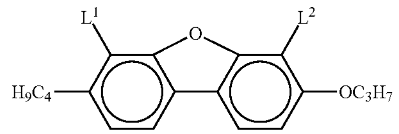
I-2.25
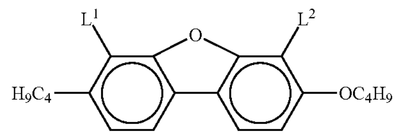
I-2.26
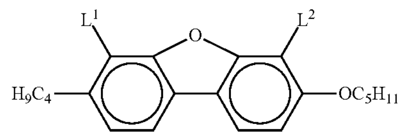
I-2.27
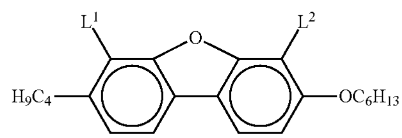
I-2.28
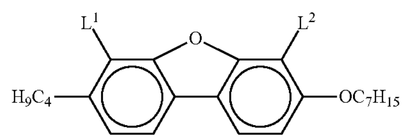
I-2.29
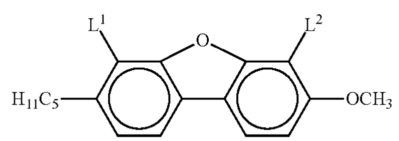
I-2.30
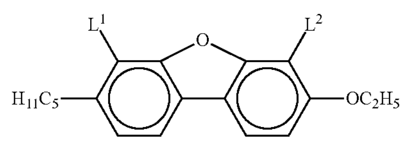
I-2.31
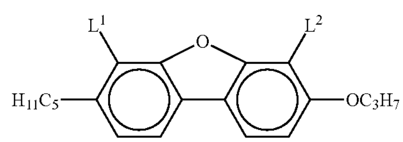
I-2.32
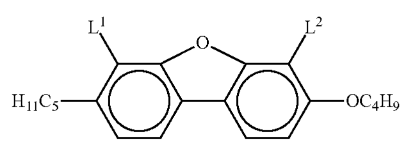
I-2.33
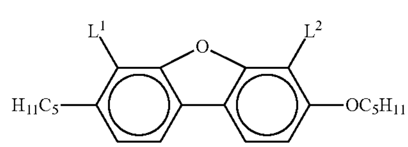

-continued
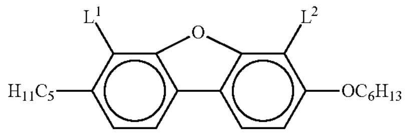
I-2.34
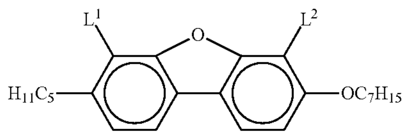
I-2.35
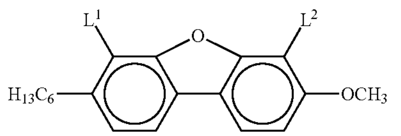
I-2.36
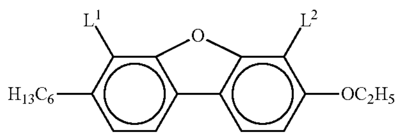
I-2.37
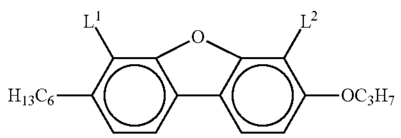
I-2.38
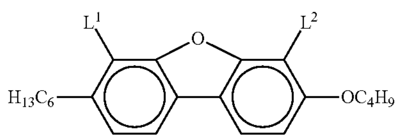
I-2.39
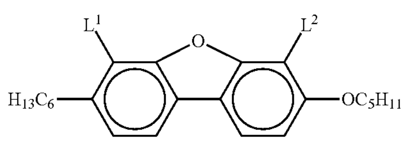
I-2.40
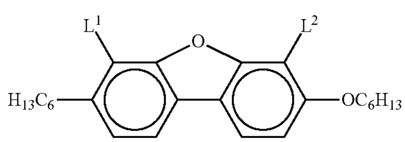
I-2.41
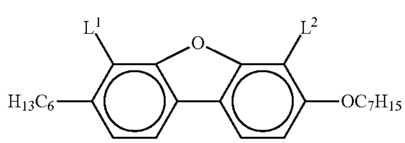
I-2.42
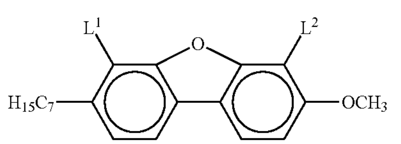
I-2.43
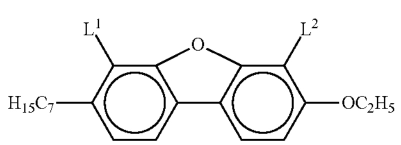
I-2.44
-continued
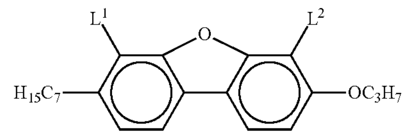
I-2.45
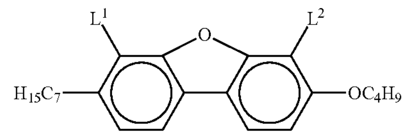
I-2.46
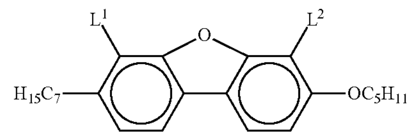
I-2.47
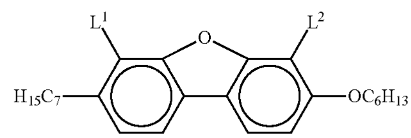
I-2.48
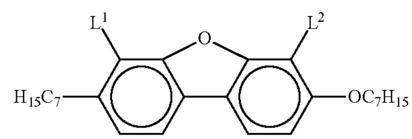
I-2.49
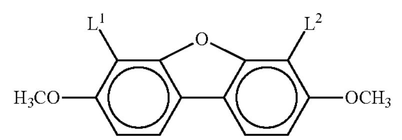
I-6.1
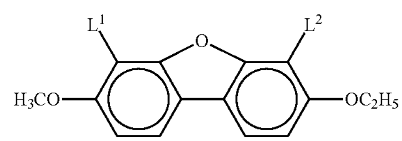
I-6.2
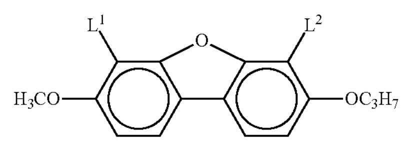
I-6.3
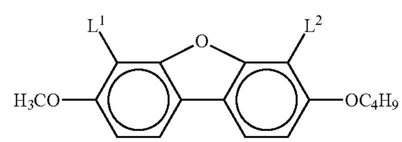
I-6.4
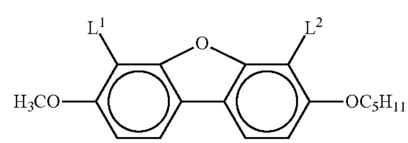
I-6.5
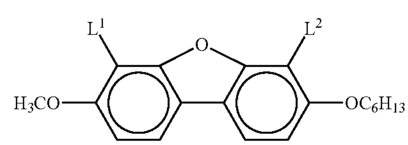
I-6.6

-continued
I-6.7
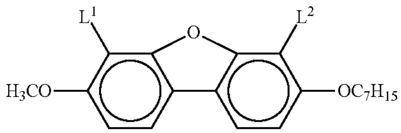
I-6.8
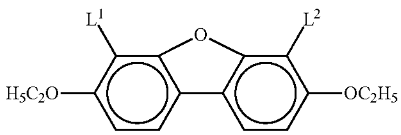
I-6.9
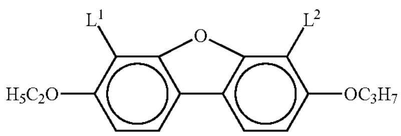
I-6.10
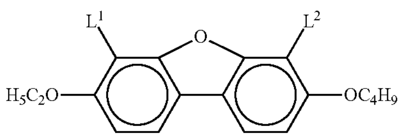
I-6.11
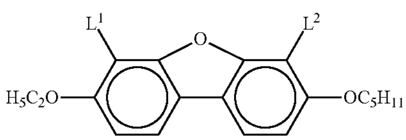
I-6.12
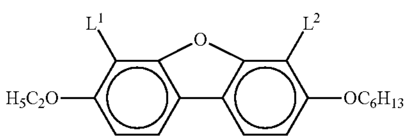
I-6.13
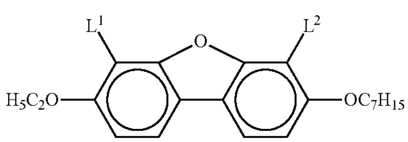
I-6.14
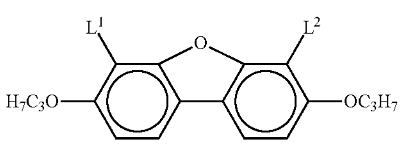
I-6.15
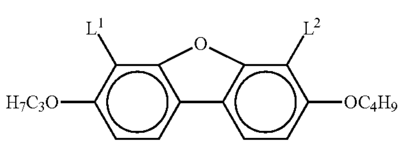
I-6.16
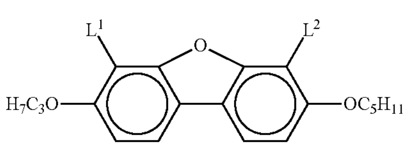
I-6.17
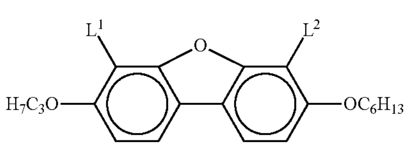
-continued
I-6.18
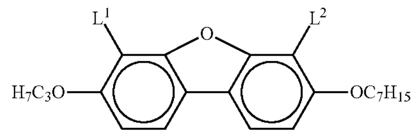
I-6.19
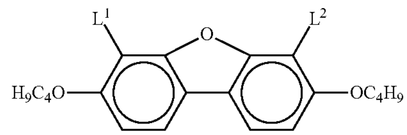
I-6.20
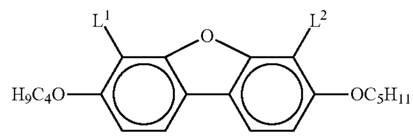
I-6.21
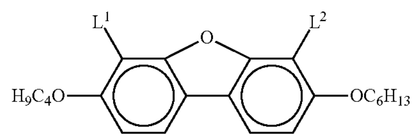
I-6.22
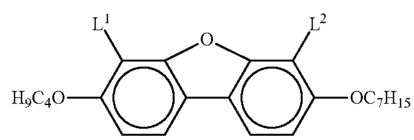
I-6.23
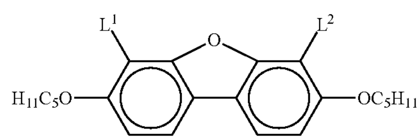
I-6.24
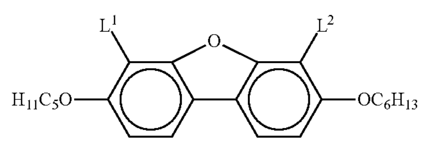
I-6.25
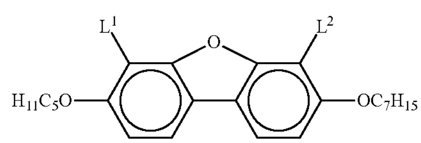
I-6.26
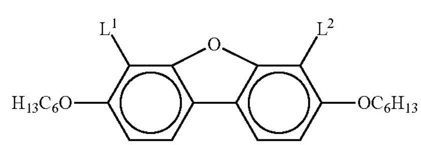
I-6.27
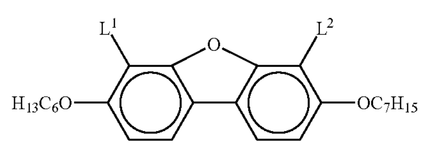
I-6.28
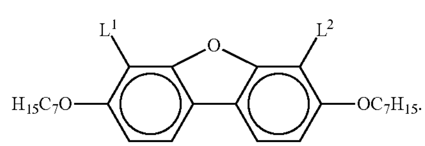

I-12.1
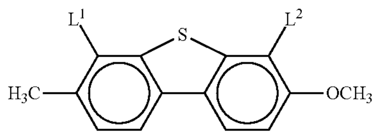
I-12.2
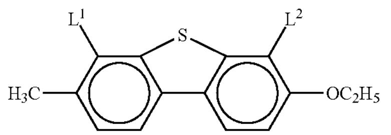
I-12.3
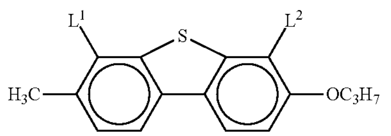
I-12.4
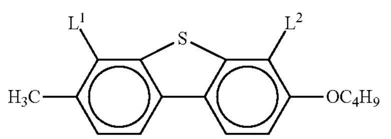
I-12.5
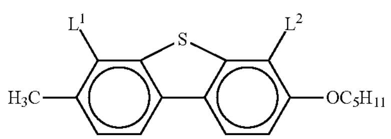
I-12.6
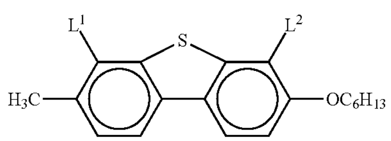
I-12.7
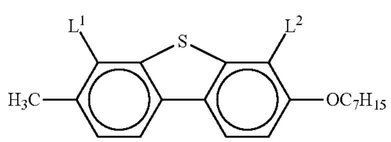
I-12.8
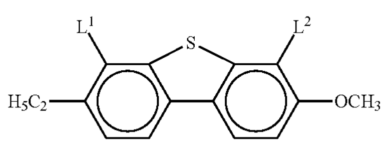
I-12.9
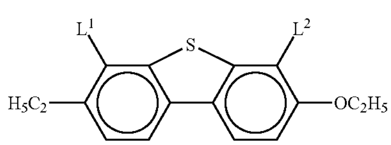
I-12.10
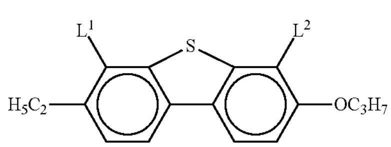
I-12.11
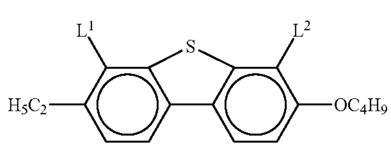
I-12.12
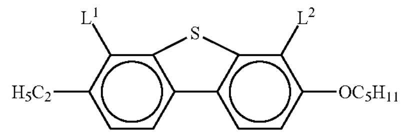
I-12.13
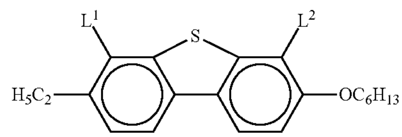
I-12.14
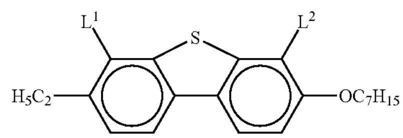
I-12.15
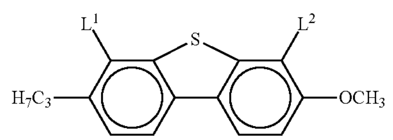
I-12.16
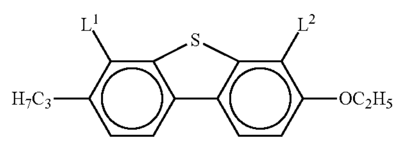
I-12.17
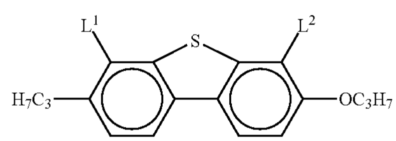
I-12.18
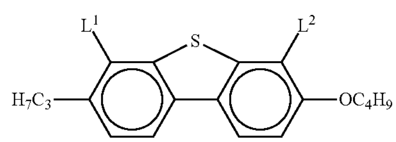
I-12.19
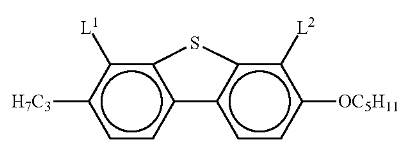
I-12.20
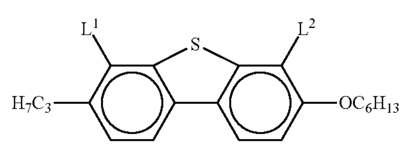
I-12.21
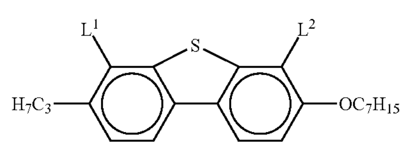
I-12.22
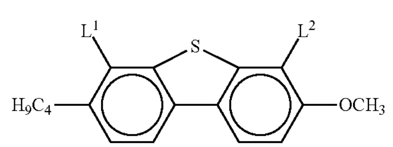

-continued
I-12.23
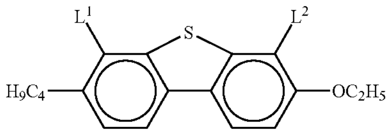
I-12.24
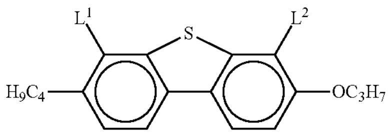
I-12.25
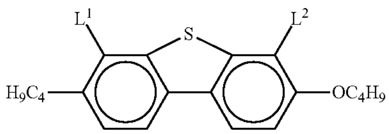
I-12.26
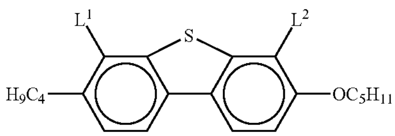
I-12.27
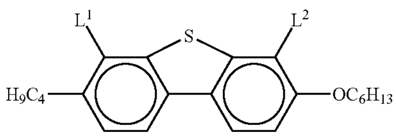
I-12.28
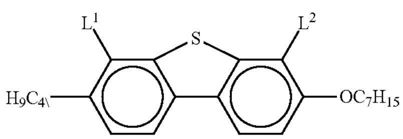
I-12.29
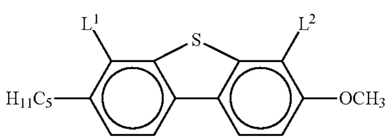
I-12.30
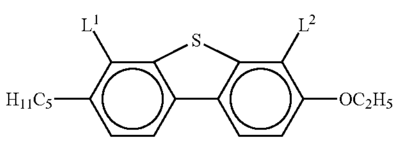
I-12.31
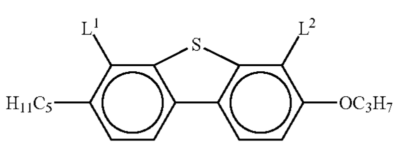
I-12.32
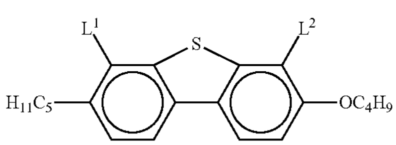
I-12.33
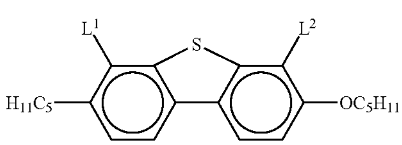
-continued
I-12.34
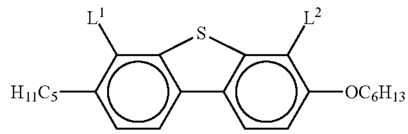
I-12.35
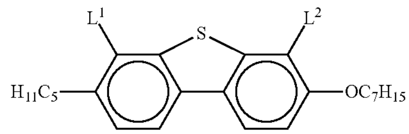
I-12.36
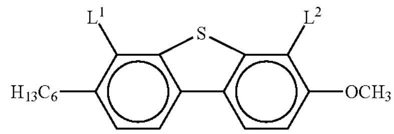
I-12.37
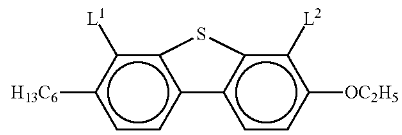
I-12.38
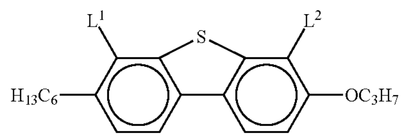
I-12.39
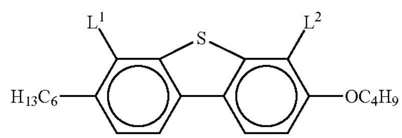
I-12.40
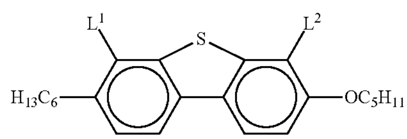
I-12.41
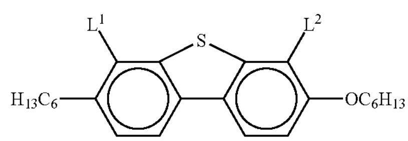
I-12.42
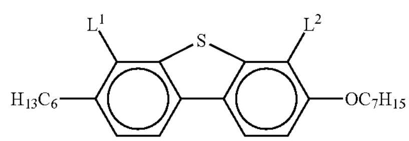
I-12.43
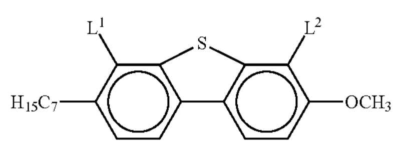
I-12.44
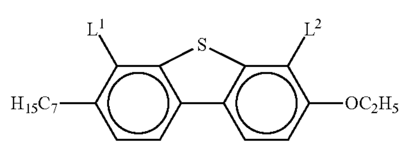

-continued
I-12.45
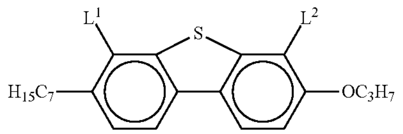
I-12.46
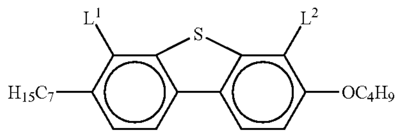
I-12.47
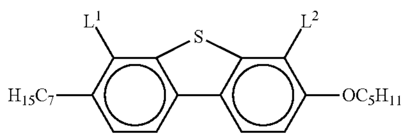
I-12.48
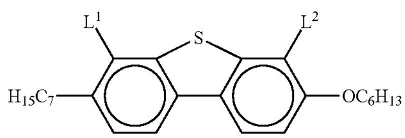
I-12.49
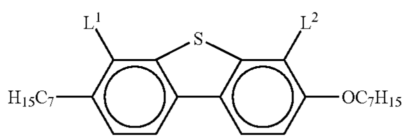
I-16.1
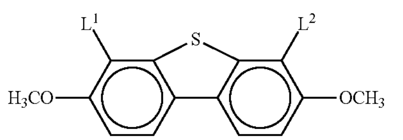
I-16.2
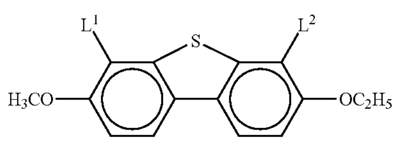
I-16.3
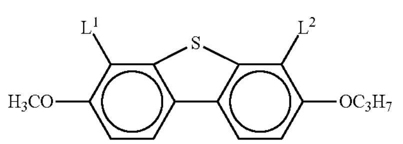
I-16.4
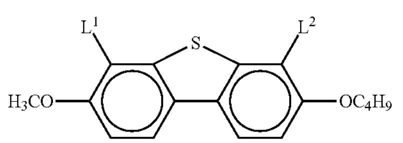
I-16.5
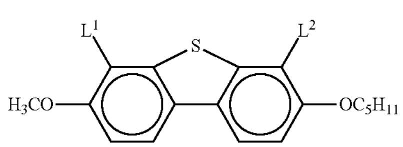
I-16.6
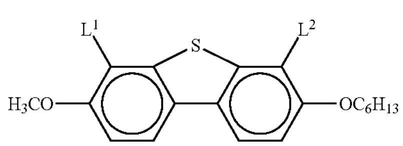
-continued
I-16.7
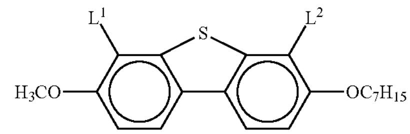
I-16.8
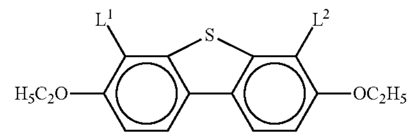
I-16.9
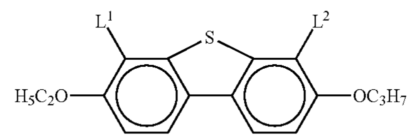
I-16.10
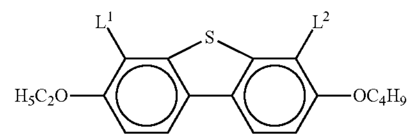
I-16.11
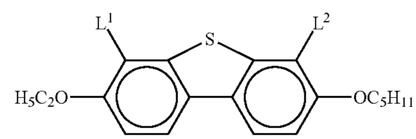
I-16.12
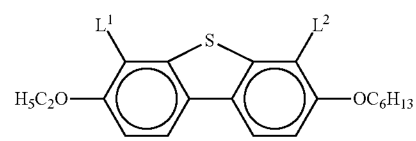
I-16.13
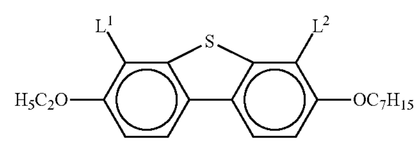
I-16.14
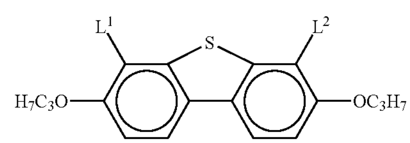
I-16.15
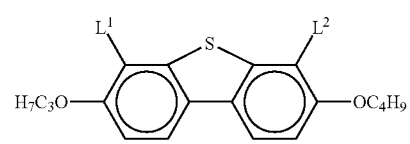
I-16.16
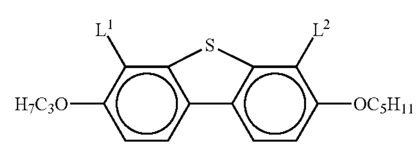
I-16.17
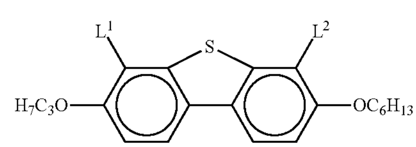

-continued
I-16.18
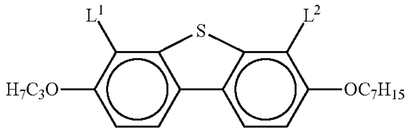
I-16.19
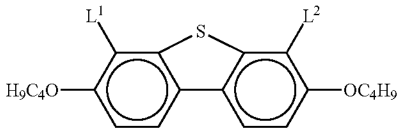
I-16.20
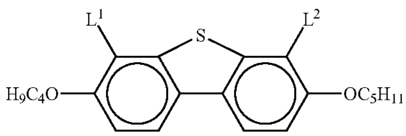
I-16.21
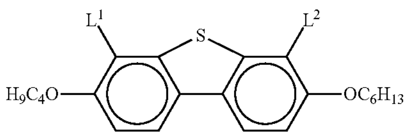
I-16.22
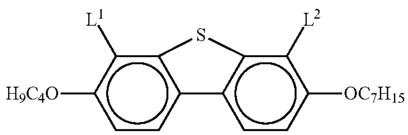
I-16.23
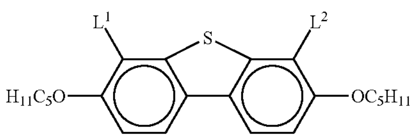
I-16.24
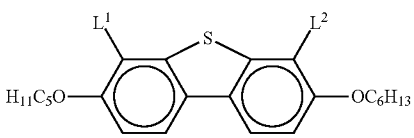
I-16.25
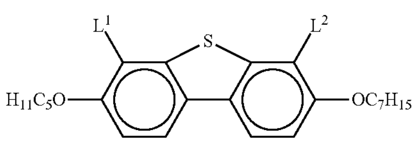
I-16.26
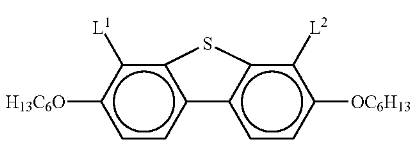
I-16.27
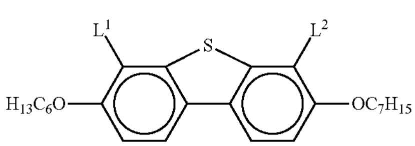
I-16.28
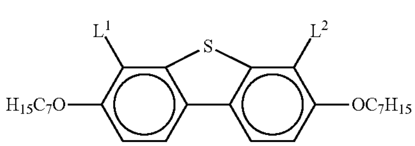
In the compounds of the formulae I-2.1 to I-2.49, I-6-1 to I-6-28, I-12.1 to I-12.49 and I-16-1 to I-16-28, $L^1$ and $L^2$ preferably both denote fluorine.
Preference is furthermore given to liquid-crystalline mixtures which comprise at least one compound selected from the group of the compounds of the formulae I-1.1 to I-1.28, I-6B.1 to I-6B.3 and I-11.1 to I-11.28:
I-1.1
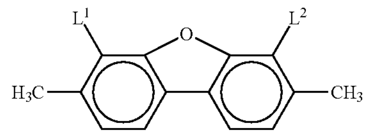
I-1.2
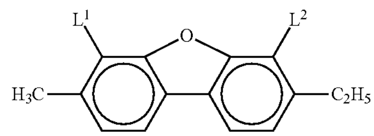
I-1.3
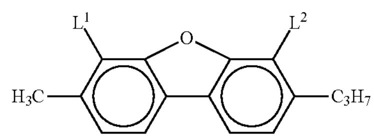
I-1.4
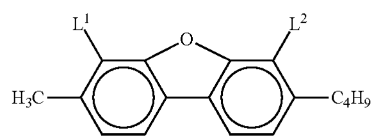
I-1.5
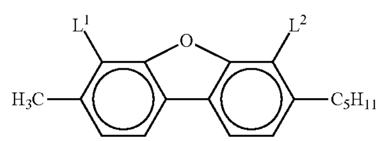
I-1.6
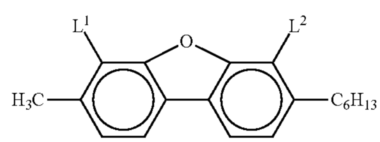
I-1.7
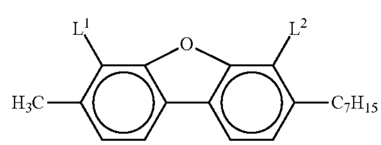
I-1.8
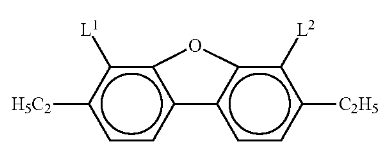
I-1.9
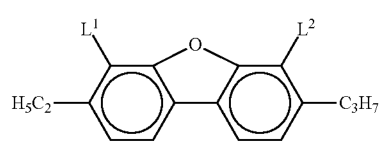
I-1.10
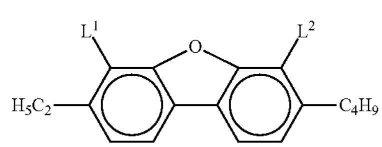

-continued
I-1.11
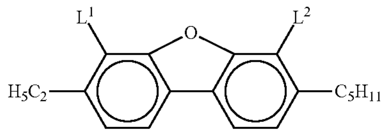
I-1.12
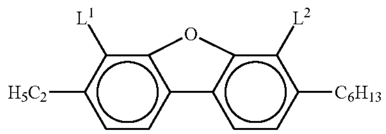
I-1.13
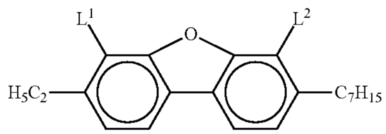
I-1.14
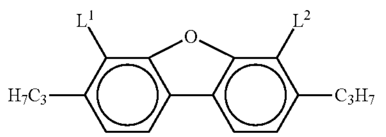
I-1.15
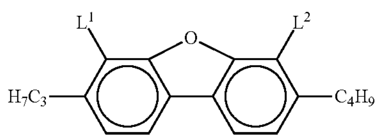
I-1.16
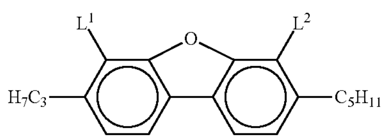
I-1.17
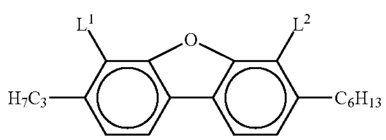
I-1.18
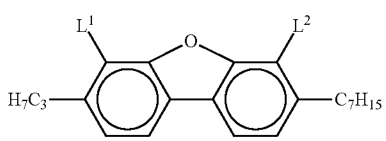
I-1.19
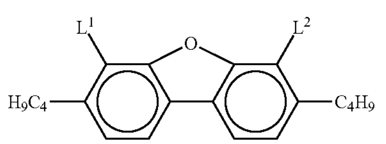
I-1.20
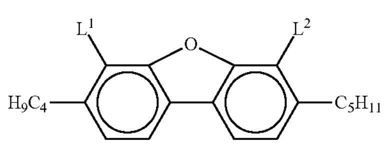
I-1.21
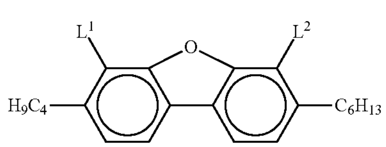
-continued
I-1.22
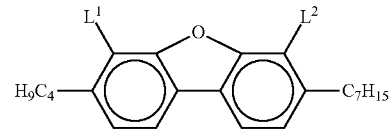
I-1.23
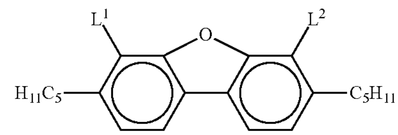
I-1.24
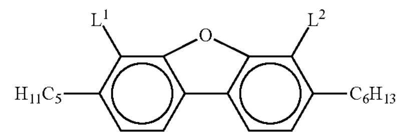
I-1.25
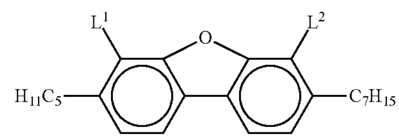
I-1.26
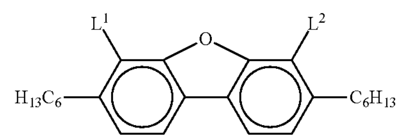
I-1.27
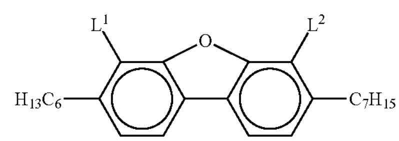
I-1.28
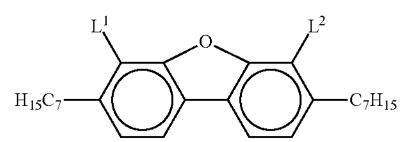
I-6B.1
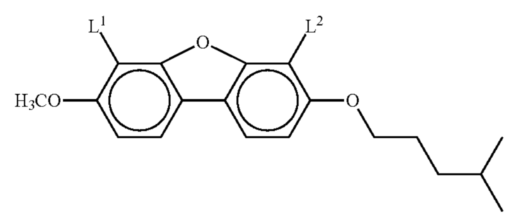
I-6B.2
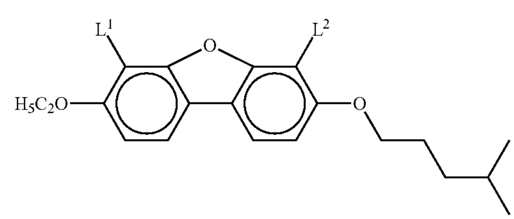

-continued
I-6B.3
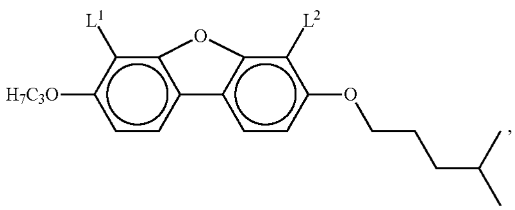
I-11.1
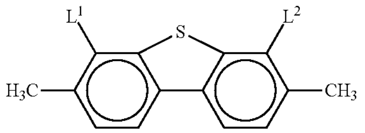
I-11.2
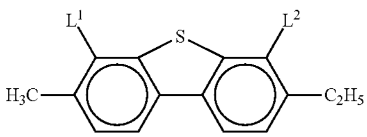
I-11.3
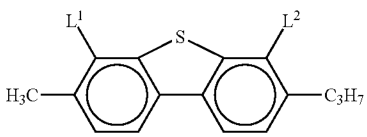
I-11.4
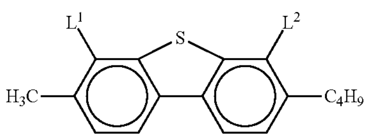
I-11.5
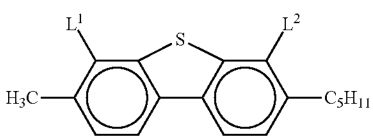
I-11.6
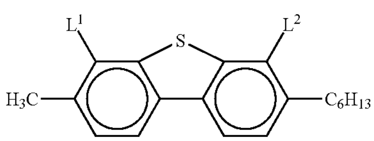
I-11.7
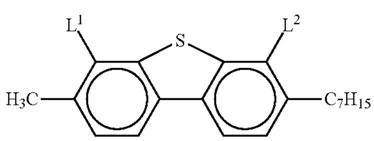
I-11.8
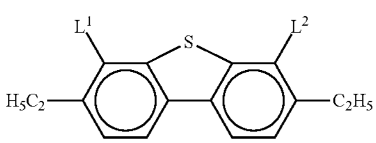
I-11.9
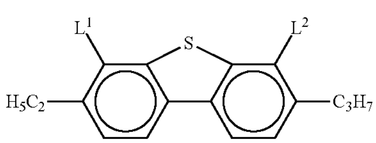
-continued
I-11.10
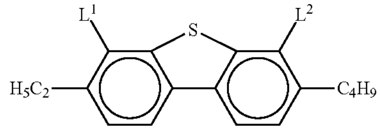
I-11.11
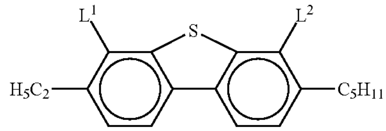
I-11.12
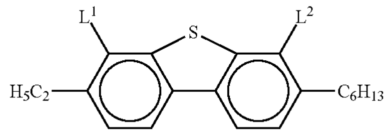
I-11.13
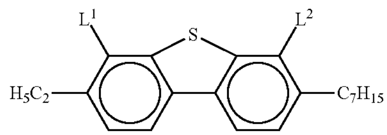
I-11.14
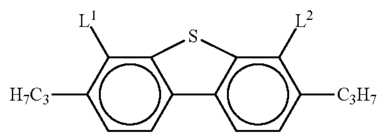
I-11.15
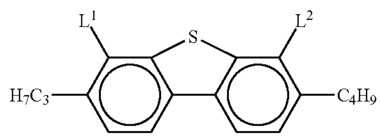
I-11.16
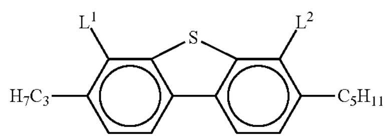
I-11.17
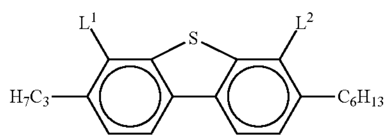
I-11.18
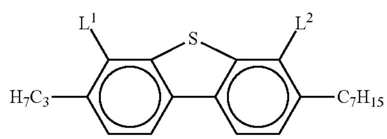
I-11.19
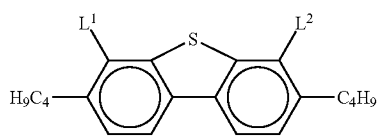
I-11.20
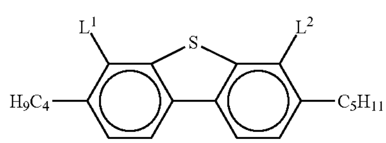

-continued
I-11.21
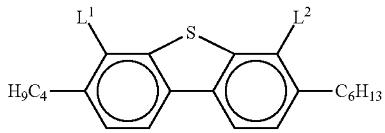
I-11.22
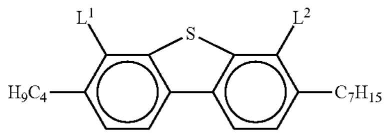
I-11.23
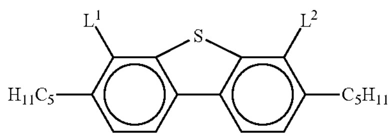
I-11.24
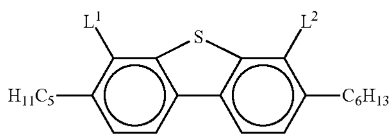
I-11.25
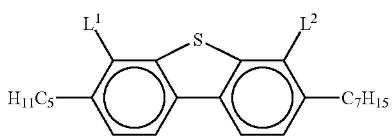
I-11.26
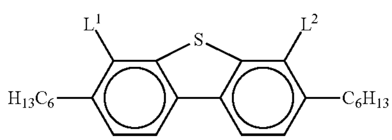
I-11.27
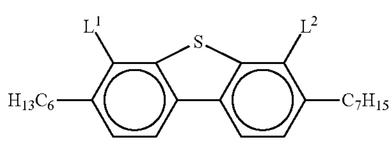
I-11.28
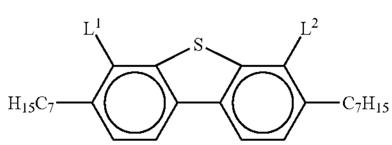
in which $L^1$ and $L^2$ each, independently of one another, have the meanings given as for formula I. In the compounds of the formulae I-1.1 to I-1.28, I-6B.1 to I-6B.3 and I-11.1 to I-11.28, preferably $L^1=L^2=F$.
Very particularly preferred mixtures comprise at least one of the compounds shown below:
I-6A-1
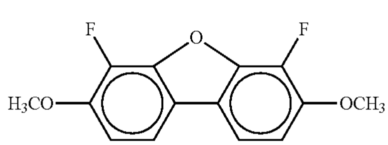
-continued
I-6A-2
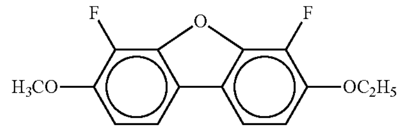
I-6A-3
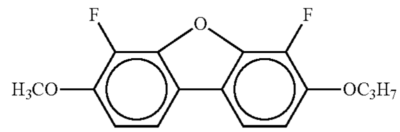
I-6A-4
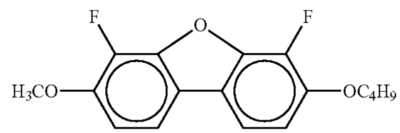
I-6A-5
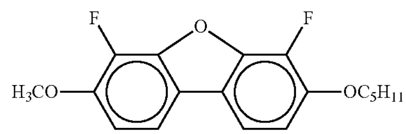
I-6A-6
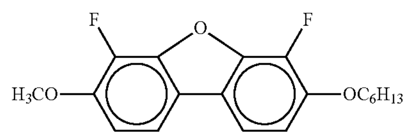
I-6A-7
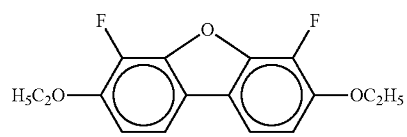
I-6A-8
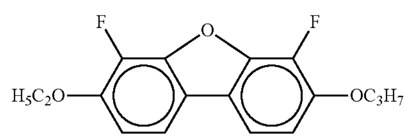
I-6A-9
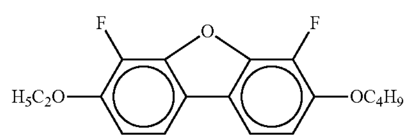
I-6A-10
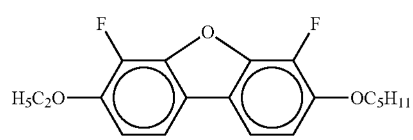
I-6A-11
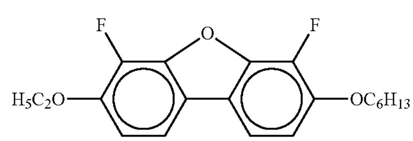
I-6A-12
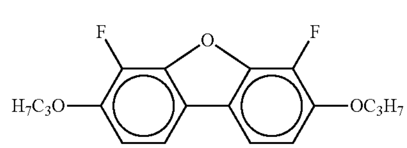

-continued

I-6A-13

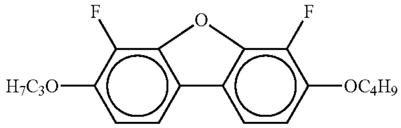

I-6A-14

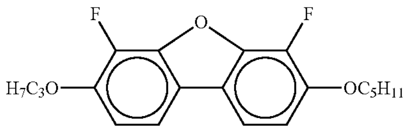

I-6A-15

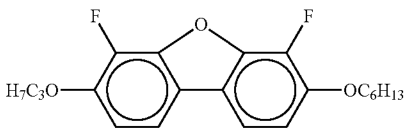

I-6A-16

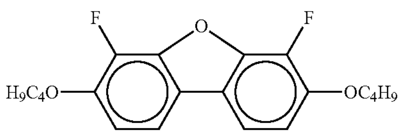

I-6A-17

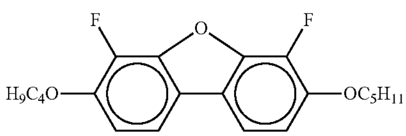

I-6A-18

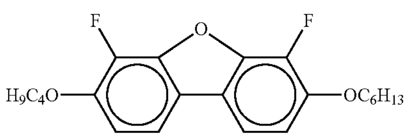

I-6A-19

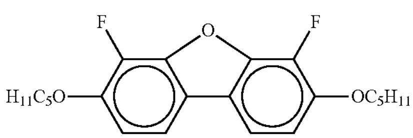

I-6A-20

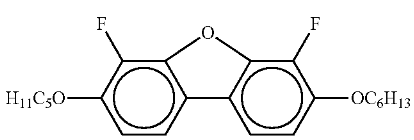

I-6A-21

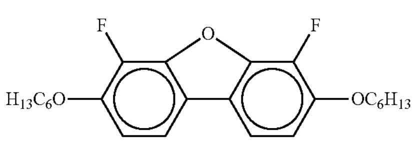

I-6B-1

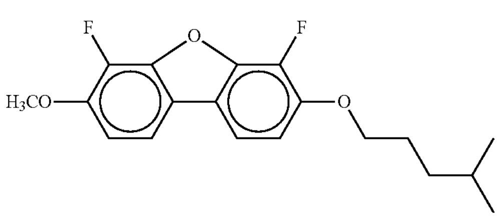

-continued

I-6B-2

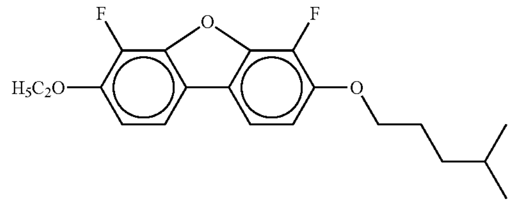

I-6B-3

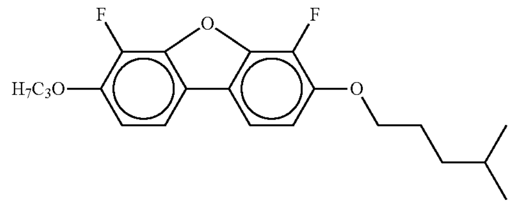

I-6B-4

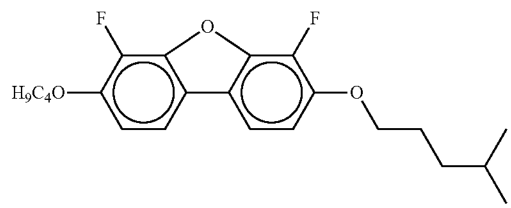

I-6B-5

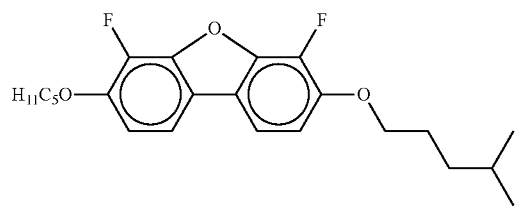

I-6B-6

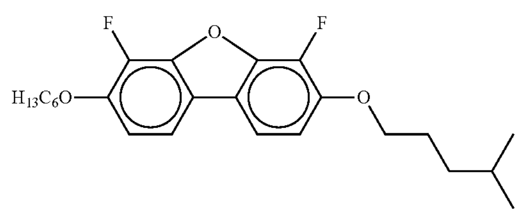

The compounds of the formula I can be prepared, for example, as described in US 2005/0258399 or WO 02/055463 A1.

The media according to the invention preferably comprise one, two, three, four or more, preferably one, two or three, compounds of the formula I.

The compounds of the formula I are preferably employed in the liquid-crystalline medium in amounts of ≥1, preferably ≥3% by weight, based on the mixture as a whole. Particular preference is given to liquid-crystalline media which comprise 1-40% by weight, very particularly preferably 2-30% by weight, of one or more compounds of the formula I.

Of the compounds of the formula ST, especial preference is given to the compounds of the formulae
St-1
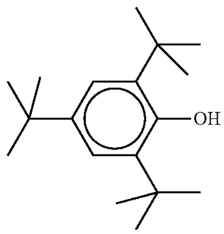
St-2a
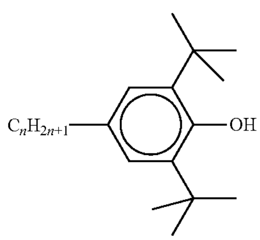
where n=1, 2, 3, 4, 5, 6 or 7, preferably n=1 or 7
St-3a
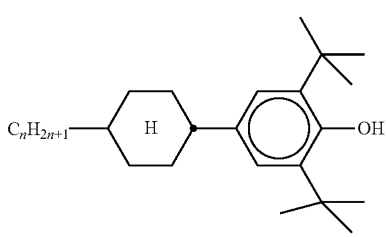
where n=1, 2, 3, 4, 5, 6 or 7, preferably n=3
ST-3b
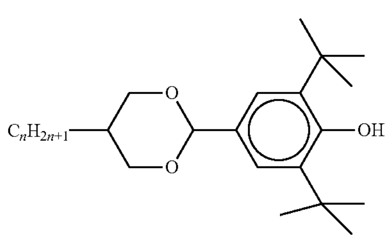
where n=1, 2, 3, 4, 5, 6 or 7, preferably n=3
ST-8-1
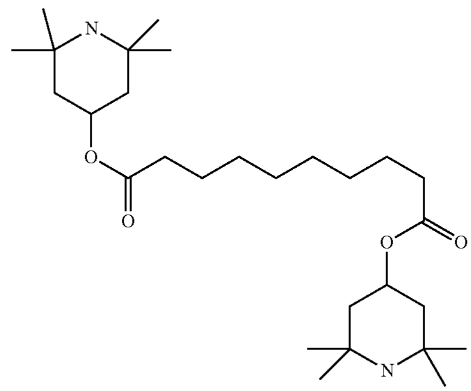
ST-9-1
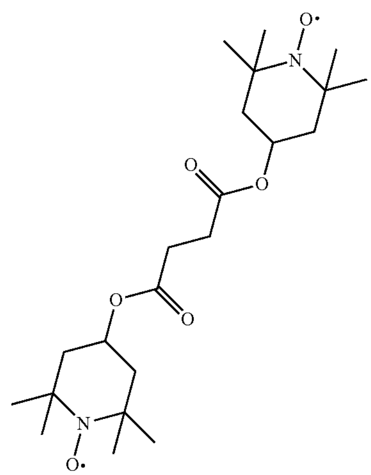
ST-12
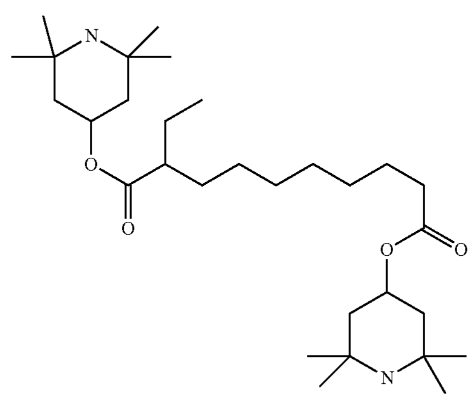
ST-15
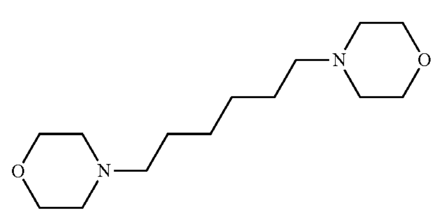

-continued

ST-16

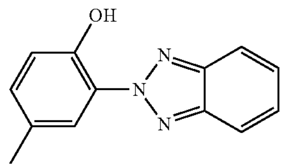

ST-17

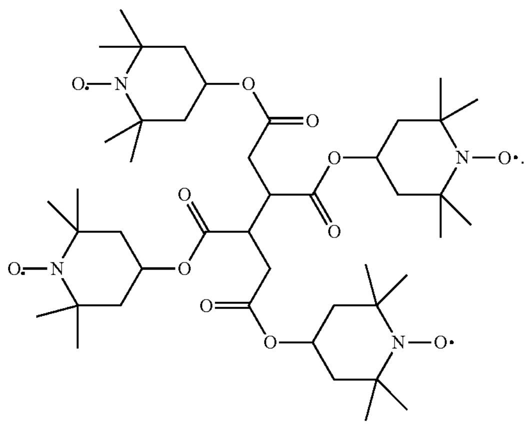

In the compounds of the formulae ST-3a and ST-3b, n preferably denotes 3. In the compounds of the formula ST-2a, n preferably denotes 7.

Very particularly preferred mixtures according to the invention comprise one or more stabilisers from the group of the compounds of the formulae ST-2a-1, ST-3a-1, ST-3b-1, ST-8-1, ST-9-1 and ST-12:

ST-2a-1

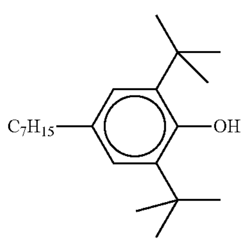

ST-3a-1

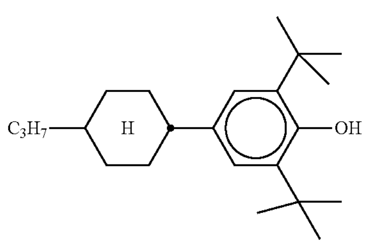

ST-3b-1

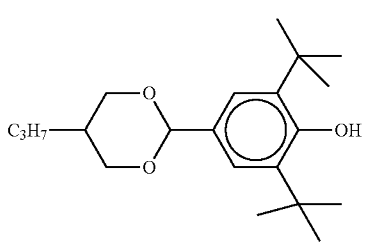

-continued

ST-8-1

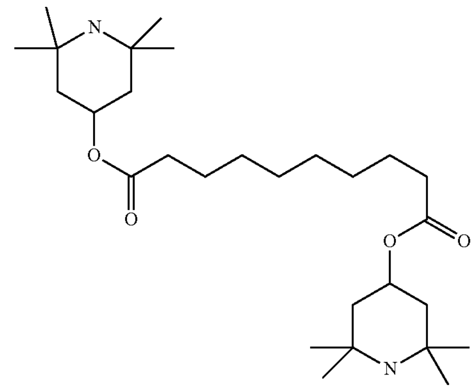

ST-9-1

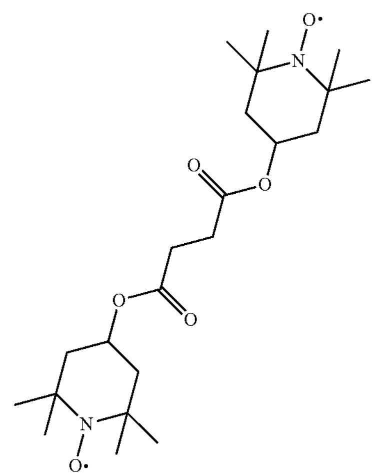

ST-12

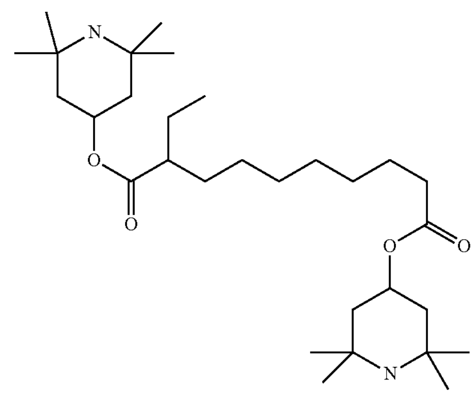

The compounds of the formulae ST-1 to ST-17 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-17, the concentration correspondingly increases to 0.01-1% in the case of two compounds, based on the mixtures.

However, the total proportion of the compounds of the formulae ST-1 to ST-17, based on the mixture according to the invention, should not exceed 2%.

Preferred embodiments of the liquid-crystalline medium according to the invention are indicated below:

a) Liquid-crystalline medium which additionally comprises one or more compounds selected from the group of the compounds of the formulae IIA, IIB and IIC,

IIA

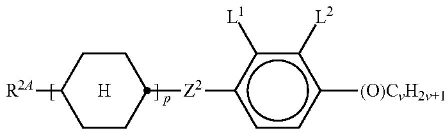

IIB

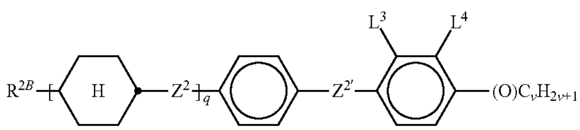

IIC

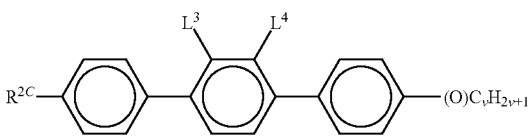

in which $R^{2A}$, $R^{2B}$ and $R^{2C}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

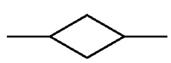,

—C≡C—, —$CF_2$O—, —O$CF_2$—, —OC—O— or —O—CO— in such a way that 0 atoms are not linked directly to one another, $L^{1-4}$ each, independently of one another, denote F, Cl, $CF_3$ or $CHF_2$, $Z^2$ and $Z^{2'}$ each, independently of one another, denote a single bond, —$CH_2CH_2$—, —CH═CH—, —$CF_2$O—, —O$CF_2$—, —$CH_2$O—, —O$CH_2$—, —COO—, —COO—, —$C_2F_4$—, —CF═CF—, —CH═CH$CH_2$O—, p denotes 0, 1 or 2, q denotes 0 or 1, and v denotes 1 to 6.

In the compounds of the formulae IIA and IIB, $Z^2$ may have identical or different meanings. In the compounds of the formula IIB, $Z^2$ and $Z^{2'}$ may have identical or different meanings.

In the compounds of the formulae IIA, IIB and IIC, $R^{2A}$, $R^{2B}$ and $R^{2C}$ each preferably denote alkyl having 1-6 C atoms, in particular $CH_3$, $C_2H_5$, n-$C_3H_7$, n-$C_4H_9$, n-$C_5H_{11}$.

In the compounds of the formulae IIA and IIB, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae IIA and IIB preferably each, independently of one another, denote a single bond, furthermore a —$C_2H_4$— bridge.

If, in the formula IIB, $Z^2$=—$C_2H_4$— or —$CH_2$O—, $Z^{2'}$ is preferably a single bond or, if $Z^{2'}$=—$C_2H_4$— or —$CH_2$O—, $Z^2$ is preferably a single bond. In the compounds of the formulae IIA and IIB, (O)$C_vH_{2v+1}$ preferably denotes O$C_vH_{2v+1}$, furthermore $C_vH_{2v+1}$. In the compounds of the formula IIC, (O)$C_vH_{2v+1}$ preferably denotes $C_vH_{2v+1}$. In the compounds of the formula IIC, $L^3$ and $L^4$ preferably each denote F.

Preferred compounds of the formulae IIA, IIB and IIC are indicated below:

IIA-1

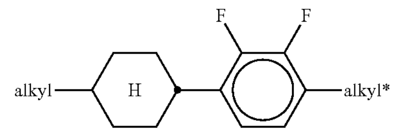

IIA-2

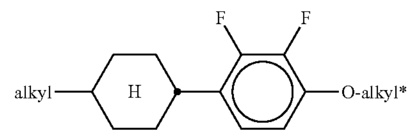

IIA-3

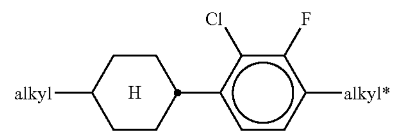

IIA-4

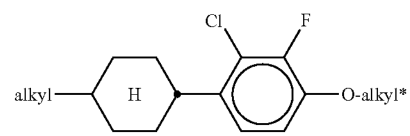

IIA-5

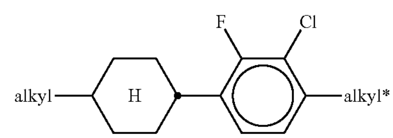

IIA-6

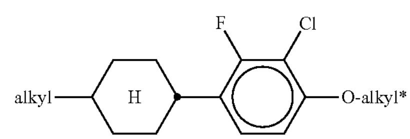

IIA-7

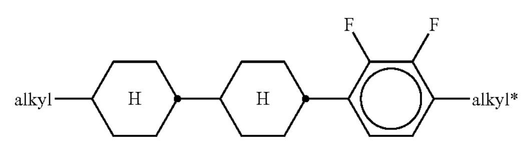

IIA-8

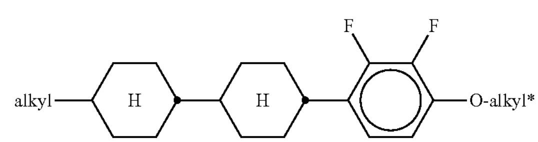

IIA-9

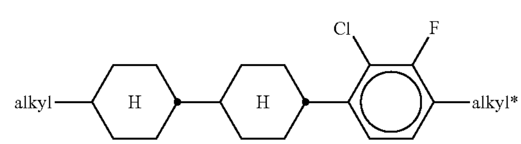

-continued
IIA-10
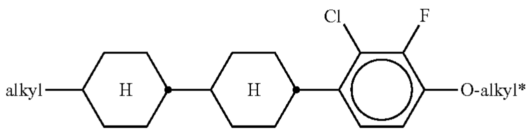
IIA-11
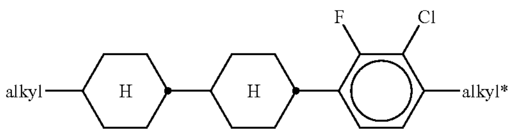
IIA-12
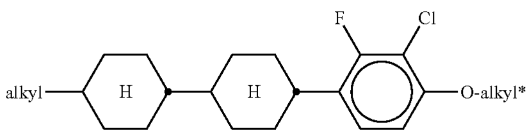
IIA-13
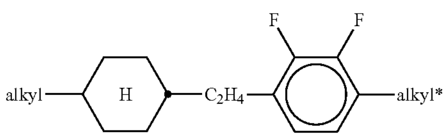
IIA-14
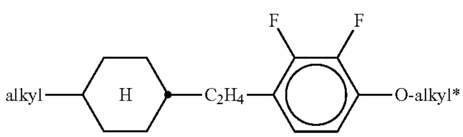
IIA-15
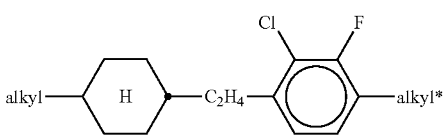
IIA-16
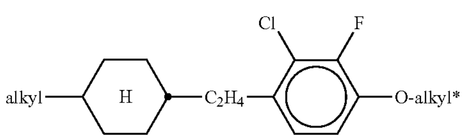
IIA-17
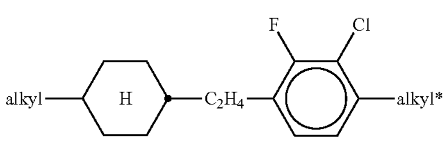
IIA-18
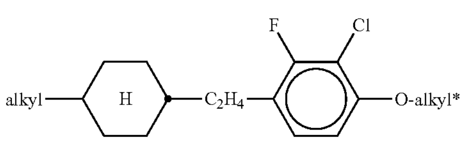
IIA-19
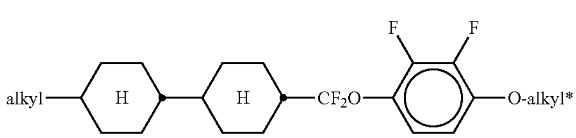
IIA-20
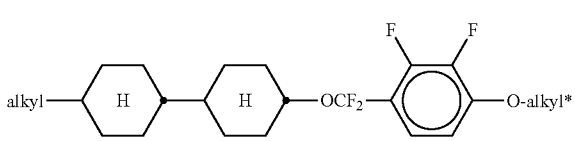
-continued
IIA-21
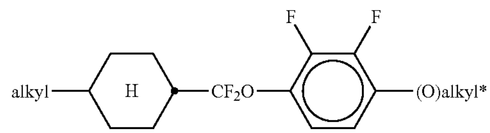
IIA-22
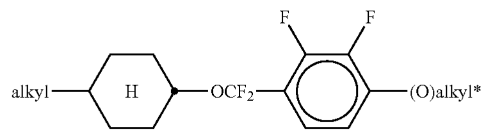
IIA-23
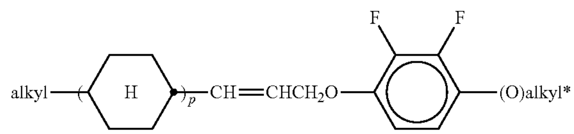
IIA-24
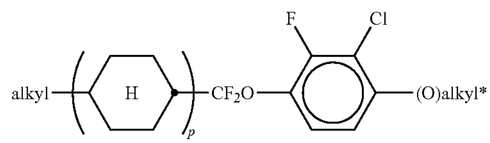
IIA-25
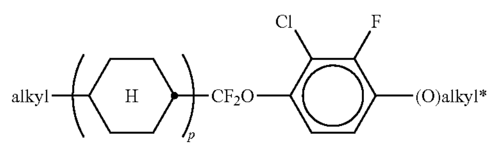
IIA-26
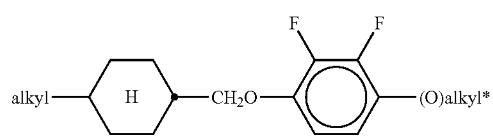
IIA-27
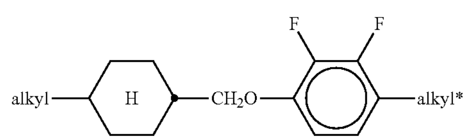
IIA-28
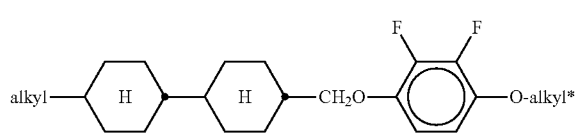
IIA-29
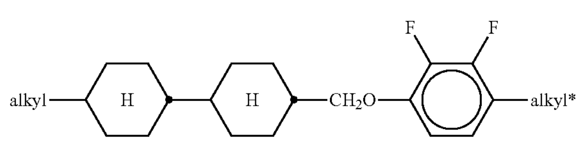
IIA-30
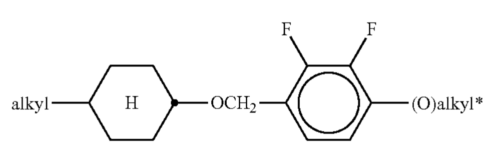

-continued
IIA-31
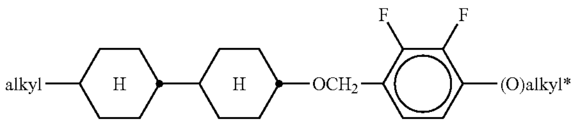
IIA-32
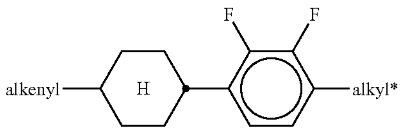
IIA-33
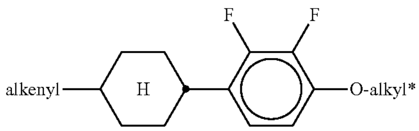
IIA-34
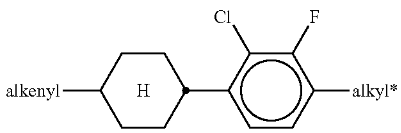
IIA-35
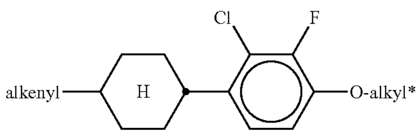
IIA-36
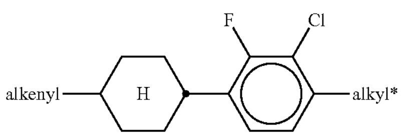
IIA-37
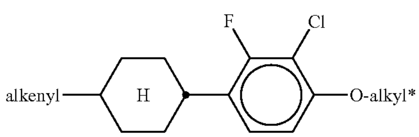
IIA-38
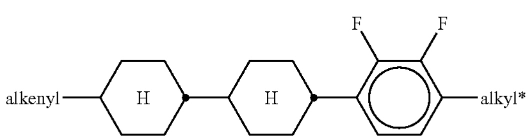
IIA-39
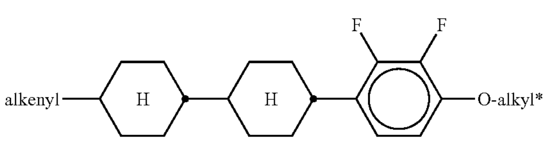
IIA-40
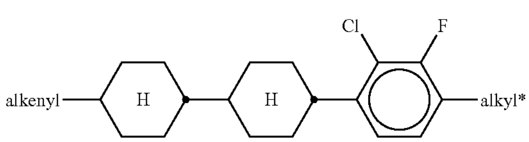
IIA-41
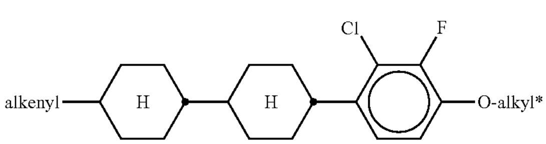
-continued
IIA-42
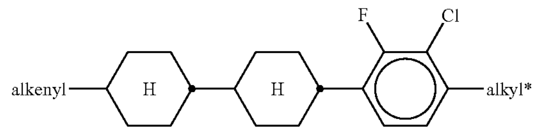
IIA-43
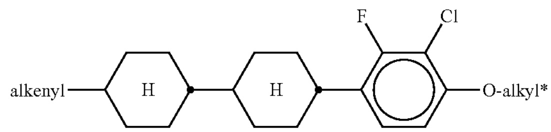
IIA-44
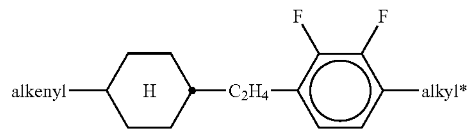
IIA-45
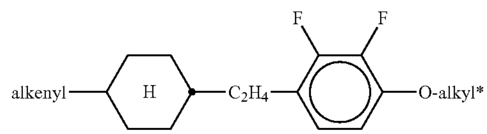
IIA-46
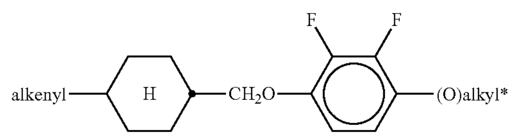
IIA-47
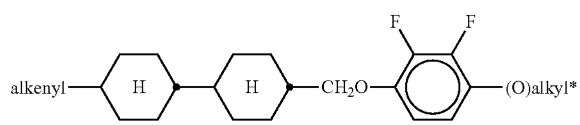
IIA-48
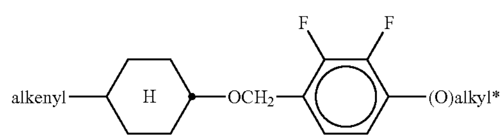
IIA-49
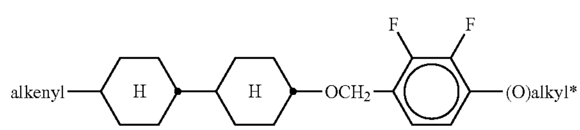
IIA-50
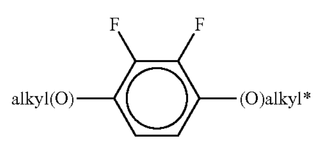
IIA-51
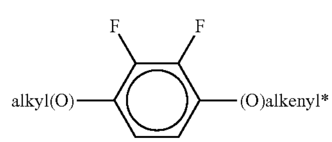

-continued

IIA-52

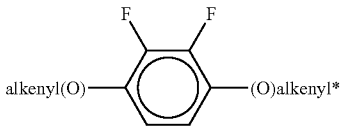

IIB-1

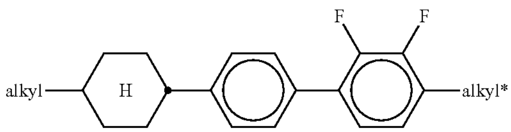

IIB-2

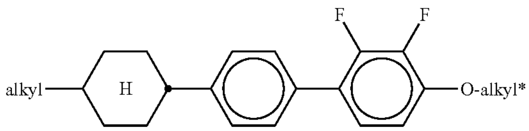

IIB-3

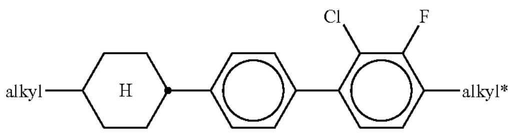

IIB-4

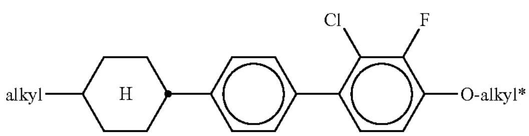

IIB-5

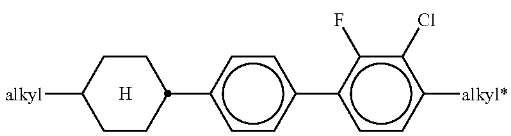

IIB-6

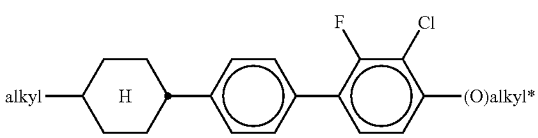

IIB-7

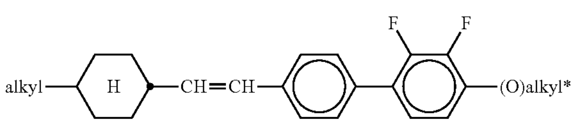

IIB-8

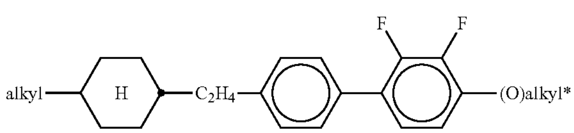

IIB-9

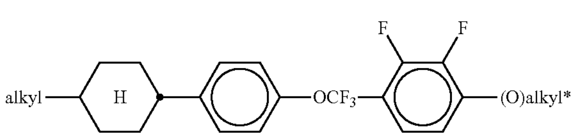

-continued

IIB-10

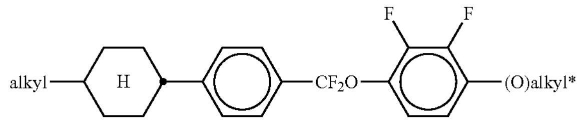

IIB-11

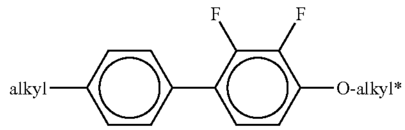

IIB-12

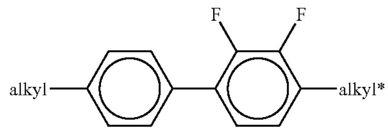

IIB-13

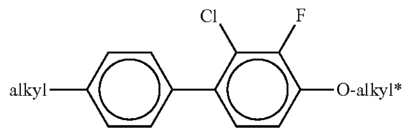

IIB-14

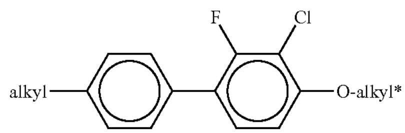

IIB-15

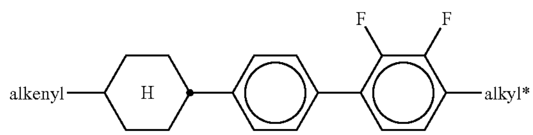

IIB-16

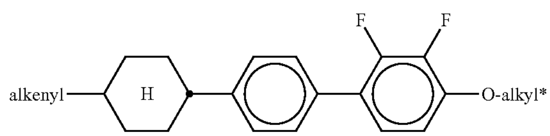

IIC-1

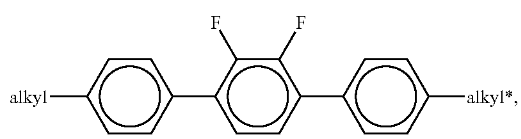

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

Particularly preferred mixtures according to the invention comprise one or more compounds of the formulae IIA-2, IIA-8, IIA-14, IIA-26, II-28, IIA-33, IIA-39, IIA-45, IIA-46, IIA-47, IIA-50, IIB-2, IIB-11, IIB-16 and IIC-1.

The proportion of compounds of the formulae IIA and/or IIB in the mixture as a whole is preferably at least 20% by weight.

Particularly preferred media according to the invention comprise at least one compound of the formula IIC-1,

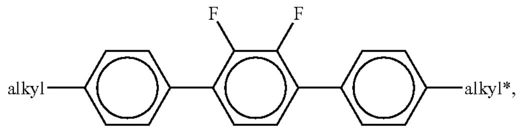

in which alkyl and alkyl* have the meanings indicated above, preferably in amounts of >3% by weight, in particular >5% by weight and particularly preferably 5-25% by weight.

b) Liquid-crystalline medium which additionally comprises one or more compounds of the formula III,

III

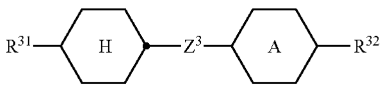

in which $R^{31}$ and $R^{32}$ each, independently of one another, denote a straight-chain alkyl, alkoxy, alkenyl, alkoxyalkyl or alkoxy radical having up to 12 C atoms, and

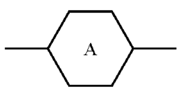

denotes

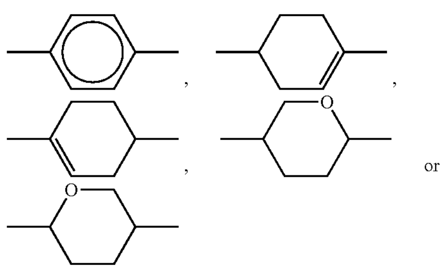

$Z^3$ denotes a single bond, —$CH_2CH_2$—, —CH═CH—, —$CF_2O$—, —$OCF_2$—, —$CH_2O$—, —$OCH_2$—, —COO—, —OCO—, —$C_2F_4$—, —$C_4H_8$—, —CF═CF—.

Preferred compounds of the formula III are indicated below:

IIIa

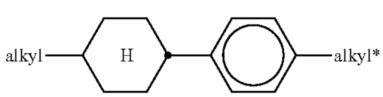

IIIb

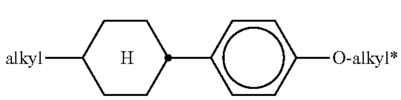

IIIc

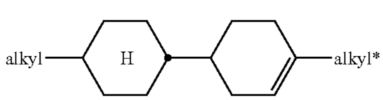

-continued

IIId

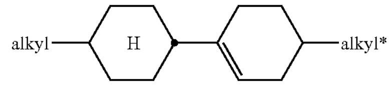

in which alkyl and alkyl* each, independently of one another, denote a straight-chain alkyl radical having 1-6 C atoms.

The medium according to the invention preferably comprises at least one compound of the formula IIIa and/or formula IIIb.

The proportion of compounds of the formula III in the mixture as a whole is preferably at least 5% by weight c) Liquid-crystalline medium additionally comprising a compound of the formula

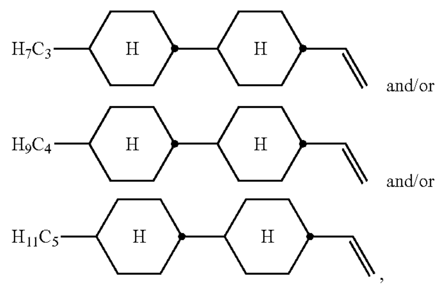

preferably in total amounts of ≥5% by weight, in particular 10% by weight.

Preference is furthermore given to mixtures according to the invention comprising the compound (acronym: CC-3-V1)

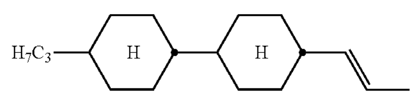

preferably in amounts of 2-15% by weight.

Preferred mixtures comprise 5-60% by weight, preferably 10-55% by weight, in particular 20-50% by weight, of the compound of the formula (acronym: CC-3-V)

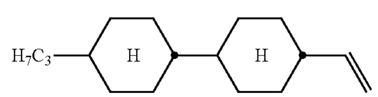

Preference is furthermore given to mixtures which comprise a compound of the formula (acronym: CC-3-V)

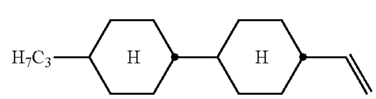

and a compound of the formula (acronym: CC-3-V1)

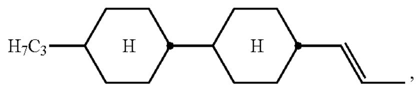

preferably in amounts of 10-60% by weight.

d) Liquid-crystalline medium which additionally comprises one or more tetracyclic compounds of the formulae

V-1

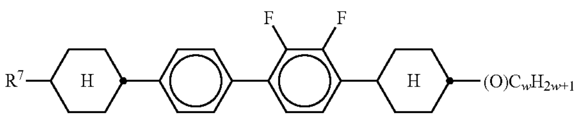

V-2

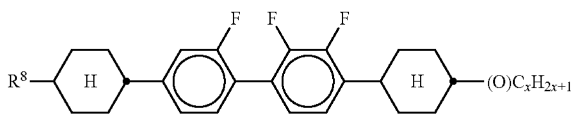

V-3

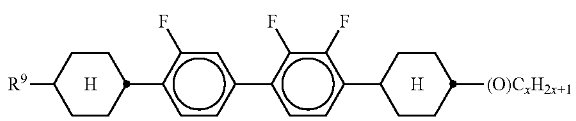

V-4

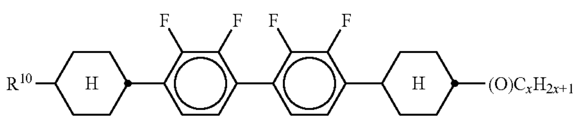

V-5

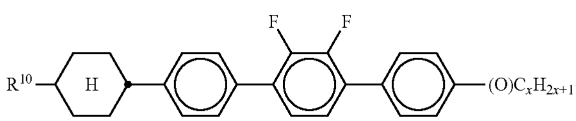

V-6

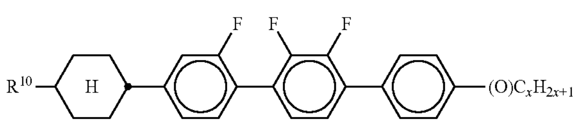

V-7

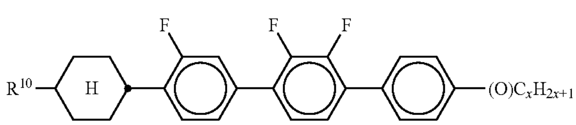

V-8

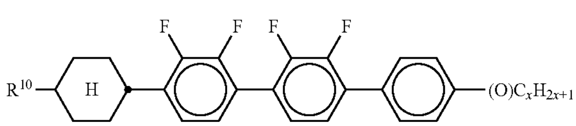

V-9

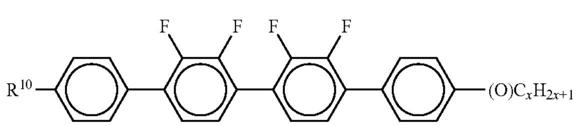

in which $R^{7-10}$ each, independently of one another, have one of the meanings indicated for $R^{2A}$ for the compounds of formula IIA, and w and x each, independently of one another, denote 1 to 6.

Particular preference is given to mixtures comprising at least one compound of the formula V-9.

e) Liquid-crystalline medium which additionally comprises one or more compounds of the formulae Y-1 to Y-6,

Y-1

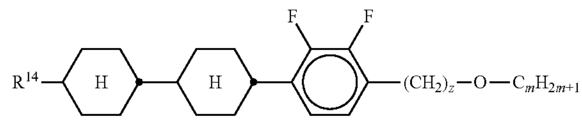

Y-2

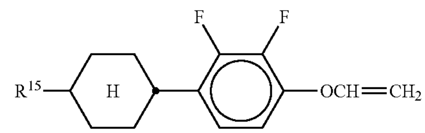

Y-3

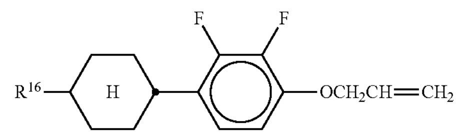

Y-4

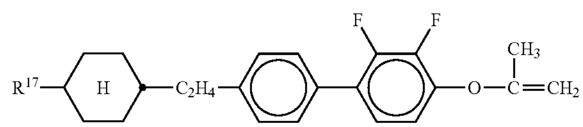

Y-5

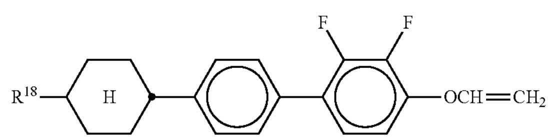

Y-6

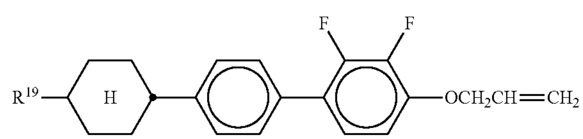

in which $R^{14}$-$R^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably comprises one or more compounds of the formulae Y-1 to Y-6, preferably in amounts of ≥5% by weight.

f) Liquid-crystalline medium additionally comprising one or more fluorinated terphenyls of the formulae T-1 to T-21,

T-1

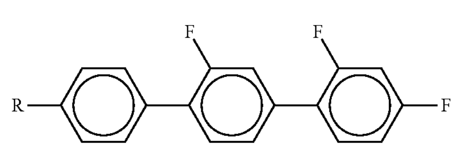

-continued
T-2
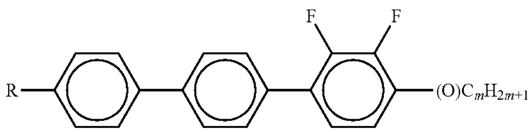
T-3
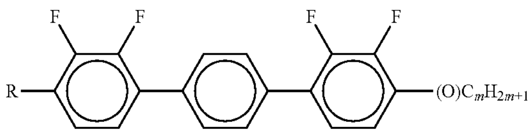
T-4
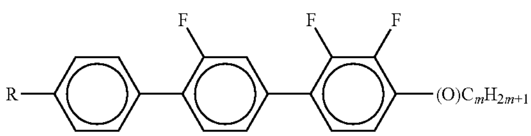
T-5
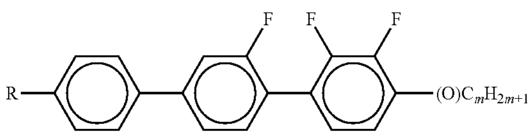
T-6
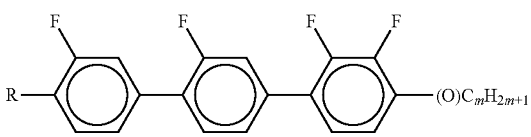
T-7
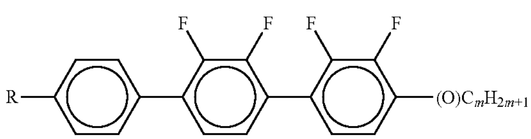
T-8
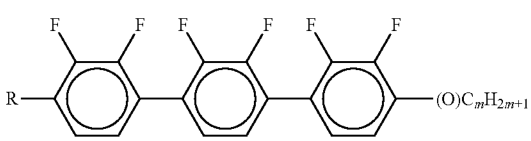
T-9
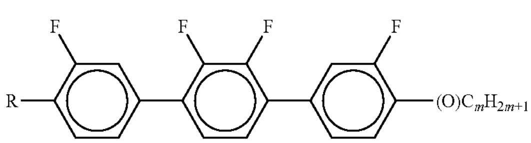
T-10
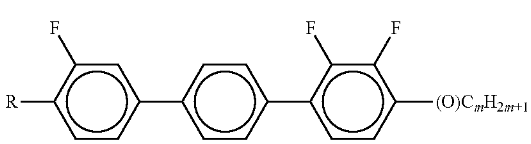
T-11
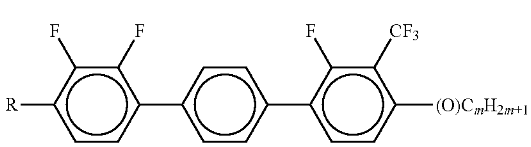
-continued
T-12
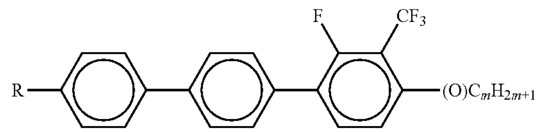
T-13
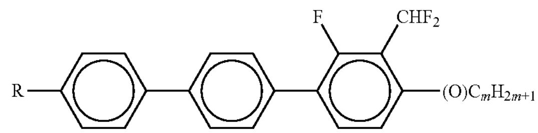
T-14
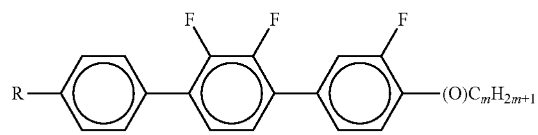
T-15
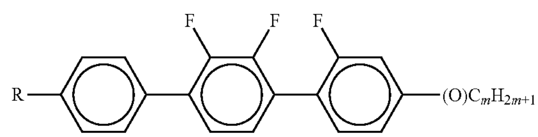
T-16
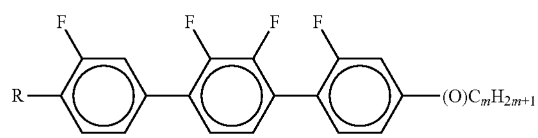
T-17
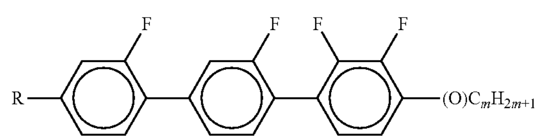
T-18
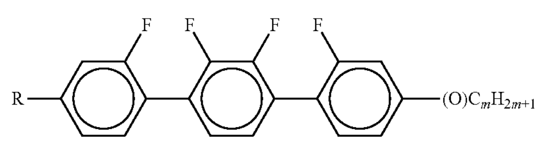
T-19
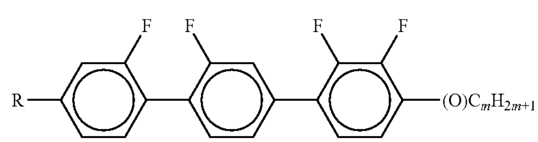
T-20
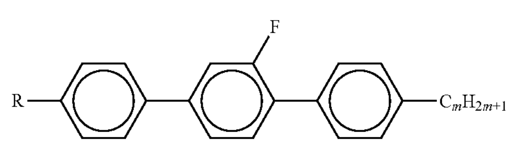
T-21
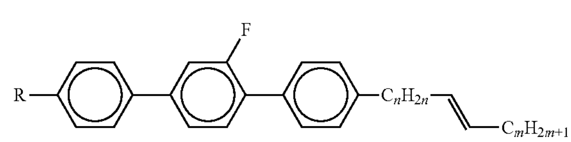

in which

R denotes a straight-chain alkyl or alkoxy radical having 1-6 C atoms, and m=0, 1, 2, 3, 4, 5 or 6 and n denotes 0, 1, 2, 3 or 4.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-21 in amounts of 2-30% by weight, in particular 5-20% by weight.

Particular preference is given to compounds of the formulae T-1, T-2, T-4, T-20 and T-21. In these compounds, R preferably denotes alkyl, furthermore alkoxy, each having 1-5 C atoms. In the compounds of the formula T-20, R preferably denotes alkyl or alkenyl, in particular alkyl. In the compound of the formula T-21, R preferably denotes alkyl.

The terphenyls are preferably employed in the mixtures according to the invention if the Δn value of the mixture is to be 0.1. Preferred mixtures comprise 2-20% by weight of one or more terphenyl compounds selected from the group of the compounds T-1 to T-21.

g) Liquid-crystalline medium additionally comprising one or more biphenyls of the formulae B-1 to B-3,

B-1

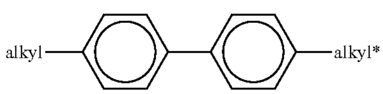

B-2

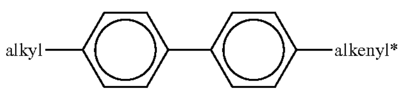

B-3

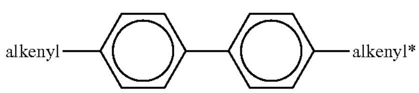

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular 5% by weight.

Of the compounds of the formulae B-1 to B-3, the compounds of the formula B-2 are particularly preferred.

Particularly preferred biphenyls are

B-1a

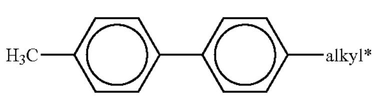

B-2a

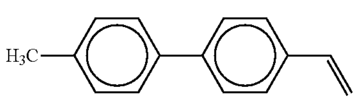

B-2b

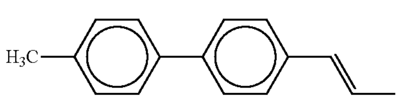

-continued

B-2c

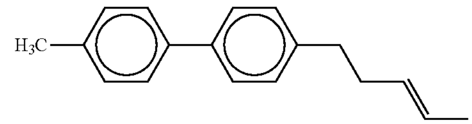

in which alkyl* denotes an alkyl radical having 1-6 C atoms.

The medium according to the invention particularly preferably comprises one or more compounds of the formulae B-1a and/or B-2c.

h) Liquid-crystalline medium comprising at least one compound of the formulae Z-1 to Z-7,

Z-1

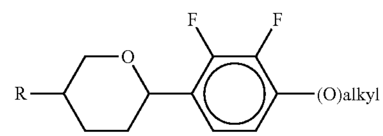

Z-2

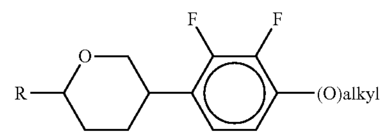

Z-3

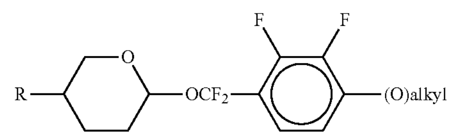

Z-4

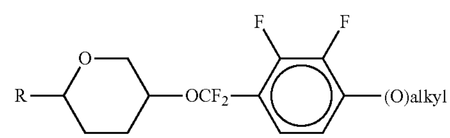

Z-5

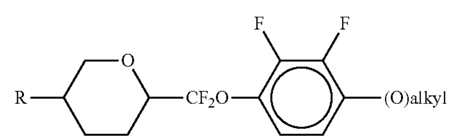

Z-6

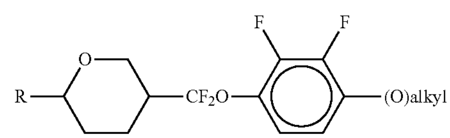

Z-7

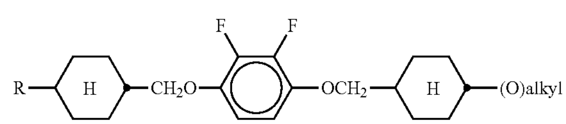

in which R and alkyl have the meanings indicated above.

i) Liquid-crystalline medium additionally comprising at least one compound of the formulae O-1 to O-18,

O-1

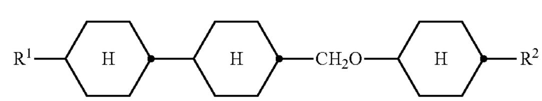

-continued

O-2

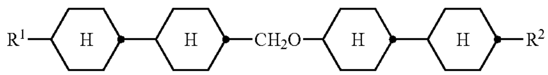

O-3

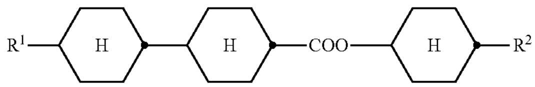

O-4

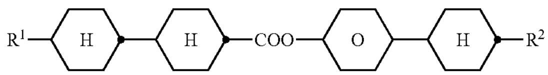

O-5

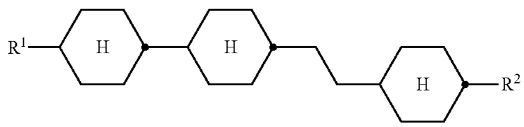

O-6

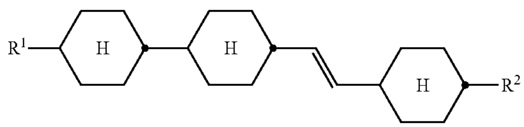

O-7

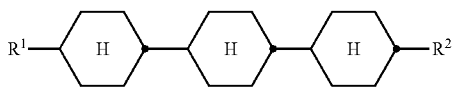

O-8

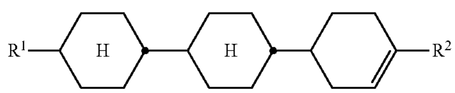

O-9

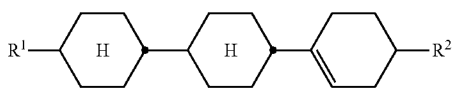

O-10

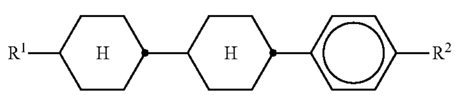

O-11

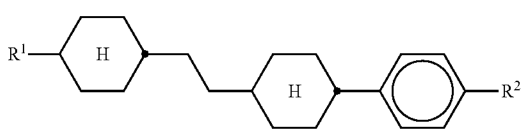

O-12

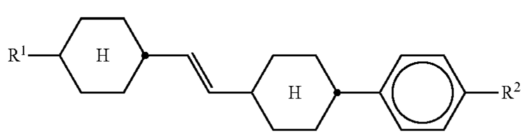

O-13

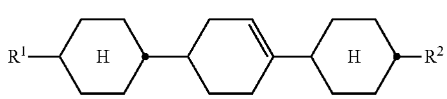

O-14

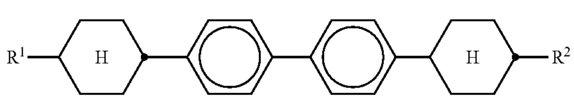

-continued

O-15

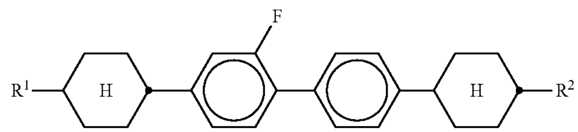

O-16

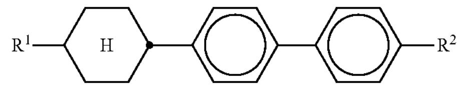

O-17

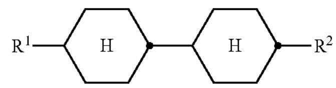

O-18

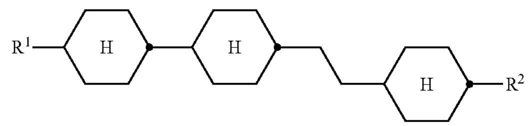

in which $R^1$ and $R^2$ have the meanings indicated for $R^{2A}$. $R^1$ and $R^2$ preferably each, independently of one another, denote straight-chain alkyl or alkenyl.

Preferred media comprise one or more compounds of the formulae O-1, O-3, O-4, O-6, O-7, O-10, O-11, O-12, O-14, O-15, O-16 and/or O-17.

Mixtures according to the invention very particularly preferably comprise the compounds of the formula O-10, O-12, O-16 and/or O-17, in particular in amounts of 5-30%.

Preferred compounds of the formulae O-10 and O-17 are indicated below:

O-10a

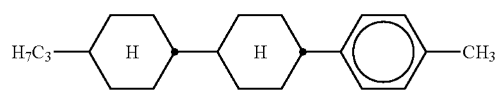

O-10b

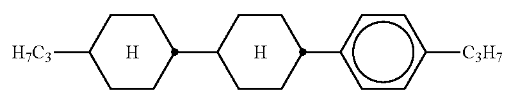

O-17a

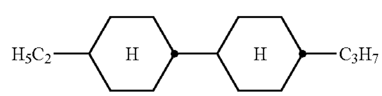

O-17b

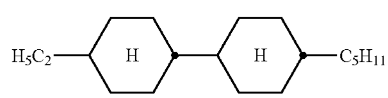

O-17c

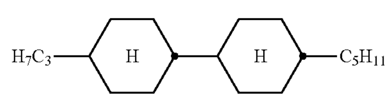

O-17d

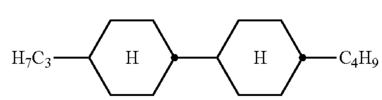

The medium according to the invention particularly preferably comprises the tricyclic compounds of the formula O-10a and/or of the formula O-10b in combination with one or more bicyclic compounds of the formulae O-17a to O-17d. The total proportion of the compounds of the formulae O-10a and/or O-10b in combination with one or more compounds selected from the bicyclic compounds of the formulae O-17a to O-17d is 5-40%, very particularly preferably 15-35%.

Very particularly preferred mixtures comprise compounds O-10a and O-17a:

O-10a

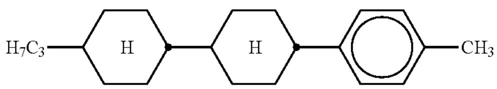

O-17a

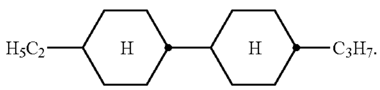

The compounds O-10a and O-17a are preferably present in the mixture in a concentration of 15-35%, particularly preferably 15-25% and especially preferably 18-22%, based on the mixture as a whole.

Very particularly preferred mixtures comprise the compounds O-10b and O-17a:

O-10b

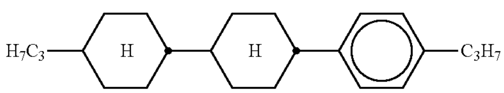

O-17a

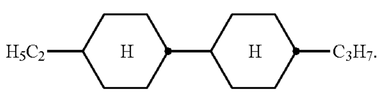

The compounds O-10b and O-17a are preferably present in the mixture in a concentration of 15-35%, particularly preferably 15-25% and especially preferably 18-22%, based on the mixture as a whole.

Very particularly preferred mixtures comprise the following three compounds:

O-10a

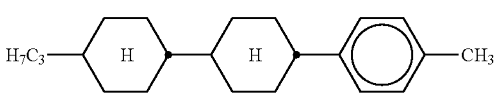

O-10b

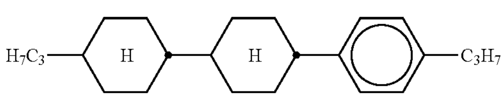

O-17a

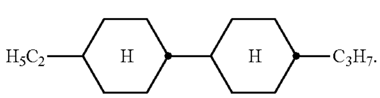

The compounds O-10a, O-10b and O-17a are preferably present in the mixture in a concentration of 15-35%, particularly preferably 15-25% and especially preferably 18-22%, based on the mixture as a whole.

Preferred mixtures comprise at least one compound selected from the group of the compounds

O-6

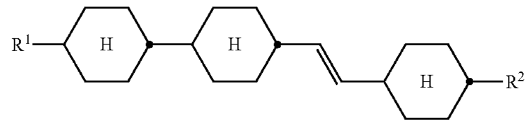

O-7

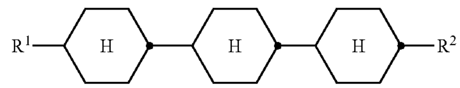

O-17

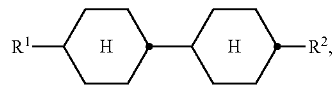

in which $R^1$ and $R^2$ have the meanings indicated above. Preferably in the compounds O-6, O-7 and O-17, $R^1$ denotes alkyl or alkenyl having 1-6 or 2-6 C atoms respectively and $R^2$ denotes alkenyl having 2-6 C atoms.

Preferred mixtures comprise at least one compound of the formulae O-6a, O-6b, O-7a, O-7b, O-17e, O-17f, O-17g and O-17h:

O-6a

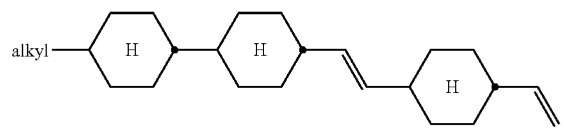

O-6b

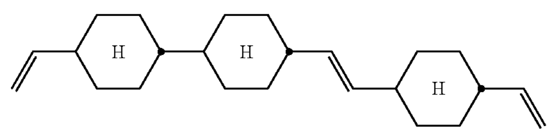

O-7a

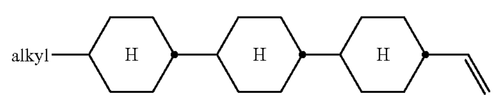

O-7b

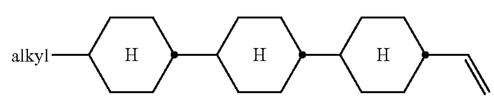

O-17e

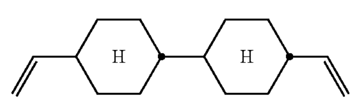

O-17f

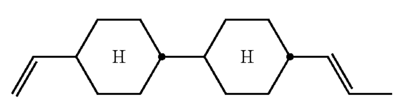

O-17g

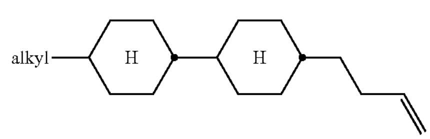

-continued

O-17h

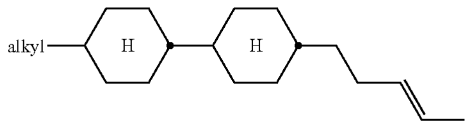

in which alkyl denotes an alkyl radical having 1-6 C atoms.

The compounds of the formulae O-6, O-7 and O-17e-h are preferably present in the mixtures according to the invention in amounts of 1-40% by weight, preferably 2-35% by weight and very particularly preferably 2-30% by weight.

j) Preferred liquid-crystalline media according to the invention comprise one or more substances which contain a tetrahydronaphthyl or naphthyl unit, such as, for example, the compounds of the formulae N-1 to N-5,

N-1

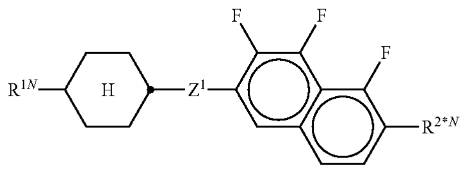

N-2

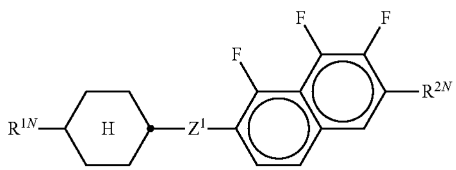

N-3

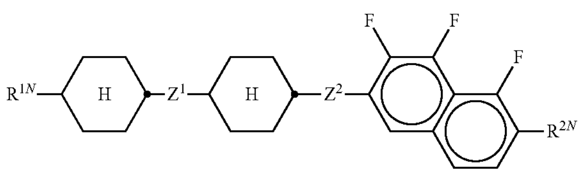

N-4

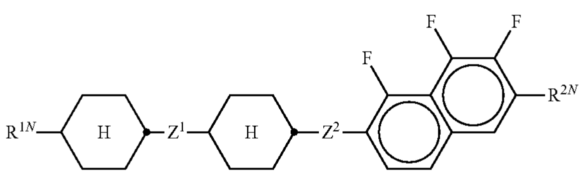

N-5

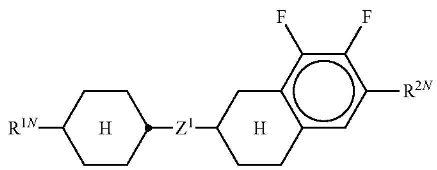

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH═CH—, —$(CH_2)_4$—, —$(CH_2)_3O$—, —$O(CH_2)_3$—, —CH═CHCH$_2$CH$_2$—, —CH$_2$CH$_2$CH═CH—, —$CH_2O$—, —$OCH_2$—, —COO—, —OCO—, —$C_2F_4$—, —CF═CF—, —CF═CH—, —CH═CF—, —$CF_2O$—, —$OCF_2$—, —$CH_2$— or a single bond.

k) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formula BF-1 and BF-2,

BC

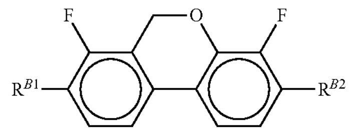

CR

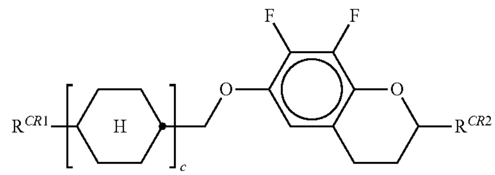

PH-1

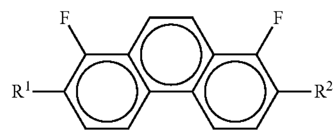

PH-2

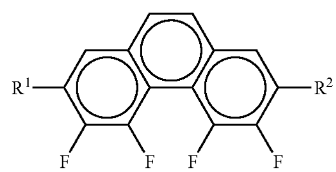

BF-1

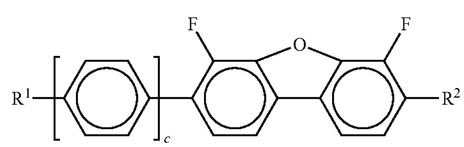

BF-2

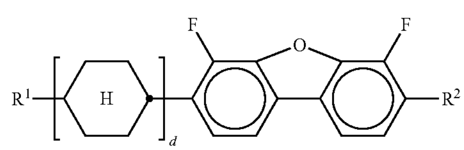

in which $R^{B1}$, $R^{B2}$, $R^{CR1}$, $R^{CR2}$, $R^1$, $R^2$ each, independently of one another, have the meaning of $R^{2A}$. c is 0, 1 or 2 and d denotes 1 or 2. $R^1$ and $R^2$ preferably, independently of one another, denote alkyl or alkoxy having 1 to 6 C atoms. The compounds of the formulae BF-1 and BF-2 should not be identical to one or more compounds of the formula I.

The mixtures according to the invention preferably comprise the compounds of the formulae BC, CR, PH-1, PH-2 and/or BF in amounts of 3 to 20% by weight, in particular in amounts of 3 to 15% by weight. Particularly preferred compounds of the formulae BC and CR are the compounds BC-1 to BC-7 and CR-1 to CR-5, BC-1
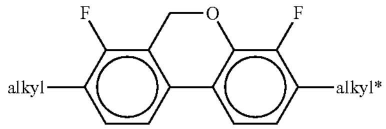

BC-2
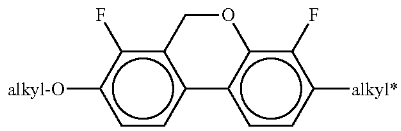

BC-3
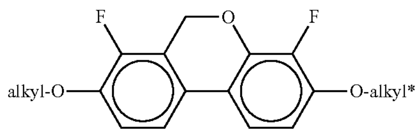

BC-4
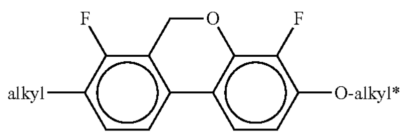

BC-5
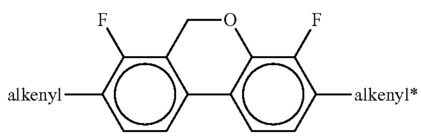

BC-6
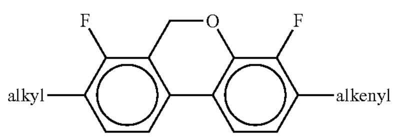

BC-7
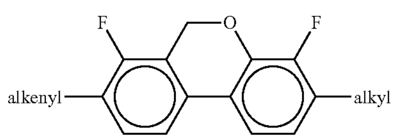

CR-1
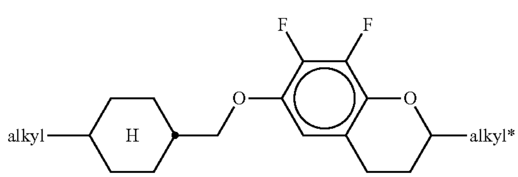

CR-2
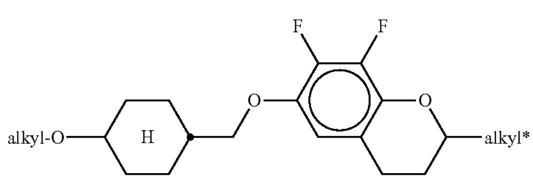

CR-3
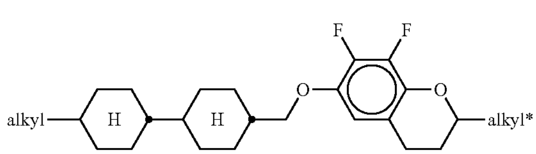

-continued

CR-4
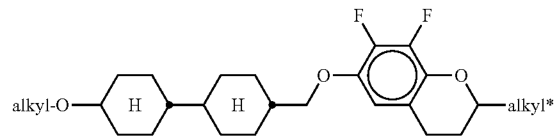

CR-5
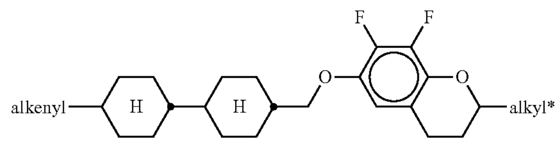

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

Very particular preference is given to mixtures comprising one, two or three compounds of the formula BC-2, BF-1 and/or BF-2.

l) Preferred mixtures comprise one or more indane compounds of the formula In,

In
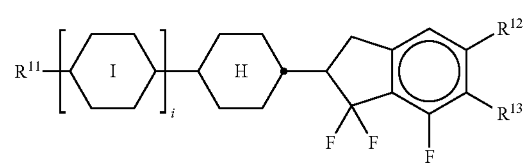

in which $R^{11}$, $R^{12}$, $R^{13}$ each, independently of one another, denote a straight-chain alkyl, alkoxy, alkoxyalkyl or alkenyl radical having 1-6 C atoms, $R^{12}$ and $R^{13}$ additionally denote halogen, preferably F,

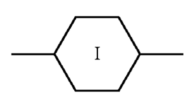

denotes

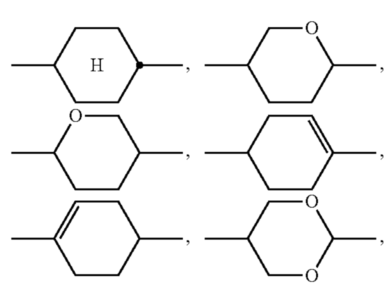

-continued

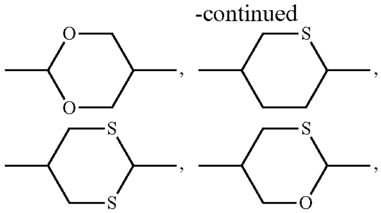

i denotes 0, 1 or 2.

Preferred compounds of the formula In are the compounds of the formulae In-1 to In-16 indicated below:

In-1

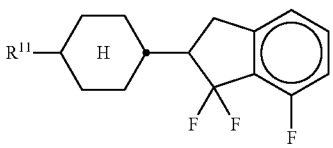

In-2

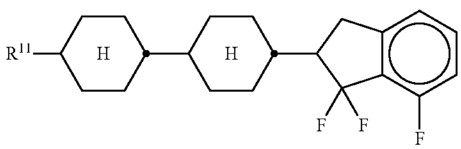

In-3

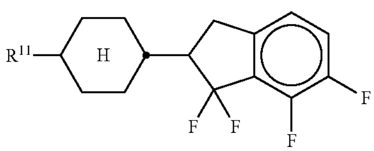

In-4

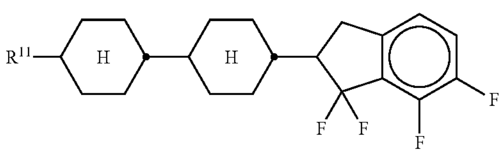

In-5

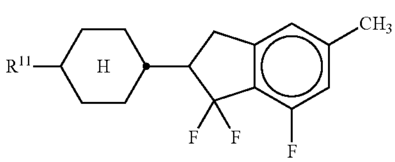

In-6

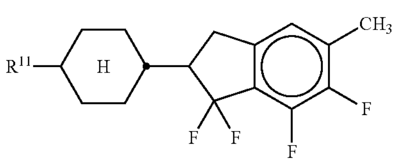

In-7

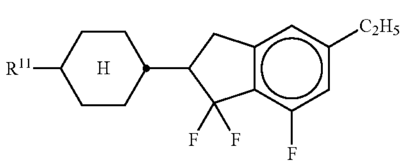

In-8

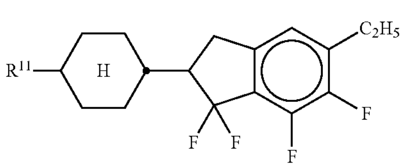

-continued

In-9

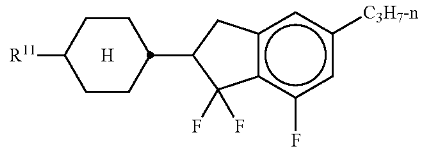

In-10

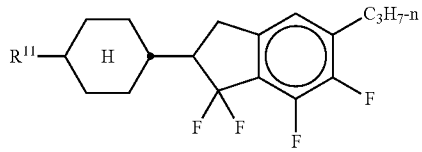

In-11

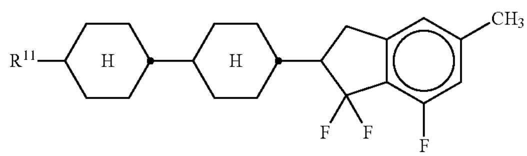

In-12

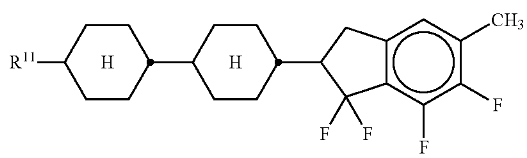

In-13

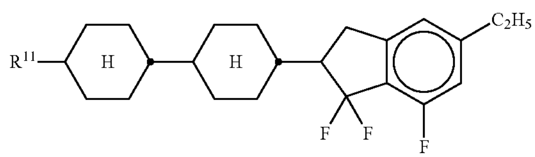

In-14

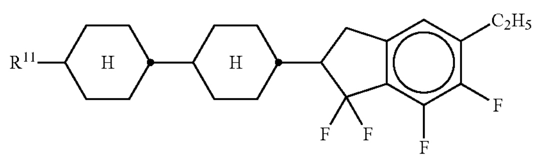

In-15

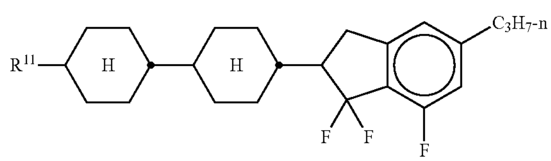

In-16

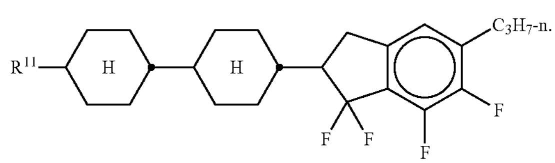

Particular preference is given to the compounds of the formulae In-1, In-2, In-3 and In-4.

The compounds of the formula In and the sub-formulae In-1 to In-16 are preferably employed in the mixtures according to the invention in concentrations 5% by weight, in particular 5-30% by weight and very particularly preferably 5-25% by weight.

m) Preferred mixtures additionally comprise one or more compounds of the formulae L-1 to L-11, -continued

L-1

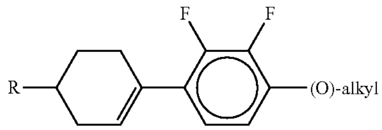

L-2

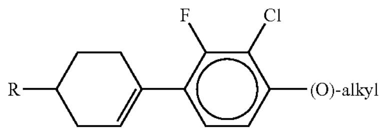

L-3

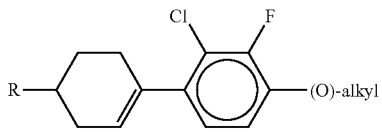

L-4

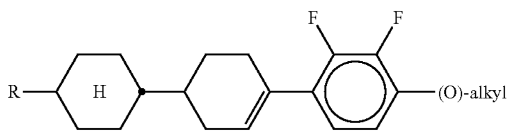

L-5

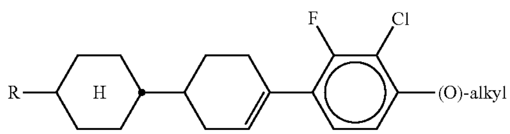

L-6

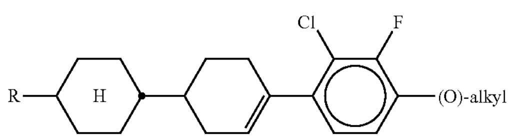

L-7

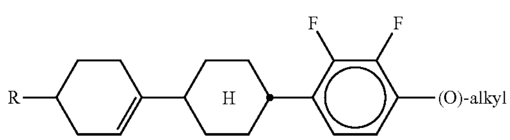

L-8

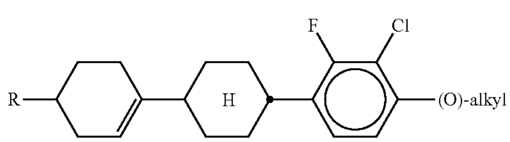

L-9

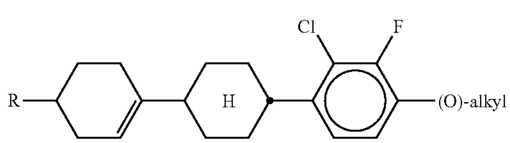

L-10

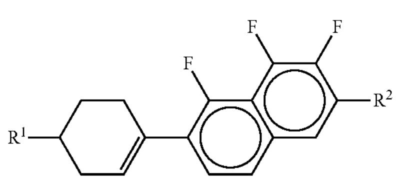

L-11

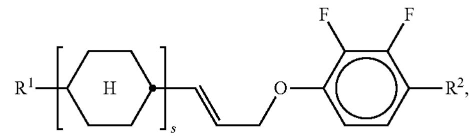

in which

R, $R^1$ and $R^2$ each, independently of one another, have the meanings indicated for $R^{2A}$ for the compounds of formula IIA and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

Particularly preferred mixture concepts are indicated below: (the acronyms used are explained in Table A. n and m here each, independently of one another, denote 1-15, preferably 1-6).

The mixtures according to the invention preferably comprise

- one or more compounds of the formula I in which $L^1$=$L^2$=F and $R^1$=$R^{1*}$=alkoxy;
- CPY-n-Om, in particular CPY-2-O2, CPY-3-O2 and/or CPY-5-O2, preferably in concentrations >5%, in particular 10-30%, based on the mixture as a whole, and/or

- CY-n-Om, preferably CY-3-O2, CY-3-O4, CY-5-O2 and/or CY-5-O4, preferably in concentrations >5%, in particular 15-50%, based on the mixture as a whole, and/or

- CCY-n-Om, preferably CCY-4-O2, CCY-3-O2, CCY-3-O3, CCY-3-O1 and/or CCY-5-O2, preferably in concentrations >5%, in particular 10-30%, based on the mixture as a whole, and/or

- CLY-n-Om, preferably CLY-2-O4, CLY-3-O2 and/or CLY-3-O3, preferably in concentrations >5%, in particular 10-30%, based on the mixture as a whole, and/or

- CK-n-F, preferably CK-3-F, CK-4-F and/or CK-5-F, preferably >5%, in particular 5-25%, based on the mixture as a whole.

Preference is furthermore given to mixtures according to the invention which comprise the following mixture concepts: (n and m each, independently of one another, denote 1-6.)

- CPY-n-Om and CY-n-Om, preferably in concentrations of 10-80%, based on the mixture as a whole, and/or

- CPY-n-Om and CK-n-F, preferably in concentrations of 10-70%, based on the mixture as a whole, and/or

- CPY-n-Om and PY-n-Om, preferably CPY-2-O2 and/or CPY-3-O2 and PY-3-O2, preferably in concentrations of 10-45%, based on the mixture as a whole, and/or

- CPY-n-Om and CLY-n-Om, preferably in concentrations of 10-80%, based on the mixture as a whole, and/or

- CCVC-n-V, preferably CCVC-3-V, preferably in concentrations of 2-10%, based on the mixture as a whole, and/or CCC-n-V, preferably CCC-2-V and/or CCC-3-V, preferably in concentrations of 2-10%, based on the mixture as a whole, and/or CC-V-V, preferably in concentrations of 5-50%, based on the mixture as a whole.

The invention furthermore relates to an electro-optical display having active-matrix addressing based on the dem ECB, VA, PS-VA, PA-VA, IPS, PS-IPS, FFS or PS-FFS effect, characterised in that it contains, as dielectric, a liquid-crystalline medium as disclosed herein.

The liquid-crystalline medium according to the invention preferably has a nematic phase from ≤−20° C. to ≥70° C., particularly preferably from ≤−30° C. to ≥80° C., very particularly preferably from ≤−40° C. to ≥90° C.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $\nu_{20}$ of at most 30 $mm^2 \cdot s^{-1}$ at 20° C.

The values of the birefringence Δn in the liquid-crystal mixture are generally between 0.07 and 0.16, preferably between 0.08 and 0.13.

The liquid-crystal mixture according to the invention has a Δε of −0.5 to −8.0, in particular −2.5 to −6.0, where Δε denotes the dielectric anisotropy. The rotational viscosity $\gamma_1$ at 20° C. is preferably ≤150 mPa·s, in particular ≤120 mPa·s.

The liquid-crystal media according to the invention have relatively low values for the threshold voltage ($V_0$). They are preferably in the range from 1.7 V to 3.0 V, particularly preferably 2.5 V and very particularly preferably 2.3 V.

For the present invention, the term "threshold voltage" relates to the capacitive threshold ($V_0$), also called the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5≤Δε≤1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA). They are furthermore suitable for IPS (in-plane switching) and FFS (fringe field switching) applications having negative Δε.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≤−0.5. Besides one or more compounds of the formula I, it preferably comprises the compounds of the formulae IIA, IIB and/or IIC, furthermore one or more compounds of the formula O-17.

The proportion of component A is preferably between 45 and 100%, in particular between 60 and 100%.

For component A, one (or more) individual compound(s) which has (have) a value of Δε−0.8 is (are) preferably selected. This value must be more negative, the smaller the proportion A in the mixture as a whole.

Component B has pronounced nematogeneity and a flow viscosity of not greater than 30 $mm^2 \cdot s^{-1}$, preferably not greater than 25 $mm^2 \cdot s^{-1}$, at 20° C.

A multiplicity of suitable materials is known to the person skilled in the art from the literature. Particular preference is given to compounds of the formula O-17.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of Δε≥1.5. These so-called positive compounds are generally present in a mixture of negative dielectric anisotropy in amounts of ≤20% by weight, based on the mixture as a whole.

If the mixture according to the invention comprises one or more compounds having a dielectric anisotropy of Δε1.5, these are preferably one or more compounds selected from the group of the compounds of the formulae P-1 to P-4,

P-1

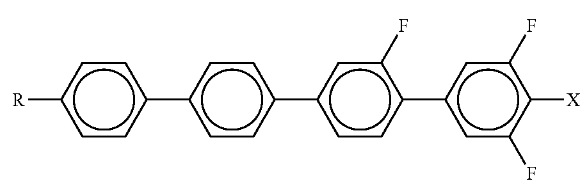

-continued

P-2

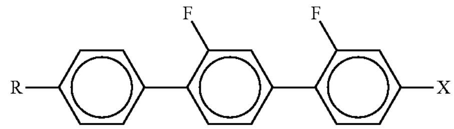

P-3

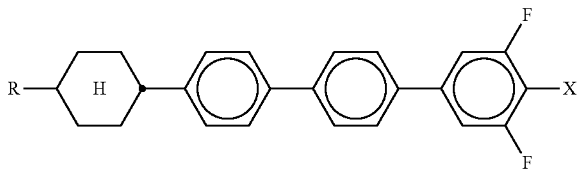

P-4

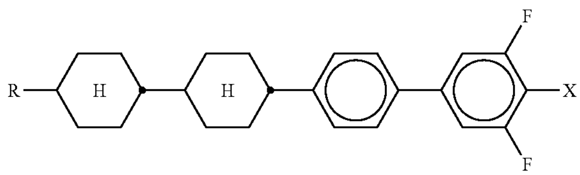

in which

R denotes straight-chain alkyl, alkoxy or alkenyl, each having 1 or 2 to 6 C atoms respectively, and X denotes F, Cl, $CF_3$, $OCF_3$, $OCHFCF_3$ or $CCF_2CHFCF_3$, preferably F or $OCF_3$.

The compounds of the formulae P-1 to P-4 are preferably employed in the mixtures according to the invention in concentrations of 0.1-15%, in particular 0.1-10%.

Particular preference is given to the compound of the formula

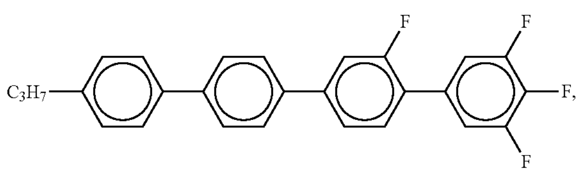

which is preferably employed in the mixtures according to the invention in amounts of 0.1-15%.

In addition, these liquid-crystal phases may also comprise more than 18 components, preferably 18 to 25 components.

Besides one or more compounds of the formula I, the phases preferably comprise 4 to 15, in particular 5 to 12, and particularly preferably <10, compounds of the formulae IIA, IIB and/or IIC and optionally one or more compounds of the formula O-17.

Besides compounds of the formula I and the compounds of the formulae IIA, IIB and/or IIC and optionally O-17, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolanes and substituted cinnamic acid esters.

The most important compounds which are suitable as constituents of liquid-crystal phases of this type can be characterised by the formula IV $$R^{20}\text{-L-G-E-}R^{21} \qquad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G denotes —CH═CH— —N(O)═N—
—CH═CQ- —CH═N(O)—
—C≡C— —$CH_2$—$CH_2$—
—CO—O— —$CH_2$—O—
—CO—S— —$CH_2$—S—
—CH═N— —COO-Phe-COO
—$CF_2$O— —CF═CF—
—$OCF_2$— —$OCH_2$—
—$(CH_2)_4$— —$(CH_2)_3$O— or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

Polymerisable compounds, so-called reactive mesogens (RMs), for example as disclosed in U.S. Pat. No. 6,861,107, may furthermore be added to the mixtures according to the invention in concentrations of preferably 0.01-5% by weight, particularly preferably 0.2-2% by weight, based on the mixture. These mixtures may optionally also comprise an initiator, as described, for example, in U.S. Pat. No. 6,781,665. The initiator, for example Irganox-1076 from BASF, is preferably added to the mixture comprising polymerisable compounds in amounts of 0-1%. Mixtures of this type can be used for so-called polymer-stabilised VA modes (PS-VA) or PSA (polymer sustained VA), in which polymerisation of the reactive mesogens is intended to take place in the liquid-crystalline mixture. The prerequisite for this is that the liquid-crystalline compounds of the LC host do not react under the polymerisation conditions of the reactive mesogens, i.e. generally on exposure to UV in the wavelength range from 320-360 nm. Liquid-crystalline compounds containing an alkenyl side chain, such as, for example, CC-3-V, exhibit no reaction under the polymerisation conditions (UV polymerisation) for the RMs.

In a preferred embodiment of the invention, the polymerisable compounds are selected from the compounds of the formula M $$R^{Ma}\text{-}A^{M1}\text{-}(Z^{M1}\text{-}A^{M2})_{m1}\text{-}R^{Mb} \qquad \text{M}$$

in which the individual radicals have the following meanings:

$R^{Ma}$ and $R^{Mb}$ each, independently of one another, denote P, P-Sp-, H, halogen, $SF_5$, $NO_2$, an alkyl, alkenyl or alkynyl group, where at least one of the radicals $R^{Ma}$ and $R^{Mb}$ preferably denotes or contains a group P or P-Sp-, P denotes a polymerisable group, Sp denotes a spacer group or a single bond, $A^{M1}$ and $A^{M2}$ each, independently of one another, denote an aromatic, heteroaromatic, alicyclic or heterocyclic group, preferably having 4 to 25 ring atoms, preferably C atoms, which also includes or may contain annellated rings, and which may optionally be mono- or polysubstituted by L, L denotes P, P-Sp-, OH, $CH_2OH$, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, preferably P, P-Sp-, H, OH, $CH_2OH$, halogen, $SF_5$, $NO_2$, an alkyl, alkenyl or alkynyl group, $Y^1$ denotes halogen, $Z^{M1}$ denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —($CH_2$)$_{n1}$-, —$CF_2CH_2$—, —$CH_2CF_2$—, —($CF_2$)$_{n1}$-, —CH=CH—, —CF=CF—, —C≡C—, —CH=CH—, —COO—, —OCO—CH=CH—, $CR^0R^{00}$ or a single bond, $R^0$ and $R^{00}$ each, independently of one another, denote H or alkyl having 1 to 12 C atoms, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that 0 and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, m1 denotes 0, 1, 2, 3 or 4 and n1 denotes 1, 2, 3 or 4, where at least one, preferably one, two or three, particularly preferably one or two, from the group $R^{Ma}$, $R^{Mb}$ and the substituents L present denotes a group P or P-Sp- or contains at least one group P or P-Sp-.

Particularly preferred compounds of the formula M are those in which $R^{Ma}$ and $R^{Mb}$ each, independently of one another, denote P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by —C($R^0$)=C($R^{00}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where at least one of the radicals $R^{Ma}$ and $R^{Mb}$ preferably denotes or contains a group P or P-Sp-, $A^{M1}$ and $A^{M2}$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent $CH_2$ groups may be replaced by 0 and/or S, 1,4-cyclohexenylene, bicyclo[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, $CH_2OH$, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P denotes a polymerisable group, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Very particular preference is given to compounds of the formula M in which one of $R^{Ma}$ and $R^{Mb}$ or both denote P or P-Sp-.

Suitable and preferred RMs or monomers or comonomers for use in liquid-crystalline media and PS-VA displays or PSA displays according to the invention are selected, for example from the following formulae:

M1

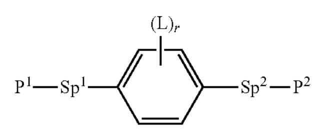

M2

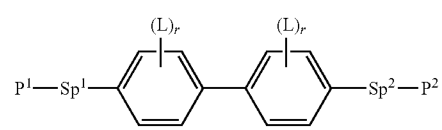

M3

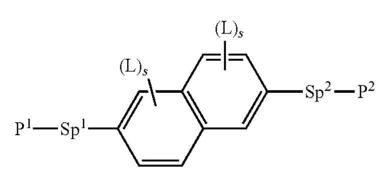

M4

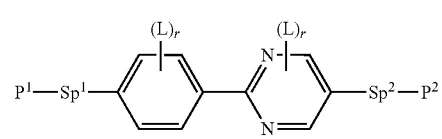

M5
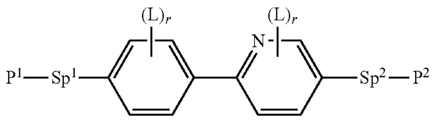
M6
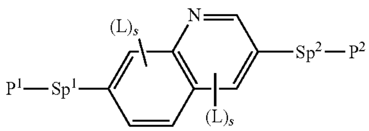
M7
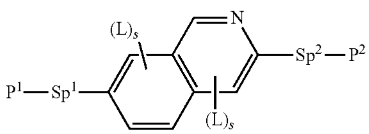
M8
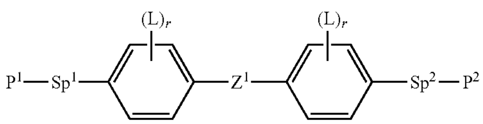
M9
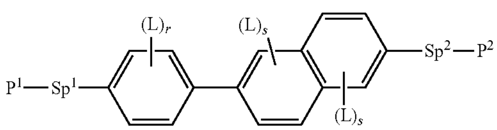
M10
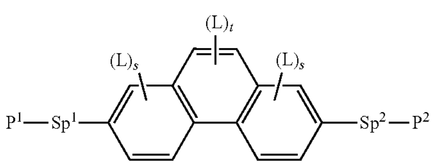
M11
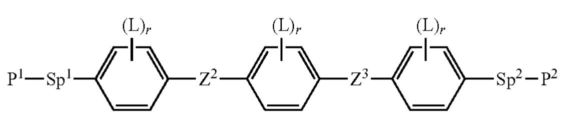
M12
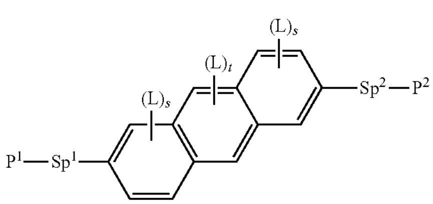
M13
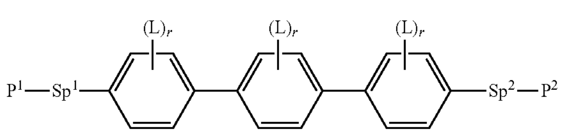
M14
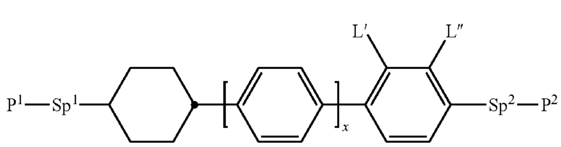
M15
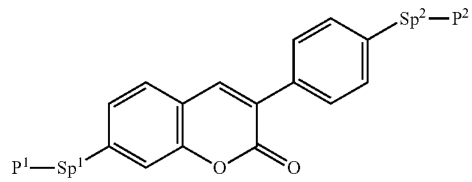
M16
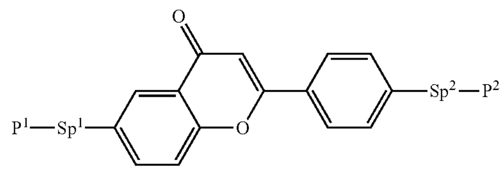
M17
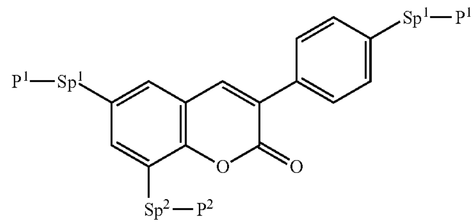
M18
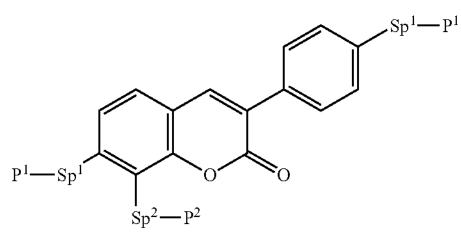
M19
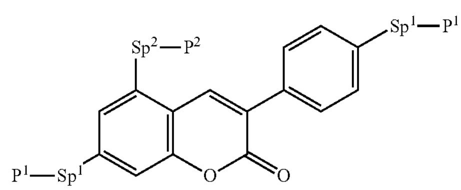
M20
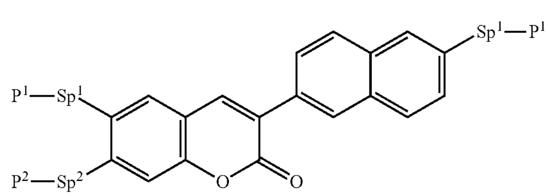
M21
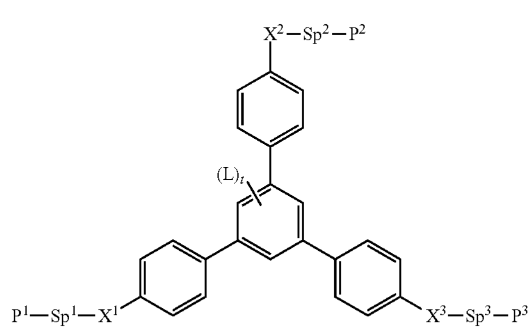

-continued
M22
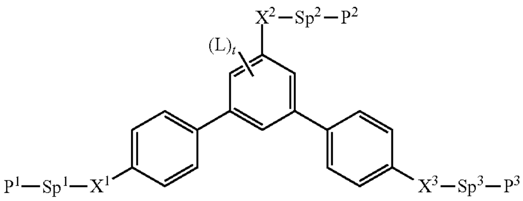
M23
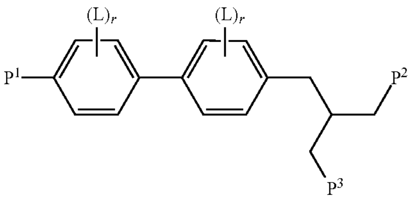
M24
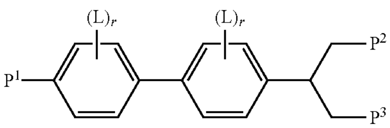
M25
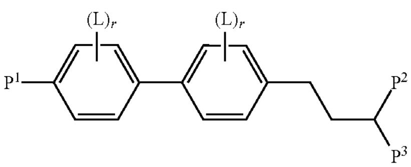
M26
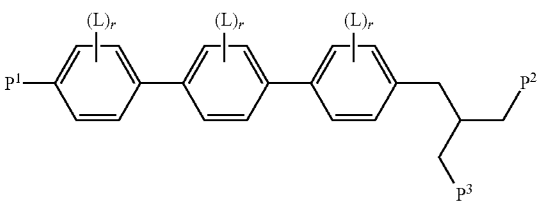
M27
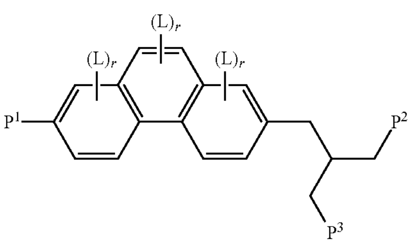
M28
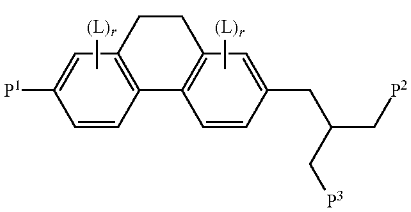
M29
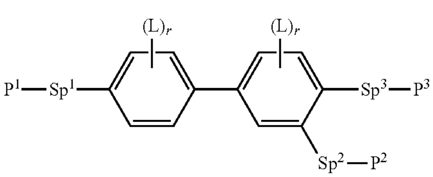
-continued
M30
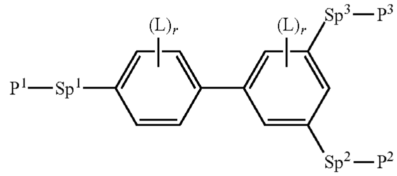
M31
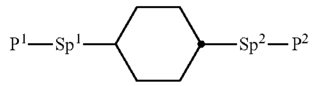
M32
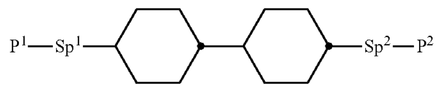
M33
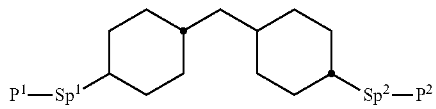
M34
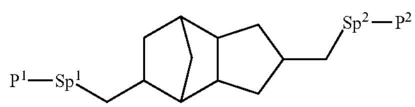
M35
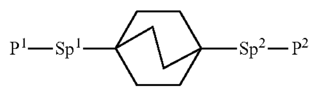
M36
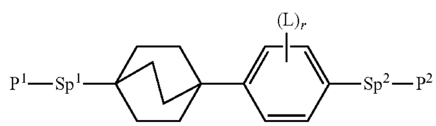
M37
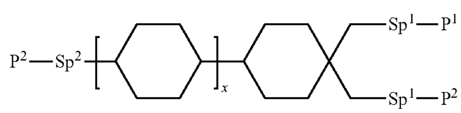
M38
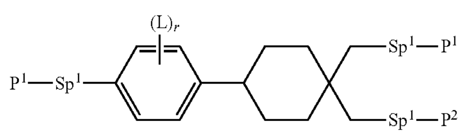
M39
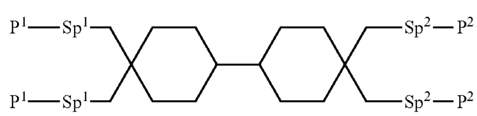
M40
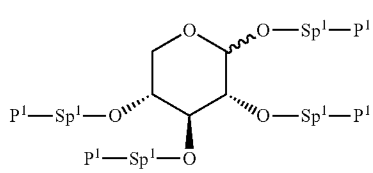
M41
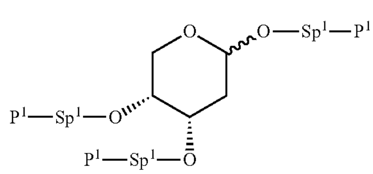

-continued

M42

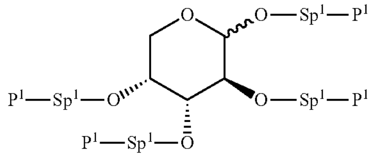

M43

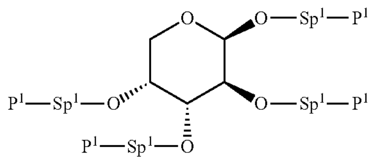

M44

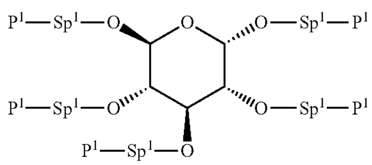

in which the individual radicals have the following meanings:

- $P^1$, $P^2$ and $P^3$ each, identically or differently, denote a polymerisable group, preferably having one of the meanings indicated above and below for P, particularly preferably an acrylate, methacrylate, fluoroacrylate, oxetane, vinyloxy or epoxy group,
- $Sp^1$, $Sp^2$ and $Sp^3$ each, independently of one another, denote a single bond or a spacer group, preferably having one of the meanings indicated above and below for $Sp^a$, and particularly preferably —$(CH_2)_{p1}$-, —$(CH_2)_{p1}$-O—, —$(CH_2)_{p1}$-CO—O— or —$(CH_2)_{p1}$-O—CO—O—, in which p1 is an integer from 1 to 12, and where in the last-mentioned groups the linking to the adjacent ring takes place via the O atom,
  - where one or more of the radicals $P^1$-$Sp^1$-, $P^2$-$Sp^2$- and $P^3$-$Sp^3$- may also denote $R^{aa}$, with the proviso that at least one of the radicals $P^1$-$Sp^1$-, $P^2$-$Sp^2$- and $P^3$-$Sp^3$- present does not denote $R^{aa}$,
- $R^{aa}$ denotes H, F, Cl, CN or straight-chain or branched alkyl having 1 to 25 C atoms, in which, in addition, one or more nonadjacent $CH_2$ groups may each be replaced, independently of one another, by $C(R^0)$=$C(R^{00})$—, —C≡C—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated, alkyl, alkoxy, alkenyl, alkynyl, alkylcarbonyl, alkoxycarbonyl or alkylcarbonyloxy having 1 to 12 C atoms (where the alkenyl and alkynyl radicals have at least two and the branched radicals at least three C atoms),
- $R^0$, $R^{00}$ each, independently of one another and on each occurrence identically or differently, denote H or alkyl having 1 to 12 C atoms,
- $R^y$ and $R^z$ each, independently of one another, denote H, F, $CH_3$ or $CF_3$,
- $X^1$, $X^2$ and $X^3$ each, independently of one another, denote —CO—O—, O—CO— or a single bond,
- $Z^1$ denotes-O—, —CO—, —$C(R^yR^z)$— or —$CF_2CF_2$—,
- $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$—, where n is 2, 3 or 4,
- L on each occurrence, identically or differently, denotes F, Cl, CN, SCN, $SF_5$ or straight-chain or branched, optionally mono- or polyfluorinated, alkyl, alkoxy, alkenyl, alkynyl, alkylcarbonyl, alkoxycarbonyl, alkylcarbonyloxy or alkoxycarbonyloxy having 1 to 12 C atoms, preferably F,
- L' and L" each, independently of one another, denote H, F or CI,
- r denotes 0, 1, 2, 3 or 4,
- s denotes 0, 1, 2 or 3,
- t denotes 0, 1 or 2,
- x denotes 0 or 1.

In the compounds of the formulae M1 to M36,

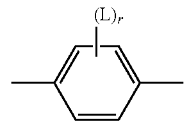

preferably denotes

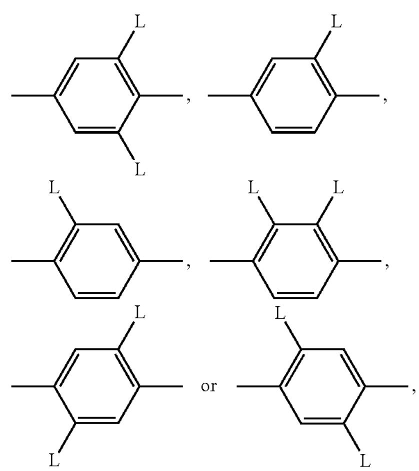

in which L, identically or differently on each occurrence, has one of the above meanings and preferably denotes F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, particularly preferably F, Cl, CN, $CH_3$, $C_2H_5$, $OCH_3$, $COCH_3$, $OCF_3$ or P-Sp-, very particularly preferably F, Cl, $CH_3$, $OCH_3$, $COCH_3$ or $OCF_3$, in particular F or $CH_3$.

Suitable polymerisable compounds are listed, for example, in Table D.

The liquid-crystalline media in accordance with the present application preferably comprise in total 0.1 to 10%, preferably 0.2 to 4.0%, particularly preferably 0.2 to 2.0%, of polymerisable compounds.

Particular preference is given to the polymerisable compounds of the formula M and the formulae RM-1 to RM-99.

The mixtures according to the invention may furthermore comprise conventional additives, such as, for example, stabilisers, antioxidants, UV absorbers, nanoparticles, microparticles, etc.

The structure of the liquid-crystal displays according to the invention corresponds to the usual geometry, as described, for example, in EP-A 0 240 379.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

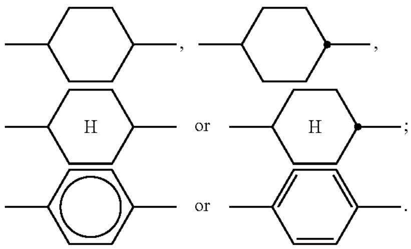

The cyclohexylene rings are trans-1,4-cyclohexylene rings.

Throughout the patent application and in the working examples, the structures of the liquid-crystal compounds are indicated by means of acronyms. Unless indicated otherwise, the transformation into chemical formulae is carried out in accordance with Tables 1-3. All radicals $C_nH_{2n+1}$, $C_mH_{2m+1}$ and $C_mH_{2m'+1}$ or $C_nH_{2n}$ and $C_mH_{2m}$ are straight-chain alkyl radicals or alkylene radicals respectively in each case having n, m, m' or z C atoms respectively. n, m, m', z each denote, independently of one another, 1, 2, 3, 4, 5, 6, 7, 8, 9, 10, 11 or 12, preferably 1, 2, 3, 4, 5 or 6. In Table 1 the ring elements of the respective compound are coded, in Table 2 the bridging members are listed and in Table 3 the meanings of the symbols for the left-hand or right-hand side chains of the compounds are indicated.

TABLE 1

| Ring elements | |
|---|---|
| 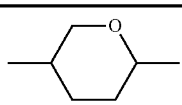 | A |
| 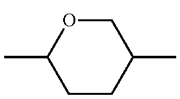 | Al |
| 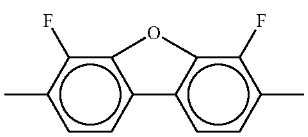 | B |
| 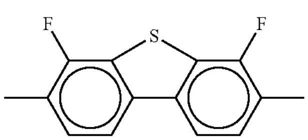 | B(S) |
| 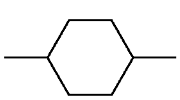 | C |
| 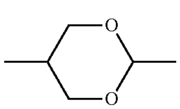 | D |

TABLE 1-continued

| Ring elements | |
|---|---|
| 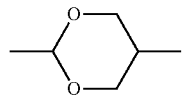 | Dl |
| 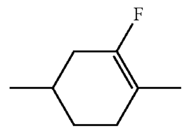 | F |
| 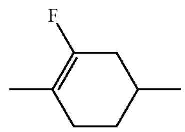 | Fl |
| 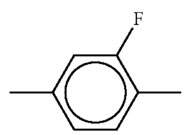 | G |
| 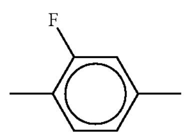 | Gl |
| 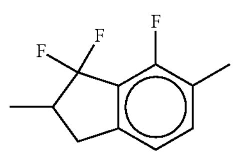 | K |
| 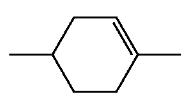 | L |
| 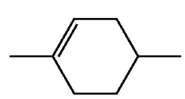 | Ll |
| 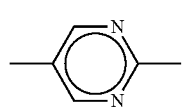 | M |
| 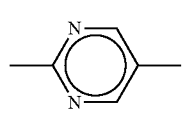 | Ml |

TABLE 1-continued

| Ring elements | |
|---|---|
| 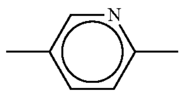 | N |
| 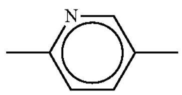 | Nl |
| 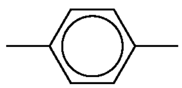 | P |
| 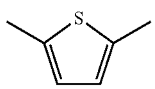 | S |
| 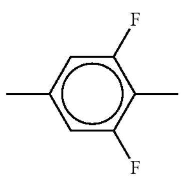 | U |
| 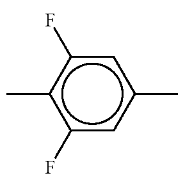 | Ul |

TABLE 1-continued

| Ring elements | |
|---|---|
| 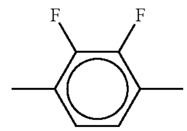 | Y |
| 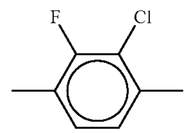 | Y(F, Cl) |
| 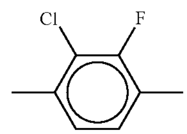 | Y(Cl, F) |

TABLE 2

| Bridging members | | | |
|---|---|---|---|
| E | —$CH_2CH_2$— | | |
| V | —CH═CH— | | |
| T | —C≡C— | | |
| W | —$CF_2CF_2$— | | |
| Z | —COO— | ZI | —OCO— |
| O | —$CH_2O$— | OI | —$OCH_2$— |
| Q | —$CF_2O$— | QI | —$OCF_2$— |

TABLE 3

| Side chains | | | |
|---|---|---|---|
| Left-hand side chain | | Right-hand side chain | |
| n- | $C_nH_{2n+1}$— | -n | —$C_nH_{2n+1}$ |
| nO- | $C_nH_{2n+1}$—O— | -On | —O—$C_nH_{2n+1}$ |
| V- | $CH_2$═CH— | -V | —CH═$CH_2$ |
| nV- | $C_nH_{2n+1}$—CH═CH— | -nV | —$C_nH_{2n}$—CH═$CH_2$ |
| Vn- | $CH_2$═CH—$C_nH_{2n}$— | -Vn | —CH═CH—$C_nH_{2n+1}$ |
| nVm- | $C_nH_{2n+1}$—CH═CH—$C_mH_{2m}$— | -nVm | —$C_nH_{2n}$—CH═CH—$C_mH_{2m+1}$ |
| N- | N≡C— | -N | —C≡N |
| F- | F— | -F | —F |
| Cl- | Cl— | -Cl | —Cl |
| M- | $CFH_2$— | -M | —$CFH_2$ |
| D- | $CF_2H$— | -D | —$CF_2H$ |
| T- | $CF_3$— | -T | —$CF_3$ |
| MO- | $CFH_2O$— | -OM | —$OCFH_2$ |
| DO- | $CF_2HO$— | -OD | —$OCF_2H$ |
| TO- | $CF_3O$— | -OT | —$OCF_3$ |
| T- | $CF_3$— | -T | —$CF_3$ |
| A- | H—C≡C— | -A | —C≡C—H |

Besides one or more compounds of the formula I, the mixtures according to the invention preferably comprise one or more compounds of the compounds mentioned below from Table A.
TABLE A
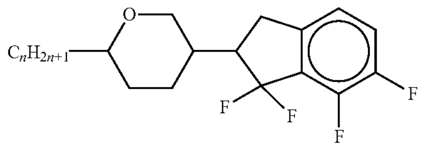
AIK-n-F
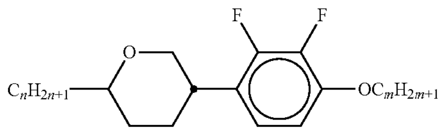
AIY-n-Om
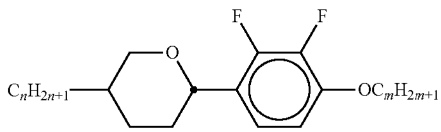
AY-n-Om
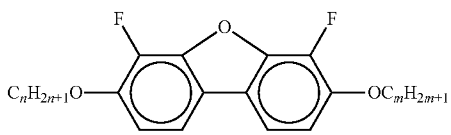
B-nO-Om
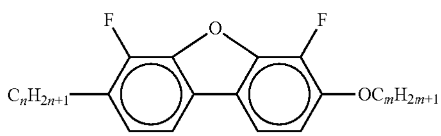
B-n-Om
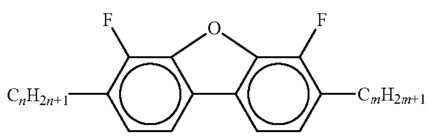
B-n-m
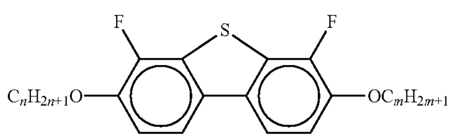
B(S)-nO-Om
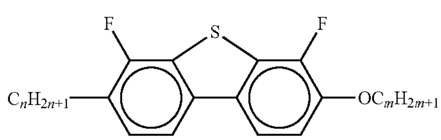
B(S)-n-Om
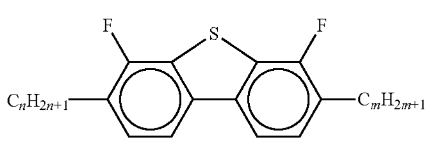
B(S)-n-m
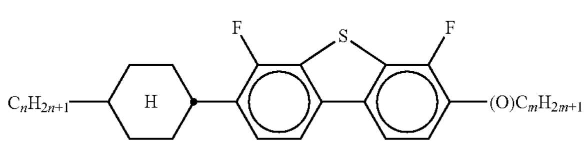
CB(S)-n-(O)m TABLE A-continued
CB-n-m
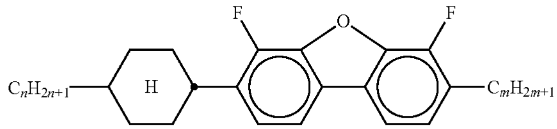
CB-n-Om
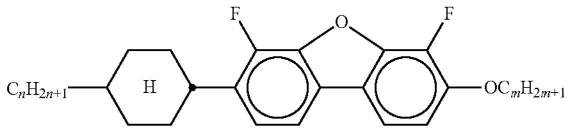
PB-n-m
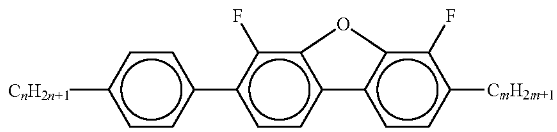
PB-nO-Om
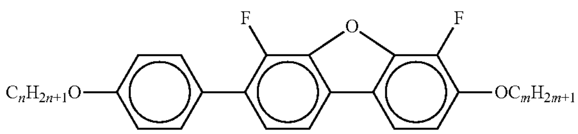
PB-n-Om
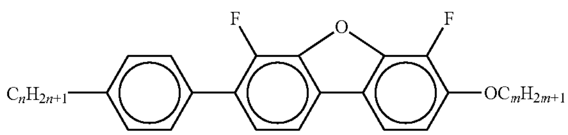
BCH-nm
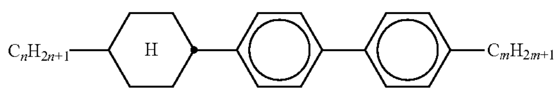
BCH-nmF
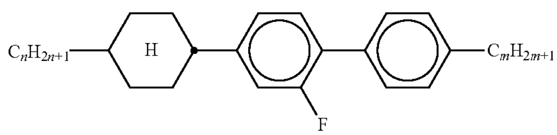
BCN-nm
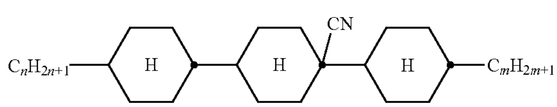
C-1V-V1
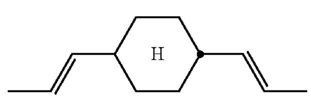
CY-n-Om
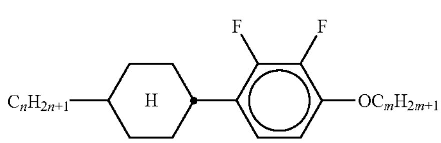
CY(F, Cl)-n-Om
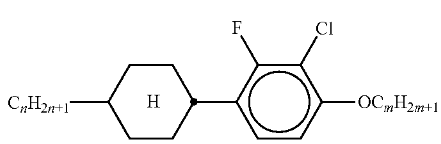
CY(Cl, F)-n-Om
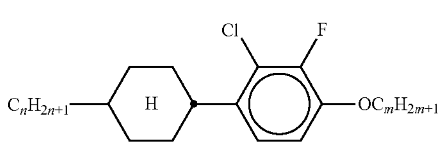

TABLE A-continued
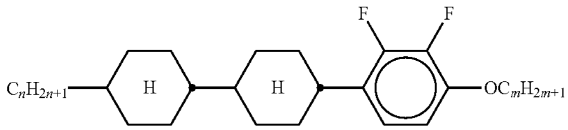
CCY-n-Om
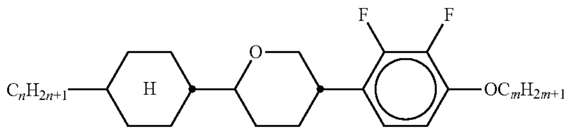
CAIY-n-Om
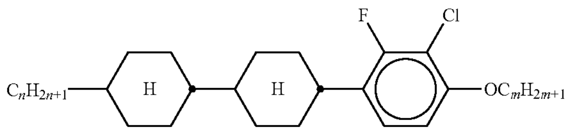
CCY(F, Cl)-n-Om
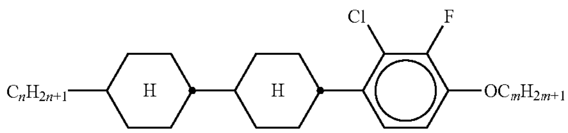
CCY(Cl, F)-n-Om
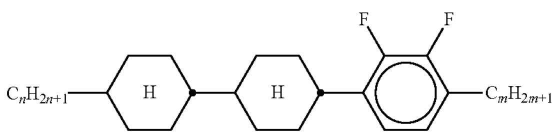
CCY-n-m
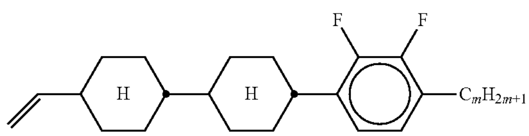
CCY-V-m
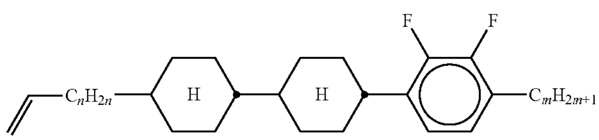
CCY-Vn-m
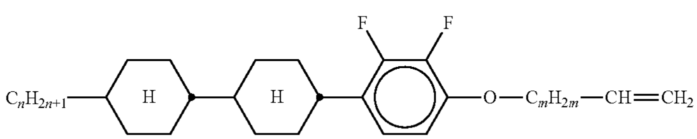
CCY-n-OmV
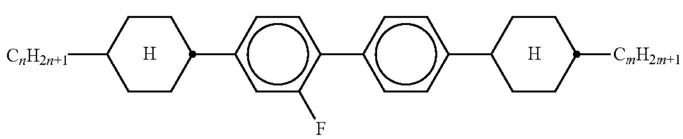
CBC-nmF
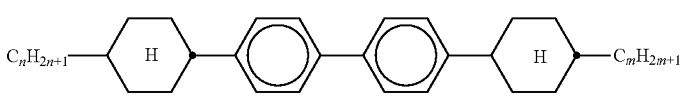
CBC-nm
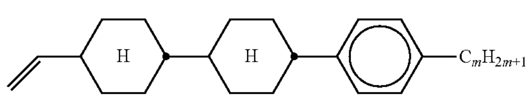
CCP-V-m
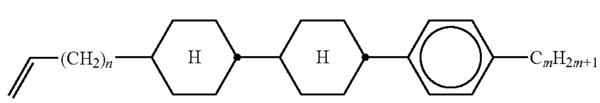
CCP-Vn-m TABLE A-continued
CCP-nV-m
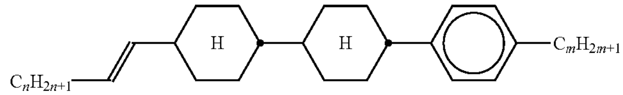
CCP-n-m
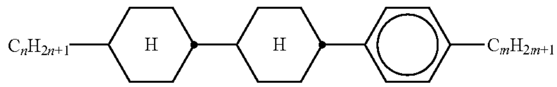
CPYP-n-(O)m
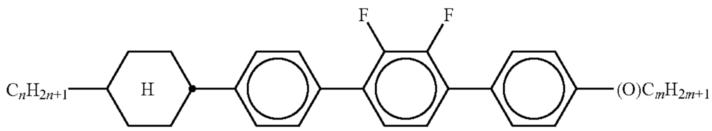
CYYC-n-m
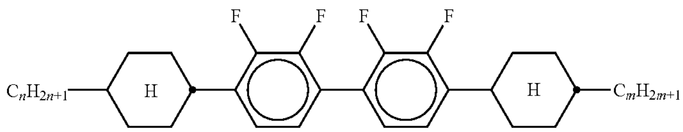
CCYY-n-(O)m
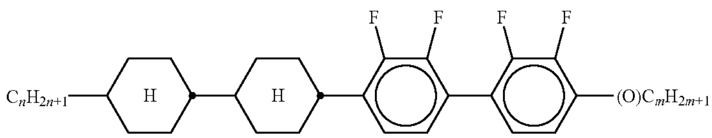
CCY-n-O2V
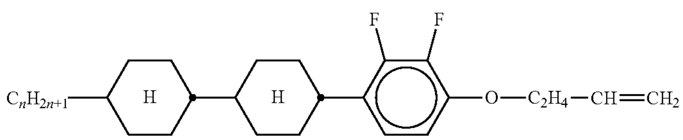
CCH-nOM
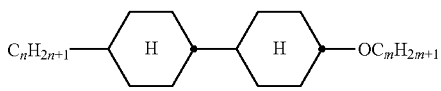
CCC-n-m
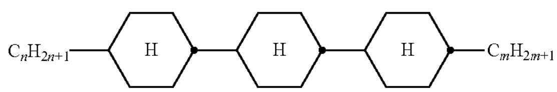
CCC-n-V
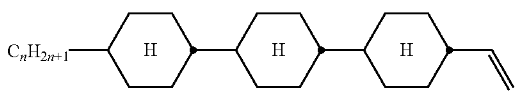
CY-n-m
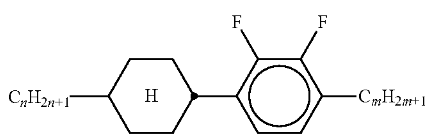
CCH-nm
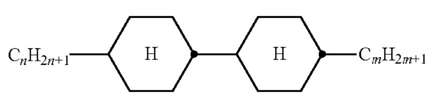
CC-n-V
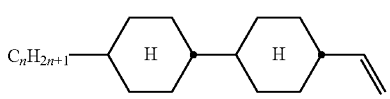
CC-n-V1
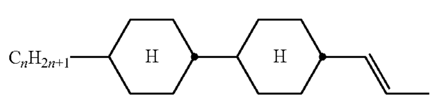
CC-n-Vm
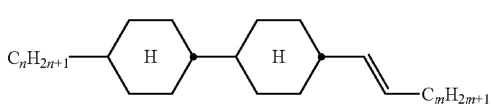

TABLE A-continued
CC-V-V
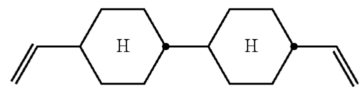
CC-V-V1
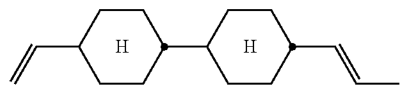
CC-2V-V2
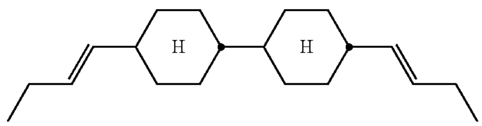
CVC-n-m
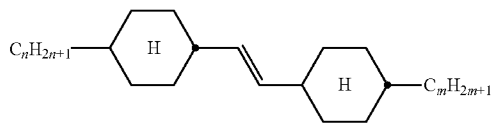
CC-n-mV
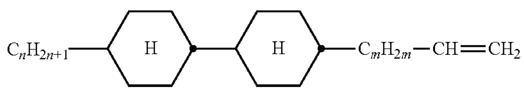
CC-n-mV1
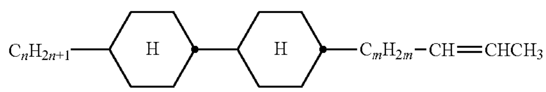
CCOC-n-m
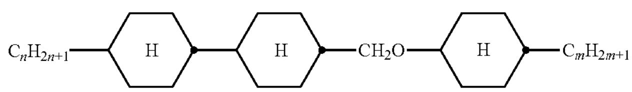
CP-nOmFF
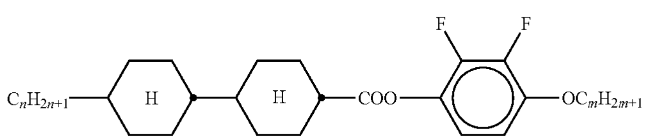
CH-nm
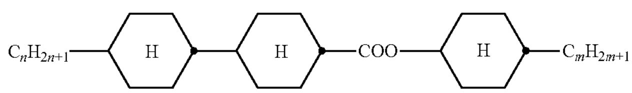
CEY-n-Om
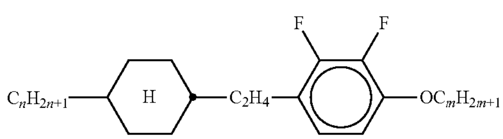
CEY-V-n
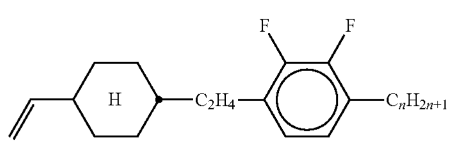
CVY-V-n
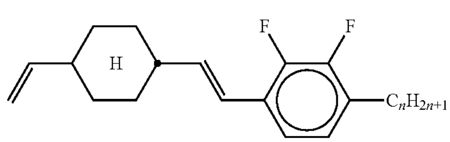
CY-V-On
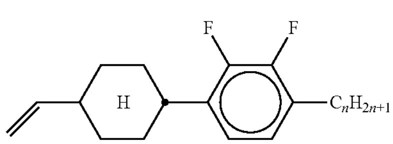

TABLE A-continued
CY-n-O1V
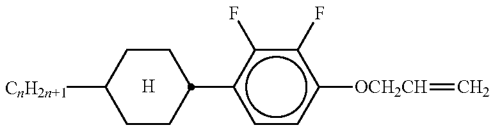
CY-n-OC($CH_3$)=$CH_2$
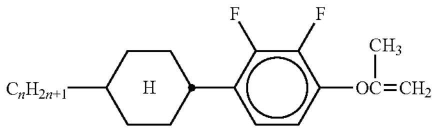
CCN-nm
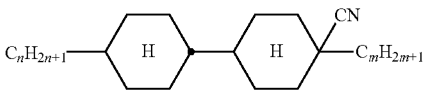
CY-n-OV
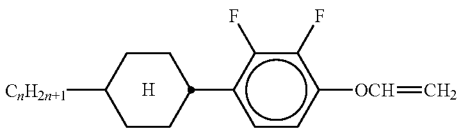
CCPC-nm
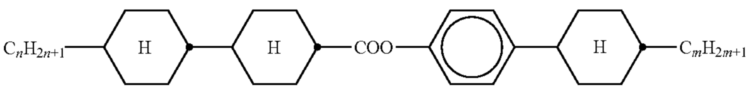
CCY-n-zOm
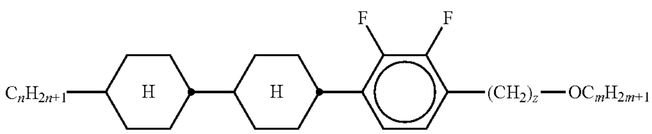
CPY-n-Om
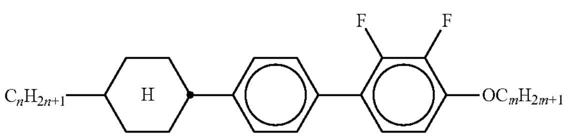
CPY-n-m
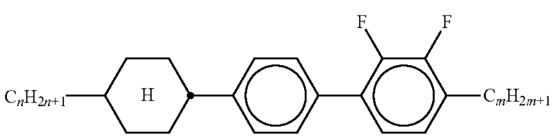
CPY-V-Om
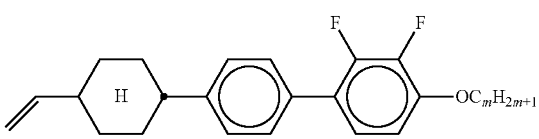
CQY-n-(O)m
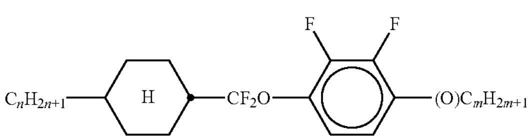
CQIY-n-(O)m
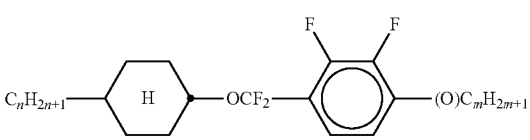
CCQY-n-(O)m
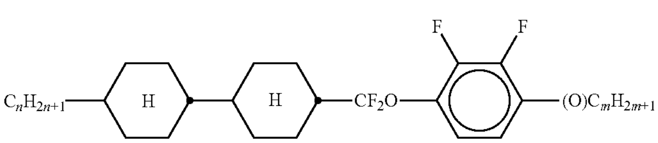

TABLE A-continued
CCQIY-n-(O)m
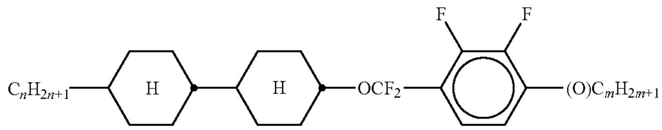
CPQY-n-(O)m
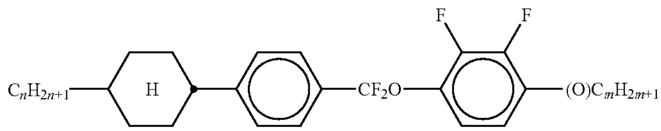
CPQIY-n-(O)m
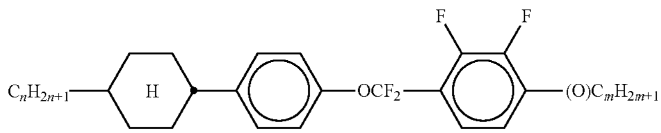
CPYG-n-(O)m
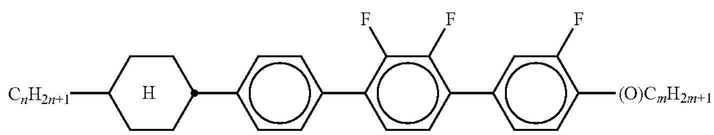
CCY-V-Om
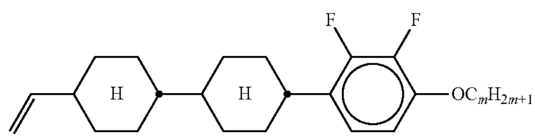
CCY-V2-(O)m
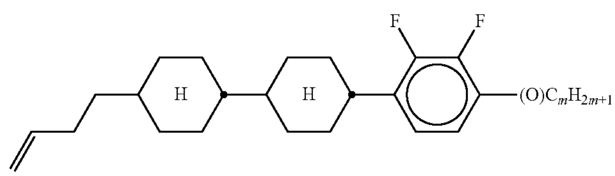
CCY-1V2-(O)m
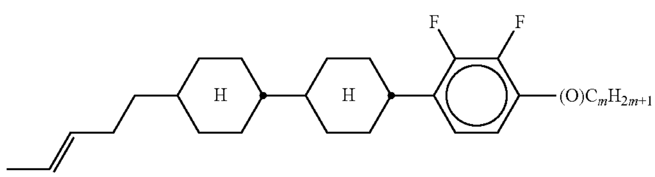
CCY-3V-(O)m
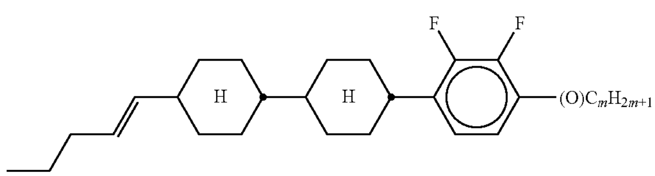
CCVC-n-V
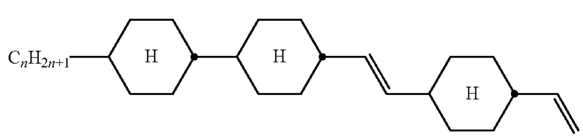
CCVC-V-V
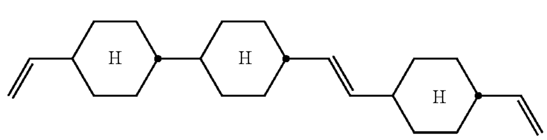
CPGP-n-m
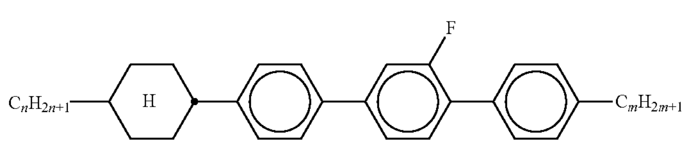

TABLE A-continued
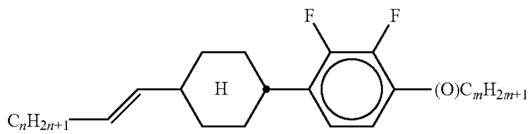
CY-nV-(O)m
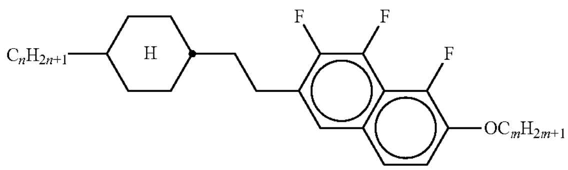
CENaph-n-Om
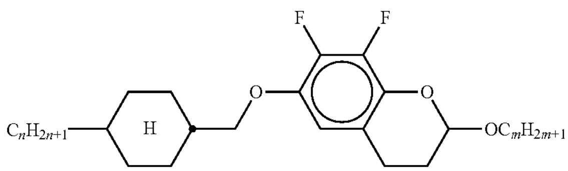
COChrom-n-Om
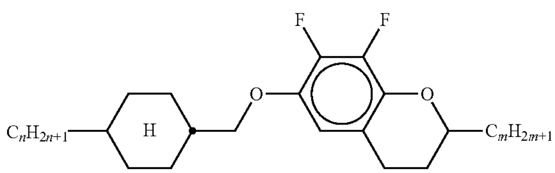
COChrom-n-m
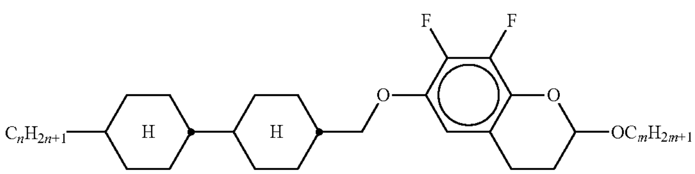
CCOChrom-n-Om
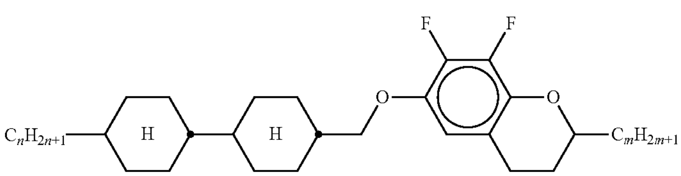
CCOChrom-n-m
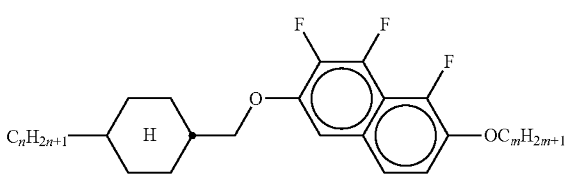
CONaph-n-Om
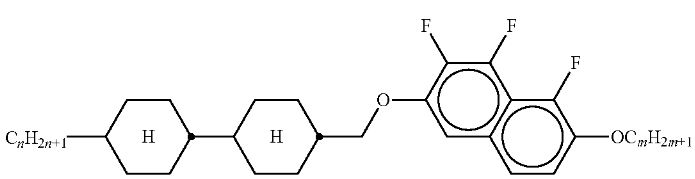
CCONaph-n-Om
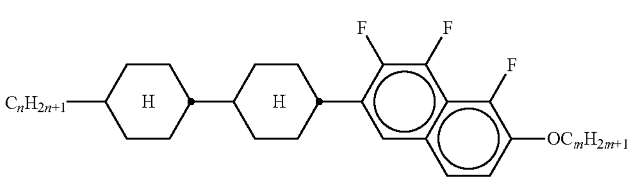
CCNaph-n-Om TABLE A-continued
CNaph-n-Om
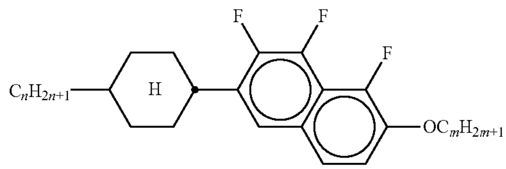
CETNaph-n-Om
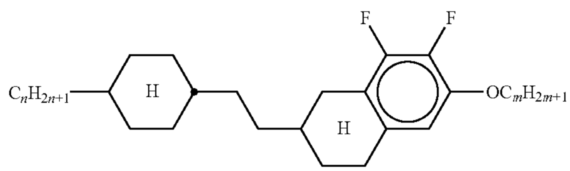
CTNaph-n-Om
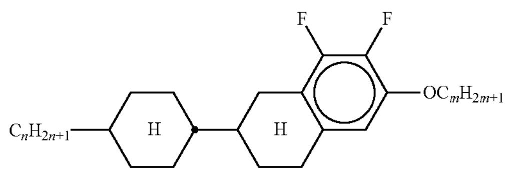
CK-n-F
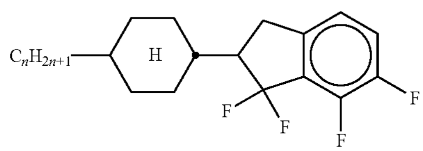
CLY-n-Om
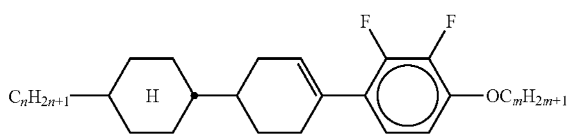
CLY-n-m
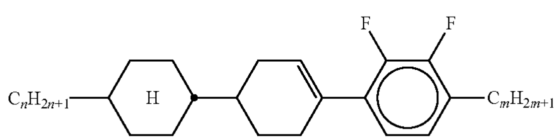
LYLI-n-m
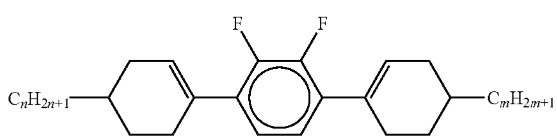
CYLI-n-m
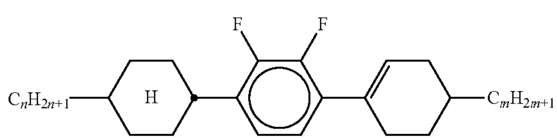
LY-n-(O)m
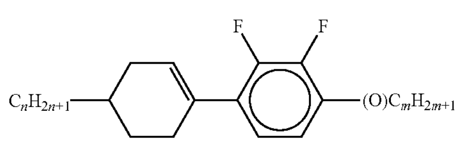
COYOICC-n-m
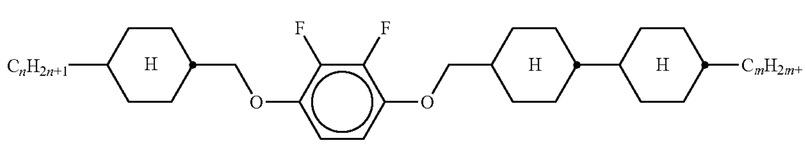

TABLE A-continued
| | |
|---|---|
| 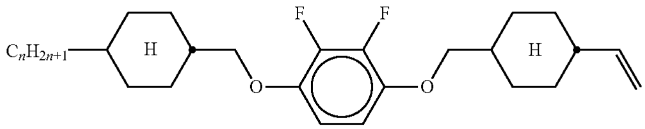 | COYOIC-n-V |
| 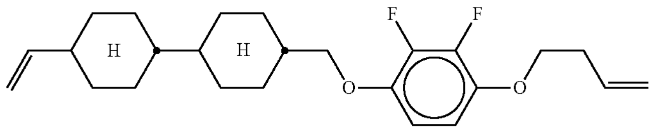 | CCOY-V-O2V |
| 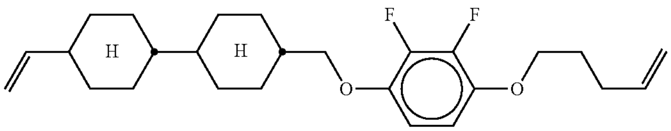 | CCOY-V-O3V |
| 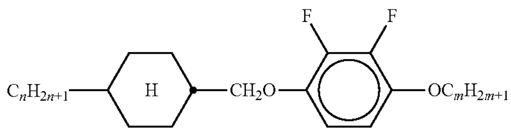 | COY-n-Om |
| 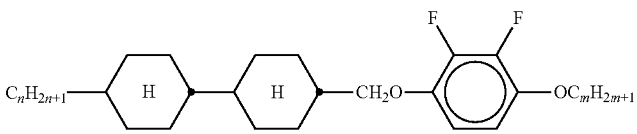 | CCOY-n-Om |
| 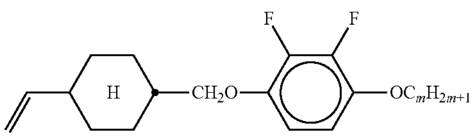 | COY-V-Om |
| 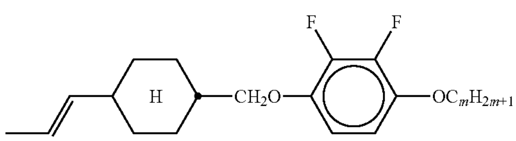 | COY-1V-Om |
| 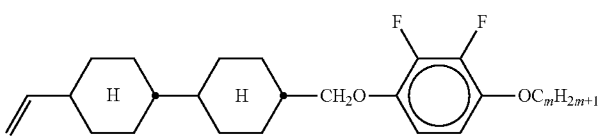 | CCOY-V-Om |
| 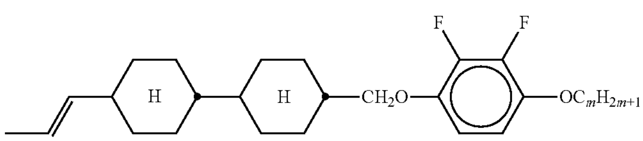 | CCOY-1V-Om |
| 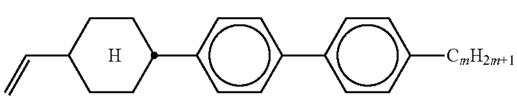 | CPP-V-m |
| 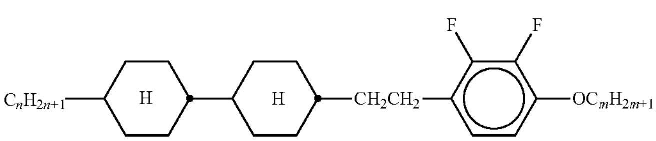 | CCEY-n-Om |
| 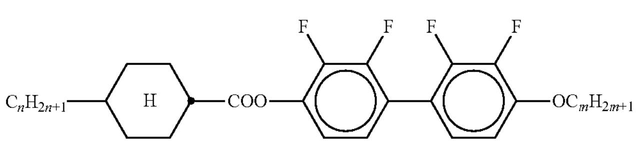 | CZYY-n-Om |

TABLE A-continued
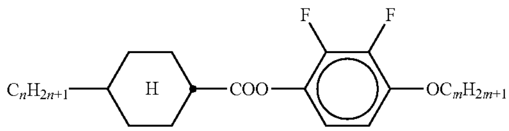
D-nOmFF
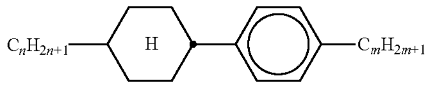
PCH-nm
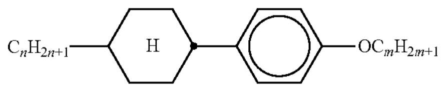
PCH-nOm
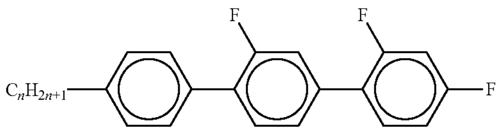
PGIGI-n-F
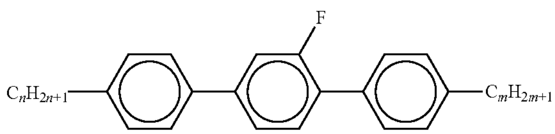
PGP-n-m
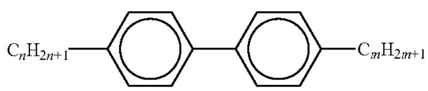
PP-n-m
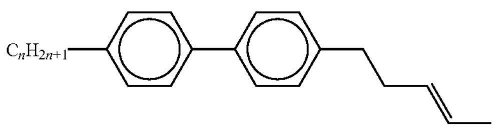
PP-n-2V1
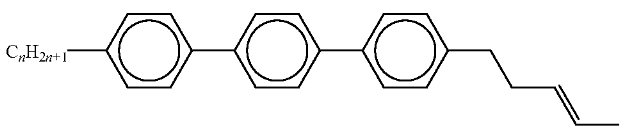
PPP-n-2V1
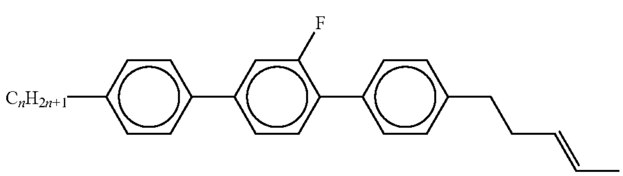
PGP-n-2V1
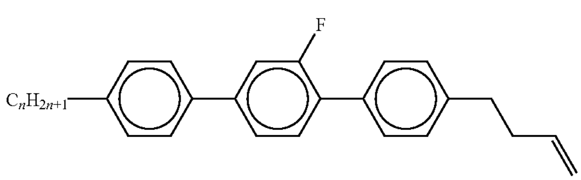
PGP-n-2V
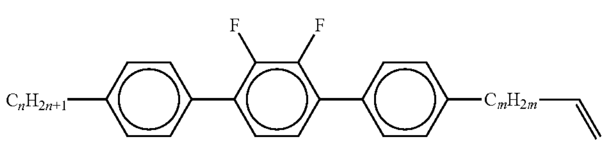
PYP-n-mV
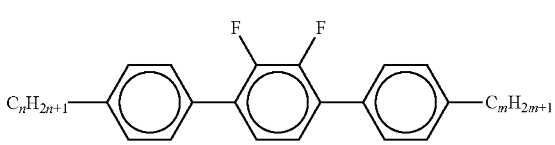
PYP-n-m TABLE A-continued
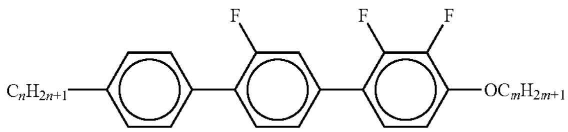
PGIY-n-Om
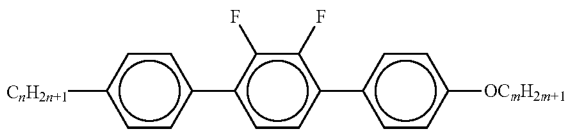
PYP-n-Om
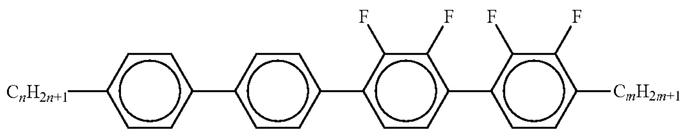
PPYY-n-m
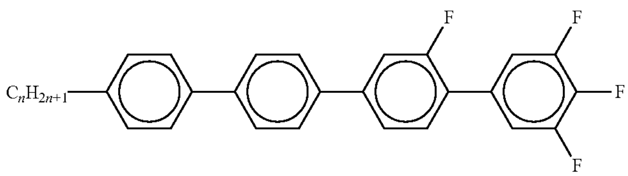
PPGU-n-F
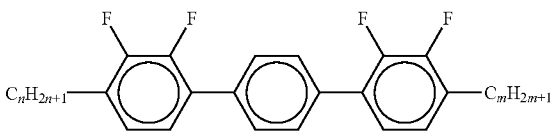
YPY-n-m
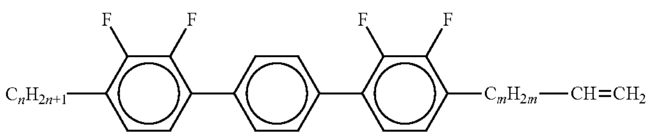
YPY-n-mV
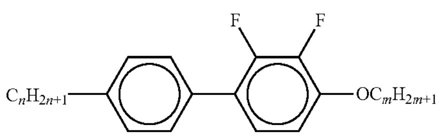
PY-n-Om
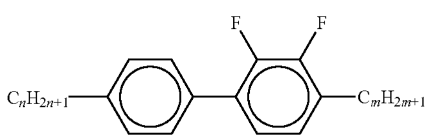
PY-n-m
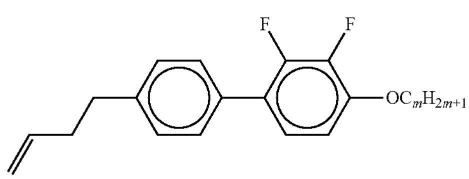
PY-V2-Om
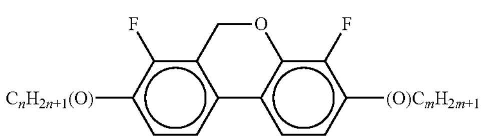
DFDBC-n(O)-(O)m
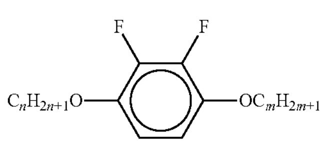
Y-nO-Om TABLE A-continued

| | |
|---|---|
| 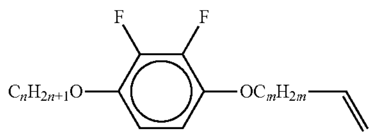 | Y-nO-OmV |
| 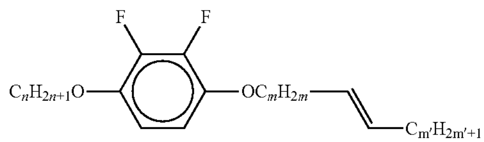 | Y-nO-OmVm' |
| 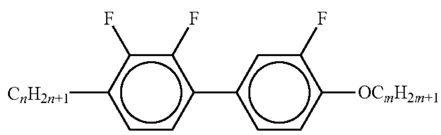 | YG-n-Om |
| 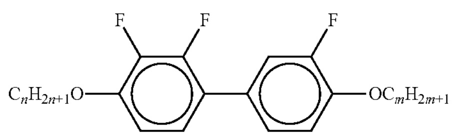 | YG-nO-Om |
| 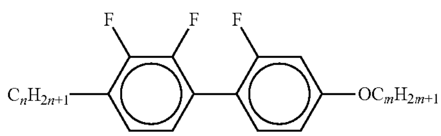 | YGI-n-Om |
| 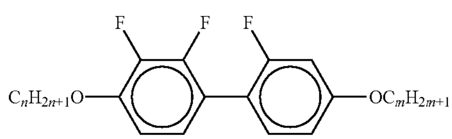 | YGI-nO-Om |
| 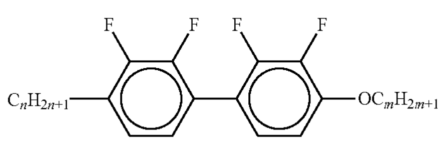 | YY-n-Om |
| 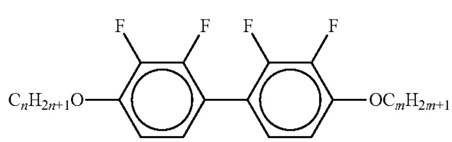 | YY-nO-Om |

The following abbreviations are used:

(n, m, m', z: each, independently of one another, 1, 2, 3, 4, 5 or 6;

(O)$C_mH_{2m+1}$ means $OC_mH_{2m+1}$ or $C_mH_{2m+1}$)

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers, such as, for example, phenols, HALS (hindered amine light stabilisers), or chiral dopants may be added. Suitable stabilisers for the mixtures according to the invention are, in particular, those listed in Table C.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst., Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

TABLE B
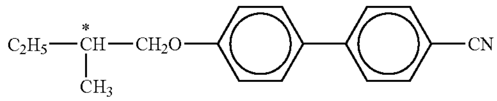
C 15
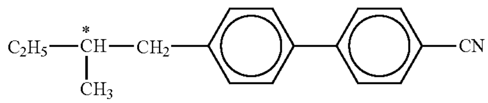
CB 15
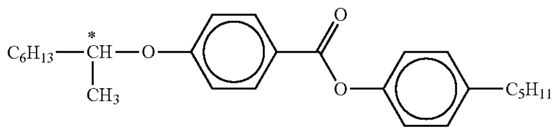
CM 21
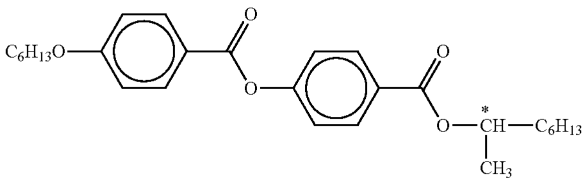
R/S-811
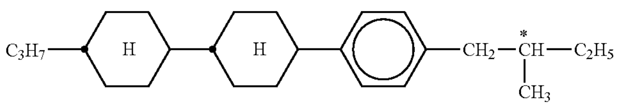
CM 44
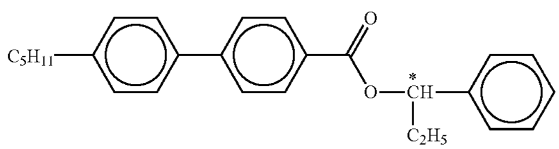
CM 45
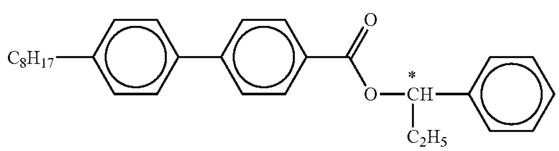
CM 47
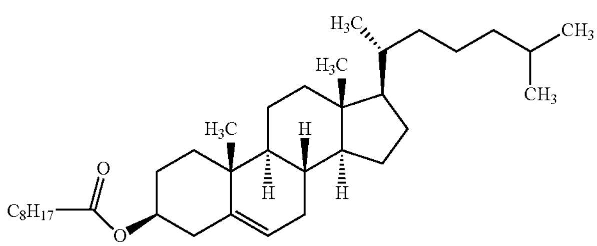
CN
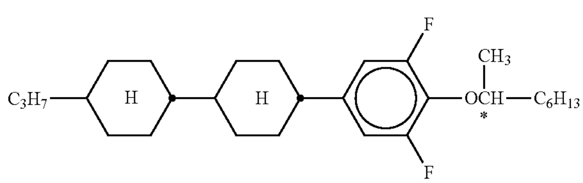
R/S-2011
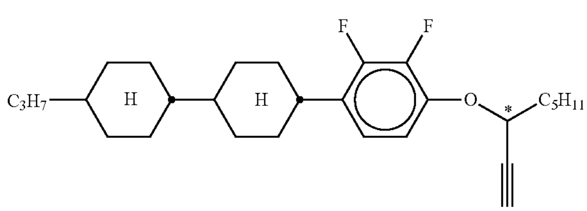
R/S-3011

TABLE B-continued
R/S-4011
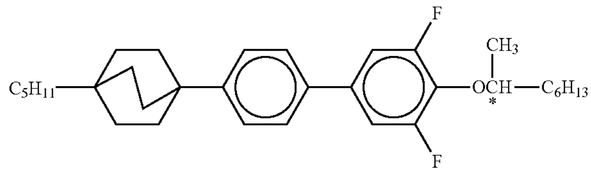
R/S-5011
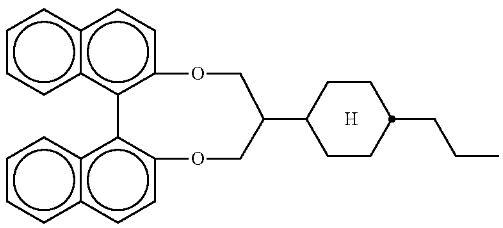
R/S-1011
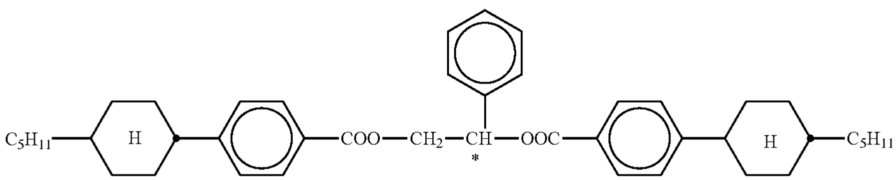
Table B indicates possible dopants which can be added to the mixtures according to the invention. If the mixtures comprise a dopant, it is added in amounts of 0.01-4% by weight, preferably 0.01-3% by weight.
The mixtures according to the invention comprise at least one stabiliser from Table C given below.
TABLE C
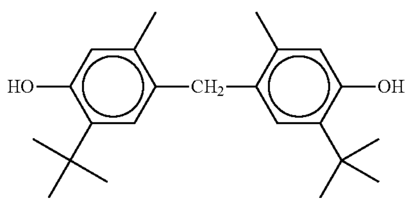
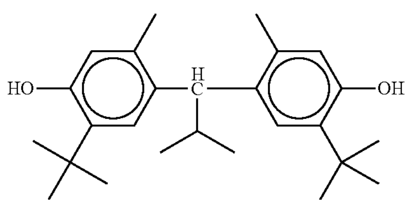
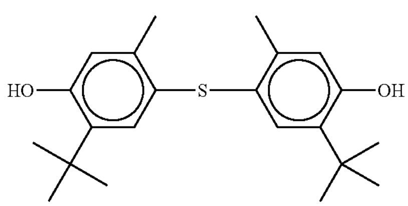

TABLE C-continued
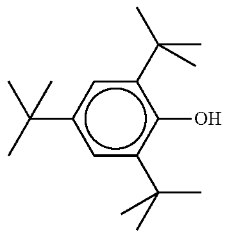
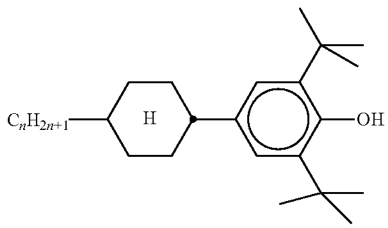
n = 1, 2, 4, 5, 6 or 7
ST-3a-1
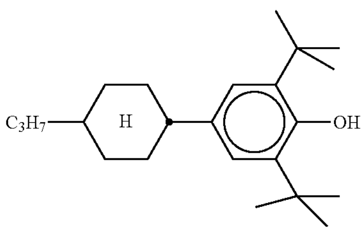
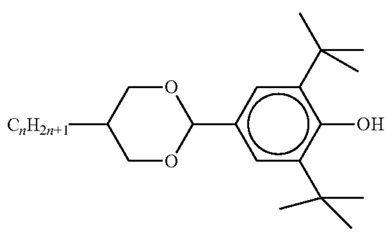
n = 1, 2, 4, 5, 6 or 7
ST-3b-1
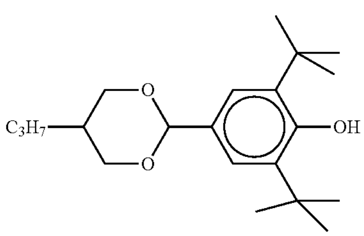
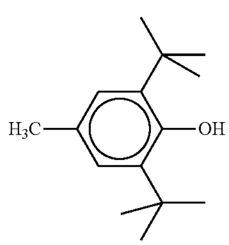

TABLE C-continued
ST-2a-1
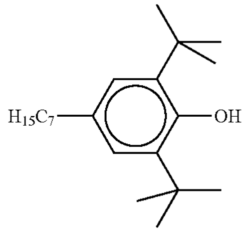
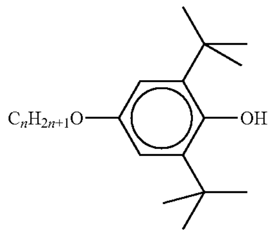
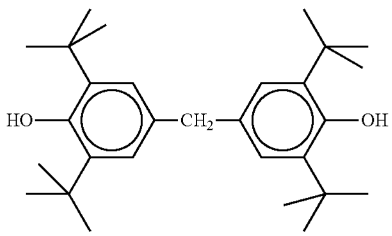
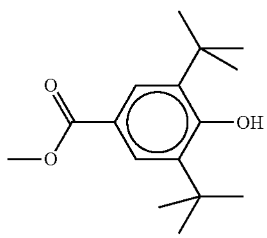
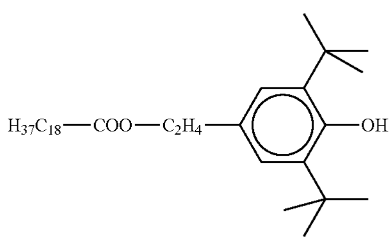
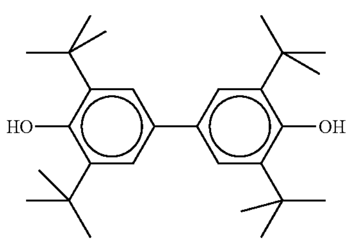

TABLE C-continued
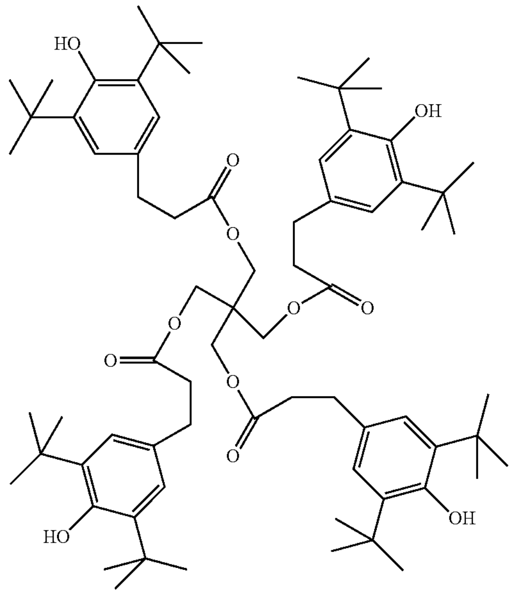 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
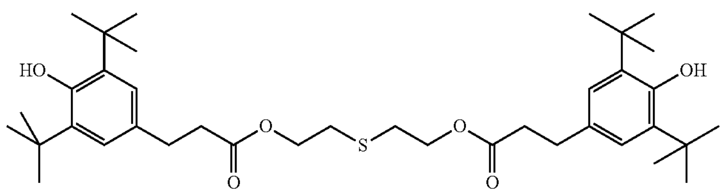 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
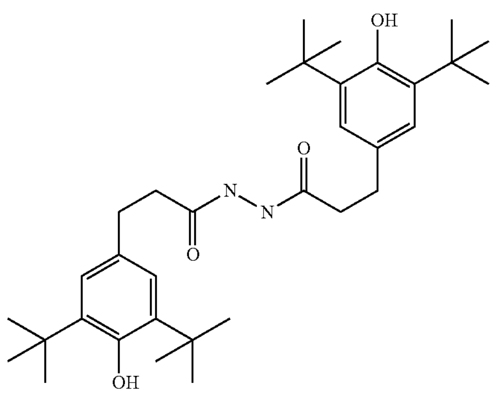 [SMILES: CC(C)(C)c1cc(CCC(=O)NNC(=O)CCc2cc(C(C)(C)C)c(O)c(C(C)(C)C)c2)cc(C(C)(C)C)c1O]
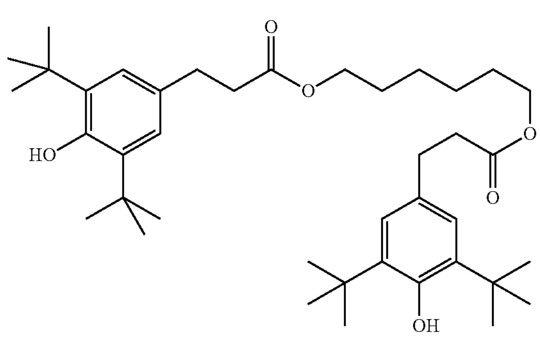 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

TABLE C-continued
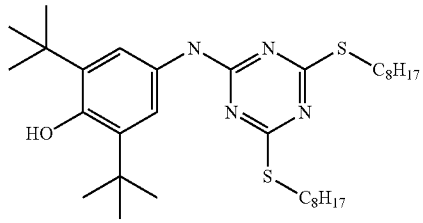
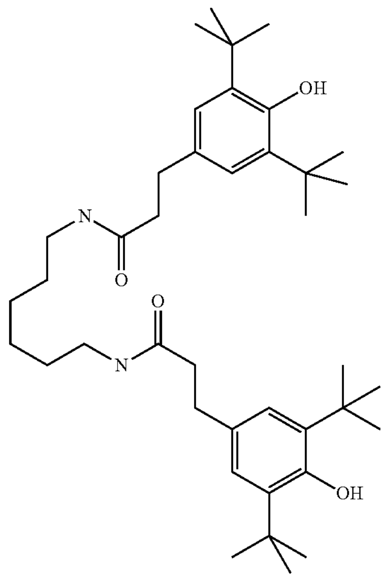 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
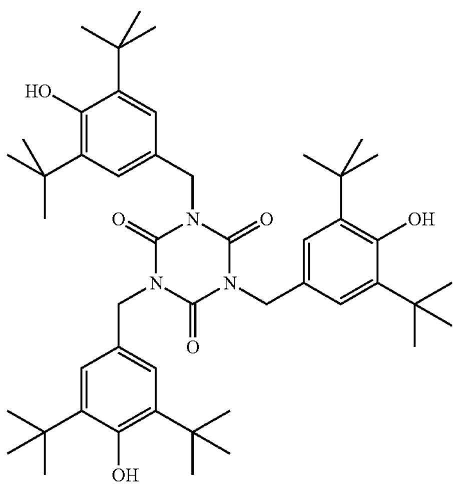 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
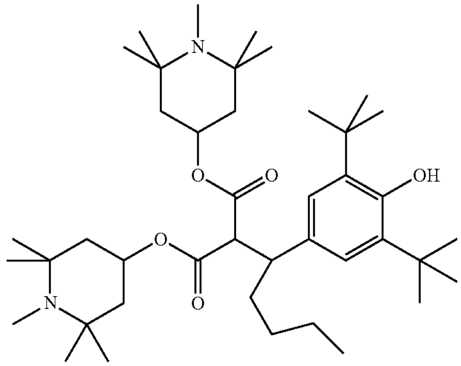 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
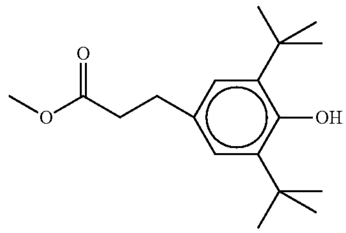
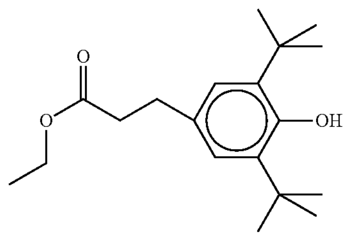
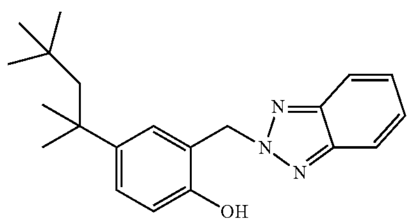 [SMILES: CC(C)(C)CC(C)(C)c1ccc(O)c(Cn2nc3ccccc3n2)c1]
ST-16
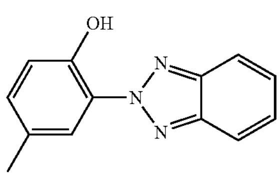 [SMILES: Cc1ccc(O)c(-n2nc3ccccc3n2)c1]
ST-8-1
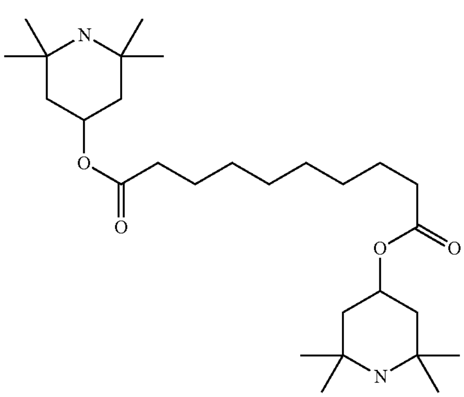

TABLE C-continued
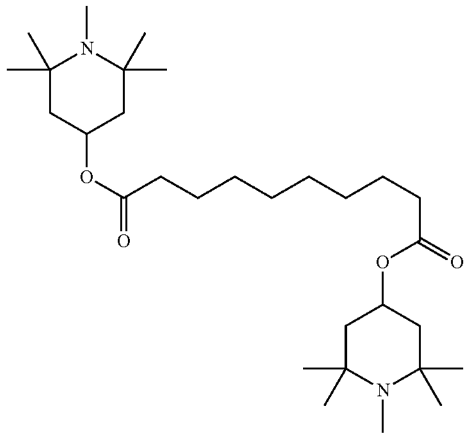
ST-9-1
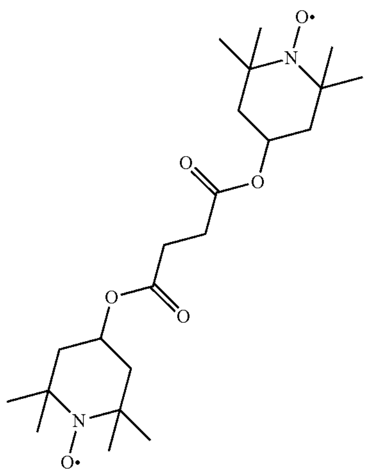
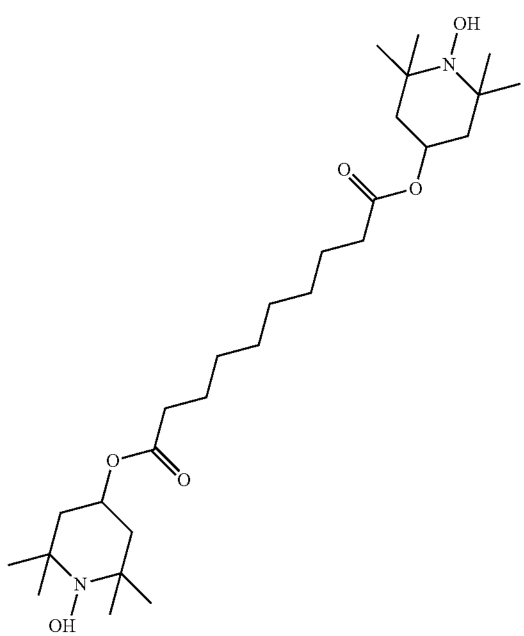

TABLE C-continued
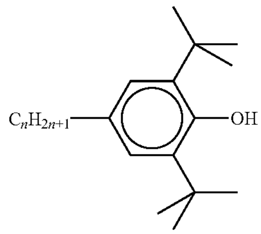
n = 2, 3, 4, 5 or 6
ST-15
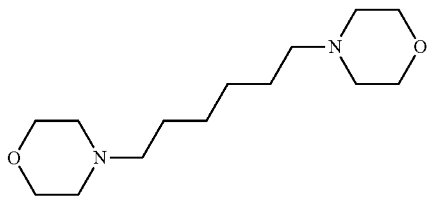 [SMILES: C(CCCN1CCOCC1)CCN1CCOCC1]
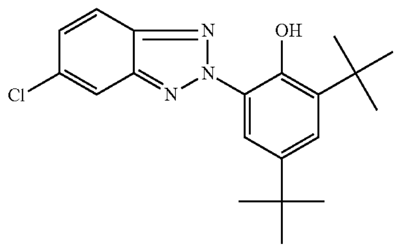 [SMILES: CC(C)(C)c1cc(-n2nc3ccc(Cl)cc3n2)c(O)c(C(C)(C)C)c1]
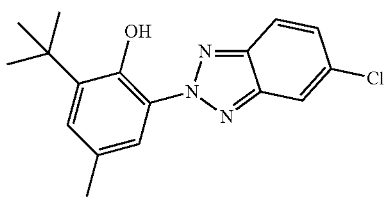 [SMILES: Cc1cc(-n2nc3ccc(Cl)cc3n2)c(O)c(C(C)(C)C)c1]
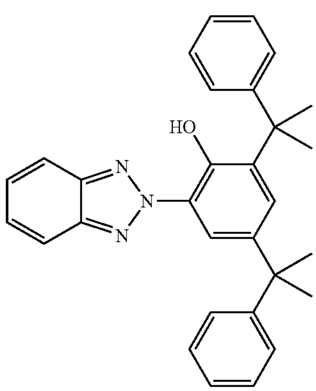 [SMILES: CC(C)(c1ccccc1)c1cc(-n2nc3ccccc3n2)c(O)c(C(C)(C)c2ccccc2)c1]
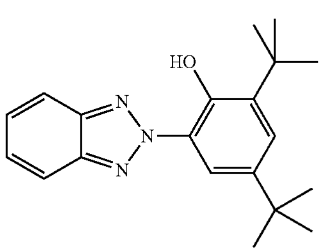 [SMILES: CC(C)(C)c1cc(-n2nc3ccccc3n2)c(O)c(C(C)(C)C)c1]

TABLE C-continued
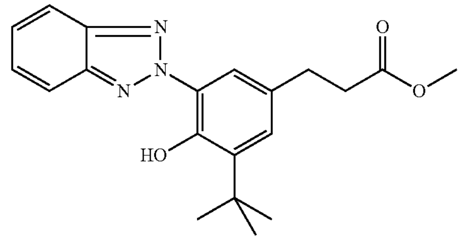 [SMILES: COC(=O)CCc1cc(-n2nc3ccccc3n2)c(O)c(C(C)(C)C)c1]
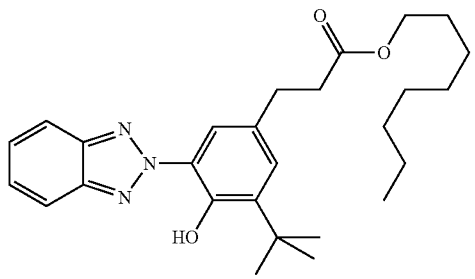 [SMILES: CCCCCCCCOC(=O)CCc1cc(-n2nc3ccccc3n2)c(O)c(C(C)(C)C)c1]
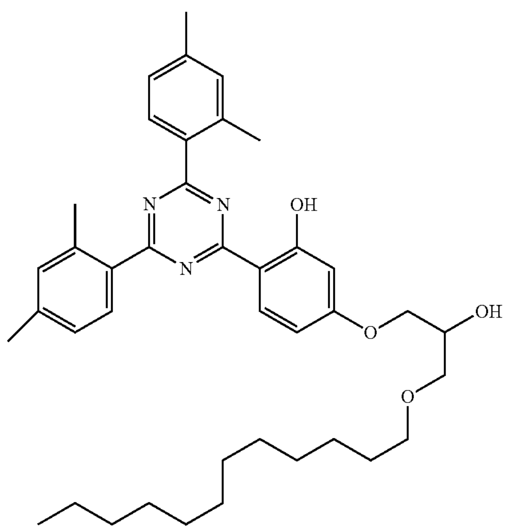 [SMILES: CCCCCCCCCCCCOCC(O)COc1ccc(-c2nc(-c3ccc(C)cc3C)nc(-c3ccc(C)cc3C)n2)c(O)c1]
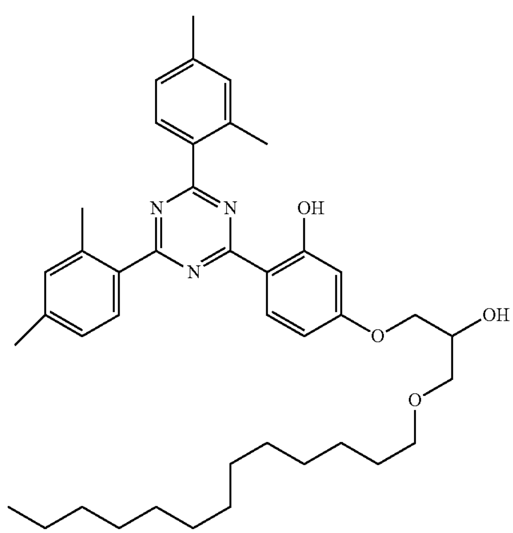 [SMILES: CCCCCCCCCCCCCOCC(O)COc1ccc(-c2nc(-c3ccc(C)cc3C)nc(-c3ccc(C)cc3C)n2)c(O)c1]

TABLE C-continued
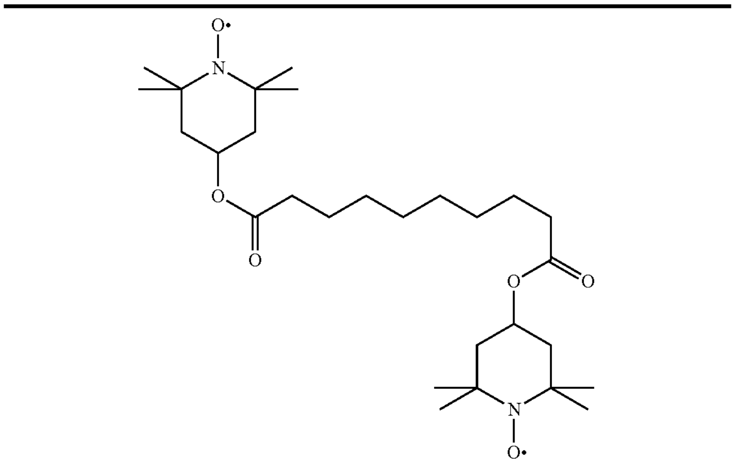
ST-12
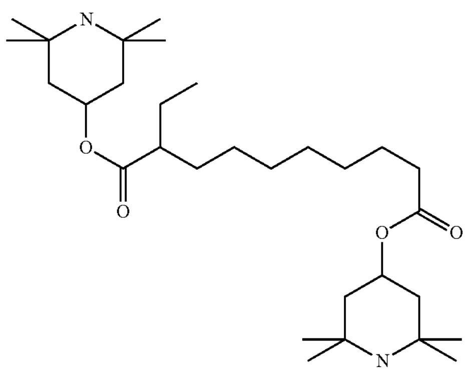
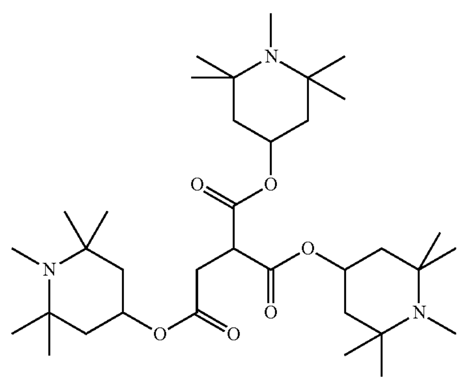
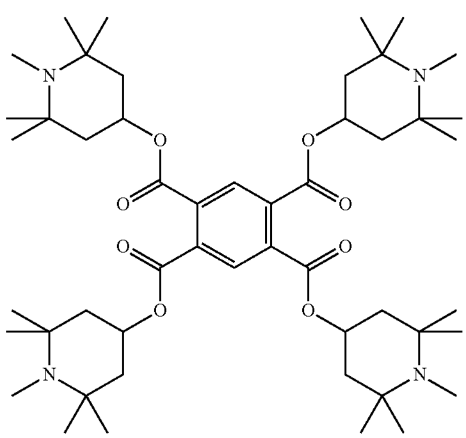

TABLE C-continued
T-17
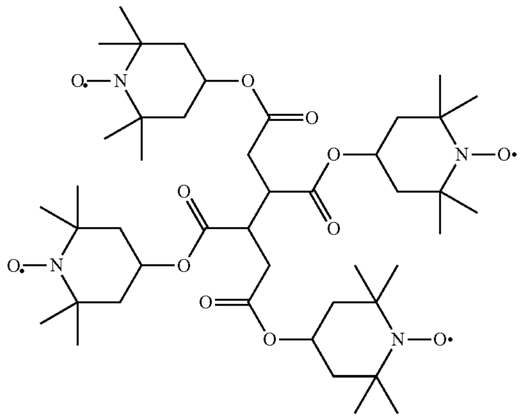
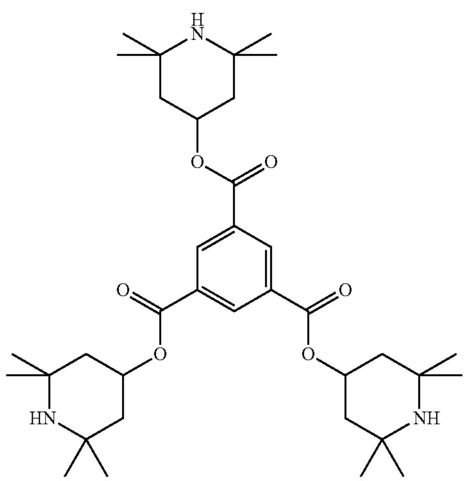
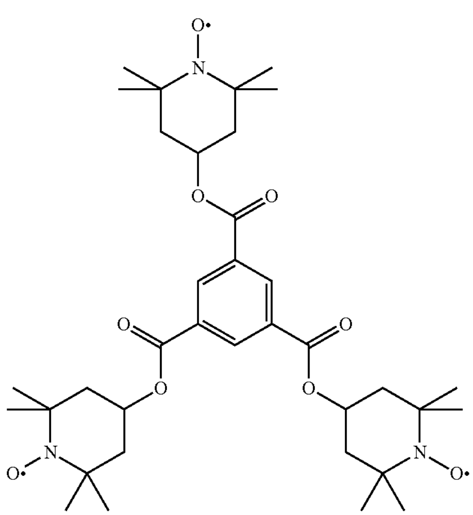

Stabilisers which can be added, for example, to the mixtures according to the invention in amounts of 0-10% by weight, preferably 0.001-5% by weight, in particular 0.001-1% by weight, are indicated below.
TABLE D
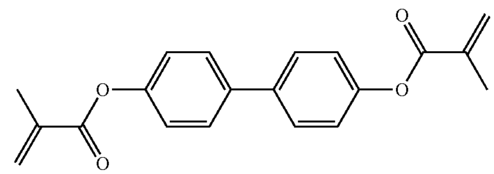
RM-1
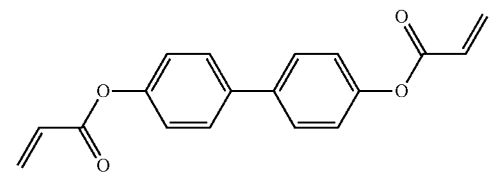 [SMILES: C=CC(=O)Oc1ccc(-c2ccc(OC(=O)C=C)cc2)cc1]
RM-2
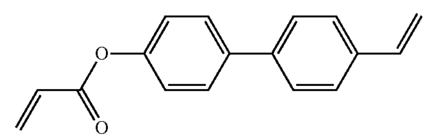 [SMILES: C=CC(=O)Oc1ccc(-c2ccc(C=C)cc2)cc1]
RM-3
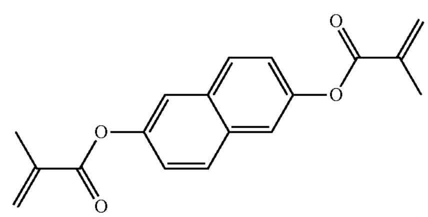 [SMILES: C=C(C)C(=O)Oc1ccc2cc(OC(=O)C(=C)C)ccc2c1]
RM-4
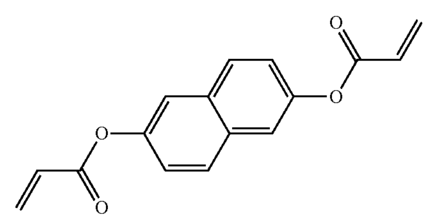 [SMILES: C=CC(=O)Oc1ccc2cc(OC(=O)C=C)ccc2c1]
RM-5
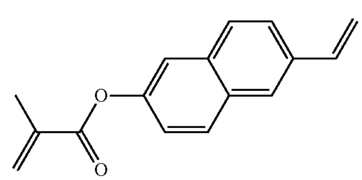 [SMILES: C=Cc1ccc2cc(OC(=O)C(=C)C)ccc2c1]
RM-6
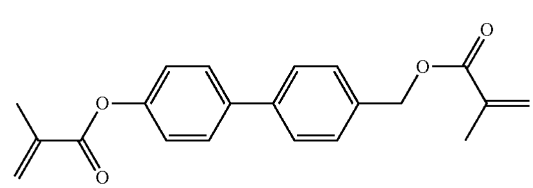 [SMILES: C=C(C)C(=O)OCc1ccc(-c2ccc(OC(=O)C(=C)C)cc2)cc1]
RM-7
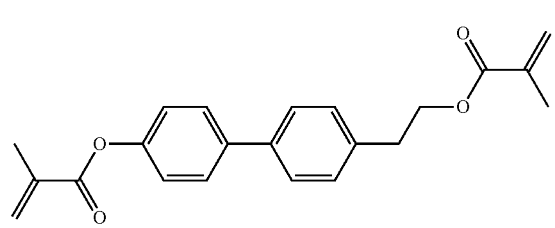 [SMILES: C=C(C)C(=O)OCCc1ccc(-c2ccc(OC(=O)C(=C)C)cc2)cc1]
RM-8

TABLE D-continued
RM-9
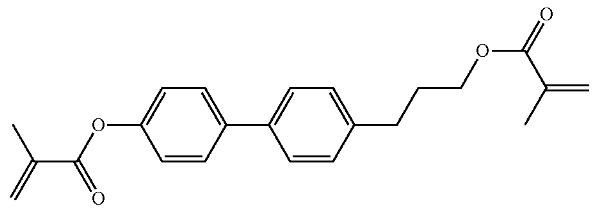 [SMILES: C=C(C)C(=O)OCCCc1ccc(-c2ccc(OC(=O)C(=C)C)cc2)cc1]
RM-10
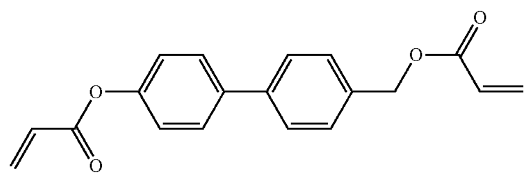 [SMILES: C=CC(=O)OCc1ccc(-c2ccc(OC(=O)C=C)cc2)cc1]
RM-11
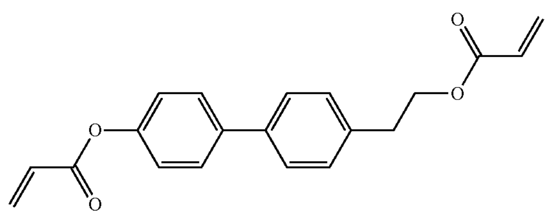 [SMILES: C=CC(=O)OCCc1ccc(-c2ccc(OC(=O)C=C)cc2)cc1]
RM-12
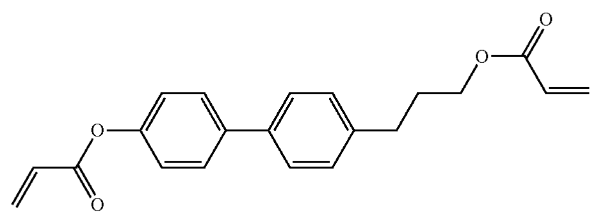 [SMILES: C=CC(=O)OCCCc1ccc(-c2ccc(OC(=O)C=C)cc2)cc1]
RM-13
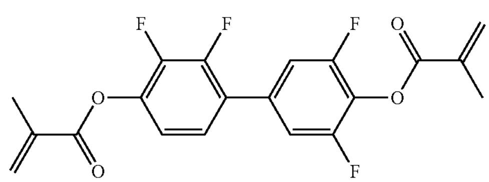 [SMILES: C=C(C)C(=O)Oc1ccc(-c2cc(F)c(OC(=O)C(=C)C)c(F)c2)c(F)c1F]
RM-14
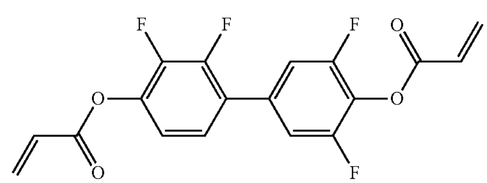
RM-15
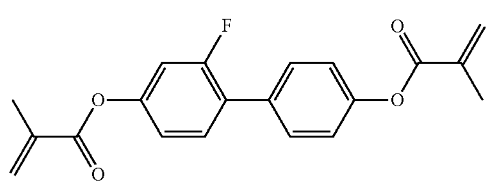
RM-16
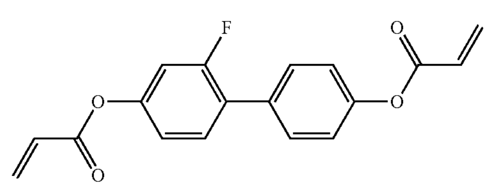 [SMILES: C=CC(=O)Oc1ccc(-c2ccc(OC(=O)C=C)cc2F)cc1]

TABLE D-continued
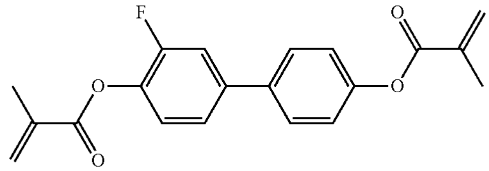
RM-17
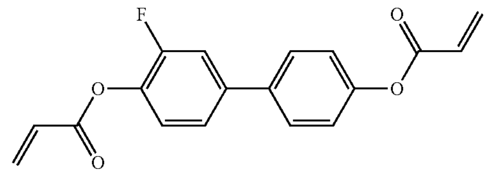
RM-18
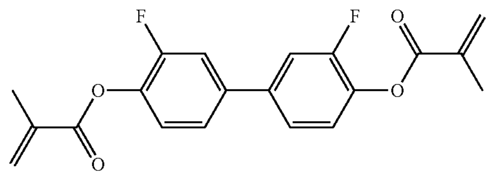
RM-19
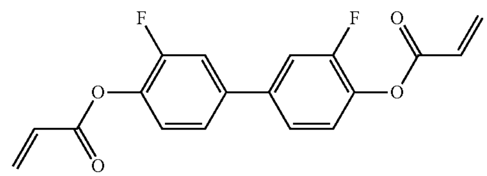 [SMILES: C=CC(=O)Oc1ccc(-c2ccc(OC(=O)C=C)c(F)c2)cc1F]
RM-20
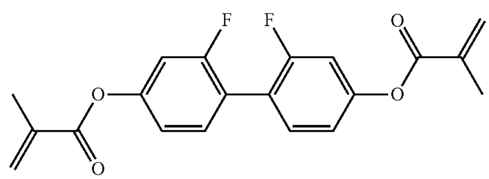
RM-21
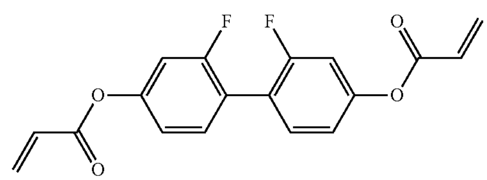
RM-22
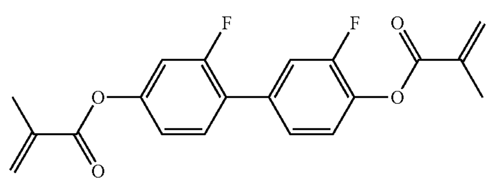
RM-23
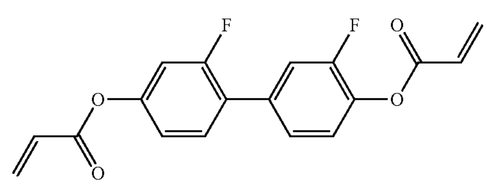 [SMILES: C=CC(=O)Oc1ccc(-c2ccc(OC(=O)C=C)c(F)c2)c(F)c1]
RM-24
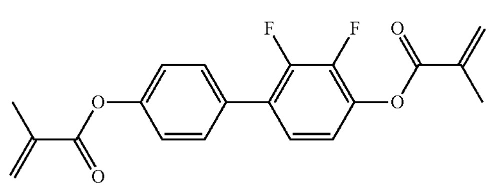 [SMILES: C=C(C)C(=O)Oc1ccc(-c2ccc(OC(=O)C(=C)C)c(F)c2F)cc1]
RM-25

TABLE D-continued
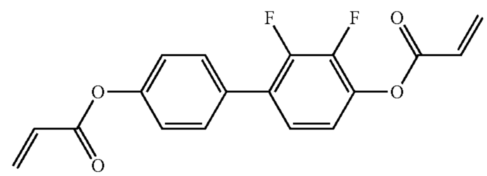 [SMILES: C=CC(=O)Oc1ccc(-c2ccc(OC(=O)C=C)c(F)c2F)cc1]
RM-26
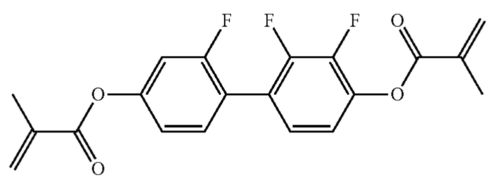 [SMILES: C=C(C)C(=O)Oc1ccc(-c2ccc(OC(=O)C(=C)C)c(F)c2F)c(F)c1]
RM-27
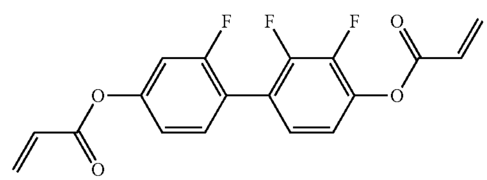 [SMILES: C=CC(=O)Oc1ccc(-c2ccc(OC(=O)C=C)c(F)c2F)c(F)c1]
RM-28
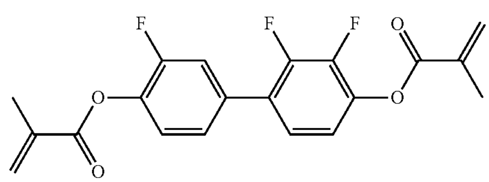 [SMILES: C=C(C)C(=O)Oc1ccc(-c2ccc(OC(=O)C(=C)C)c(F)c2F)cc1F]
RM-29
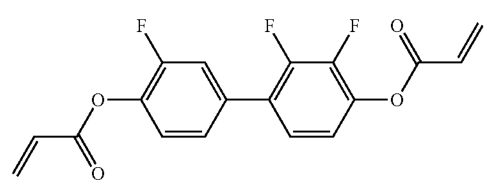 [SMILES: C=CC(=O)Oc1ccc(-c2ccc(OC(=O)C=C)c(F)c2F)cc1F]
RM-30
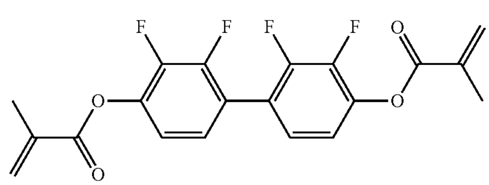 [SMILES: C=C(C)C(=O)Oc1ccc(-c2ccc(OC(=O)C(=C)C)c(F)c2F)c(F)c1F]
RM-31
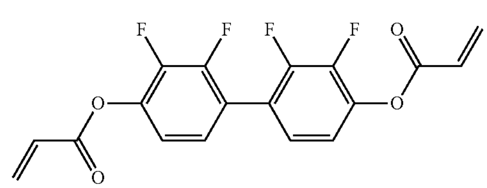 [SMILES: C=CC(=O)Oc1ccc(-c2ccc(OC(=O)C=C)c(F)c2F)c(F)c1F]
RM-32
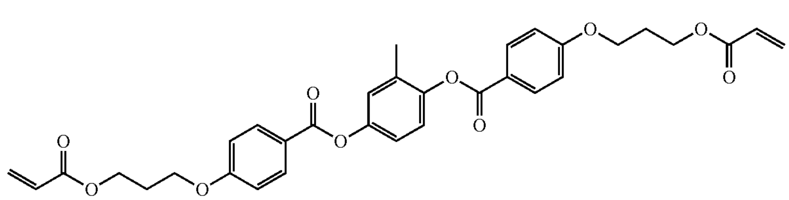 [SMILES: C=CC(=O)OCCCOc1ccc(C(=O)Oc2ccc(OC(=O)c3ccc(OCCCOC(=O)C=C)cc3)c(C)c2)cc1]
RM-33

TABLE D-continued
RM-34
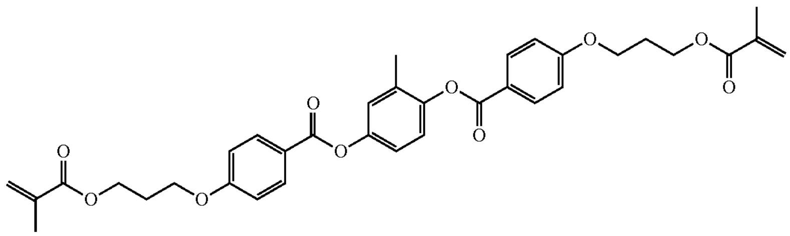 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-35
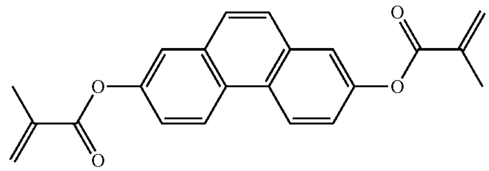 [SMILES: C=C(C)C(=O)Oc1ccc2c(ccc3cc(OC(=O)C(=C)C)ccc32)c1]
RM-36
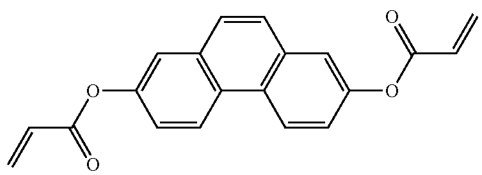 [SMILES: C=CC(=O)Oc1ccc2c(ccc3cc(OC(=O)C=C)ccc32)c1]
RM-37
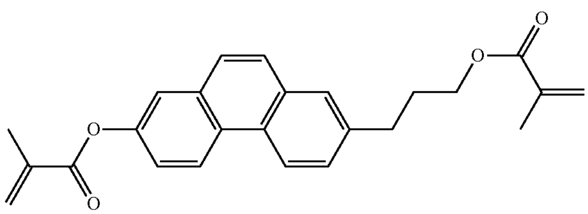 [SMILES: C=C(C)C(=O)OCCCc1ccc2c(ccc3cc(OC(=O)C(=C)C)ccc32)c1]
RM-38
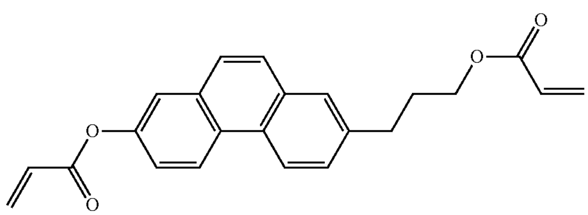 [SMILES: C=CC(=O)OCCCc1ccc2c(ccc3cc(OC(=O)C=C)ccc32)c1]
RM-39
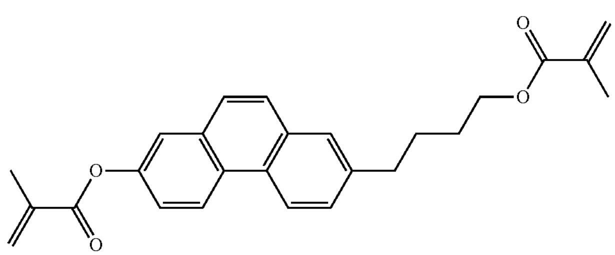 [SMILES: C=C(C)C(=O)OCCCCc1ccc2c(ccc3cc(OC(=O)C(=C)C)ccc32)c1]
RM-40
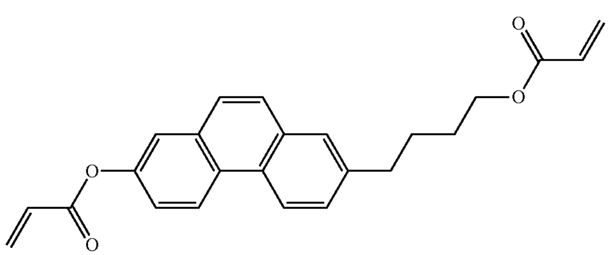 [SMILES: C=CC(=O)OCCCCc1ccc2c(ccc3cc(OC(=O)C=C)ccc32)c1]

TABLE D-continued
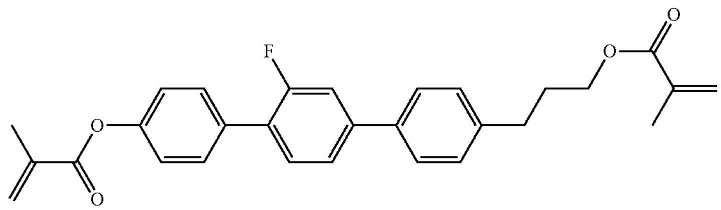 [SMILES: C=C(C)C(=O)OCCCc1ccc(-c2ccc(-c3ccc(OC(=O)C(=C)C)cc3)c(F)c2)cc1]
RM-41
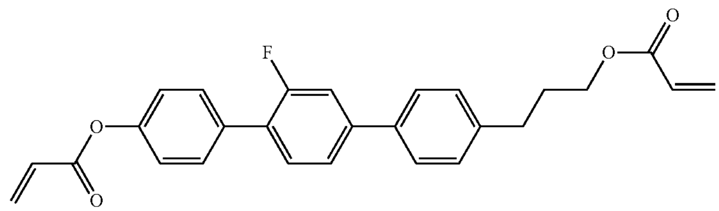 [SMILES: C=CC(=O)OCCCc1ccc(-c2ccc(-c3ccc(OC(=O)C=C)cc3)c(F)c2)cc1]
RM-42
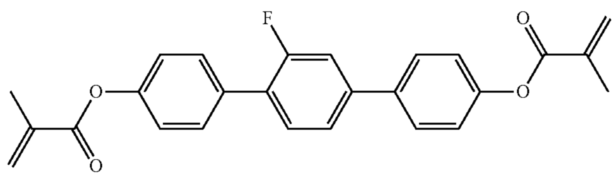 [SMILES: C=C(C)C(=O)Oc1ccc(-c2ccc(-c3ccc(OC(=O)C(=C)C)cc3)c(F)c2)cc1]
RM-43
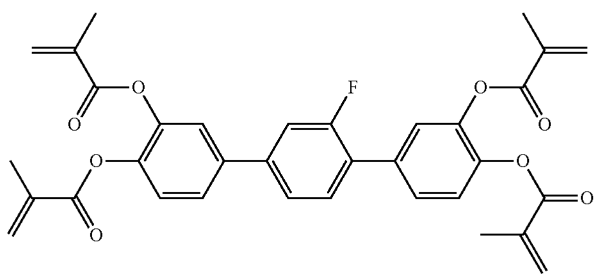 [SMILES: C=C(C)C(=O)Oc1ccc(-c2ccc(-c3ccc(OC(=O)C(=C)C)c(OC(=O)C(=C)C)c3)c(F)c2)cc1OC(=O)C(=C)C]
RM-44
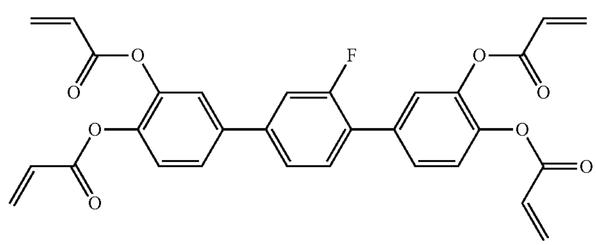 [SMILES: C=CC(=O)Oc1ccc(-c2ccc(-c3ccc(OC(=O)C=C)c(OC(=O)C=C)c3)c(F)c2)cc1OC(=O)C=C]
RM-45
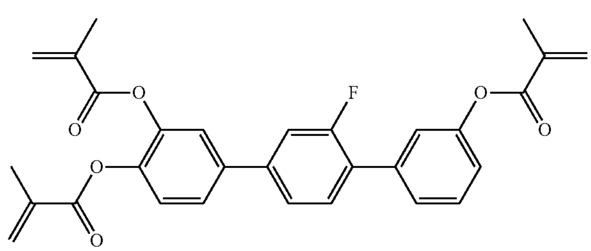 [SMILES: C=C(C)C(=O)Oc1cccc(-c2ccc(-c3ccc(OC(=O)C(=C)C)c(OC(=O)C(=C)C)c3)cc2F)c1]
RM-46
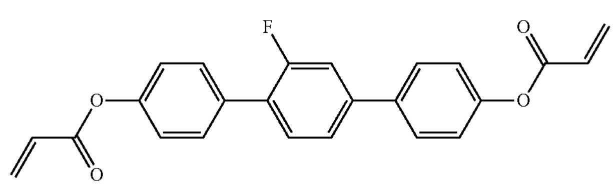 [SMILES: C=CC(=O)Oc1ccc(-c2ccc(-c3ccc(OC(=O)C=C)cc3)c(F)c2)cc1]
RM-47

TABLE D-continued
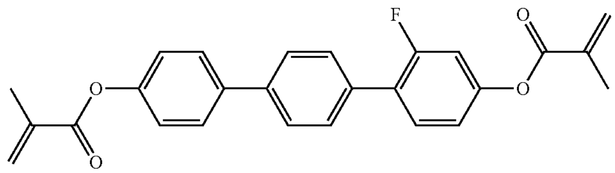 [SMILES: C=C(C)C(=O)Oc1ccc(-c2ccc(-c3ccc(OC(=O)C(=C)C)cc3F)cc2)cc1]
RM-48
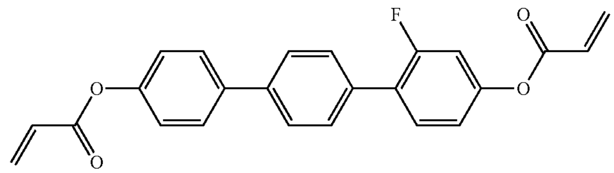 [SMILES: C=CC(=O)Oc1ccc(-c2ccc(-c3ccc(OC(=O)C=C)cc3F)cc2)cc1]
RM-49
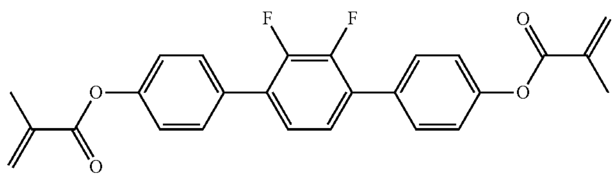 [SMILES: C=C(C)C(=O)Oc1ccc(-c2ccc(-c3ccc(OC(=O)C(=C)C)cc3)c(F)c2F)cc1]
RM-50
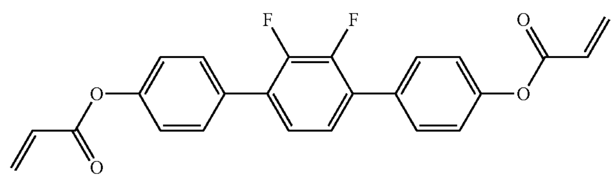
RM-51
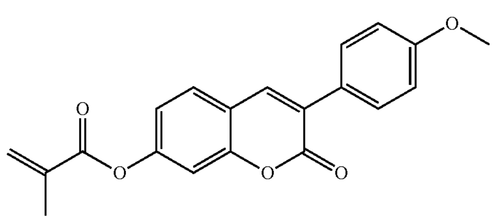 [SMILES: C=C(C)C(=O)Oc1ccc2cc(-c3ccc(OC)cc3)c(=O)oc2c1]
RM-52
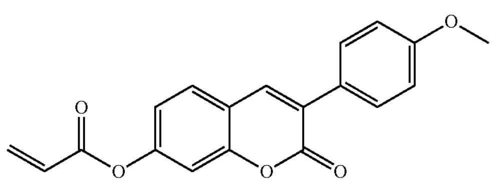 [SMILES: C=CC(=O)Oc1ccc2cc(-c3ccc(OC)cc3)c(=O)oc2c1]
RM-53
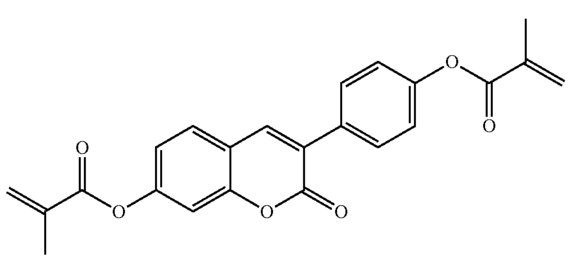 [SMILES: C=C(C)C(=O)Oc1ccc(-c2cc3ccc(OC(=O)C(=C)C)cc3oc2=O)cc1]
RM-54
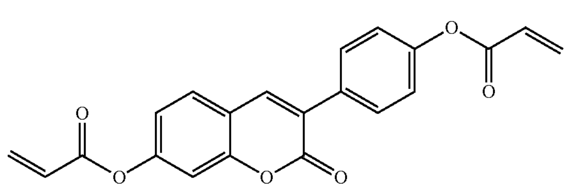 [SMILES: C=CC(=O)Oc1ccc(-c2cc3ccc(OC(=O)C=C)cc3oc2=O)cc1]
RM-55

TABLE D-continued
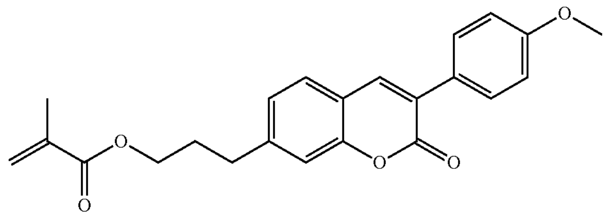 [SMILES: C=C(C)C(=O)OCCCc1ccc2cc(-c3ccc(OC)cc3)c(=O)oc2c1]
RM-56
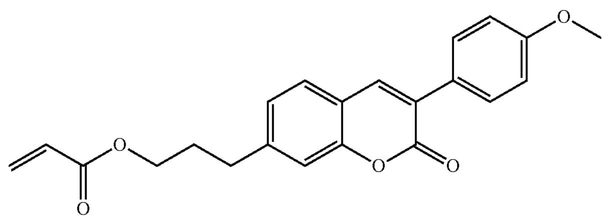 [SMILES: C=CC(=O)OCCCc1ccc2cc(-c3ccc(OC)cc3)c(=O)oc2c1]
RM-57
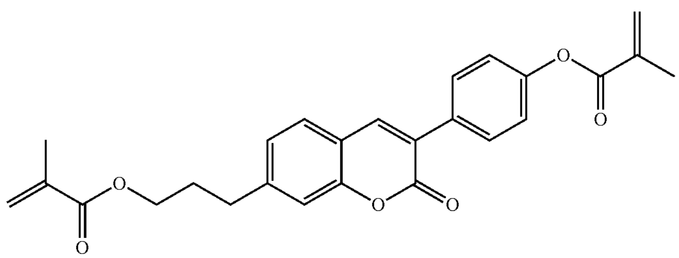 [SMILES: C=C(C)C(=O)OCCCc1ccc2cc(-c3ccc(OC(=O)C(=C)C)cc3)c(=O)oc2c1]
RM-58
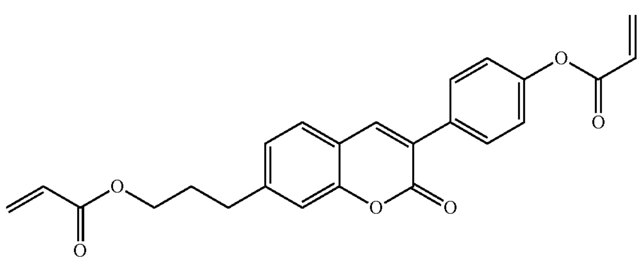 [SMILES: C=CC(=O)OCCCc1ccc2cc(-c3ccc(OC(=O)C=C)cc3)c(=O)oc2c1]
RM-59
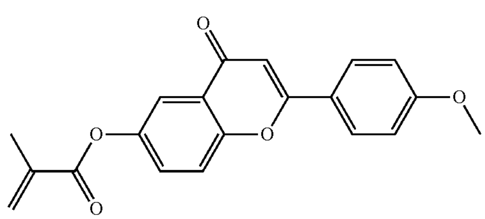 [SMILES: C=C(C)C(=O)Oc1ccc2oc(-c3ccc(OC)cc3)cc(=O)c2c1]
RM-60
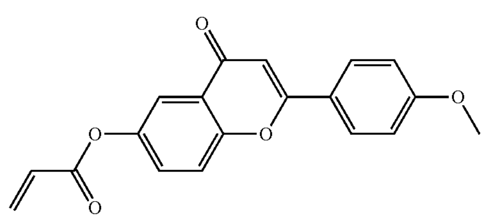 [SMILES: C=CC(=O)Oc1ccc2oc(-c3ccc(OC)cc3)cc(=O)c2c1]
RM-61
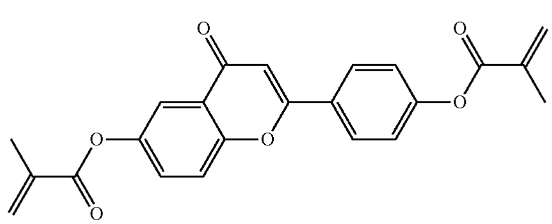 [SMILES: C=C(C)C(=O)Oc1ccc(-c2cc(=O)c3cc(OC(=O)C(=C)C)ccc3o2)cc1]
RM-62

TABLE D-continued
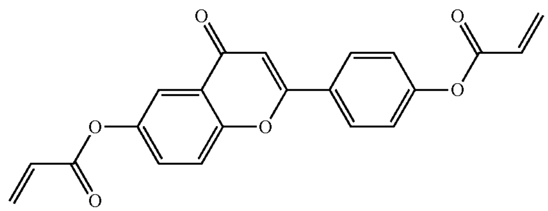 [SMILES: C=CC(=O)Oc1ccc(-c2cc(=O)c3cc(OC(=O)C=C)ccc3o2)cc1]
RM-63
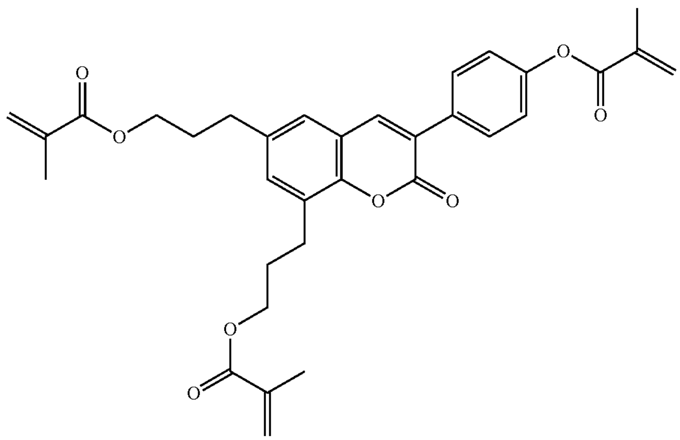 [SMILES: C=C(C)C(=O)OCCCc1cc(CCCOC(=O)C(=C)C)c2oc(=O)c(-c3ccc(OC(=O)C(=C)C)cc3)cc2c1]
RM-64
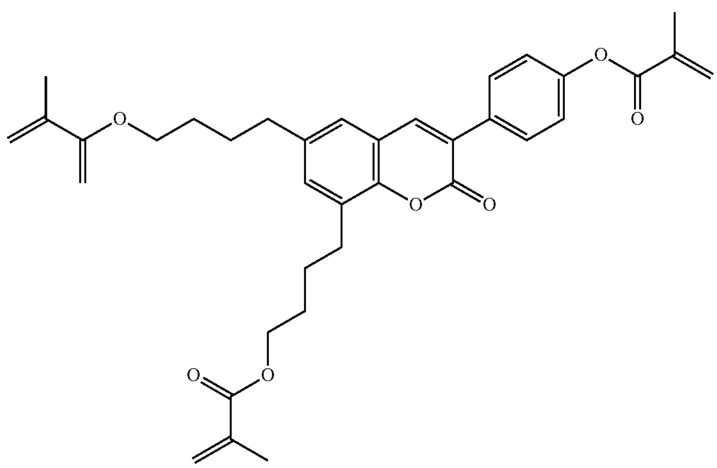 [SMILES: C=C(C)C(=C)OCCCCc1cc(CCCCOC(=O)C(=C)C)c2oc(=O)c(-c3ccc(OC(=O)C(=C)C)cc3)cc2c1]
RM-65
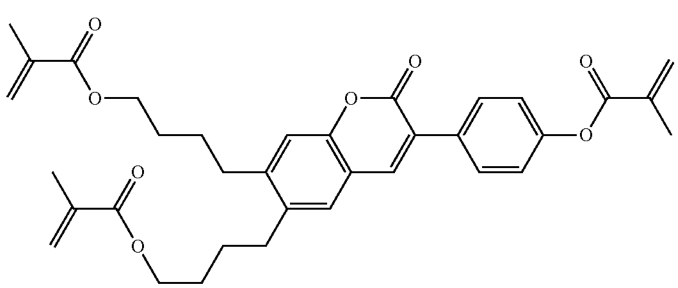 [SMILES: C=C(C)C(=O)OCCCCc1cc2cc(-c3ccc(OC(=O)C(=C)C)cc3)c(=O)oc2cc1CCCCOC(=O)C(=C)C]
RM-66

TABLE D-continued
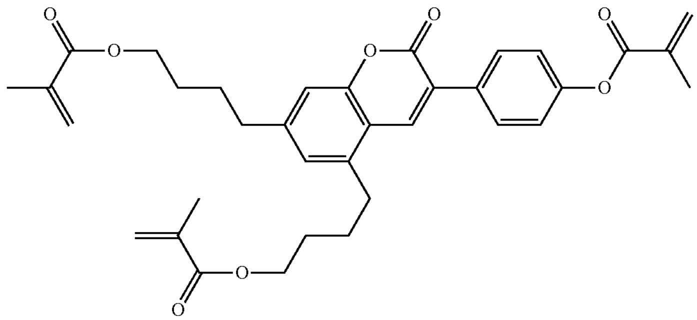 [SMILES: C=C(C)C(=O)OCCCCc1cc(CCCCOC(=O)C(=C)C)c2cc(-c3ccc(OC(=O)C(=C)C)cc3)c(=O)oc2c1]
RM-67
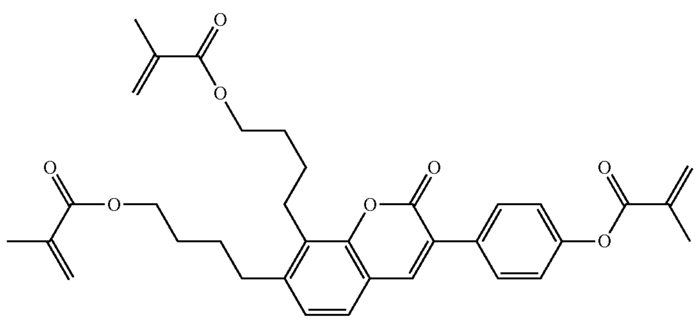 [SMILES: C=C(C)C(=O)OCCCCc1ccc2cc(-c3ccc(OC(=O)C(=C)C)cc3)c(=O)oc2c1CCCCOC(=O)C(=C)C]
RM-68
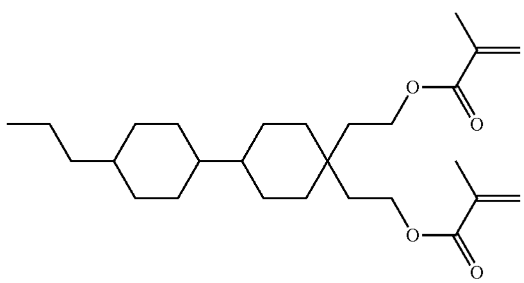 [SMILES: C=C(C)C(=O)OCCC1(CCOC(=O)C(=C)C)CCC(C2CCC(CCC)CC2)CC1]
RM-69
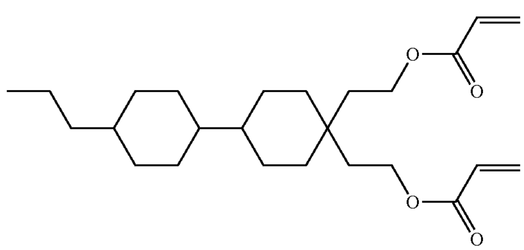 [SMILES: C=CC(=O)OCCC1(CCOC(=O)C=C)CCC(C2CCC(CCC)CC2)CC1]
RM-70
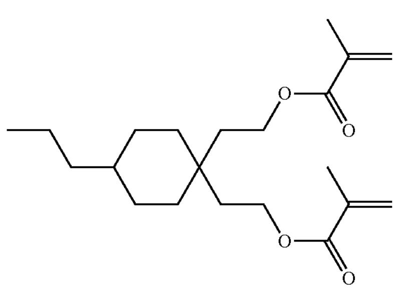 [SMILES: C=C(C)C(=O)OCCC1(CCOC(=O)C(=C)C)CCC(CCC)CC1]
RM-71

TABLE D-continued
RM-72
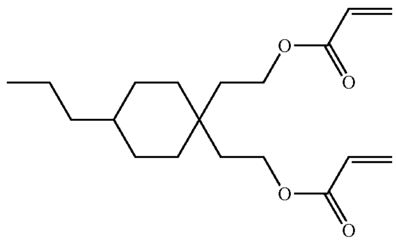 [SMILES: C=CC(=O)OCCC1(CCOC(=O)C=C)CCC(CCC)CC1]
RM-73
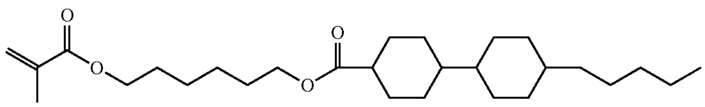 [SMILES: C=C(C)C(=O)OCCCCCCOC(=O)C1CCC(C2CCC(CCCCC)CC2)CC1]
RM-74
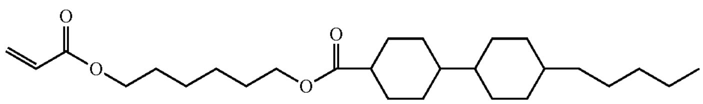 [SMILES: C=CC(=O)OCCCCCCOC(=O)C1CCC(C2CCC(CCCCC)CC2)CC1]
RM-75
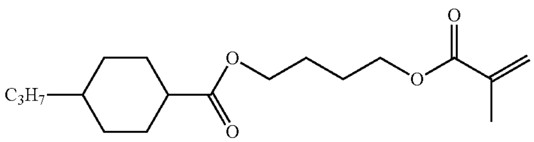
RM-76
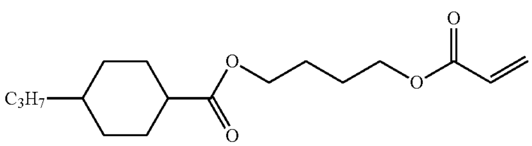
RM-77
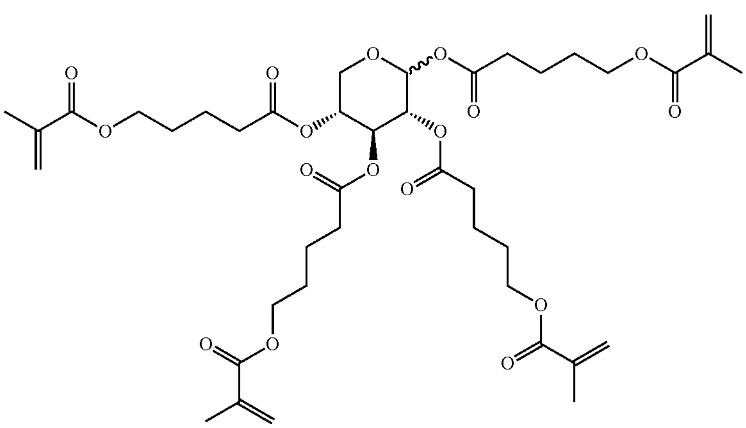 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-78
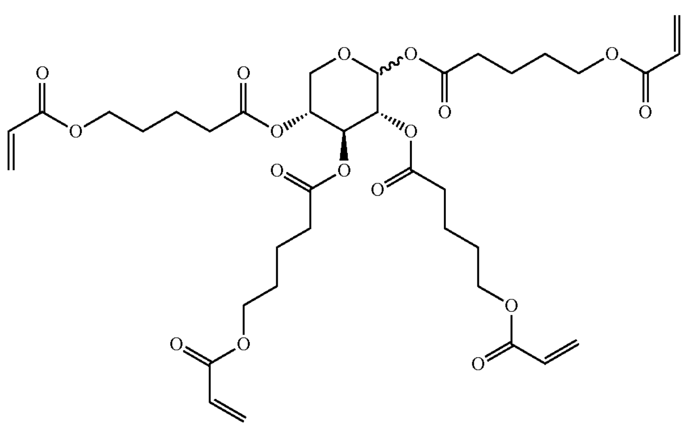 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]

TABLE D-continued
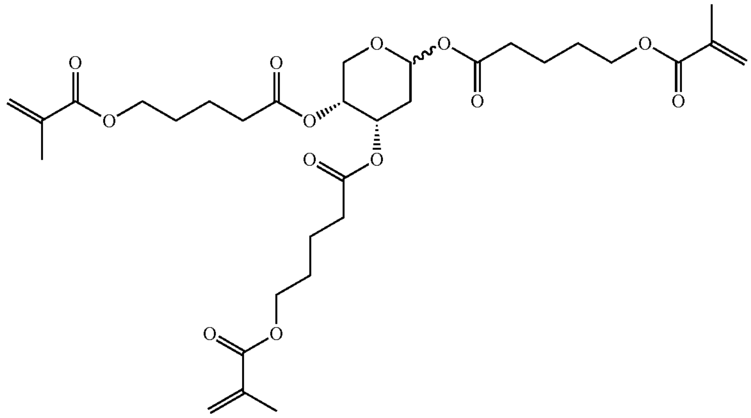 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]
RM-79
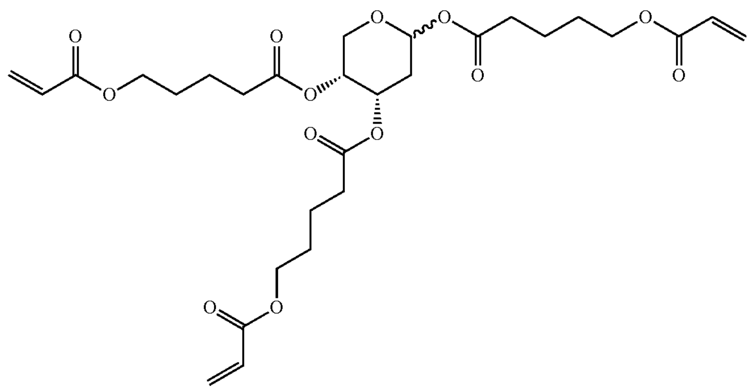 [SMILES: C=CC(=O)OCCCCC(=O)OC1C[C@H](OC(=O)CCCCOC(=O)C=C)[C@H](OC(=O)CCCCOC(=O)C=C)CO1]
RM-80
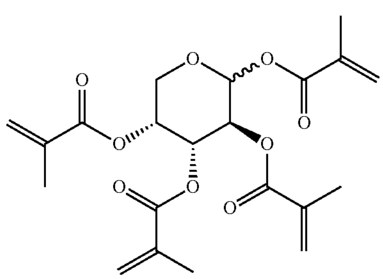 [SMILES: C=C(C)C(=O)OC1OC[C@@H](OC(=O)C(=C)C)[C@@H](OC(=O)C(=C)C)[C@@H]1OC(=O)C(=C)C]
RM-81
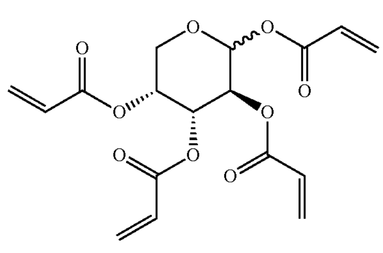 [SMILES: C=CC(=O)OC1OC[C@@H](OC(=O)C=C)[C@@H](OC(=O)C=C)[C@@H]1OC(=O)C=C]
RM-82

TABLE D-continued
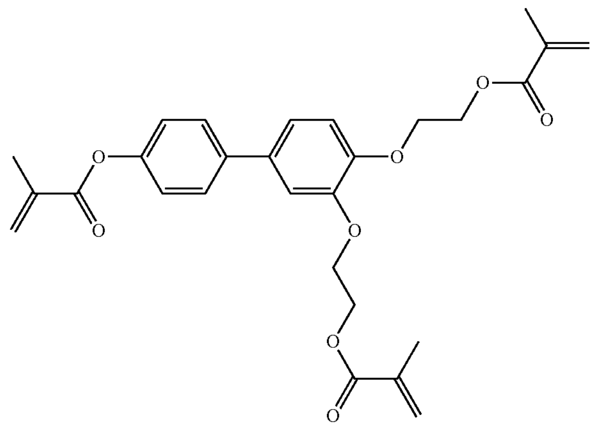 [SMILES: C=C(C)C(=O)OCCOc1ccc(-c2ccc(OC(=O)C(=C)C)cc2)cc1OCCOC(=O)C(=C)C]
RM-83
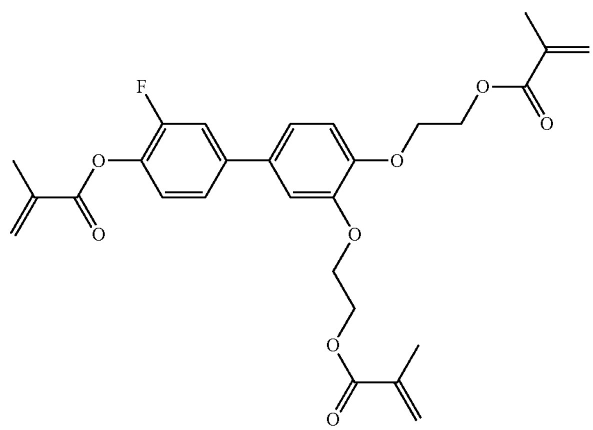 [SMILES: C=C(C)C(=O)OCCOc1ccc(-c2ccc(OC(=O)C(=C)C)c(F)c2)cc1OCCOC(=O)C(=C)C]
RM-84
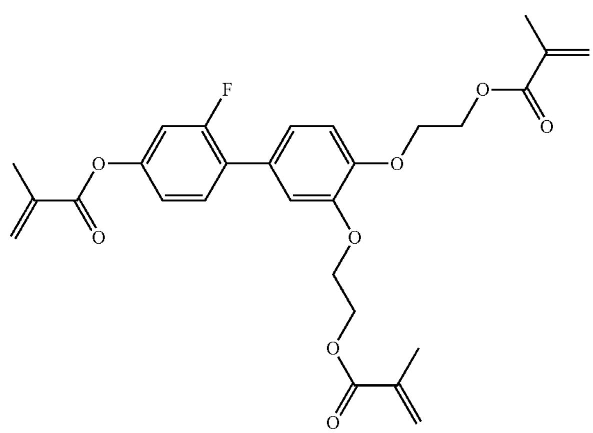 [SMILES: C=C(C)C(=O)OCCOc1ccc(-c2ccc(OC(=O)C(=C)C)cc2F)cc1OCCOC(=O)C(=C)C]
RM-85

TABLE D-continued
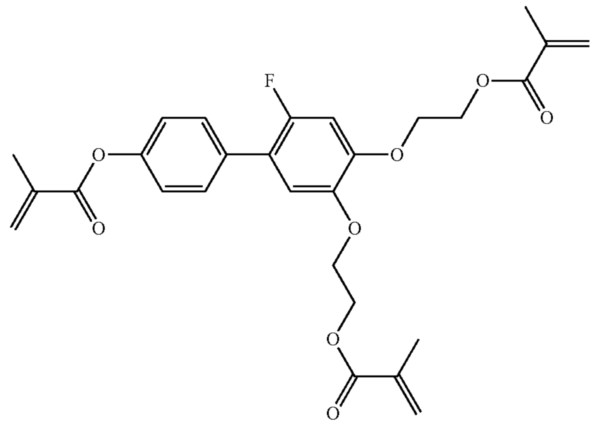 [SMILES: C=C(C)C(=O)OCCOc1cc(F)c(-c2ccc(OC(=O)C(=C)C)cc2)cc1OCCOC(=O)C(=C)C]
RM-86
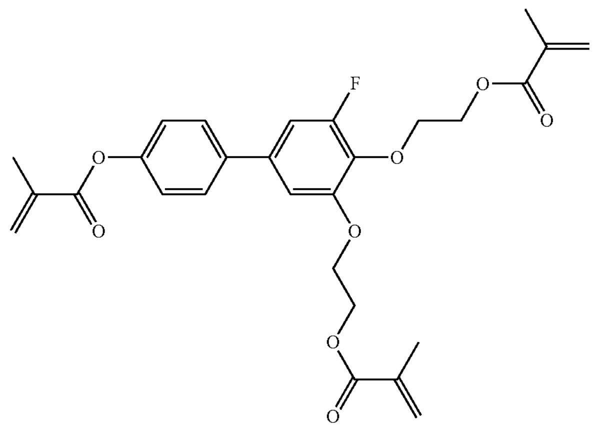 [SMILES: C=C(C)C(=O)OCCOc1cc(-c2ccc(OC(=O)C(=C)C)cc2)cc(F)c1OCCOC(=O)C(=C)C]
RM-87
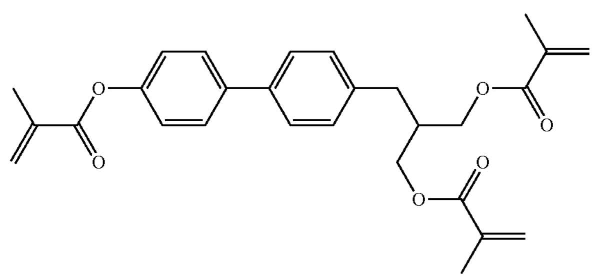 [SMILES: C=C(C)C(=O)OCC(COC(=O)C(=C)C)Cc1ccc(-c2ccc(OC(=O)C(=C)C)cc2)cc1]
RM-88
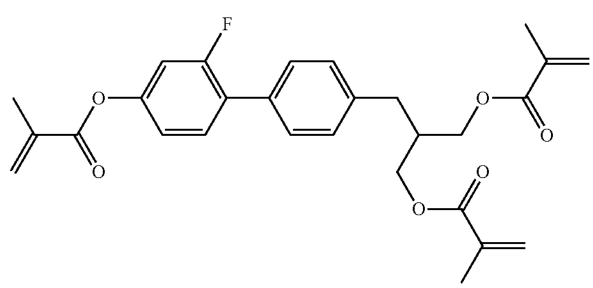
RM-89

TABLE D-continued
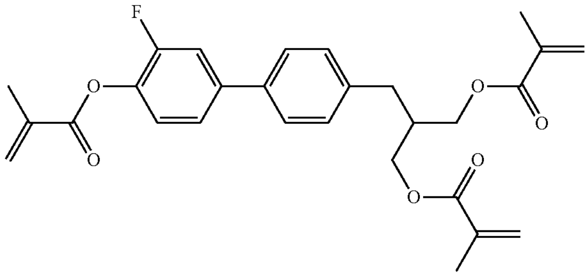
RM-90
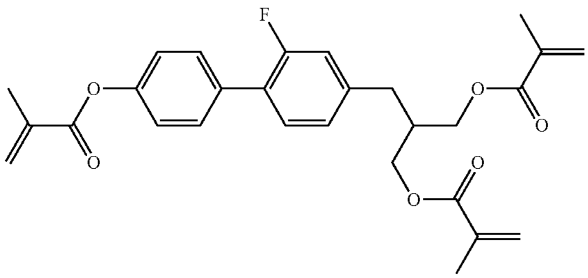
RM-91
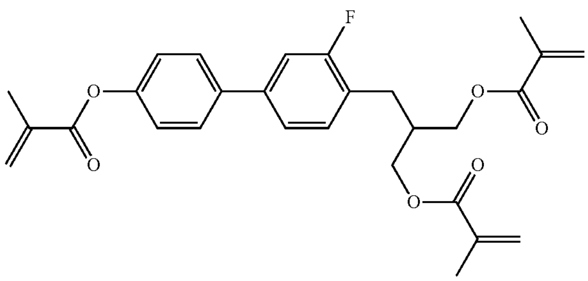 [SMILES: C=C(C)C(=O)OCC(COC(=O)C(=C)C)Cc1ccc(-c2ccc(OC(=O)C(=C)C)cc2)cc1F]
RM-92
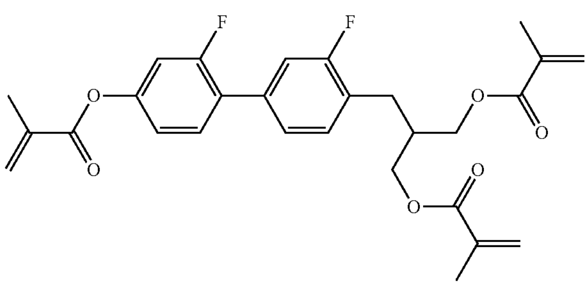
RM-93
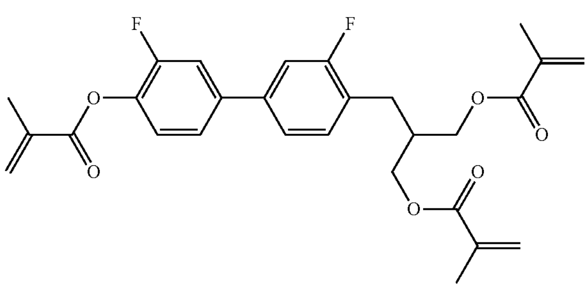 [SMILES: C=C(C)C(=O)OCC(COC(=O)C(=C)C)Cc1ccc(-c2ccc(OC(=O)C(=C)C)c(F)c2)cc1F]
RM-94
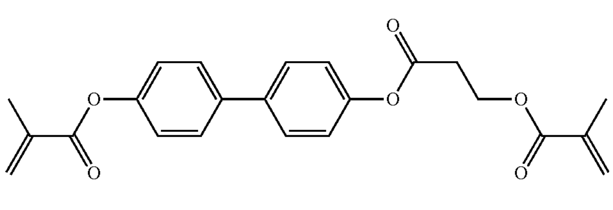 [SMILES: C=C(C)C(=O)OCCC(=O)Oc1ccc(-c2ccc(OC(=O)C(=C)C)cc2)cc1]
RM-95

TABLE D-continued

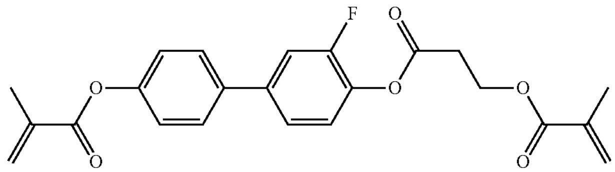 [SMILES: C=C(C)C(=O)OCCC(=O)Oc1ccc(-c2ccc(OC(=O)C(=C)C)cc2)cc1F]
RM-96

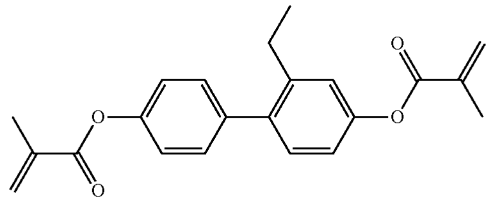
RM-97

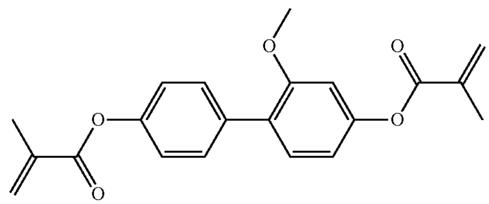 [SMILES: C=C(C)C(=O)Oc1ccc(-c2ccc(OC(=O)C(=C)C)cc2OC)cc1]
RM-98

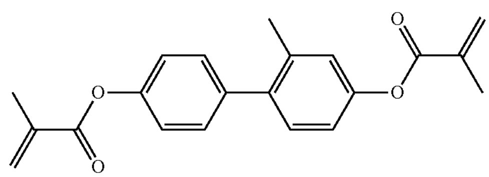 [SMILES: C=C(C)C(=O)Oc1ccc(-c2ccc(OC(=O)C(=C)C)cc2C)cc1]
RM-99

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

In a preferred embodiment, the mixtures according to the invention comprise one or more polymerisable compounds, preferably selected from the polymerisable compounds of the formulae RM-1 to RM-99. Media of this type are suitable, in particular, for PS-VA, PS-FFS and PS-IPS applications. Of the reactive mesogens shown in Table D, compounds RM-1, RM-2, RM-3, RM-4, RM-5, RM-11, RM-17, RM-35, RM-41, RM-44, RM-62, RM-81, RM-95 and RM-98 are particularly preferred.

Working Examples:

The following examples are intended to explain the invention without limiting it. In the examples, m.p. denotes the melting point and C denotes the clearing point of a liquid-crystalline substance in degrees Celsius; boiling temperatures are denoted by m.p. Furthermore: C denotes crystalline solid state, S denotes smectic phase (the index denotes the phase type), N denotes nematic state, Ch denotes cholesteric phase, I denotes isotropic phase, $T_g$ denotes glass-transition temperature. The number between two symbols indicates the conversion temperature in degrees Celsius an.

The host mixture used for determination of the optical anisotropy Δn of the compounds of the formula I is the commercial mixture ZLI-4792 (Merck KGaA). The dielectric anisotropy Δε is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Above and Below:

- $V_o$ denotes threshold voltage, capacitive [V] at 20° C.,
- $n_e$ denotes extraordinary refractive index at 20° C. and 589 nm,
- $n_o$ denotes ordinary refractive index at 20° C. and 589 nm,
- Δn denotes optical anisotropy at 20° C. and 589 nm,
- $\varepsilon_\perp$ denotes dielectric permittivity perpendicular to the director at 20° C. and 1 kHz,
- $\varepsilon_\parallel$ denotes dielectric permittivity parallel to the director at 20° C. and 1 kHz,
- Δε denotes dielectric anisotropy at 20° C. and 1 kHz,
- cl.p., T(N,I) denotes clearing point [° C.],
- $\gamma_1$ denotes rotational viscosity measured at 20° C. [mPa·s], determined by the rotation method in a magnetic field,
- $K_1$ denotes elastic constant, "splay" deformation at 20° C. [pN],
- $K_2$ denotes elastic constant, "twist" deformation at 20° C. [pN], $K_3$ denotes elastic constant, "bend" deformation at 20° C. [pN], LTS denotes low-temperature stability (nematic phase), determined in test cells.

Unless explicitly noted otherwise, all values indicated in the present application for temperatures, such as, for example, the melting point T(C,N), the transition from the smectic (S) to the nematic (N) phase T(S,N) and the clearing point T(N,I), are indicated in degrees Celsius (° C.). M.p. denotes melting point, cl.p.=clearing point. Furthermore, Tg=glass state, C=crystalline state, N=nematic phase, S=smectic phase and I=isotropic phase. The numbers between these symbols represent the transition temperatures.

The term "threshold voltage" for the present invention relates to the capacitive threshold ($V_0$), also called the Freedericksz threshold, unless explicitly indicated otherwise. In the examples, as is generally usual, the optical threshold can also be indicated for 10% relative contrast ($V_{10}$).

The display used for measurement of the capacitive threshold voltage consists of two plane-parallel glass outer plates at a separation of 20 μm, which each have on the insides an electrode layer and an unrubbed polyimide alignment layer on top, which cause a homeotropic edge alignment of the liquid-crystal molecules.

The display or test cell used for measurement of the tilt angle consists of two plane-parallel glass outer plates at a separation of 4 μm, which each have on the insides an electrode layer and a polyimide alignment layer on top, where the two polyimide layers are rubbed antiparallel to one another and cause a homeotropic edge alignment of the liquid-crystal molecules.

The polymerisable compounds are polymerised in the display or test cell by irradiation with UVA light (usually 365 nm) of a defined intensity for a pre-specified time, with a voltage simultaneously being applied to the display (usually 10 V to 30 V alternating current, 1 kHz). In the examples, unless indicated otherwise, a 50 mW/cm$^2$ mercury vapour lamp is used, and the intensity is measured using a standard UV meter (make Ushio UNI meter) fitted with a 365 nm band-pass filter.

The tilt angle is determined by a rotational crystal experiment (Autronic-Melchers TBA-105). A low value (i.e. a large deviation from the 90° angle) corresponds to a large tilt here.

The VHR value is measured as follows: 0.3% of a polymerisable monomeric compound are added to the LC host mixture, and the resultant mixture is introduced into TN-VHR test cells (rubbed at 90°, alignment layer TN polyimide, layer thickness d≈6 μm). The HR value is determined after 5 min at 100° C. before and after UV exposure for 2 h (sun test) at 1 V, 60 Hz, 64 μs pulse (measuring instrument: Autronic-Melchers VHRM-105).

In order to investigate the low-temperature stability, also known as "LTS", i.e. the stability of the LC mixture to spontaneous crystallisation-out of individual components at low temperatures, bottles containing 1 g of LC/RM mixture are stored at −10° C., and it is regularly checked whether the mixtures have crystallised out.

The so-called "HTP" denotes the helical twisting power of an optically active or chiral substance in an LC medium (in μm). Unless indicated otherwise, the HTP is measured in the commercially available nematic LC host mixture MLD-6260 (Merck KGaA) at a temperature of 20° C.

Unless explicitly noted otherwise, all concentrations in the present application are indicated in percent by weight and relate to the corresponding mixture as a whole, comprising all solid or liquid-crystalline components, without solvents. All physical properties are determined in accordance with "Merck Liquid Crystals, Physical Properties of Liquid Crystals", Status November 1997, Merck KGaA, Germany, and apply for a temperature of 20° C., unless explicitly indicated otherwise.

The following mixture examples having negative dielectric anisotropy are suitable, in particular, for liquid-crystal displays which have at least one planar alignment layer, such as, for example, IPS and FFS displays, in particular UB-FFS=ultra-bright FFS), and for VA displays.

MIXTURE EXAMPLES

Example M1

The liquid-crystalline mixture

| | | | |
|---|---|---|---|
| CC-3-V | 43.00% | Clearing point [° C.]: | 74.5 |
| CCY-3-O1 | 4.00% | Δn [589 nm, 20° C.]: | 0.1008 |
| CCY-3-O2 | 10.00% | Δε [1 kHz, 20° C.]: | −3.4 |
| CCY-4-O2 | 2.50% | $\varepsilon_{\parallel}$ [1 kHz, 20° C.]: | 3.6 |
| CPY-2-O2 | 10.00% | $K_1$ [pN, 20° C.]: | 13.1 |
| CPY-3-O2 | 10.00% | $K_3$ [pN, 20° C.]: | 14.7 |
| CY-3-O2 | 6.50% | $\gamma_1$ [mPa · s, 20° C.]: | 82 |
| PY-3-O2 | 11.00% | $V_0$ [20° C., V]: | 2.19 |
| B(S)-2O-O5 | 3.00% | | |

additionally comprises 0.01% of ST-3a-1.

Example M2

The liquid-crystalline mixture

| | | | |
|---|---|---|---|
| CC-3-V | 5.00% | Clearing point [° C.]: | 75.5 |
| CC-3-V1 | 8.00% | Δn [589 nm, 20° C.]: | 0.1082 |
| CCH-23 | 11.50% | Δε [1 kHz, 20° C.]: | −3.3 |
| CCH-34 | 5.00% | $\varepsilon_{\parallel}$ [1 kHz, 20° C.]: | 3.6 |
| CCP-3-1 | 10.00% | $K_1$ [pN, 20° C.]: | 15.2 |
| CCP-3-3 | 5.00% | $K_3$ [pN, 20° C.]: | 16.0 |
| CCY-3-O1 | 4.00% | $\gamma_1$ [mPa · s, 20° C.]: | 104 |
| CCY-3-O2 | 11.50% | $V_0$ [20° C., V]: | 2.31 |
| CY-3-O2 | 14.50% | | |
| PY-3-O2 | 8.00% | | |
| PYP-2-3 | 8.00% | | |
| B-2O-O5 | 3.50% | | |
| B(S)-2O-O5 | 3.50% | | |
| PP-1-2V1 | 2.50% | | |

additionally comprises 0.02% of ST-8-1.

Example M3

The liquid-crystalline mixture

| | | | |
|---|---|---|---|
| CC-3-V1 | 8.00% | Clearing point [° C.]: | 74.0 |
| CCH-23 | 18.00% | Δn [589 nm, 20° C.]: | 0.0979 |
| CCH-34 | 3.00% | Δε [1 kHz, 20° C.]: | −3.4 |
| CCH-35 | 4.00% | $\varepsilon_{\parallel}$ [1 kHz, 20° C.]: | 3.6 |
| CCP-3-1 | 14.00% | $K_1$ [pN, 20° C.]: | 15.0 |
| CCY-3-O2 | 11.00% | $K_3$ [pN, 20° C.]: | 16.0 |
| CCY-3-O1 | 2.00% | $\gamma_1$ [mPa · s, 20° C.]: | 100 |
| CPY-3-O2 | 11.00% | $V_0$ [20° C., V]: | 2.28 |
| CY-3-O2 | 10.00% | | |
| PY-3-O2 | 12.00% | | |
| Y-4O-O4 | 4.00% | | |
| B(S)-2O-O5 | 3.00% | | |

additionally comprises 0.02% of ST-12.

Example M4

The liquid-crystalline mixture

| | | | |
|---|---|---|---|
| CC-3-V | 46.00% | Clearing point [° C.]: | 72.5 |
| CCY-3-O2 | 11.00% | Δn [589 nm, 20° C.]: | 0.1009 |
| CCY-4-O2 | 2.50% | Δε [1 kHz, 20° C.]: | −3.5 |
| CPY-2-O2 | 10.00% | $ε_{\|\|}$ [1 kHz, 20° C.]: | 3.6 |
| CPY-3-O2 | 10.00% | $K_1$ [pN, 20° C.]: | 13.1 |
| CY-3-O2 | 5.00% | $K_3$ [pN, 20° C.]: | 14.2 |
| PY-3-O2 | 8.50% | $γ_1$ [mPa · s, 20° C.]: | 78 |
| B-2O-O5 | 4.00% | $V_0$ [20° C., V]: | 2.13 |
| B(S)-2O-O5 | 3.00% | | |

additionally comprises 0.02% of ST-8-1 and 0.01% of ST-3a-1.

Example M5

The liquid-crystalline mixture

| | | | |
|---|---|---|---|
| CC-3-V | 41.50% | Clearing point [° C.]: | 75.0 |
| CCY-3-O1 | 5.00% | Δn [589 nm, 20° C.]: | 0.1016 |
| CCY-3-O2 | 11.00% | Δε [1 kHz, 20° C.]: | −3.4 |
| CCY-4-O2 | 4.00% | $ε_{\|\|}$ [1 kHz, 20° C.]: | 3.6 |
| CPY-2-O2 | 5.50% | $K_1$ [pN, 20° C.]: | 13.3 |
| CPY-3-O2 | 11.00% | $K_3$ [pN, 20° C.]: | 14.8 |
| CY-3-O2 | 5.00% | $γ_1$ [mPa · s, 20° C.]: | 88 |
| PY-3-O2 | 12.00% | $V_0$ [20° C., V]: | 2.20 |
| B(S)-5-O3 | 5.00% | | |

additionally comprises 0.02% of ST-3a-1.

Example M6

The liquid-crystalline mixture

| | | | |
|---|---|---|---|
| CC-3-V | 37.00% | Clearing point [° C.]: | 79.0 |
| CY-3-O2 | 8.50% | Δn [589 nm, 20° C.]: | 0.1062 |
| CCY-3-O1 | 6.00% | Δε [1 kHz, 20° C.]: | −3.9 |
| CCY-3-O2 | 10.00% | $ε_{\|\|}$ [1 kHz, 20° C.]: | 3.7 |
| CCY-4-O2 | 7.00% | $K_1$ [pN, 20° C.]: | 13.8 |
| CPY-2-O2 | 3.50% | $K_3$ [pN, 20° C.]: | 15.5 |
| CPY-3-O2 | 10.00% | $γ_1$ [mPa · s, 20° C.]: | 101 |
| PYP-2-3 | 4.50% | $V_0$ [20° C., V]: | 2.12 |
| PY-3-O2 | 9.50% | | |
| B(S)-2O-O5 | 4.00% | | |

additionally comprises 0.025% of ST-3a-1.

Example M7

The liquid-crystalline mixture

| | | | |
|---|---|---|---|
| CC-3-V | 41.00% | Clearing point [° C.]: | 81.0 |
| CY-3-O2 | 7.00% | Δn [589 nm, 20° C.]: | 0.1074 |
| CCY-3-O1 | 6.00% | Δε [1 kHz, 20° C.]: | −3.8 |
| CCY-3-O2 | 10.50% | $ε_{\|\|}$ [1 kHz, 20° C.]: | 3.7 |
| CPY-2-O2 | 10.00% | $K_1$ [pN, 20° C.]: | 14.0 |
| CPY-3-O2 | 11.00% | $K_3$ [pN, 20° C.]: | 15.5 |
| PYP-2-3 | 4.00% | $γ_1$ [mPa · s, 20° C.]: | 97 |
| PY-3-O2 | 3.50% | $V_0$ [20° C., V]: | 2.13 |
| B-2O-O5 | 4.00% | | |
| B(S)-2O-O5 | 3.00% | | |

additionally comprises 0.025% of ST-3a-1.

Example M8

The liquid-crystalline mixture

| | | | |
|---|---|---|---|
| CY-3-O2 | 11.00% | Clearing point [° C.]: | 86.0 |
| CY-3-O4 | 7.00% | Δn [589 nm, 20° C.]: | 0.1020 |
| PY-3-O2 | 3.00% | Δε [1 kHz, 20° C.]: | −4.9 |
| CCY-3-O1 | 7.50% | $ε_{\|\|}$ [1 kHz, 20° C.]: | 3.8 |
| CCY-3-O2 | 11.00% | $K_1$ [pN, 20° C.]: | 14.4 |
| CCY-4-O2 | 10.00% | $K_3$ [pN, 20° C.]: | 16.5 |
| CPY-2-O2 | 6.50% | $γ_1$ [mPa · s, 20° C.]: | 138 |
| CPY-3-O2 | 11.00% | $V_0$ [20° C., V]: | 1.94 |
| CC-3-V | 29.00% | | |
| B(S)-2O-O5 | 4.00% | | |

additionally comprises 0.025% of ST-3a-1.

Example M9

For the preparation of a PS (polymer-stabilised) mixture, for example for PS-IPS, PS-VA, PS-FFS applications, 99.7% of the mixture according to Example M1 are mixed with 0.3% of the polymerisable compound of the formula

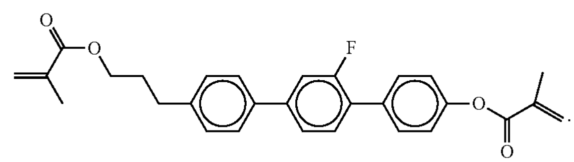

Example M10

For the preparation of a PS (polymer-stabilised) mixture, for example for PS-IPS, PS-VA, PS-FFS applications, 99.75% of the mixture according to Example M1 are mixed with 0.25% of the polymerisable compound of the formula

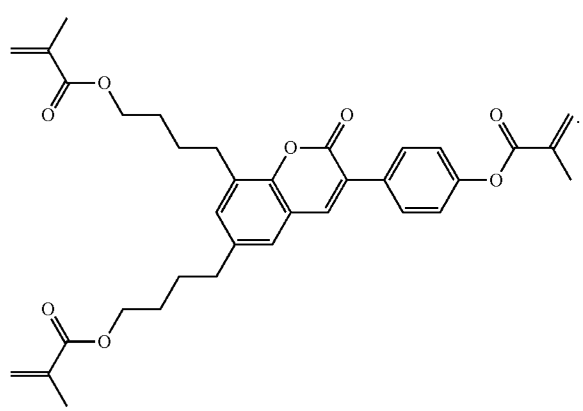 [SMILES: C=C(C)C(=O)OCCCCc1cc(CCCCOC(=O)C(=C)C)c2oc(=O)c(-c3ccc(OC(=O)C(=C)C)cc3)cc2c1]

Example M11

For the preparation of a PS (polymer-stabilised) mixture, for example for PS-IPS, PS-VA, PS-FFS applications, 99.8% of the mixture according to Example M2 are mixed with 0.2% of the polymerisable compound of the formula

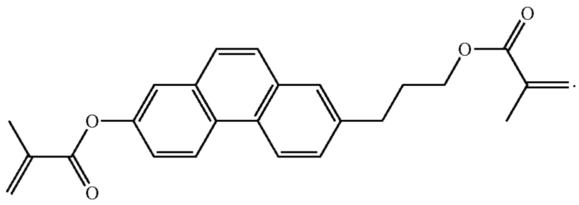 [SMILES: C=C(C)C(=O)OCCCc1ccc2c(ccc3cc(OC(=O)C(=C)C)ccc32)c1]

Example M12

For the preparation of a PS (polymer-stabilised) mixture, for example for PS-IPS, PS-VA, PS-FFS applications, 99.75% of the mixture according to Example M4 are mixed with 0.25% of the polymerisable compound of the formula

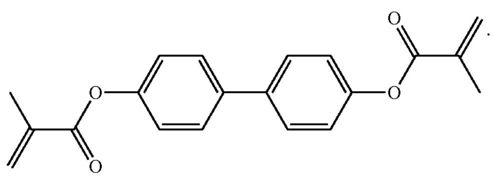

Example M13

For the preparation of a PS (polymer-stabilised) mixture, for example for PS-IPS, PS-VA, PS-FFS applications, 99.75% of the mixture according to Example M4 are mixed with 0.25% of the polymerisable compound of the formula

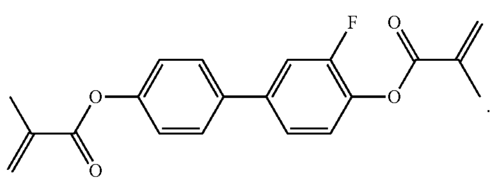 [SMILES: C=C(C)C(=O)Oc1ccc(-c2ccc(OC(=O)C(=C)C)c(F)c2)cc1]

Example M14

For the preparation of a PS (polymer-stabilised) mixture, for example for PS-IPS, PS-VA, PS-FFS applications, 99.75% of the mixture according to Example M1 are mixed with 0.25% of the polymerisable compound of the formula

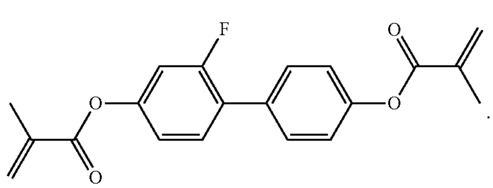 [SMILES: C=C(C)C(=O)Oc1ccc(-c2ccc(OC(=O)C(=C)C)cc2F)cc1]

Example M15

For the preparation of a PS (polymer-stabilised) mixture, for example for PS-IPS, PS-VA, PS-FFS applications, 99.8% of the mixture according to Example M1 are mixed with 0.2% of the polymerisable compound of the formula

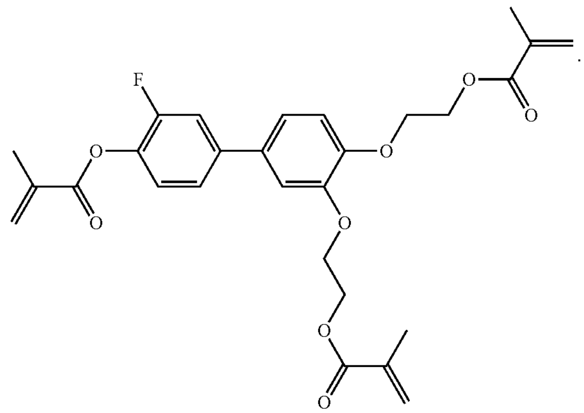 [SMILES: C=C(C)C(=O)OCCOc1ccc(-c2ccc(OC(=O)C(=C)C)c(F)c2)cc1OCCOC(=O)C(=C)C]

Example M16

For the preparation of a PS (polymer-stabilised) mixture, for example for PS-IPS, PS-VA, PS-FFS applications, 99.75% of the mixture according to Example M5 are mixed with 0.25% of the polymerisable compound of the formula

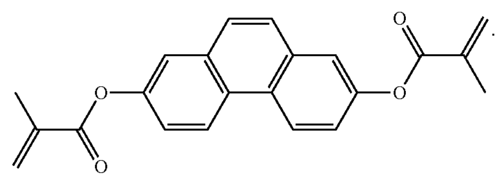 [SMILES: C=C(C)C(=O)Oc1ccc2c(ccc3cc(OC(=O)C(=C)C)ccc32)c1]

Example M17

The liquid-crystalline mixture

| | | | |
|---|---|---|---|
| CC-3-V1 | 8.00% | Clearing point [° C.]: | 75.0 |
| CCH-23 | 13.50% | Δn [589 nm, 20° C.]: | 0.1085 |
| CCH-34 | 6.00% | Δε [1 kHz, 20° C.]: | −3.4 |
| CCP-3-1 | 12.00% | $\varepsilon_{\parallel}$ [1 kHz, 20° C.]: | 3.5 |
| CCP-3-3 | 7.00% | $\varepsilon_{\perp}$ [1 kHz, 20° C.]: | 6.9 |
| CCY-3-O2 | 8.50% | $K_1$ [pN, 20° C.]: | 15.5 |
| CY-3-O2 | 20.50% | $K_3$ [pN, 20° C.]: | 16.0 |
| PY-3-O2 | 3.50% | $\gamma_1$ [mPa · s, 20° C.]: | 102 |
| PYP-2-3 | 8.00% | $V_0$ [20° C., V]: | 2.31 |
| B(S)-2O-O5 | 4.00% | | |
| B(S)-2O-O4 | 3.00% | | |
| B(S)-2O-O6 | 3.00% | | |
| PP-1-2V1 | 3.00% | | |

additionally comprises 0.025% of ST-3a-1.

Example M18

The liquid-crystalline mixture

| | | | |
|---|---|---|---|
| CC-3-V1 | 8.00% | Clearing point [° C.]: | 74.5 |
| CCH-23 | 14.50% | Δn [589 nm, 20° C.]: | 0.1081 |
| CCH-34 | 6.00% | Δε [1 kHz, 20° C.]: | −3.3 |
| CCP-3-1 | 12.00% | $\varepsilon_{\parallel}$ [1 kHz, 20° C.]: | 3.6 |
| CCP-3-3 | 7.00% | $\varepsilon_{\perp}$ [1 kHz, 20° C.]: | 6.9 |
| CCY-3-O2 | 9.00% | $K_1$ [pN, 20° C.]: | 15.3 |
| CY-3-O2 | 18.50% | $K_3$ [pN, 20° C.]: | 15.8 |
| PY-3-O2 | 4.00% | $\gamma_1$ [mPa · s, 20° C.]: | 101 |
| PYP-2-3 | 8.00% | $V_0$ [20° C., V]: | 2.31 |

-continued

| | |
|---|---|
| B-2O-O5 | 3.00% |
| B(S)-2O-O5 | 3.00% |
| B(S)-2O-O4 | 2.00% |
| B(S)-2O-O6 | 2.00% |
| PP-1-2V1 | 3.00% |

additionally comprises 0.03% of ST-8-1.

Example M19

The liquid-crystalline mixture

| | | | |
|---|---|---|---|
| CC-3-V1 | 8.00% | Clearing point [° C.]: | 72.5 |
| CCH-23 | 11.50% | Δn [589 nm, 20° C.]: | 0.1082 |
| CCH-34 | 5.00% | Δε [1 kHz, 20° C.]: | −3.3 |
| CCP-3-1 | 14.50% | $ε_{\|\|}$ [1 kHz, 20° C.]: | 3.7 |
| CCP-3-3 | 10.00% | $ε_⊥$ [1 kHz, 20° C.]: | 7.0 |
| CCY-3-O2 | 10.00% | $K_1$ [pN, 20° C.]: | 15.3 |
| CY-3-O2 | 14.00% | $K_3$ [pN, 20° C.]: | 15.7 |
| PY-3-O2 | 7.00% | $γ_1$ [mPa · s, 20° C.]: | 105 |
| PGIY-2-O4 | 3.50% | $V_0$ [20° C., V]: | 2.28 |
| B-2O-O5 | 4.00% | LTS [bulk, −20° C.]: | >1000 h |
| B(S)-2O-O5 | 3.50% | | |
| B-3-O2 | 4.00% | | |
| PP-1-3 | 5.00% | | |

additionally comprises 0.03% of ST-12.

Example M20

The liquid-crystalline mixture

| | | | |
|---|---|---|---|
| CC-3-V | 36.50% | Clearing point [° C.]: | 74.0 |
| CC-3-V1 | 7.00% | Δn [589 nm, 20° C.]: | 0.1088 |
| CCY-3-O1 | 7.50% | Δε [1 kHz, 20° C.]: | −3.6 |
| CCY-3-O2 | 11.00% | $ε_{\|\|}$ [1 kHz, 20° C.]: | 3.7 |
| CCY-4-O2 | 1.50% | $ε_⊥$ [1 kHz, 20° C.]: | 7.3 |
| CLY-3-O2 | 5.00% | $K_1$ [pN, 20° C.]: | 14.4 |
| PGIY-2-O4 | 5.00% | $K_3$ [pN, 20° C.]: | 15.0 |
| PY-3-O2 | 12.00% | $γ_1$ [mPa · s, 20° C.]: | 85 |
| PY-1-O4 | 4.00% | $V_0$ [20° C., V]: | 2.15 |
| PYP-2-3 | 3.00% | LTS [bulk, −20° C.]: | >1000 h |
| PP-1-2V1 | 0.50% | | |
| B(S)-2O-O5 | 4.00% | | |
| B(S)-2O-O4 | 3.00% | | |

additionally comprises 0.03% of ST-12.

Example M21

The liquid-crystalline mixture

| | | | |
|---|---|---|---|
| CC-3-V | 36.50% | Clearing point [° C.]: | 75.0 |
| CC-3-V1 | 7.00% | Δn [589 nm, 20° C.]: | 0.1088 |
| CCY-3-O1 | 7.50% | Δε [1 kHz, 20° C.]: | −3.7 |
| CCY-3-O2 | 11.00% | $ε_{\|\|}$ [1 kHz, 20° C.]: | 3.7 |
| CCY-4-O2 | 2.50% | $ε_⊥$ [1 kHz, 20° C.]: | 7.3 |
| CLY-3-O2 | 5.00% | $K_1$ [pN, 20° C.]: | 14.7 |
| PGIY-2-O4 | 5.00% | $K_3$ [pN, 20° C.]: | 15.2 |
| PY-3-O2 | 12.00% | $γ_1$ [mPa · s, 20° C.]: | 86 |
| PY-1-O4 | 1.00% | $V_0$ [20° C., V]: | 2.15 |
| PYP-2-3 | 3.00% | | |
| PP-1-2V1 | 1.50% | | |
| B-2O-O5 | 4.00% | | |
| B(S)-2O-O4 | 4.00% | | |

additionally comprises 0.03% of ST-12.

Example M22

The liquid-crystalline mixture

| | | | |
|---|---|---|---|
| CC-3-V | 36.50% | Clearing point [° C.]: | 75.0 |
| CC-3-V1 | 7.00% | Δn [589 nm, 20° C.]: | 0.1083 |
| CCY-3-O1 | 7.50% | Δε [1 kHz, 20° C.]: | −3.6 |
| CCY-3-O2 | 11.00% | $ε_{\|\|}$ [1 kHz, 20° C.]: | 3.7 |
| CCY-4-O2 | 2.50% | $ε_⊥$ [1 kHz, 20° C.]: | 7.3 |
| CLY-3-O2 | 5.00% | $K_1$ [pN, 20° C.]: | 14.5 |
| PGIY-2-O4 | 5.00% | $K_3$ [pN, 20° C.]: | 15.2 |
| PY-3-O2 | 12.00% | $γ_1$ [mPa · s, 20° C.]: | 86 |
| PY-1-O4 | 1.00% | $V_0$ [20° C., V]: | 2.16 |
| PYP-2-3 | 3.00% | | |
| PP-1-2V1 | 1.50% | | |
| B-2O-O5 | 4.00% | | |
| B(S)-2O-O5 | 4.00% | | |

additionally comprises 0.015% of ST-8-1.

Example M23

The liquid-crystalline mixture

| | | | |
|---|---|---|---|
| CC-3-V | 41.50% | Clearing point [° C.]: | 75.0 |
| CC-3-V1 | 7.00% | Δn [589 nm, 20° C.]: | 0.0985 |
| CCY-3-O1 | 8.00% | Δε [1 kHz, 20° C.]: | −3.2 |
| CCY-3-O2 | 11.00% | $ε_{\|\|}$ [1 kHz, 20° C.]: | 3.6 |
| CCY-4-O2 | 4.50% | $ε_⊥$ [1 kHz, 20° C.]: | 6.8 |
| CY-3-O2 | 3.50% | $K_1$ [pN, 20° C.]: | 13.8 |
| PY-3-O2 | 14.50% | $K_3$ [pN, 20° C.]: | 15.0 |
| B(S)-2O-O5 | 5.00% | $γ_1$ [mPa · s, 20° C.]: | 80 |
| PGIY-2-O4 | 5.00% | $V_0$ [20° C., V]: | 2.29 |
| | | LTS [bulk, −25° C.]: | >1000 h |

additionally comprises 0.015% of ST-9-1.

Example M24

The liquid-crystalline mixture

| | | | |
|---|---|---|---|
| CC-3-V1 | 8.00% | Clearing point [° C.]: | 74.0 |
| CCH-23 | 18.00% | Δn [589 nm, 20° C.]: | 0.0979 |
| CCH-34 | 3.00% | Δε [1 kHz, 20° C.]: | −3.4 |
| CCH-35 | 4.00% | $ε_{\|\|}$ [1 kHz, 20° C.]: | 3.6 |
| CCP-3-1 | 14.00% | $ε_⊥$ [1 kHz, 20° C.]: | 7.0 |
| CCY-3-O2 | 11.00% | $K_1$ [pN, 20° C.]: | 15.0 |
| CCY-3-O1 | 2.00% | $K_3$ [pN, 20° C.]: | 16.0 |
| CPY-3-O2 | 11.00% | $γ_1$ [mPa · s, 20° C.]: | 100 |
| CY-3-O2 | 10.00% | $V_0$ [20° C., V]: | 2.28 |
| PY-3-O2 | 12.00% | | |
| Y-4O-O4 | 4.00% | | |
| B(S)-2O-O5 | 3.00% | | |

additionally comprises 0.03% of ST-2a-1.

Example M25

The liquid-crystalline mixture

| | | | |
|---|---|---|---|
| CC-3-V1 | 8.50% | Clearing point [° C.]: | 74.5 |
| CCH-23 | 18.00% | Δn [589 nm, 20° C.]: | 0.0986 |
| CCH-35 | 5.50% | Δε [1 kHz, 20° C.]: | −3.4 |
| CCP-3-1 | 13.00% | $ε_{\|\|}$ [1 kHz, 20° C.]: | 3.6 |
| CCY-3-O1 | 5.00% | $ε_⊥$ [1 kHz, 20° C.]: | 6.9 |
| CCY-3-O2 | 10.00% | $K_1$ [pN, 20° C.]: | 15.3 |
| CPY-3-O2 | 10.50% | $K_3$ [pN, 20° C.]: | 15.8 |
| CY-3-O2 | 10.00% | $γ_1$ [mPa · s, 20° C.]: | 95 |
| Y-4O-O4 | 6.00% | $V_0$ [20° C., V]: | 2.30 |
| B(S)-2O-O5 | 4.00% | | |

-continued

| | |
|---|---|
| PP-1-3 | 6.40% |
| B(S)-2O-O4 | 3.00% |

additionally comprises 0.03% of ST-2a-1 and 0.02% of ST-3a-1.

Example M26

The liquid-crystalline mixture

| | | | |
|---|---|---|---|
| CC-3-V1 | 8.00% | Clearing point [° C.]: | 73.5 |
| CCH-23 | 18.00% | Δn [589 nm, 20° C.]: | 0.0979 |
| CCH-35 | 5.00% | Δε [1 kHz, 20° C.]: | −3.3 |
| CCH-34 | 1.00% | $\varepsilon_{\parallel}$ [1 kHz, 20° C.]: | 3.6 |
| CCP-3-1 | 13.00% | $\varepsilon_{\perp}$ [1 kHz, 20° C.]: | 6.9 |
| CCY-3-O1 | 5.00% | $K_1$ [pN, 20° C.]: | 15.2 |
| CCY-3-O2 | 10.00% | $K_3$ [pN, 20° C.]: | 15.7 |
| CPY-3-O2 | 10.00% | $\gamma_1$ [mPa · s, 20° C.]: | 95 |
| CY-3-O2 | 11.00% | $V_0$ [20° C., V]: | 2.30 |
| Y-4O-O4 | 5.50% | | |
| B(S)-2O-O5 | 3.00% | | |
| PP-1-3 | 6.50% | | |
| B(S)-2O-O4 | 2.00% | | |
| B(S)-2O-O6 | 2.00% | | |

additionally comprises 0.01% of ST-3b-1.

Example M27

The liquid-crystalline mixture

| | | | |
|---|---|---|---|
| CC-3-V | 42.00% | Clearing point [° C.]: | 74.0 |
| CCY-3-O2 | 11.00% | Δn [589 nm, 20° C.]: | 0.1008 |
| CPY-2-O2 | 10.00% | Δε [1 kHz, 20° C.]: | −3.7 |
| CPY-3-O2 | 11.00% | $\varepsilon_{\parallel}$ [1 kHz, 20° C.]: | 3.7 |
| CY-3-O3 | 17.00% | $\varepsilon_{\perp}$ [1 kHz, 20° C.]: | 7.3 |
| PGIY-2-O4 | 5.00% | $K_1$ [pN, 20° C.]: | 12.8 |
| B(S)-2O-O5 | 4.00% | $K_3$ [pN, 20° C.]: | 14.6 |
| | | $\gamma_1$ [mPa · s, 20° C.]: | 86 |
| | | $V_0$ [20° C., V]: | 2.11 |

additionally comprises 0.02% of ST-8-1.

Example M28

The liquid-crystalline mixture

| | | | |
|---|---|---|---|
| CC-3-V | 42.00% | Clearing point [° C.]: | 73.0 |
| CCY-3-O2 | 11.00% | Δn [589 nm, 20° C.]: | 0.1004 |
| CPY-2-O2 | 9.00% | Δε [1 kHz, 20° C.]: | −3.7 |
| CPY-3-O2 | 11.00% | $\varepsilon_{\parallel}$ [1 kHz, 20° C.]: | 3.7 |
| PGIY-2-O4 | 5.50% | $\varepsilon_{\perp}$ [1 kHz, 20° C.]: | 7.3 |
| CY-3-O2 | 17.50% | $K_1$ [pN, 20° C.]: | 12.7 |
| B(S)-2O-O5 | 2.00% | $K_3$ [pN, 20° C.]: | 14.5 |
| B(S)-2O-O4 | 2.00% | $\gamma_1$ [mPa · s, 20° C.]: | 85 |
| | | $V_0$ [20° C., V]: | 2.10 |

additionally comprises 0.02% of ST-8-1.

Example M29

The liquid-crystalline mixture

| | | | |
|---|---|---|---|
| CC-3-V | 44.50% | Clearing point [° C.]: | 74.0 |
| CCY-3-O2 | 11.00% | Δn [589 nm, 20° C.]: | 0.1010 |
| CPY-2-O2 | 9.50% | Δε [1 kHz, 20° C.]: | −3.7 |
| CPY-3-O2 | 11.00% | $\varepsilon_{\parallel}$ [1 kHz, 20° C.]: | 3.7 |
| CY-3-O2 | 13.00% | $\varepsilon_{\perp}$ [1 kHz, 20° C.]: | 7.4 |

-continued

| | | | |
|---|---|---|---|
| PGIY-2-O4 | 4.00% | $K_1$ [pN, 20° C.]: | 13.0 |
| B-2O-O5 | 4.00% | $K_3$ [pN, 20° C.]: | 14.5 |
| B-2O-O4 | 3.00% | $\gamma_1$ [mPa · s, 20° C.]: | 83 |
| | | $V_0$ [20° C., V]: | 2.09 |

additionally comprises 0.02% of ST-8-1.

Example M30

The liquid-crystalline mixture

| | | | |
|---|---|---|---|
| CC-3-V | 42.00% | Clearing point [° C.]: | 80.5 |
| CY-3-O2 | 11.50% | Δn [589 nm, 20° C.]: | 0.1070 |
| CCY-3-O2 | 10.00% | Δε [1 kHz, 20° C.]: | −3.7 |
| CCY-4-O2 | 4.00% | $\varepsilon_{\parallel}$ [1 kHz, 20° C.]: | 3.6 |
| CPY-2-O2 | 6.50% | $\varepsilon_{\perp}$ [1 kHz, 20° C.]: | 7.4 |
| CPY-3-O2 | 11.00% | $K_1$ [pN, 20° C.]: | 13.9 |
| PGIY-2-O4 | 5.00% | $K_3$ [pN, 20° C.]: | 15.2 |
| PYP-2-3 | 3.00% | $\gamma_1$ [mPa · s, 20° C.]: | 94 |
| B(S)-2O-O5 | 4.00% | $V_0$ [20° C., V]: | 2.14 |
| B(S)-2O-O4 | 3.00% | | |

additionally comprises 0.02% of ST-8-1.

Example M31

The liquid-crystalline mixture

| | | | |
|---|---|---|---|
| CC-3-V | 32.50% | Clearing point [° C.]: | 80.5 |
| CCP-3-1 | 6.50% | Δn [589 nm, 20° C.]: | 0.1031 |
| CCY-3-O2 | 10.00% | Δε [1 kHz, 20° C.]: | −4.4 |
| CLY-3-O2 | 5.00% | $\varepsilon_{\parallel}$ [1 kHz, 20° C.]: | 3.8 |
| CLY-3-O3 | 4.00% | $\varepsilon_{\perp}$ [1 kHz, 20° C.]: | 8.2 |
| CPY-3-O2 | 9.50% | $K_1$ [pN, 20° C.]: | 14.4 |
| CY-3-O2 | 21.50% | $K_3$ [pN, 20° C.]: | 16.6 |
| PGIY-2-O4 | 4.00% | $\gamma_1$ [mPa · s, 20° C.]: | 109 |
| B(S)-2O-O5 | 3.00% | $V_0$ [20° C., V]: | 2.05 |
| B(S)-2O-O4 | 4.00% | | |

additionally comprises 0.02% of ST-12.

Example M32

The liquid-crystalline mixture

| | | | |
|---|---|---|---|
| CC-3-V | 32.00% | Clearing point [° C.]: | 81.0 |
| CCP-3-1 | 8.00% | Δn [589 nm, 20° C.]: | 0.1031 |
| CCY-3-O2 | 10.00% | Δε [1 kHz, 20° C.]: | −4.5 |
| CLY-3-O2 | 5.00% | $\varepsilon_{\parallel}$ [1 kHz, 20° C.]: | 3.8 |
| CLY-3-O3 | 3.00% | $\varepsilon_{\perp}$ [1 kHz, 20° C.]: | 8.2 |
| CPY-3-O2 | 10.00% | $K_1$ [pN, 20° C.]: | 14.8 |
| CY-3-O2 | 21.00% | $K_3$ [pN, 20° C.]: | 16.9 |
| PGIY-2-O4 | 3.00% | $\gamma_1$ [mPa · s, 20° C.]: | 110 |
| B-2O-O5 | 2.00% | $V_0$ [20° C., V]: | 2.05 |
| B(S)-2O-O5 | 2.00% | | |
| B(S)-2O-O4 | 2.00% | | |
| B(S)-2O-O6 | 2.00% | | |

additionally comprises 0.02% of ST-8-1.

Example M33

The liquid-crystalline mixture

| | | | |
|---|---|---|---|
| CC-3-V | 33.00% | Clearing point [° C.]: | 80.5 |
| CCP-3-1 | 6.00% | Δn [589 nm, 20° C.]: | 0.1031 |
| CCY-3-O2 | 10.50% | Δε [1 kHz, 20° C.]: | −4.5 |

-continued

| | | | |
|---|---|---|---|
| CLY-3-O2 | 5.00% | $\varepsilon_{\parallel}$ [1 kHz, 20° C.]: | 3.8 |
| CLY-3-O3 | 4.00% | $\varepsilon_{\perp}$ [1 kHz, 20° C.]: | 8.2 |
| CPY-3-O2 | 10.00% | $K_1$ [pN, 20° C.]: | 14.3 |
| CY-3-O2 | 20.50% | $K_3$ [pN, 20° C.]: | 16.6 |
| PGIY-2-O4 | 4.00% | $\gamma_1$ [mPa · s, 20° C.]: | 109 |
| B-2O-O5 | 2.00% | $V_0$ [20° C., V]: | 2.04 |
| B(S)-2O-O5 | 2.00% | | |
| B(S)-2O-O4 | 3.00% | | |

additionally comprises 0.02% of ST-9-1 and 0.02% of ST-3b-1.

Example M34

The liquid-crystalline mixture

| | | | |
|---|---|---|---|
| CC-3-V | 33.00% | Clearing point [° C.]: | 80.0 |
| CCP-3-1 | 6.50% | Δn [589 nm, 20° C.]: | 0.1030 |
| CCY-3-O2 | 10.50% | Δε [1 kHz, 20° C.]: | −4.4 |
| CLY-3-O2 | 5.00% | $\varepsilon_{\parallel}$ [1 kHz, 20° C.]: | 3.8 |
| CLY-3-O3 | 3.50% | $\varepsilon_{\perp}$ [1 kHz, 20° C.]: | 8.2 |
| CPY-3-O2 | 10.00% | $K_1$ [pN, 20° C.]: | 14.3 |
| CY-3-O2 | 20.50% | $K_3$ [pN, 20° C.]: | 16.6 |
| PGIY-2-O4 | 4.00% | $\gamma_1$ [mPa · s, 20° C.]: | 108 |
| B-2O-O5 | 3.00% | $V_0$ [20° C., V]: | 2.04 |
| B(S)-2O-O4 | 4.00% | | |

additionally comprises 0.01% of ST-9-1.

Example M35

The liquid-crystalline mixture

| | | | |
|---|---|---|---|
| CC-3-V | 38.50% | Clearing point [° C.]: | 79.5 |
| CCY-3-O1 | 4.00% | Δn [589 nm, 20° C.]: | 0.1034 |
| CCY-3-O2 | 10.00% | Δε [1 kHz, 20° C.]: | −4.4 |
| CLY-3-O2 | 7.00% | $\varepsilon_{\parallel}$ [1 kHz, 20° C.]: | 3.8 |
| CLY-3-O3 | 3.00% | $\varepsilon_{\perp}$ [1 kHz, 20° C.]: | 8.2 |
| CPY-2-O2 | 4.00% | $K_1$ [pN, 20° C.]: | 14.4 |
| CPY-3-O2 | 10.00% | $K_3$ [pN, 20° C.]: | 15.9 |
| CY-3-O2 | 9.50% | $\gamma_1$ [mPa · s, 20° C.]: | 102 |
| PY-3-O2 | 6.00% | $V_0$ [20° C., V]: | 2.01 |
| B(S)-2O-O5 | 4.00% | | |
| B-2O-O5 | 4.00% | | |

additionally comprises 0.01% of ST-8-1.

Example M36

For the preparation of a PS (polymer-stabilised) mixture, for example for PS-IPS, PS-VA, PS-FFS applications, 99.7% of the mixture according to Example M17 are mixed with 0.3% of the polymerisable compound of the formula

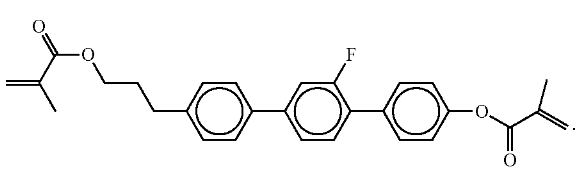

Example M37

For the preparation of a PS (polymer-stabilised) mixture, for example for PS-IPS, PS-VA, PS-FFS applications, 99.75% of the mixture according to Example M17 are mixed with 0.25% of the polymerisable compound of the formula

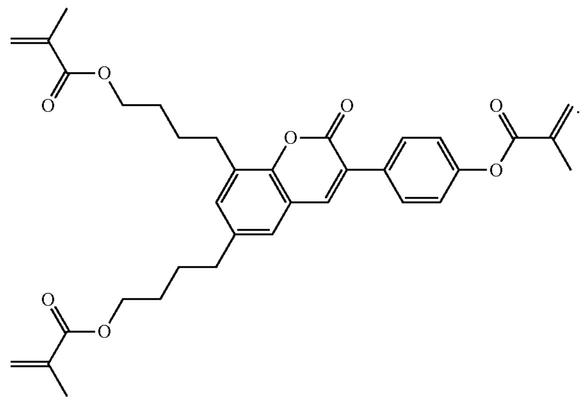 [SMILES: C=C(C)C(=O)OCCCCc1cc(CCCCOC(=O)C(=C)C)c2oc(=O)c(-c3ccc(OC(=O)C(=C)C)cc3)cc2c1]

Example M38

For the preparation of a PS (polymer-stabilised) mixture, for example for PS-IPS, PS-VA, PS-FFS applications, 99.8% of the mixture according to Example M17 are mixed with 0.2% of the polymerisable compound of the formula

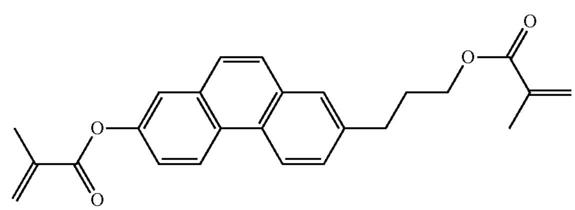

Example M39

For the preparation of a PS (polymer-stabilised) mixture, for example for PS-IPS, PS-VA, PS-FFS applications, 99.75% of the mixture according to Example M17 are mixed with 0.25% of the polymerisable compound of the formula

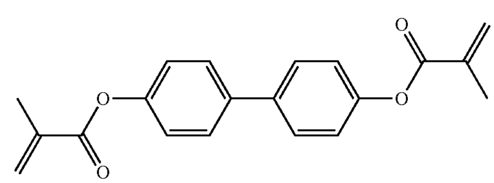

Example M40

For the preparation of a PS (polymer-stabilised) mixture, for example for PS-IPS, PS-VA, PS-FFS applications, 99.75% of the mixture according to Example M17 are mixed with 0.25% of the polymerisable compound of the formula

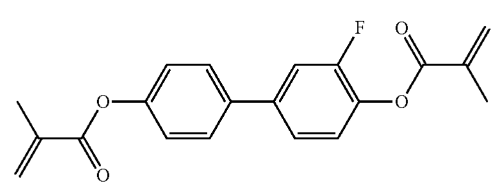

Example M41

For the preparation of a PS (polymer-stabilised) mixture, for example for PS-IPS, PS-VA, PS-FFS applications, 99.75% of the mixture according to Example M17 are mixed with 0.25% of the polymerisable compound of the formula

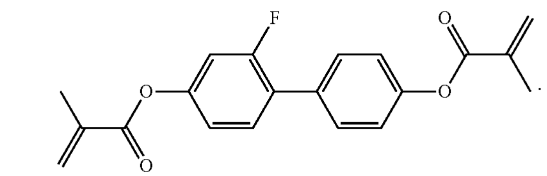 [SMILES: C=C(C)C(=O)Oc1ccc(-c2ccc(OC(=O)C(=C)C)cc2F)cc1]

Example M42

For the preparation of a PS (polymer-stabilised) mixture, for example for PS-IPS, PS-VA, PS-FFS applications, 99.8% of the mixture according to Example M17 are mixed with 0.2% of the polymerisable compound of the formula

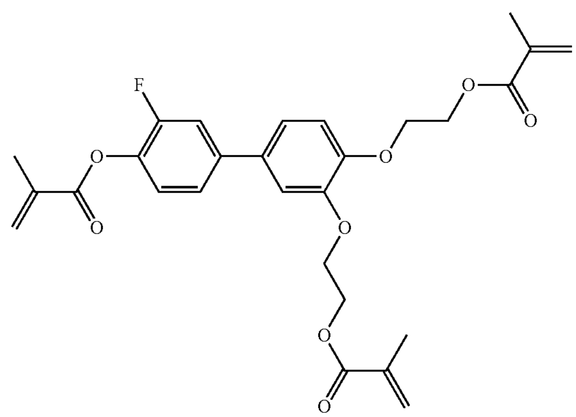

Example M43

For the preparation of a PS (polymer-stabilised) mixture, for example for PS-IPS, PS-VA, PS-FFS applications, 99.7% of the mixture according to Example M19 are mixed with 0.3% of the polymerisable compound of the formula

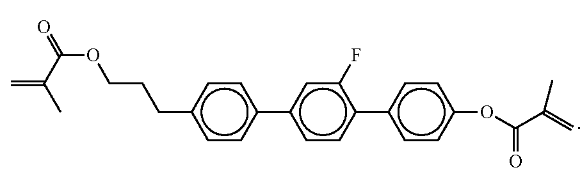

Example M44

For the preparation of a PS (polymer-stabilised) mixture, for example for PS-IPS, PS-VA, PS-FFS applications, 99.75% of the mixture according to Example M19 are mixed with 0.25% of the polymerisable compound of the formula

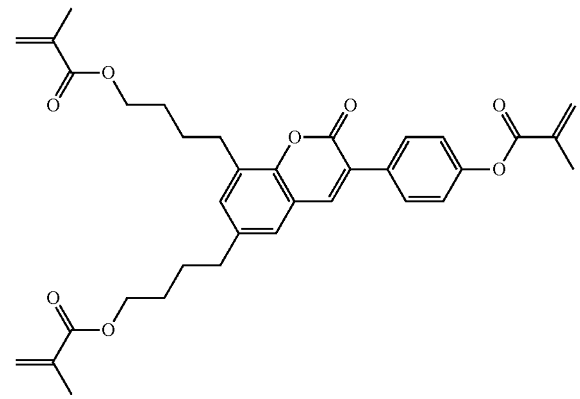

Example M45

For the preparation of a PS (polymer-stabilised) mixture, for example for PS-IPS, PS-VA, PS-FFS applications, 99.8% of the mixture according to Example M19 are mixed with 0.2% of the polymerisable compound of the formula

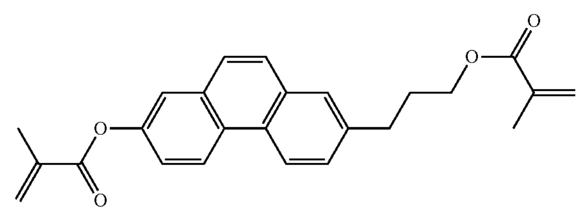

Example M46

For the preparation of a PS (polymer-stabilised) mixture, for example for PS-IPS, PS-VA, PS-FFS applications, 99.75% of the mixture according to Example M19 are mixed with 0.001% of Irganox and 0.25% of the polymerisable compound of the formula

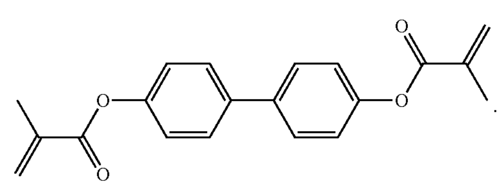

Example M47

For the preparation of a PS (polymer-stabilised) mixture, for example for PS-IPS, PS-VA, PS-FFS applications, 99.75% of the mixture according to Example M19 are mixed with 0.25% of the polymerisable compound of the formula

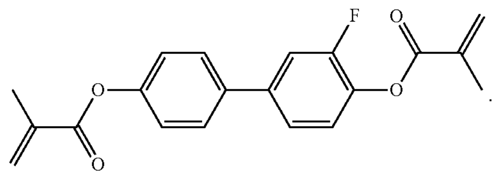 [SMILES: C=C(C)C(=O)Oc1ccc(-c2ccc(OC(=O)C(=C)C)c(F)c2)cc1]

Example M48

For the preparation of a PS (polymer-stabilised) mixture, for example for PS-IPS, PS-VA, PS-FFS applications, 99.75% of the mixture according to Example M19 are mixed with 0.25% of the polymerisable compound of the formula

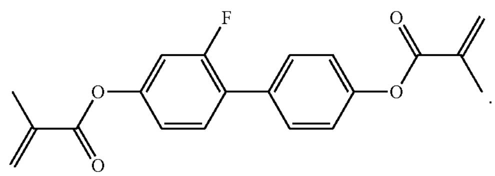 [SMILES: C=C(C)C(=O)Oc1ccc(-c2ccc(OC(=O)C(=C)C)cc2F)cc1]

Example M49

For the preparation of a PS (polymer-stabilised) mixture, for example for PS-IPS, PS-VA, PS-FFS applications, 99.8% of the mixture according to Example M19 are mixed with 0.2% of the polymerisable compound of the formula

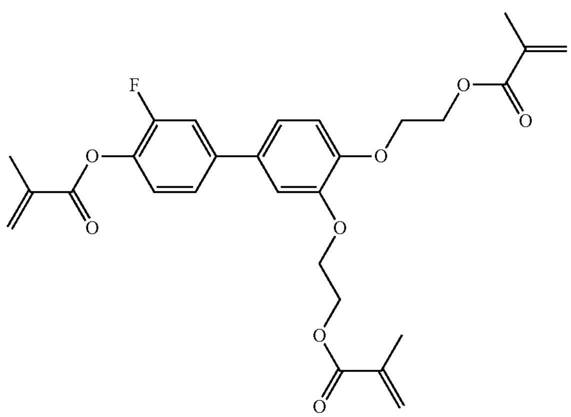

Example M50

For the preparation of a PS (polymer-stabilised) mixture, for example for PS-IPS, PS-VA, PS-FFS applications, 99.75% of the mixture according to Example M19 are mixed with 0.25% of the polymerisable compound of the formula

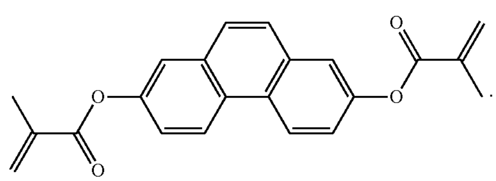 [SMILES: C=C(C)C(=O)Oc1ccc2c(ccc3cc(OC(=O)C(=C)C)ccc32)c1]

Example M51

For the preparation of a PS (polymer-stabilised) mixture, for example for PS-IPS, PS-VA, PS-FFS applications, 99.7% of the mixture according to Example M22 are mixed with 0.3% of the polymerisable compound of the formula

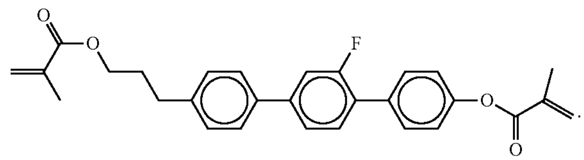

Example M52

For the preparation of a PS (polymer-stabilised) mixture, for example for PS-IPS, PS-VA, PS-FFS applications, 99.75% of the mixture according to Example M22 are mixed with 0.25% of the polymerisable compound of the formula

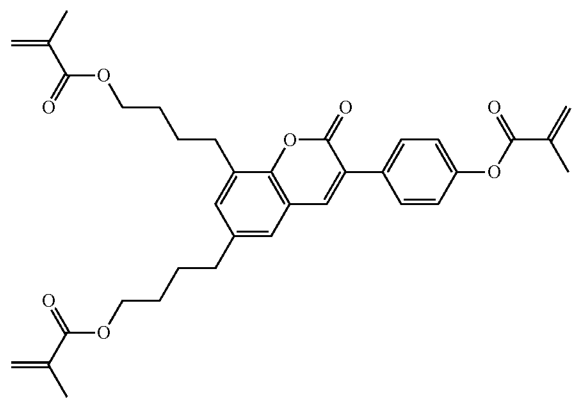 [SMILES: C=C(C)C(=O)OCCCCc1cc(CCCCOC(=O)C(=C)C)c2oc(=O)c(-c3ccc(OC(=O)C(=C)C)cc3)cc2c1]

Example M53

For the preparation of a PS (polymer-stabilised) mixture, for example for PS-IPS, PS-VA, PS-FFS applications, 99.8% of the mixture according to Example M22 are mixed with 0.2% of the polymerisable compound of the formula

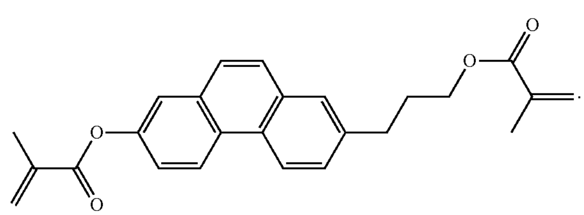 [SMILES: C=C(C)C(=O)OCCCc1ccc2c(ccc3cc(OC(=O)C(=C)C)ccc32)c1]

Example M54

For the preparation of a PS (polymer-stabilised) mixture, for example for PS-IPS, PS-VA, PS-FFS applications, 99.75% of the mixture according to Example M22 are mixed with 0.25% of the polymerisable compound of the formula

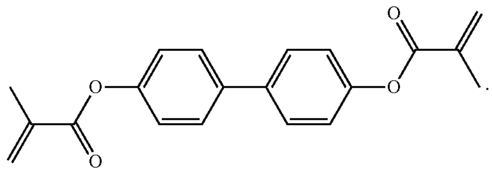 [SMILES: C=C(C)C(=O)Oc1ccc(-c2ccc(OC(=O)C(=C)C)cc2)cc1]

Example M55

For the preparation of a PS (polymer-stabilised) mixture, for example for PS-IPS, PS-VA, PS-FFS applications, 99.75% of the mixture according to Example M22 are mixed with 0.25% of the polymerisable compound of the formula

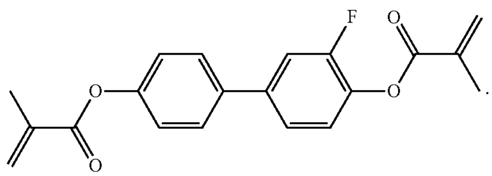 [SMILES: C=C(C)C(=O)Oc1ccc(-c2ccc(OC(=O)C(=C)C)c(F)c2)cc1]

Example M56

For the preparation of a PS (polymer-stabilised) mixture, for example for PS-IPS, PS-VA, PS-FFS applications, 99.75% of the mixture according to Example M22 are mixed with 0.25% of the polymerisable compound of the formula

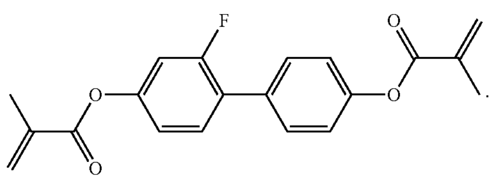 [SMILES: C=C(C)C(=O)Oc1ccc(-c2ccc(OC(=O)C(=C)C)cc2F)cc1]

Example M57

For the preparation of a PS (polymer-stabilised) mixture, for example for PS-IPS, PS-VA, PS-FFS applications, 99.8% of the mixture according to Example M22 are mixed with 0.2% of the polymerisable compound of the formula

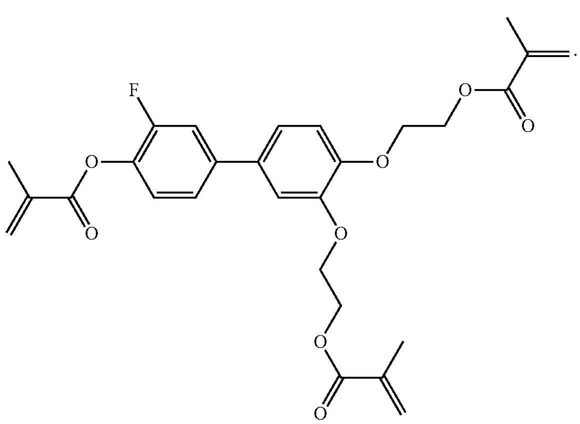 [SMILES: C=C(C)C(=O)OCCOc1ccc(-c2ccc(OC(=O)C(=C)C)c(F)c2)cc1OCCOC(=O)C(=C)C]

Example M58

For the preparation of a PS (polymer-stabilised) mixture, for example for PS-IPS, PS-VA, PS-FFS applications, 99.8% of the mixture according to Example M28 are mixed with 0.2% of the polymerisable compound of the formula

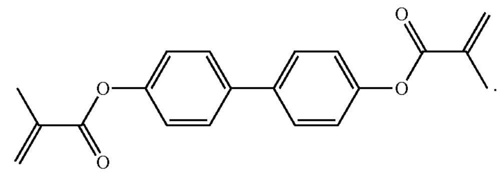

Example M59

For the preparation of a PS (polymer-stabilised) mixture, for example for PS-IPS, PS-VA, PS-FFS applications, 99.75% of the mixture according to Example M28 are mixed with 0.25% of the polymerisable compound of the formula

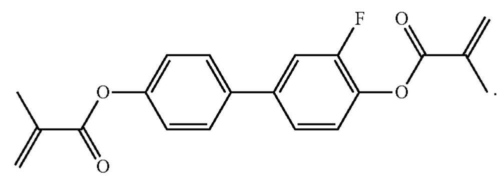 [SMILES: C=C(C)C(=O)Oc1ccc(-c2ccc(OC(=O)C(=C)C)c(F)c2)cc1]

Example M60

For the preparation of a PS (polymer-stabilised) mixture, for example for PS-IPS, PS-VA, PS-FFS applications, 99.7% of the mixture according to Example M33 are mixed with 0.3% of the polymerisable compound of the formula

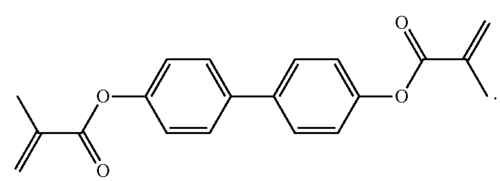 [SMILES: C=C(C)C(=O)Oc1ccc(-c2ccc(OC(=O)C(=C)C)cc2)cc1]

Example M61

For the preparation of a PS (polymer-stabilised) mixture, for example for PS-IPS, PS-VA, PS-FFS applications, 99.7% of the mixture according to Example M33 are mixed with 0.3% of the polymerisable compound of the formula

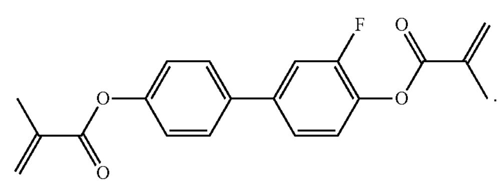 [SMILES: C=C(C)C(=O)Oc1ccc(-c2ccc(OC(=O)C(=C)C)c(F)c2)cc1]

Example M62

For the preparation of a PS (polymer-stabilised) mixture, for example for PS-IPS, PS-VA, PS-FFS applications, 99.8% of the mixture according to Example M33 are mixed with 0.2% of the polymerisable compound of the formula

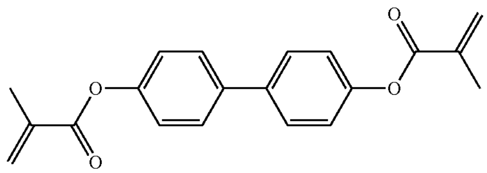

and 0.2% of the polymerisable compound

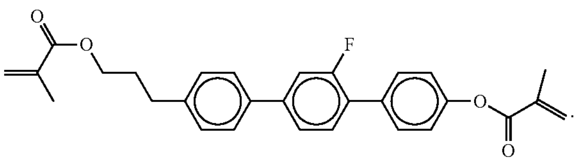

Example M63

The liquid-crystalline mixture

| | | | |
|---|---|---|---|
| CC-3-V | 41.00% | Clearing point [° C.]: | 74.0 |
| CCY-3-O2 | 11.00% | Δn [589 nm, 20° C.]: | 0.1005 |
| CCY-3-O1 | 2.50% | Δε [1 kHz, 20° C.]: | −3.7 |
| CLY-3-O2 | 4.00% | $\varepsilon_{\parallel}$ [1 kHz, 20° C.]: | 3.7 |
| CLY-3-O3 | 4.00% | $K_1$ [pN, 20° C.]: | 13.3 |
| CPY-2-O2 | 4.00% | $K_3$ [pN, 20° C.]: | 15.0 |
| CPY-3-O2 | 11.00% | $\gamma_1$ [mPa · s, 20° C.]: | 87 |
| CY-3-O2 | 7.50% | $V_0$ [20° C., V]: | 2.14 |
| PY-3-O2 | 12.00% | | |
| B-3O-O5 | 3.00% | | |

additionally comprises 0.025% of ST-8-1.

Example M64

The liquid-crystalline mixture

| | | | |
|---|---|---|---|
| CC-3-V | 42.00% | Clearing point [° C.]: | 73.5 |
| CCY-3-O1 | 5.00% | Δn [589 nm, 20° C.]: | 0.1009 |
| CCY-3-O2 | 10.00% | Δε [1 kHz, 20° C.]: | −3.5 |
| CCY-4-O2 | 2.50% | $\varepsilon_{\parallel}$ [1 kHz, 20° C.]: | 3.6 |
| CPY-2-O2 | 10.00% | $K_1$ [pN, 20° C.]: | 12.9 |
| CPY-3-O2 | 10.00% | $K_3$ [pN, 20° C.]: | 14.5 |
| CY-3-O2 | 6.50% | $\gamma_1$ [mPa · s, 20° C.]: | 88 |
| PY-3-O2 | 11.00% | $V_0$ [20° C., V]: | 2.14 |
| B-3O-O5 | 3.00% | | |

additionally comprises 0.025% of ST-12.

Example M65

The liquid-crystalline mixture

| | | | |
|---|---|---|---|
| CC-3-V | 43.00% | Clearing point [° C.]: | 73.5 |
| CCY-3-O1 | 5.00% | Δn [589 nm, 20° C.]: | 0.1011 |
| CCY-3-O2 | 10.00% | Δε [1 kHz, 20° C.]: | −3.6 |
| CCY-4-O2 | 2.00% | $\varepsilon_{\parallel}$ [1 kHz, 20° C.]: | 3.7 |
| CPY-2-O2 | 10.00% | $K_1$ [pN, 20° C.]: | 13.3 |
| CPY-3-O2 | 10.00% | $K_3$ [pN, 20° C.]: | 14.7 |
| CY-3-O2 | 5.00% | $\gamma_1$ [mPa · s, 20° C.]: | 83 |
| PY-3-O2 | 11.00% | $V_0$ [20° C., V]: | 2.14 |
| B-3O-O5 | 4.00% | | |

additionally comprises 0.025% of ST-3a-1.

Example M66

The liquid-crystalline mixture

| | | | |
|---|---|---|---|
| CC-3-V | 40.50% | Clearing point [° C.]: | 74.0 |
| CCY-3-O1 | 5.00% | Δn [589 nm, 20° C.]: | 0.1005 |
| CCY-3-O2 | 10.00% | Δε [1 kHz, 20° C.]: | −3.6 |
| CCY-4-O2 | 3.50% | $\varepsilon_{\parallel}$ [1 kHz, 20° C.]: | 3.6 |
| CPY-2-O2 | 10.00% | $K_1$ [pN, 20° C.]: | 12.9 |
| CPY-3-O2 | 10.00% | $K_3$ [pN, 20° C.]: | 14.6 |
| CY-3-O2 | 8.00% | $\gamma_1$ [mPa · s, 20° C.]: | 88 |
| PY-3-O2 | 11.00% | $V_0$ [20° C., V]: | 2.14 |
| B-3O-O4 | 2.00% | | |

additionally comprises 0.025% of ST-12.

Example M67

The liquid-crystalline mixture

| | | | |
|---|---|---|---|
| CC-3-V | 42.00% | Clearing point [° C.]: | 73.5 |
| CCY-3-O1 | 5.00% | Δn [589 nm, 20° C.]: | 0.1011 |
| CCY-3-O2 | 10.00% | Δε [1 kHz, 20° C.]: | −3.6 |
| CCY-4-O2 | 2.50% | $\varepsilon_{\parallel}$ [1 kHz, 20° C.]: | 3.7 |
| CPY-2-O2 | 10.00% | $K_1$ [pN, 20° C.]: | 12.9 |
| CPY-3-O2 | 10.00% | $K_3$ [pN, 20° C.]: | 14.6 |
| CY-3-O2 | 6.50% | $\gamma_1$ [mPa · s, 20° C.]: | 85 |
| PY-3-O2 | 11.00% | $V_0$ [20° C., V]: | 2.14 |
| B-2O-O4 | 3.00% | | |

additionally comprises 0.03% of ST-2a-1.

Example M68

The liquid-crystalline mixture

| | | | |
|---|---|---|---|
| CC-3-V | 42.00% | Clearing point [° C.]: | 73.5 |
| CCY-3-O1 | 5.00% | Δn [589 nm, 20° C.]: | 0.1001 |
| CCY-3-O2 | 10.00% | Δε [1 kHz, 20° C.]: | −3.5 |
| CCY-4-O2 | 2.50% | $\varepsilon_{\parallel}$ [1 kHz, 20° C.]: | 3.6 |
| CPY-2-O2 | 10.00% | $K_1$ [pN, 20° C.]: | 13.0 |
| CPY-3-O2 | 10.00% | $K_3$ [pN, 20° C.]: | 14.5 |
| CY-3-O2 | 6.50% | $\gamma_1$ [mPa · s, 20° C.]: | 84 |
| PY-3-O2 | 11.00% | $V_0$ [20° C., V]: | 2.15 |
| B-3O-O6 | 3.00% | | |

additionally comprises 0.025% of ST-8-1.

Example M69

The liquid-crystalline mixture

| | | | |
|---|---|---|---|
| CC-3-V | 42.00% | Clearing point [° C.]: | 73.5 |
| CCY-3-O1 | 5.00% | Δn [589 nm, 20° C.]: | 0.1007 |
| CCY-3-O2 | 10.00% | Δε [1 kHz, 20° C.]: | −3.5 |
| CCY-4-O2 | 2.50% | $\varepsilon_{\parallel}$ [1 kHz, 20° C.]: | 3.7 |
| CPY-2-O2 | 10.00% | $K_1$ [pN, 20° C.]: | 12.9 |
| CPY-3-O2 | 10.00% | $K_3$ [pN, 20° C.]: | 14.6 |

-continued

| | | | |
|---|---|---|---|
| CY-3-O2 | 6.50% | $\gamma_1$ [mPa · s, 20° C.]: | 84 |
| PY-3-O2 | 11.00% | $V_0$ [20° C., V]: | 2.15 |
| B-2O-O5 | 3.00% | | |

additionally comprises 0.025% of ST-8-1.

| Comparison | VHR after UV |
|---|---|
| M69 without stabiliser | 60% |
| M69 with stabiliser (0.025% of ST-8-1) | 79% |

Example M70

The liquid-crystalline mixture

| | | | |
|---|---|---|---|
| CC-3-V | 45.50% | Clearing point [° C.]: | 73.0 |
| CCY-3-O1 | 3.00% | Δn [589 nm, 20° C.]: | 0.1011 |
| CCY-3-O2 | 11.00% | Δε [1 kHz, 20° C.]: | −3.5 |
| CCY-4-O2 | 3.50% | $\varepsilon_{\parallel}$ [1 kHz, 20° C.]: | 3.6 |
| CPY-2-O2 | 7.50% | $K_1$ [pN, 20° C.]: | 13.1 |
| CPY-3-O2 | 10.00% | $K_3$ [pN, 20° C.]: | 14.3 |
| CY-3-O2 | 2.00% | $\gamma_1$ [mPa · s, 20° C.]: | 79 |
| PY-3-O2 | 11.50% | $V_0$ [20° C., V]: | 2.15 |
| B-2O-O5 | 6.00% | | |

additionally comprises 0.025% of ST-8-1.

Example M71

The liquid-crystalline mixture

| | | | |
|---|---|---|---|
| CC-3-V | 42.00% | Clearing point [° C.]: | 73.5 |
| CCY-3-O1 | 5.00% | Δn [589 nm, 20° C.]: | 0.0993 |
| CCY-3-O2 | 10.00% | Δε [1 kHz, 20° C.]: | −3.5 |
| CCY-4-O2 | 2.50% | $\varepsilon_{\parallel}$ [1 kHz, 20° C.]: | 3.6 |
| CPY-2-O2 | 10.00% | $K_1$ [pN, 20° C.]: | 12.9 |
| CPY-3-O2 | 10.00% | $K_3$ [pN, 20° C.]: | 14.5 |
| CY-3-O2 | 6.50% | $\gamma_1$ [mPa · s, 20° C.]: | 84 |
| PY-3-O2 | 11.00% | $V_0$ [20° C., V]: | 2.14 |
| B-3O-O3 | 3.00% | | |

additionally comprises 0.025% of ST-8-1.

Example M72

The liquid-crystalline mixture

| | | | |
|---|---|---|---|
| CC-3-V | 45.50% | Clearing point [° C.]: | 73.5 |
| CCY-3-O1 | 3.00% | Δn [589 nm, 20° C.]: | 0.1009 |
| CCY-3-O2 | 11.00% | Δε [1 kHz, 20° C.]: | −3.5 |
| CCY-4-O2 | 3.00% | $\varepsilon_{\parallel}$ [1 kHz, 20° C.]: | 3.6 |
| CPY-2-O2 | 8.50% | $K_1$ [pN, 20° C.]: | 13.2 |
| CPY-3-O2 | 10.00% | $K_3$ [pN, 20° C.]: | 14.3 |
| CY-3-O2 | 2.00% | $\gamma_1$ [mPa · s, 20° C.]: | 80 |
| PY-3-O2 | 11.00% | $V_0$ [20° C., V]: | 2.15 |
| B-2O-O5 | 3.00% | | |
| B-3O-O5 | 3.00% | | |

additionally comprises 0.025% of ST-8-1.

Example M73

The liquid-crystalline mixture

| | | | |
|---|---|---|---|
| CC-3-V | 35.50% | Clearing point [° C.]: | 73.0 |
| CCY-3-O1 | 6.00% | Δn [589 nm, 20° C.]: | 0.1006 |
| CCY-3-O2 | 11.00% | Δε [1 kHz, 20° C.]: | −4.4 |
| CCY-4-O2 | 6.50% | $\varepsilon_{\parallel}$ [1 kHz, 20° C.]: | 3.9 |
| CPY-2-O2 | 4.00% | $K_1$ [pN, 20° C.]: | 12.9 |
| CPY-3-O2 | 10.00% | $K_3$ [pN, 20° C.]: | 14.6 |
| CY-3-O2 | 12.00% | $\gamma_1$ [mPa · s, 20° C.]: | 99 |
| PY-3-O2 | 10.00% | $V_0$ [20° C., V]: | 1.93 |
| B-3O-O5 | 2.50% | | |
| B-3O-O4 | 2.50% | | |

additionally comprises 0.025% of ST-3a-1.

Example M74

The liquid-crystalline mixture

| | | | |
|---|---|---|---|
| CC-3-V | 34.50% | Clearing point [° C.]: | 75.0 |
| CC-3-V1 | 8.00% | Δn [589 nm, 20° C.]: | 0.1084 |
| CCY-3-O1 | 6.00% | Δε [1 kHz, 20° C.]: | −3.1 |
| CCY-3-O2 | 11.50% | $\varepsilon_{\parallel}$ [1 kHz, 20° C.]: | 3.5 |
| CCY-4-O2 | 3.50% | $K_1$ [pN, 20° C.]: | 14.3 |
| CPY-3-O2 | 11.50% | $K_3$ [pN, 20° C.]: | 15.9 |
| PY-3-O2 | 16.00% | $\gamma_1$ [mPa · s, 20° C.]: | 87 |
| PYP-2-3 | 3.00% | $V_0$ [20° C., V]: | 2.40 |
| PP-1-2V1 | 3.00% | | |
| B-3O-O5 | 3.00% | | |

additionally comprises 0.02% of ST-2a-1.

Example M75

The liquid-crystalline mixture

| | | | |
|---|---|---|---|
| CC-3-V | 34.50% | Clearing point [° C.]: | 75.0 |
| CC-3-V1 | 8.00% | Δn [589 nm, 20° C.]: | 0.1075 |
| CCY-3-O1 | 7.00% | Δε [1 kHz, 20° C.]: | −3.1 |
| CCY-3-O2 | 11.50% | $\varepsilon_{\parallel}$ [1 kHz, 20° C.]: | 3.5 |
| CCY-4-O2 | 3.50% | $K_1$ [pN, 20° C.]: | 14.7 |
| CPY-3-O2 | 11.50% | $K_3$ [pN, 20° C.]: | 16.4 |
| PY-3-O2 | 13.00% | $\gamma_1$ [mPa · s, 20° C.]: | 84 |
| PP-1-2V1 | 6.00% | $V_0$ [20° C., V]: | 2.41 |
| B-2O-O5 | 5.00% | | |

additionally comprises 0.02% of ST-8-1.

Example M76

The liquid-crystalline mixture

| | | | |
|---|---|---|---|
| CC-V-V | 37.00% | Clearing point [° C.]: | 73.5 |
| CC-V-V1 | 10.00% | Δn [589 nm, 20° C.]: | 0.1026 |
| CCVC-V-V | 7.00% | Δε [1 kHz, 20° C.]: | −3.0 |
| CCVC-3-V | 7.00% | $\varepsilon_{\parallel}$ [1 kHz, 20° C.]: | 3.7 |
| CCC-2-V | 3.00% | $K_1$ [pN, 20° C.]: | 11.8 |
| CCC-3-V | 4.00% | $K_3$ [pN, 20° C.]: | 11.9 |
| B-4O-O4 | 3.00% | $\gamma_1$ [mPa · s, 20° C.]: | 57 |
| B-3O-O4 | 8.50% | $V_0$ [20° C., V]: | 2.10 |
| B-3O-O5 | 8.50% | | |
| PB-3-O4 | 7.00% | | |
| CB-3-O4 | 5.00% | | |

additionally comprises 0.02% of ST-8-1.

Example M77

The liquid-crystalline mixture

| | | | |
|---|---|---|---|
| CC-V-V | 18.00%% | Clearing point [° C.]: | 77.8 |
| CC-3-V | 21.00% | Δn [589 nm, 20° C.]: | 0.1040 |
| CC-V-V1 | 10.00% | Δε [1 kHz, 20° C.]: | −3.2 |
| CCVC-V-V | 7.00% | $\varepsilon_{\parallel}$ [1 kHz, 20° C.]: | 3.7 |
| CCVC-3-V | 7.00% | $K_1$ [pN, 20° C.]: | 13.3 |
| CCC-2-V | 2.00% | $K_3$ [pN, 20° C.]: | 12.2 |
| CCC-3-V | 3.00% | $\gamma_1$ [mPa · s, 20° C.]: | 64 |
| B-4O-O4 | 3.00% | $V_0$ [20° C., V]: | 2.07 |
| B-3O-O4 | 8.50% | | |
| B-3O-O5 | 8.50% | | |
| PB-3-O4 | 7.00% | | |
| CB-3-O4 | 5.00% | | |

additionally comprises 0.02% of ST-12.

Example M78

The liquid-crystalline mixture

| | | | |
|---|---|---|---|
| CC-V-V | 38.00% | Clearing point [° C.]: | 74.0 |
| CCVC-V-V | 5.00% | Δn [589 nm, 20° C.]: | 0.1119 |
| CCVC-3-V | 10.00% | Δε [1 kHz, 20° C.]: | −4.8 |
| CCC-2-V | 3.00% | $\varepsilon_{\parallel}$ [1 kHz, 20° C.]: | 4.3 |
| CCC-3-V | 4.00% | $K_1$ [pN, 20° C.]: | 12.3 |
| B-4O-O4 | 2.00% | $K_3$ [pN, 20° C.]: | 11.0 |
| B-3O-O4 | 5.00% | $\gamma_1$ [mPa · s, 20° C.]: | 76 |
| B-3O-O5 | 7.00% | $V_0$ [20° C., V]: | 1.60 |
| PB-3-O4 | 6.00% | | |
| CB-3-O4 | 7.00% | | |
| B-2O-O5 | 8.00% | | |
| B-2O-O6 | 5.00% | | |

additionally comprises 0.025% of ST-8-1.

Example M79

The liquid-crystalline mixture

| | | | |
|---|---|---|---|
| CC-V-V | 25.00% | Clearing point [° C.]: | 81.0 |
| CCVC-V-V | 4.00% | Δn [589 nm, 20° C.]: | 0.1068 |
| CCVC-3-V | 9.00% | Δε [1 kHz, 20° C.]: | −4.2 |
| CCC-2-V | 3.00% | $\varepsilon_{\parallel}$ [1 kHz, 20° C.]: | 4.1 |
| CCC-3-V | 3.00% | $K_1$ [pN, 20° C.]: | 14.6 |
| B-3O-O4 | 4.00% | $K_3$ [pN, 20° C.]: | 11.8 |
| B-3O-O5 | 5.00% | $\gamma_1$ [mPa · s, 20° C.]: | 90 |
| PB-3-O4 | 4.00% | $V_0$ [20° C., V]: | 1.70 |
| CB-3-O4 | 7.00% | | |
| B-2O-O5 | 6.00% | | |
| B-2O-O6 | 5.00% | | |
| B-2O-O4 | 3.00% | | |
| B-1O-O4 | 3.00% | | |
| CCOC-3-3 | 3.00% | | |
| CCH-23 | 3.00% | | |
| CCH-34 | 10.00% | | |
| CCOC-4-3 | 3.00% | | |

additionally comprises 0.02% of ST-8-1 and 0.1% of ST-3a-1.

Example M80

The liquid-crystalline mixture

| | | | |
|---|---|---|---|
| CC-V-V | 28.00% | Clearing point [° C.]: | 55.5 |
| CCVC-V-V | 5.00% | Δε [1 kHz, 20° C.]: | −7.6 |
| CCVC-3-V | 10.00% | $\varepsilon_{\parallel}$ [1 kHz, 20° C.]: | 5.8 |
| CCC-2-V | 3.00% | $K_1$ [pN, 20° C.]: | 11.1 |
| CCC-3-V | 3.00% | $K_3$ [pN, 20° C.]: | 8.6 |

-continued

| | | | |
|---|---|---|---|
| B-4O-O4 | 3.00% | $\gamma_1$ [mPa · s, 20° C.]: | 90 |
| B-3O-O4 | 4.00% | $V_0$ [20° C., V]: | 1.12 |
| B-3O-O5 | 3.00% | | |
| B-4O-O5 | 3.00% | | |
| B-2O-O4 | 3.00% | | |
| B-2O-O5 | 5.00% | | |
| B-2O-O6 | 3.00% | | |
| B-1O-O5 | 3.00% | | |
| B-3O-O3 | 4.00% | | |
| B-3O-O6 | 3.00% | | |
| B-1O-O4 | 5.00% | | |
| B-2O-O5i | 5.00% | | |
| CCP-V-1 | 7.00% | | |

additionally comprises 0.02% of ST-8-1.

Example M81

The liquid-crystalline mixture

| | | | |
|---|---|---|---|
| CC-V-V | 35.00% | Clearing point [° C.]: | 67.5 |
| CCVC-V-V | 5.00% | Δε [1 kHz, 20° C.]: | −6.2 |
| CCVC-3-V | 8.00% | $\varepsilon_{\parallel}$ [1 kHz, 20° C.]: | 4.8 |
| CCC-2-V | 3.00% | $K_1$ [pN, 20° C.]: | 11.9 |
| CCC-3-V | 4.00% | $K_3$ [pN, 20° C.]: | 9.6 |
| B-4O-O4 | 2.00% | $\gamma_1$ [mPa · s, 20° C.]: | 86 |
| B-3O-O4 | 5.00% | $V_0$ [20° C., V]: | 1.32 |
| B-3O-O5 | 7.00% | | |
| PB-3-O4 | 6.00% | | |
| CB-3-O4 | 7.00% | | |
| B-2O-O5 | 8.00% | | |
| B-2O-O6 | 5.00% | | |
| B-3O-O3 | 5.00% | | |

additionally comprises 0.02% of ST-8-1.

Example M82

The liquid-crystalline mixture

| | | | |
|---|---|---|---|
| CC-V-V | 35.00% | Clearing point [° C.]: | 67.5 |
| CCVC-V-V | 5.00% | Δε [1 kHz, 20° C.]: | −6.2 |
| CCVC-3-V | 8.00% | $\varepsilon_{\parallel}$ [1 kHz, 20° C.]: | 4.8 |
| CCC-2-V | 3.00% | $K_1$ [pN, 20° C.]: | 11.9 |
| CCC-3-V | 4.00% | $K_3$ [pN, 20° C.]: | 9.6 |
| B-4O-O4 | 2.00% | $\gamma_1$ [mPa · s, 20° C.]: | 86 |
| B-3O-O4 | 5.00% | $V_0$ [20° C., V]: | 1.32 |
| B-3O-O5 | 7.00% | | |
| PB-3-O4 | 6.00% | | |
| CB-3-O4 | 7.00% | | |
| B-2O-O5 | 8.00% | | |
| B-2O-O6 | 5.00% | | |
| B-3O-O3 | 5.00% | | |

additionally comprises 0.03% of ST-12.

Example M83

The liquid-crystalline mixture

| | | | |
|---|---|---|---|
| CC-3-V | 10.00% | Clearing point [° C.]: | 74.5 |
| CC-3-V1 | 8.00% | Δn [589 nm, 20° C.]: | 0.1078 |
| CCH-23 | 10.00% | Δε [1 kHz, 20° C.]: | −3.3 |
| CCH-34 | 5.00% | $\varepsilon_{\parallel}$ [1 kHz, 20° C.]: | 3.5 |
| CCP-3-1 | 7.00% | $K_1$ [pN, 20° C.]: | 14.6 |
| CCY-3-O1 | 5.00% | $K_3$ [pN, 20° C.]: | 15.7 |
| CCY-3-O2 | 11.00% | $\gamma_1$ [mPa · s, 20° C.]: | 101 |
| CCY-4-O2 | 4.50% | $V_0$ [20° C., V]: | 2.32 |
| CPY-3-O2 | 3.00% | | |
| CY-3-O2 | 12.00% | | |

-continued

| | | | |
|---|---|---|---|
| PY-3-O2 | 8.50% | | |
| PYP-2-3 | 8.00% | | |
| B-2O-O5 | 4.00% | | |
| PP-1-2V1 | 4.00% | | |

additionally comprises 0.03% of ST-9-1.

Example M84

The liquid-crystalline mixture

| | | | |
|---|---|---|---|
| CC-3-V | 15.00% | Clearing point [° C.]: | 74.0 |
| CC-3-V1 | 8.00% | Δn [589 nm, 20° C.]: | 0.1078 |
| CCH-23 | 10.00% | Δε [1 kHz, 20° C.]: | −3.1 |
| CCH-34 | 7.00% | $\varepsilon_{\parallel}$ [1 kHz, 20° C.]: | 3.5 |
| CCY-3-O1 | 8.00% | $K_1$ [pN, 20° C.]: | 14.6 |
| CCY-3-O2 | 11.00% | $K_3$ [pN, 20° C.]: | 15.1 |
| CCY-4-O2 | 3.50% | $\gamma_1$ [mPa · s, 20° C.]: | 94 |
| CPY-3-O2 | 6.00% | $V_0$ [20° C., V]: | 2.32 |
| CY-3-O2 | 5.50% | | |
| PY-3-O2 | 10.00% | | |
| PYP-2-3 | 8.00% | | |
| B-2O-O5 | 4.00% | | |
| PP-1-2V1 | 4.00% | | |

additionally comprises 0.03% of ST-8-1.

Example M85

The liquid-crystalline mixture

| | | | |
|---|---|---|---|
| CC-3-V | 42.50% | Clearing point [° C.]: | 75.0 |
| CCP-3-1 | 4.50% | Δn [589 nm, 20° C.]: | 0.0984 |
| CCY-3-O1 | 9.00% | Δε [1 kHz, 20° C.]: | −3.2 |
| CCY-3-O2 | 11.00% | $\varepsilon_{\parallel}$ [1 kHz, 20° C.]: | 3.6 |
| CPY-3-O2 | 8.00% | $K_1$ [pN, 20° C.]: | 13.5 |
| CPY-2-O2 | 4.50% | $K_3$ [pN, 20° C.]: | 15.1 |
| CY-3-O2 | 3.00% | $\gamma_1$ [mPa · s, 20° C.]: | 81 |
| PY-3-O2 | 13.50% | $V_0$ [20° C., V]: | 2.29 |
| B-2O-O5 | 4.00% | | |

additionally comprises 0.025% of ST-8-1.

Example M86

The liquid-crystalline mixture

| | | | |
|---|---|---|---|
| CC-3-V | 45.00% | Clearing point [° C.]: | 75.0 |
| CCP-3-1 | 3.00% | Δn [589 nm, 20° C.]: | 0.0991 |
| CCY-3-O1 | 8.50% | Δε [1 kHz, 20° C.]: | −3.3 |
| CCY-3-O2 | 11.00% | $\varepsilon_{\parallel}$ [1 kHz, 20° C.]: | 3.6 |
| CCY-4-O2 | 1.50% | $K_1$ [pN, 20° C.]: | 13.8 |
| CPY-3-O2 | 11.50% | $K_3$ [pN, 20° C.]: | 15.3 |
| PY-3-O2 | 12.50% | $\gamma_1$ [mPa · s, 20° C.]: | 80 |
| B-2O-O5 | 4.00% | $V_0$ [20° C., V]: | 2.28 |
| B-3-O2 | 3.00% | | |

additionally comprises 0.03% of ST-8-1.

Example M87

The liquid-crystalline mixture

| | | | |
|---|---|---|---|
| CC-3-V1 | 8.00% | Clearing point [° C.]: | 74.0 |
| CCH-23 | 18.00% | Δn [589 nm, 20° C.]: | 0.0978 |
| CCH-34 | 3.00% | Δε [1 kHz, 20° C.]: | −3.4 |
| CCH-35 | 4.00% | $\varepsilon_{\parallel}$ [1 kHz, 20° C.]: | 3.6 |
| CCP-3-1 | 14.00% | $K_1$ [pN, 20° C.]: | 14.9 |
| CCY-3-O2 | 11.00% | $K_3$ [pN, 20° C.]: | 16.1 |
| CCY-3-O1 | 2.00% | $\gamma_1$ [mPa · s, 20° C.]: | 102 |
| CPY-3-O2 | 11.00% | $V_0$ [20° C., V]: | 2.28 |
| CY-3-O2 | 10.50% | | |
| PY-3-O2 | 12.50% | | |
| B-2O-O5 | 3.00% | | |
| Y-4O-O4 | 3.00% | | |

additionally comprises 0.025% of ST-8-1.

| Comparison | VHR after UV |
|---|---|
| M87 without stabiliser | 83% |
| M87 with stabiliser (0.025% of ST-8-1) | 90% |

Example M88

The liquid-crystalline mixture

| | | | |
|---|---|---|---|
| CC-3-V1 | 8.00% | Clearing point [° C.]: | 74.0 |
| CCH-23 | 18.00% | Δn [589 nm, 20° C.]: | 0.0978 |
| CCH-34 | 3.00% | Δε [1 kHz, 20° C.]: | −3.4 |
| CCH-35 | 4.00% | $\varepsilon_{\parallel}$ [1 kHz, 20° C.]: | 3.6 |
| CCP-3-1 | 14.00% | $K_1$ [pN, 20° C.]: | 14.9 |
| CCY-3-O2 | 11.00% | $K_3$ [pN, 20° C.]: | 16.1 |
| CCY-3-O1 | 2.00% | $\gamma_1$ [mPa · s, 20° C.]: | 102 |
| CPY-3-O2 | 11.00% | $V_0$ [20° C., V]: | 2.28 |
| CY-3-O2 | 10.50% | | |
| PY-3-O2 | 12.50% | | |
| B-2O-O5 | 3.00% | | |
| Y-4O-O4 | 3.00% | | |

additionally comprises 0.01% of ST-9-1.

| Comparison | VHR after UV |
|---|---|
| M88 without stabiliser | 83% |
| M88 with stabiliser (0.01% of ST-9-1) | 89% |

Example M89

The liquid-crystalline mixture

| | | | |
|---|---|---|---|
| CC-3-V1 | 7.00% | Clearing point [° C.]: | 73.0 |
| CCH-23 | 18.00% | Δn [589 nm, 20° C.]: | 0.0969 |
| CCH-34 | 3.00% | Δε [1 kHz, 20° C.]: | −3.4 |
| CCH-35 | 4.00% | $\varepsilon_{\parallel}$ [1 kHz, 20° C.]: | 3.6 |
| CCP-3-1 | 14.00% | $K_1$ [pN, 20° C.]: | 14.6 |
| CCY-3-O2 | 11.00% | $K_3$ [pN, 20° C.]: | 15.8 |
| CCY-3-O1 | 3.00% | $\gamma_1$ [mPa · s, 20° C.]: | 102 |
| CPY-3-O2 | 11.00% | $V_0$ [20° C., V]: | 2.29 |
| CY-3-O2 | 12.00% | | |
| PY-3-O2 | 11.00% | | |
| Y-4O-O4 | 3.00% | | |
| B-2-O2 | 3.00% | | |

additionally comprises 0.01% of ST-9-1.

Example M90

For the preparation of a PS-VA mixture, 99.7% of the mixture according to Example M34 are mixed with 0.3% of the polymerisable compound of the formula

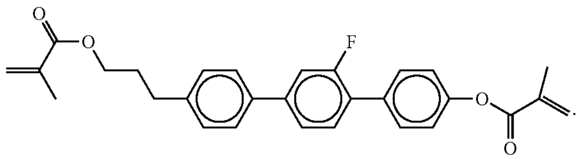

Example M91

For the preparation of a PS-VA mixture, 99.75% of the mixture according to Example M34 are mixed with 0.25% of the polymerisable compound of the formula

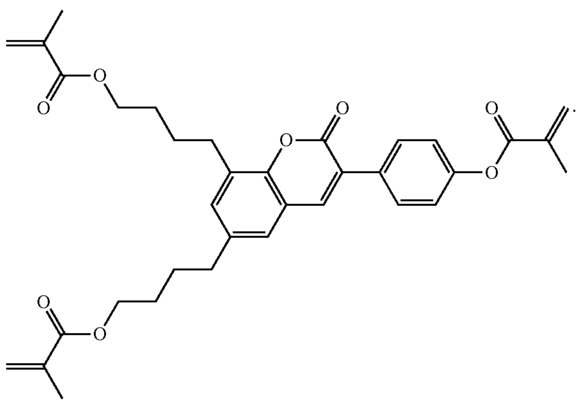 [SMILES: C=C(C)C(=O)OCCCCc1cc(CCCCOC(=O)C(=C)C)c2oc(=O)c(-c3ccc(OC(=O)C(=C)C)cc3)cc2c1]

Example M92

For the preparation of a PS-VA mixture, 99.8% of the mixture according to Example M35 are mixed with 0.2% of the polymerisable compound of the formula

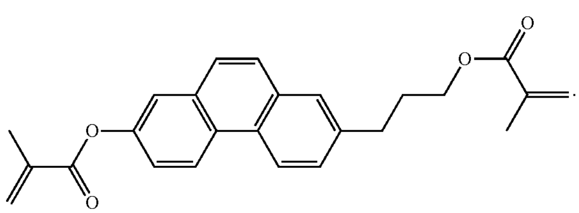 [SMILES: C=C(C)C(=O)OCCCc1ccc2c(ccc3cc(OC(=O)C(=C)C)ccc32)c1]

Example M93

For the preparation of a PS-VA mixture, 99.75% of the mixture according to Example M63 are mixed with 0.25% of the polymerisable compound of the formula

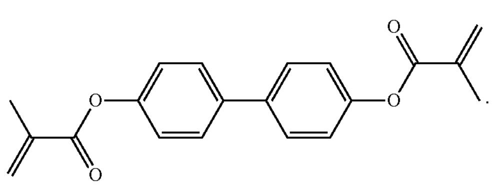 [SMILES: C=C(C)C(=O)Oc1ccc(-c2ccc(OC(=O)C(=C)C)cc2)cc1]

Example M94

For the preparation of a PS-VA mixture, 99.75% of the mixture according to Example M63 are mixed with 0.25% of the polymerisable compound of the formula

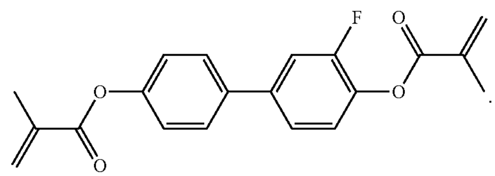

Example M95

For the preparation of a PS-VA mixture, 99.75% of the mixture according to Example M63 are mixed with 0.3% of the polymerisable compound of the formula

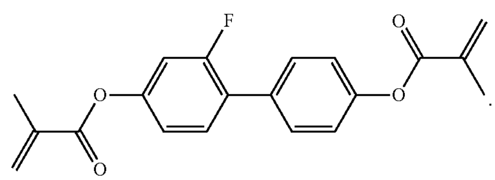 [SMILES: C=C(C)C(=O)Oc1ccc(-c2ccc(OC(=O)C(=C)C)cc2F)cc1]

Example M96

For the preparation of a PS-VA mixture, 99.8% of the mixture according to Example M65 are mixed with 0.2% of the polymerisable compound of the formula

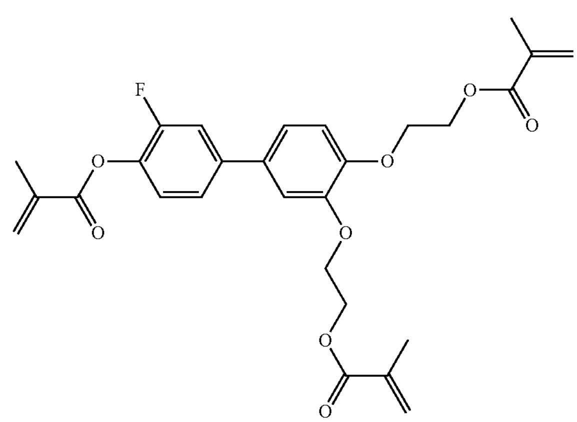

Example M97

For the preparation of a PS-VA mixture, 99.8% of the mixture according to Example M70 are mixed with 0.2% of the polymerisable compound of the formula

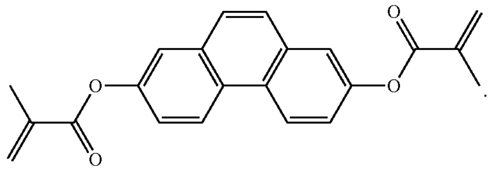 [SMILES: C=C(C)C(=O)Oc1ccc2c(ccc3cc(OC(=O)C(=C)C)ccc32)c1]

Example M98

For the preparation of a PS-VA mixture, 99.75% of the mixture according to Example M71 are mixed with 0.25% of the polymerisable compound of the formula

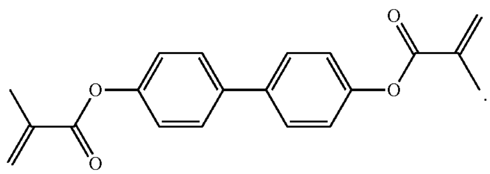

Example M99

For the preparation of a PS-VA mixture, 99.7% of the mixture according to Example M72 are mixed with 0.3% of the polymerisable compound of the formula

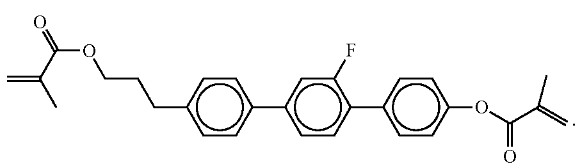

Example M100

The liquid-crystalline mixture

| | | | |
|---|---|---|---|
| CC-V-V | 31.50% | Clearing point [° C.]: | 75.0 |
| CCP-3-1 | 5.00% | Δn [589 nm, 20° C.]: | 0.0949 |
| CCY-2-1 | 12.00% | Δε [1 kHz, 20° C.]: | −3.8 |
| CCY-3-O1 | 7.50% | $\varepsilon_{\parallel}$ [1 kHz, 20° C.]: | 3.7 |
| CCY-3-O2 | 8.00% | $K_1$ [pN, 20° C.]: | 11.4 |
| CLY-3-O2 | 5.50% | $K_3$ [pN, 20° C.]: | 14.2 |
| CLY-3-O3 | 4.00% | $\gamma_1$ [mPa · s, 20° C.]: | 88 |
| CPY-2-O2 | 4.50% | $V_0$ [20° C., V]: | 2.04 |
| CPY-3-O2 | 3.00% | | |
| CY-3-O2 | 11.00% | | |
| PY-1-O4 | 4.00% | | |
| B-2O-O5 | 4.00% | | |

additionally comprises 0.03% of ST-12.

Example M101

The liquid-crystalline mixture

| | | | |
|---|---|---|---|
| CC-3-V | 36.50% | Clearing point [° C.]: | 80.0 |
| CCY-3-O1 | 6.00% | Δn [589 nm, 20° C.]: | 0.1028 |
| CCY-3-O2 | 6.00% | Δε [1 kHz, 20° C.]: | −4.4 |
| CCY-4-O2 | 2.50% | $\varepsilon_{\parallel}$ [1 kHz, 20° C.]: | 3.8 |
| CLY-3-O2 | 7.00% | $K_1$ [pN, 20° C.]: | 14.2 |
| CLY-3-O3 | 3.00% | $K_3$ [pN, 20° C.]: | 15.9 |
| CPY-2-O2 | 7.00% | $\gamma_1$ [mPa · s, 20° C.]: | 108 |
| CPY-3-O2 | 10.00% | $V_0$ [20° C., V]: | 2.01 |
| CY-3-O2 | 11.50% | | |
| PY-3-O2 | 5.50% | | |
| B-2O-O5 | 5.00% | | |

additionally comprises 0.025% of ST-8-1.

Example M102

The liquid-crystalline mixture

| | | | |
|---|---|---|---|
| CY-3-O2 | 9.00% | Clearing point [° C.]: | 87.0 |
| CY-3-O4 | 7.00% | Δn [589 nm, 20° C.]: | 0.1026 |
| PY-3-O2 | 3.00% | Δε [1 kHz, 20° C.]: | −4.9 |
| CCY-3-O1 | 8.00% | $\varepsilon_{\parallel}$ [1 kHz, 20° C.]: | 3.9 |
| CCY-3-O2 | 11.00% | $K_1$ [pN, 20° C.]: | 14.5 |
| CCY-4-O2 | 10.00% | $K_3$ [pN, 20° C.]: | 16.7 |
| CPY-2-O2 | 6.50% | $\gamma_1$ [mPa · s, 20° C.]: | 142 |
| CPY-3-O2 | 12.00% | $V_0$ [20° C., V]: | 1.95 |
| CC-3-V | 29.50% | | |
| B-2O-O5 | 4.00% | | |

additionally comprises 0.025% of ST-8-1.

Example M103

The liquid-crystalline mixture

| | | | |
|---|---|---|---|
| CY-3-O2 | 12.50% | Clearing point [° C.]: | 87.0 |
| CCY-3-O1 | 9.00% | Δn [589 nm, 20° C.]: | 0.1025 |
| CCY-3-O2 | 11.00% | Δε [1 kHz, 20° C.]: | −4.8 |
| CCY-4-O2 | 7.00% | $\varepsilon_{\parallel}$ [1 kHz, 20° C.]: | 3.8 |
| CPY-3-O2 | 3.00% | $K_1$ [pN, 20° C.]: | 14.1 |
| CC-3-V | 31.00% | $K_3$ [pN, 20° C.]: | 16.8 |
| B-2O-O5 | 4.00% | $\gamma_1$ [mPa · s, 20° C.]: | 127 |
| PY-V2-O2 | 5.50% | $V_0$ [20° C., V]: | 1.97 |
| CPY-V-O2 | 6.00% | | |
| CPY-V-O4 | 5.00% | | |
| CCY-V-O2 | 6.00% | | |

additionally comprises 0.025% of ST-12.

Example M104

The liquid-crystalline mixture

| | | | |
|---|---|---|---|
| CC-3-V | 34.50% | Clearing point [° C.]: | 74.0 |
| CC-3-V1 | 8.00% | Δn [589 nm, 20° C.]: | 0.1072 |
| CCY-3-O1 | 5.50% | Δε [1 kHz, 20° C.]: | −3.0 |
| CCY-3-O2 | 11.50% | $\varepsilon_{\parallel}$ [1 kHz, 20° C.]: | 3.5 |
| PY-3-O2 | 7.50% | $K_1$ [pN, 20° C.]: | 14.0 |
| PP-1-2V1 | 7.00% | $K_3$ [pN, 20° C.]: | 15.8 |
| B-2O-O5 | 4.00% | $\gamma_1$ [mPa · s, 20° C.]: | 78 |
| PY-V2-O2 | 5.00% | $V_0$ [20° C., V]: | 2.43 |
| CPY-V-O2 | 6.00% | | |
| CPY-V-O4 | 5.00% | | |
| CCY-V-O2 | 6.00% | | |

additionally comprises 0.025% of ST-8-1.

Example M105

| | | | |
|---|---|---|---|
| CC-3-V | 42.00% | Clearing point [° C.]: | 74.5 |
| CCP-3-1 | 5.00% | $\Delta n$ [589 nm, 20° C.]: | 0.0997 |
| CCY-3-O1 | 3.00% | $\Delta\varepsilon$ [1 kHz, 20° C.]: | −3.3 |
| CCY-3-O2 | 11.00% | $\varepsilon_{\parallel}$ [1 kHz, 20° C.]: | 3.6 |
| CCY-V-O2 | 6.00% | $K_1$ [pN, 20° C.]: | 13.0 |
| CPY-V-O2 | 6.50% | $K_3$ [pN, 20° C.]: | 14.9 |
| CPY-V-O4 | 5.00% | $\gamma_1$ [mPa · s, 20° C.]: | 75 |
| CY-3-O2 | 3.50% | $V_0$ [20° C., V]: | 2.26 |
| PY-3-O2 | 5.00% | | |
| B-2O-O5 | 4.00% | | |
| PY-V2-O2 | 9.00% | | |

additionally comprises 0.025% of ST-8-1.

Example M106

For the preparation of a PS (polymer-stabilised) mixture, for example for PS-IPS, PS-VA, PS-FFS applications, 99.7% of the mixture according to Example M100 are mixed with 0.3% of the polymerisable compound of the formula

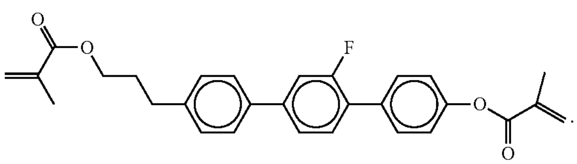

Example M107

For the preparation of a PS (polymer-stabilised) mixture, for example for PS-IPS, PS-VA, PS-FFS applications, 99.75% of the mixture according to Example M100 are mixed with 0.25% of the polymerisable compound of the formula

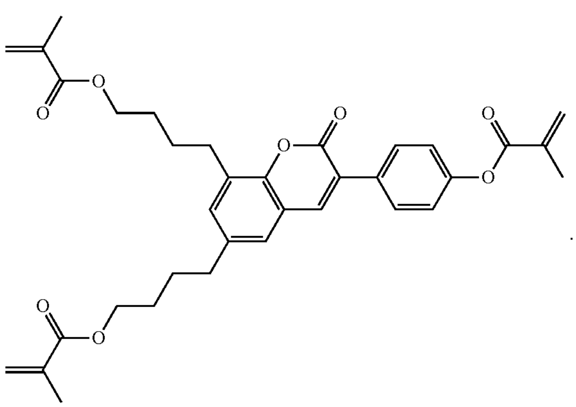 [SMILES: C=C(C)C(=O)OCCCCc1cc(CCCCOC(=O)C(=C)C)c2oc(=O)c(-c3ccc(OC(=O)C(=C)C)cc3)cc2c1]

Example M108

For the preparation of a PS-VA mixture, 99.8% of the mixture according to Example M101 are mixed with 0.2% of the polymerisable compound of the formula

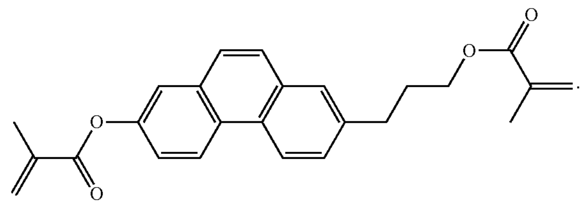 [SMILES: C=C(C)C(=O)OCCCc1ccc2c(ccc3cc(OC(=O)C(=C)C)ccc32)c1]

Example M109

For the preparation of a PS-VA mixture, 99.75% of the mixture according to Example M102 are mixed with 0.25% of the polymerisable compound of the formula

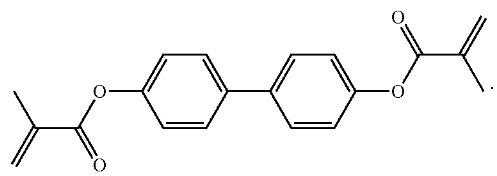

Example M110

For the preparation of a PS-VA mixture, 99.75% of the mixture according to Example M102 are mixed with 0.25% of the polymerisable compound of the formula

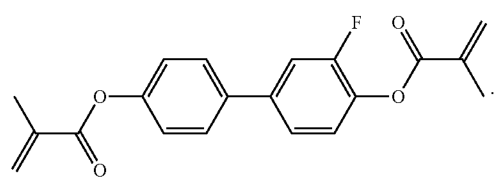 [SMILES: C=C(C)C(=O)Oc1ccc(-c2ccc(OC(=O)C(=C)C)c(F)c2)cc1]

Example M111

For the preparation of a PS (polymer-stabilised) mixture, for example for PS-IPS, PS-VA, PS-FFS applications, 99.7% of the mixture according to Example M102 are mixed with 0.3% of the polymerisable compound of the formula

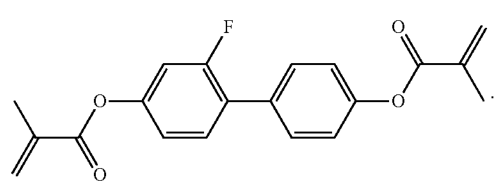 [SMILES: C=C(C)C(=O)Oc1ccc(-c2ccc(OC(=O)C(=C)C)cc2F)cc1]

Example M112

For the preparation of a PS-VA mixture, 99.8% of the mixture according to Example M102 are mixed with 0.2% of the polymerisable compound of the formula

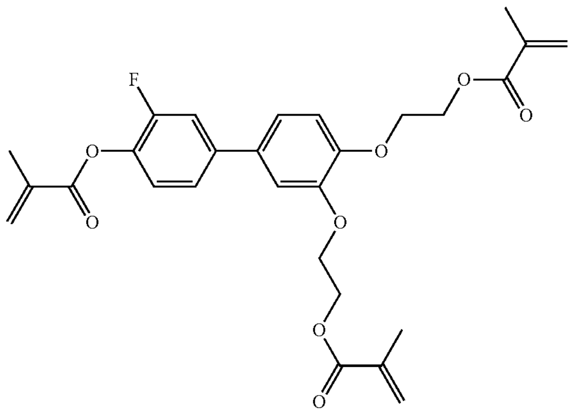

Example M113

For the preparation of a PS-VA mixture, 99.8% of the mixture according to Example M103 are mixed with 0.2% of the polymerisable compound of the formula

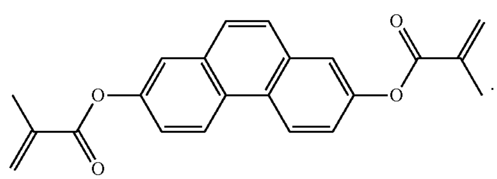 [SMILES: C=C(C)C(=O)Oc1ccc2c(ccc3cc(OC(=O)C(=C)C)ccc32)c1]

Example M114

For the preparation of a PS-VA mixture, 99.75% of the mixture according to Example M104 are mixed with 0.25% of the polymerisable compound of the formula

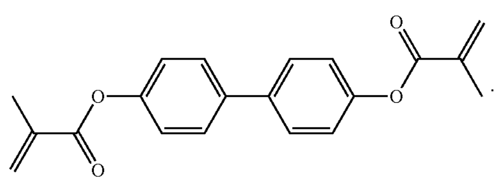 [SMILES: C=C(C)C(=O)Oc1ccc(-c2ccc(OC(=O)C(=C)C)cc2)cc1]

Example M115

For the preparation of a PS-VA mixture, 99.7% of the mixture according to Example M104 are mixed with 0.3% of the polymerisable compound of the formula

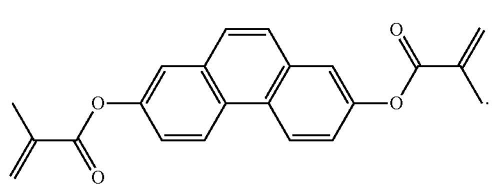 [SMILES: C=C(C)C(=O)Oc1ccc2c(ccc3cc(OC(=O)C(=C)C)ccc32)c1]

Example M116

For the preparation of a PS-VA mixture, 99.7% of the mixture according to Example M104 are mixed with 0.3% of the polymerisable compound of the formula

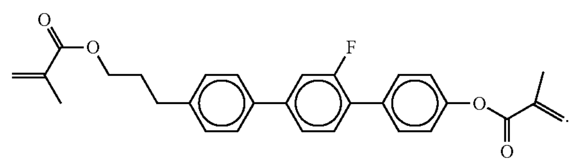

Example M117

For the preparation of a PS-VA mixture, 99.75% of the mixture according to Example M104 are mixed with 0.25% of the polymerisable compound of the formula

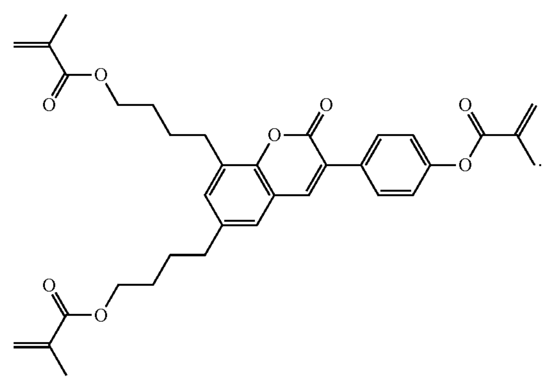 [SMILES: C=C(C)C(=O)OCCCCc1cc(CCCCOC(=O)C(=C)C)c2oc(=O)c(-c3ccc(OC(=O)C(=C)C)cc3)cc2c1]

Example M118

For the preparation of a PS-VA mixture, 99.7% of the mixture according to Example M104 are mixed with 0.3% of the polymerisable compound of the formula

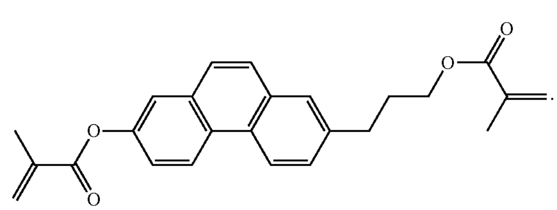 [SMILES: C=C(C)C(=O)OCCCc1ccc2c(ccc3cc(OC(=O)C(=C)C)ccc32)c1]

Example M119

For the preparation of a PS-VA mixture, 99.75% of the mixture according to Example M105 are mixed with 0.25% of the polymerisable compound of the formula

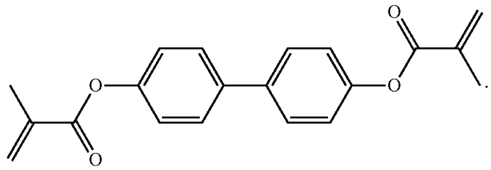

Example M120

For the preparation of a PS-VA mixture, 99.75% of the mixture according to Example M105 are mixed with 0.25% of the polymerisable compound of the formula

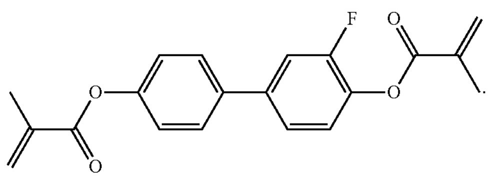 [SMILES: C=C(C)C(=O)Oc1ccc(-c2ccc(OC(=O)C(=C)C)c(F)c2)cc1]

Example M121

For the preparation of a PS-VA mixture, 99.75% of the mixture according to Example M105 are mixed with 0.25% of the polymerisable compound of the formula

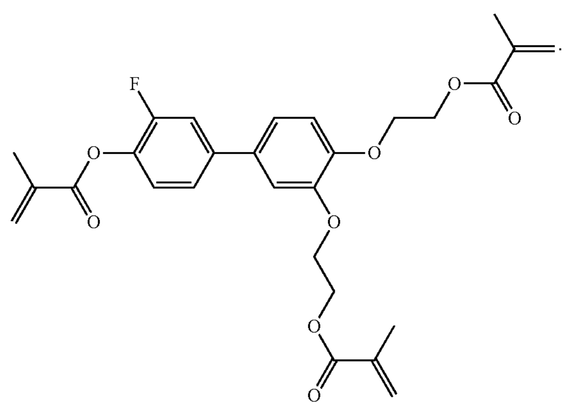 [SMILES: C=C(C)C(=O)OCCOc1ccc(-c2ccc(OC(=O)C(=C)C)c(F)c2)cc1OCCOC(=O)C(=C)C]

Example M122

For the preparation of a PS-VA mixture, 99.75% of the mixture according to Example M105 are mixed with 0.25% of the polymerisable compound of the formula

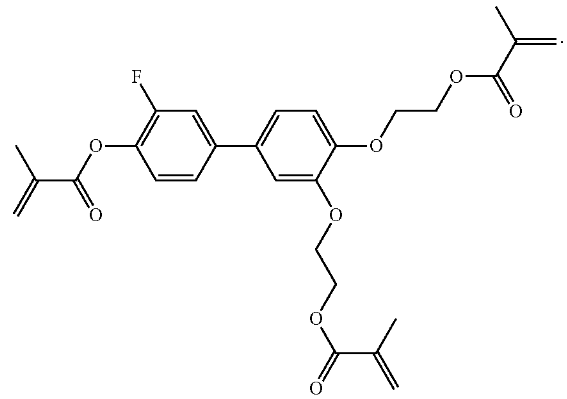 [SMILES: C=C(C)C(=O)OCCOc1ccc(-c2ccc(OC(=O)C(=C)C)c(F)c2)cc1OCCOC(=O)C(=C)C]

Example M123

For the preparation of a PS-VA mixture, 99.8% of the mixture according to Example M105 are mixed with 0.3% of the polymerisable compound of the formula

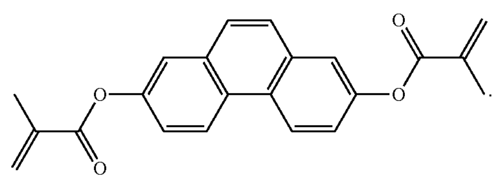 [SMILES: C=C(C)C(=O)Oc1ccc2c(ccc3cc(OC(=O)C(=C)C)ccc32)c1]

Example M124

The liquid-crystalline mixture

| | | | |
|---|---|---|---|
| CC-3-V | 17.00% | Clearing point [° C.]: | 75.5 |
| CC-V-V | 20.00% | Δn [589 nm, 20° C.]: | 0.1079 |
| CC-3-V1 | 8.00% | $\varepsilon_{\parallel}$ [1 kHz, 20° C.]: | 3.4 |
| CCY-3-O1 | 6.00% | $\varepsilon_{\perp}$ [1 kHz, 20° C.]: | 6.1 |
| CCY-3-O2 | 10.00% | Δε [1 kHz, 20° C.]: | −2.7 |
| CCY-4-O2 | 2.50% | $K_1$ [pN, 20° C.]: | 12.5 |
| CPY-2-O2 | 5.50% | $K_3$ [pN, 20° C.]: | 14.8 |
| CPY-3-O2 | 11.50% | $V_0$ [pN, 20° C.]: | 2.45 |
| PY-3-O2 | 8.50% | $\gamma_1$ [mPa · s, 20° C.]: | 75 |
| PYP-2-3 | 5.00% | | |
| PP-1-2V1 | 3.00% | | |
| B-3O-O5 | 3.00% | | |

additionally comprises 0.025% of ST-8-1.

Example M125

The liquid-crystalline mixture

| | | | |
|---|---|---|---|
| CC-3-V | 20.50% | Clearing point [° C.]: | 74.5 |
| CC-V-V | 15.00% | Δn [589 nm, 20° C.]: | 0.1095 |
| CC-3-V1 | 8.00% | $\varepsilon_{\parallel}$ [1 kHz, 20° C.]: | 3.5 |
| CLY-3-O2 | 6.00% | $\varepsilon_{\perp}$ [1 kHz, 20° C.]: | 6.3 |
| CCY-3-O2 | 11.50% | Δε [1 kHz, 20° C.]: | −2.9 |
| CCY-4-O2 | 4.00% | $K_1$ [pN, 20° C.]: | 13.5 |
| CPY-3-O2 | 7.50% | $K_3$ [pN, 20° C.]: | 15.2 |
| BCH-32 | 3.50% | $V_0$ [pN, 20° C.]: | 2.43 |
| PY-3-O2 | 11.50% | $\gamma_1$ [mPa · s, 20° C.]: | 77 |

-continued

| | |
|---|---|
| PGIY-2-O4 | 4.50% |
| PP-1-2V1 | 4.00% |
| B-2O-O5 | 4.00% |

additionally comprises 0.025% of ST-2a-1.

Example M126

The liquid-crystalline mixture

| | | | |
|---|---|---|---|
| CC-V-V | 36.00% | Clearing point [° C.]: | 75 |
| CC-3-V1 | 8.00% | Δn [589 nm, 20° C.]: | 0.1076 |
| CLY-3-O2 | 6.00% | $\varepsilon_{\parallel}$ [1 kHz, 20° C.]: | 3.4 |
| CCY-3-O2 | 11.50% | $\varepsilon_{\perp}$ [1 kHz, 20° C.]: | 6.0 |
| CCY-4-O2 | 5.00% | Δε [1 kHz, 20° C.]: | −2.7 |
| CPY-3-O2 | 7.50% | $K_1$ [pN, 20° C.]: | 12.0 |
| BCH-32 | 7.00% | $K_3$ [pN, 20° C.]: | 14.3 |
| PY-3-O2 | 8.00% | $V_0$ [pN, 20° C.]: | 2.46 |
| PGIY-2-O4 | 4.50% | $\gamma_1$ [mPa · s, 20° C.]: | 70 |
| PP-1-2V1 | 2.50% | | |
| B-2O-O5 | 4.00% | | |

additionally comprises 0.03% of ST-12.

Example M127

The liquid-crystalline mixture

| | | | |
|---|---|---|---|
| CC-V-V | 34.00% | Clearing point [° C.]: | 75.5 |
| CC-3-V1 | 8.00% | Δn [589 nm, 20° C.]: | 0.1085 |
| CCY-3-O1 | 7.00% | $\varepsilon_{\parallel}$ [1 kHz, 20° C.]: | 3.4 |
| CCY-3-O2 | 11.50% | $\varepsilon_{\perp}$ [1 kHz, 20° C.]: | 6.1 |
| CCY-4-O2 | 5.00% | Δε [1 kHz, 20° C.]: | −2.7 |
| CPY-3-O2 | 7.50% | $K_1$ [pN, 20° C.]: | 12.0 |
| BCH-32 | 7.00% | $K_3$ [pN, 20° C.]: | 14.4 |
| PY-3-O2 | 8.00% | $V_0$ [pN, 20° C.]: | 2.44 |
| PGIY-2-O4 | 4.50% | $\gamma_1$ [mPa · s, 20° C.]: | 74 |
| PP-1-2V1 | 3.50% | | |
| B-2O-O5 | 4.00% | | |

additionally comprises 0.025% of ST-8-1.

Example M128

The liquid-crystalline mixture

| | | | |
|---|---|---|---|
| CC-3-V | 9.50% | Clearing point [° C.]: | 74.0 |
| CC-V-V | 29.00% | Δn [589 nm, 20° C.]: | 0.0989 |
| CCP-3-1 | 10.00% | $\varepsilon_{\parallel}$ [1 kHz, 20° C.]: | 3.6 |
| CCY-3-O1 | 8.50% | $\varepsilon_{\perp}$ [1 kHz, 20° C.]: | 6.7 |
| CCY-3-O2 | 11.00% | Δε [1 kHz, 20° C.]: | −3.2 |
| CPY-2-O2 | 2.00% | $K_1$ [pN, 20° C.]: | 11.8 |
| CPY-3-O2 | 11.00% | $K_3$ [pN, 20° C.]: | 14.8 |
| CY-3-O2 | 5.00% | $V_0$ [pN, 20° C.]: | 2.28 |
| PY-3-O2 | 10.00% | $\gamma_1$ [mPa · s, 20° C.]: | 76 |
| B-2O-O5 | 4.00% | | |

additionally comprises 0.025% of ST-8-1.

Example M129

The liquid-crystalline mixture

| | | | |
|---|---|---|---|
| CC-3-V | 15.50% | Clearing point [° C.]: | 74.5 |
| CC-V-V | 20.00% | Δn [589 nm, 20° C.]: | 0.1075 |
| CC-3-V1 | 8.00% | $\varepsilon_{\parallel}$ [1 kHz, 20° C.]: | 3.5 |
| CCY-3-O1 | 8.00% | $\varepsilon_{\perp}$ [1 kHz, 20° C.]: | 6.5 |
| CCY-3-O2 | 11.50% | Δε [1 kHz, 20° C.]: | −3.0 |
| CCY-4-O2 | 4.50% | $K_1$ [pN, 20° C.]: | 12.9 |
| CPY-3-O2 | 8.50% | $K_3$ [pN, 20° C.]: | 15.0 |
| PY-2-O2 | 6.50% | $V_0$ [pN, 20° C.]: | 2.35 |
| PGIY-2-O4 | 5.00% | $\gamma_1$ [mPa · s, 20° C.]: | 76 |
| PP-1-2V1 | 6.50% | LTS bulk [−20° C.]: | >1000 h |
| B(S)-2O-O5 | 3.00% | | |
| B-2O-O5 | 3.00% | | |

additionally comprises 0.1% of ST-8-1.

Example M130

The liquid-crystalline mixture

| | | | |
|---|---|---|---|
| CC-3-V | 17.50% | Clearing point [° C.]: | 74 |
| CC-V-V | 20.00% | Δn [589 nm, 20° C.]: | 0.1074 |
| CC-3-V1 | 8.00% | $\varepsilon_{\parallel}$ [1 kHz, 20° C.]: | 3.5 |
| CCY-3-O1 | 8.00% | $\varepsilon_{\perp}$ [1 kHz, 20° C.]: | 6.4 |
| CCY-3-O2 | 12.00% | Δε [1 kHz, 20° C.]: | −2.9 |
| CPY-3-O2 | 12.00% | $K_1$ [pN, 20° C.]: | 12.7 |
| PY-2-O2 | 6.00% | $K_3$ [pN, 20° C.]: | 15.1 |
| PGIY-2-O4 | 4.50% | $V_0$ [pN, 20° C.]: | 2.41 |
| PP-1-2V1 | 6.00% | $\gamma_1$ [mPa · s, 20° C.]: | 72 |
| B(S)-2O-O5 | 3.00% | | |
| B-2O-O5 | 3.00% | | |

additionally comprises 0.025% of ST-8-1.

Example M131

The liquid-crystalline mixture

| | | | |
|---|---|---|---|
| CC-3-V | 22.00% | Clearing point [° C.]: | 76 |
| CC-V-V | 20.00% | Δn [589 nm, 20° C.]: | 0.0946 |
| CCY-3-O1 | 8.00% | $\varepsilon_{\parallel}$ [1 kHz, 20° C.]: | 3.7 |
| CCY-3-O2 | 12.00% | $\varepsilon_{\perp}$ [1 kHz, 20° C.]: | 7.5 |
| CCY-4-O2 | 2.50% | Δε [1 kHz, 20° C.]: | −3.9 |
| CLY-3-O2 | 6.00% | $K_1$ [pN, 20° C.]: | 12.4 |
| CLY-3-O3 | 9.50% | $K_3$ [pN, 20° C.]: | 14.3 |
| CPY-3-O2 | 1.50% | $V_0$ [pN, 20° C.]: | 2.04 |
| CY-3-O2 | 2.50% | $\gamma_1$ [mPa · s, 20° C.]: | 78 |
| B-2O-O5 | 3.00% | | |
| B(S)-2O-O5 | 3.00% | | |
| PY-2-O2 | 10.00% | | |

additionally comprises 0.025% of ST-8-1.

Example M132

The liquid-crystalline mixture

| | | | |
|---|---|---|---|
| CC-3-V | 20.50% | Clearing point [° C.]: | 76 |
| CC-V-V | 20.00% | Δn [589 nm, 20° C.]: | 0.0945 |
| CCY-3-O1 | 8.00% | $\varepsilon_{\parallel}$ [1 kHz, 20° C.]: | 3.7 |
| CCY-3-O2 | 11.50% | $\varepsilon_{\perp}$ [1 kHz, 20° C.]: | 7.6 |
| CCY-4-O2 | 4.00% | Δε [1 kHz, 20° C.]: | −3.9 |
| CPY-2-O2 | 6.00% | $K_1$ [pN, 20° C.]: | 11.9 |
| CPY-3-O2 | 11.00% | $K_3$ [pN, 20° C.]: | 14.7 |
| CY-3-O2 | 13.50% | $V_0$ [pN, 20° C.]: | 2.05 |
| B-2O-O5 | 3.00% | $\gamma_1$ [mPa · s, 20° C.]: | 84 |
| B(S)-2O-O5 | 2.50% | | |

additionally comprises 0.025% of ST-8-1.

Example M133

The liquid-crystalline mixture

| | | | |
|---|---|---|---|
| CC-3-V | 19.50% | Clearing point [° C.]: | 75.5 |
| CC-V-V | 23.00% | Δn [589 nm, 20° C.]: | 0.0989 |
| CCP-3-1 | 5.50% | $\varepsilon_{\parallel}$ [1 kHz, 20° C.]: | 3.5 |
| CCY-3-O1 | 8.00% | $\varepsilon_{\perp}$ [1 kHz, 20° C.]: | 6.6 |
| CCY-3-O2 | 11.00% | Δε [1 kHz, 20° C.]: | −3.1 |
| CCY-4-O2 | 4.00% | $K_1$ [pN, 20° C.]: | 12.2 |
| CPY-3-O2 | 12.00% | $K_3$ [pN, 20° C.]: | 14.8 |
| PY-3-O2 | 13.00% | $V_0$ [pN, 20° C.]: | 2.30 |
| B-2O-O5 | 4.00% | $\gamma_1$ [mPa · s, 20° C.]: | 75 |

additionally comprises 0.025% of ST-8-1.

Example M134

The liquid-crystalline mixture

| | | | |
|---|---|---|---|
| CC-V-V | 15.00% | Clearing point [° C.]: | 74.5 |
| CC-3-V1 | 7.00% | Δn [589 nm, 20° C.]: | 0.1071 |
| CCH-23 | 6.50% | $\varepsilon_{\parallel}$ [1 kHz, 20° C.]: | 3.6 |
| CCH-34 | 4.00% | $\varepsilon_{\perp}$ [1 kHz, 20° C.]: | 6.7 |
| CCP-3-1 | 16.00% | Δε [1 kHz, 20° C.]: | −3.2 |
| CCY-3-O1 | 4.50% | $K_1$ [pN, 20° C.]: | 13.4 |
| CCY-3-O2 | 12.00% | $K_3$ [pN, 20° C.]: | 15.0 |
| CY-3-O2 | 8.50% | $V_0$ [pN, 20° C.]: | 2.29 |
| PY-3-O2 | 11.50% | $\gamma_1$ [mPa · s, 20° C.]: | 88 |
| PYP-2-3 | 8.00% | | |
| B-2O-O5 | 4.00% | | |
| B(S)-2O-O5 | 3.00% | | |

additionally comprises 0.025% of ST-8-1.

Example M135

The liquid-crystalline mixture

| | | | |
|---|---|---|---|
| CC-3-V | 23.00% | Clearing point [° C.]: | 74.5 |
| CC-V-V | 20.00% | Δn [589 nm, 20° C.]: | 0.0974 |
| CCP-3-1 | 5.00% | $\varepsilon_{\parallel}$ [1 kHz, 20° C.]: | 3.5 |
| CCY-3-O1 | 7.50% | $\varepsilon_{\perp}$ [1 kHz, 20° C.]: | 6.6 |
| CCY-3-O2 | 11.00% | Δε [1 kHz, 20° C.]: | −3.1 |
| CCY-4-O2 | 5.00% | $K_1$ [pN, 20° C.]: | 12.3 |
| CPY-3-O2 | 11.00% | $K_3$ [pN, 20° C.]: | 14.7 |
| PY-3-O2 | 13.50% | $V_0$ [pN, 20° C.]: | 2.30 |
| B-2O-O5 | 4.00% | $\gamma_1$ [mPa · s, 20° C.]: | 74 |

additionally comprises 0.025% of ST-8-1.

Example M136

The liquid-crystalline mixture

| | | | |
|---|---|---|---|
| BCH-32 | 8.50% | Clearing point [° C.]: | 73.0 |
| CC-3-V | 15.00% | Δn [589 nm, 20° C.]: | 0.1052 |
| CC-V-V | 14.00% | $\varepsilon_{\parallel}$ [1 kHz, 20° C.]: | 3.4 |
| CCP-3-1 | 11.00% | $\varepsilon_{\perp}$ [1 kHz, 20° C.]: | 6.0 |
| CCY-3-O1 | 7.00% | Δε [1 kHz, 20° C.]: | −2.6 |
| CCY-3-O2 | 8.50% | $K_1$ [pN, 20° C.]: | 12.5 |
| CPY-3-O2 | 7.00% | $K_3$ [pN, 20° C.]: | 14.7 |
| CY-3-O2 | 17.00% | $V_0$ [pN, 20° C.]: | 2.53 |
| PP-1-3 | 7.00% | $\gamma_1$ [mPa · s, 20° C.]: | 79 |
| B-2O-O5 | 4.00% | | |
| PYP-2-3 | 1.00% | | |

additionally comprises 0.025% of ST-8-1.

Example M137

The liquid-crystalline mixture

| | | | |
|---|---|---|---|
| CC-V-V | 31.50% | Clearing point [° C.]: | 75.0 |
| CCP-3-1 | 5.00% | Δn [589 nm, 20° C.]: | 0.0949 |
| CCY-2-1 | 12.00% | $\varepsilon_{\parallel}$ [1 kHz, 20° C.]: | 3.7 |
| CCY-3-O1 | 7.50% | $\varepsilon_{\perp}$ [1 kHz, 20° C.]: | 7.5 |
| CCY-3-O2 | 8.00% | Δε [1 kHz, 20° C.]: | −3.8 |
| CLY-3-O2 | 5.50% | $K_1$ [pN, 20° C.]: | 11.4 |
| CLY-3-O3 | 4.00% | $K_3$ [pN, 20° C.]: | 14.2 |
| CPY-2-O2 | 4.50% | $V_0$ [pN, 20° C.]: | 2.04 |
| CPY-3-O2 | 3.00% | $\gamma_1$ [mPa · s, 20° C.]: | 88 |
| CY-3-O2 | 11.00% | | |
| PY-1-O4 | 4.00% | | |
| B-2O-O5 | 4.00% | | |

additionally comprises 0.025% of ST-8-1.

Example M138

The liquid-crystalline mixture

| | | | |
|---|---|---|---|
| CC-V-V | 31.50% | Clearing point [° C.]: | 74.5 |
| CCP-3-1 | 4.00% | Δn [589 nm, 20° C.]: | 0.0945 |
| CCY-2-1 | 12.00% | $\varepsilon_{\parallel}$ [1 kHz, 20° C.]: | 3.7 |
| CCY-3-O1 | 7.50% | $\varepsilon_{\perp}$ [1 kHz, 20° C.]: | 7.6 |
| CCY-3-O2 | 11.50% | Δε [1 kHz, 20° C.]: | −3.8 |
| CLY-3-O2 | 5.00% | $K_1$ [pN, 20° C.]: | 11.2 |
| CPY-3-O2 | 4.50% | $K_3$ [pN, 20° C.]: | 14.4 |
| CY-3-O2 | 14.00% | $V_0$ [pN, 20° C.]: | 2.05 |
| PY-4-O2 | 2.00% | $\gamma_1$ [mPa · s, 20° C.]: | 90 |
| PGIY-2-O4 | 3.00% | | |
| B-2O-O5 | 4.00% | | |
| CCPC-33 | 1.00% | | |

additionally comprises 0.025% of ST-8-1.

Example M139

The liquid-crystalline mixture

| | | | |
|---|---|---|---|
| CC-3-V | 14.50% | Clearing point [° C.]: | 74 |
| CC-V-V | 20.00% | Δn [589 nm, 20° C.]: | 0.1074 |
| CC-3-V1 | 8.00% | Δε [1 kHz, 20° C.]: | −3.0 |
| CCY-3-O1 | 5.50% | $K_1$ [pN, 20° C.]: | 12.7 |
| CCY-3-O2 | 11.50% | $K_3$ [pN, 20° C.]: | 15.4 |
| CPY-3-O2 | 4.00% | $V_0$ [pN, 20° C.]: | 2.42 |
| PY-3-O2 | 3.50% | $\gamma_1$ [mPa · s, 20° C.]: | 73 |
| PP-1-2V1 | 7.00% | | |
| B-2O-O5 | 4.00% | | |
| PY-V2-O2 | 5.00% | | |
| CPY-V-O2 | 6.00% | | |
| CPY-V-O4 | 5.00% | | |
| CCY-V-O2 | 6.00% | | |

additionally comprises 0.025% of ST-8-1.

Example M140

The liquid-crystalline mixture

| | | | |
|---|---|---|---|
| CCP-V-1 | 4.00% | Clearing point [° C.]: | 92.5 |
| CCY-3-O2 | 7.50% | Δn [589 nm, 20° C.]: | 0.1074 |
| CLY-3-O2 | 8.00% | Δε [1 kHz, 20° C.]: | −2.5 |
| CLY-3-O3 | 5.00% | $\varepsilon_{\parallel}$ [1 kHz, 20° C.]: | 3.2 |
| CPY-3-O2 | 10.00% | $\varepsilon_{\perp}$ [1 kHz, 20° C.]: | 5.7 |
| PGIY-2-O4 | 5.00% | $K_1$ [pN, 20° C.]: | 16.4 |
| PYP-2-3 | 6.00% | $K_3$ [pN, 20° C.]: | 18.0 |
| B-2O-O5 | 5.00% | $V_0$ [pN, 20° C.]: | 2.82 |

-continued

| | | | |
|---|---|---|---|
| CC-3-V | 41.50% | $\gamma_1$ [mPa · s, 20° C.]: | 96 |
| CC-3-V1 | 8.00% | | |

additionally comprises 0.025% of ST-8-1.

Example M141

The liquid-crystalline mixture

| | | | |
|---|---|---|---|
| CLY-3-O2 | 10.00% | Clearing point [° C.]: | 80 |
| CLY-3-O3 | 1.50% | Δn [589 nm, 20° C.]: | 0.1080 |
| CPY-2-O2 | 4.00% | Δε [1 kHz, 20° C.]: | −2.4 |
| CPY-3-O2 | 10.00% | $\varepsilon_{\parallel}$ [1 kHz, 20° C.]: | 3.3 |
| PGIY-2-O4 | 5.00% | $\varepsilon_{\perp}$ [1 kHz, 20° C.]: | 5.7 |
| PYP-2-3 | 8.00% | $K_1$ [pN, 20° C.]: | 14.0 |
| B-2O-O5 | 4.50% | $K_3$ [pN, 20° C.]: | 15.8 |
| CC-3-V | 44.50% | $V_0$ [pN, 20° C.]: | 2.68 |
| CC-3-V1 | 8.00% | $\gamma_1$ [mPa · s, 20° C.]: | 80 |
| CY-3-O2 | 2.50% | | |
| CY-5-O2 | 2.00% | | |

additionally comprises 0.025% of ST-8-1.

Example M141

The liquid-crystalline mixture

| | | | |
|---|---|---|---|
| CCP-V2-1 | 5.00% | Clearing point [° C.]: | 79.5 |
| CLY-3-O2 | 10.00% | Δn [589 nm, 20° C.]: | 0.1079 |
| CPY-3-O2 | 9.00% | Δε [1 kHz, 20° C.]: | −2.0 |
| PGIY-2-O4 | 2.50% | $\varepsilon_{\parallel}$ [1 kHz, 20° C.]: | 3.2 |
| PYP-2-3 | 8.00% | $\varepsilon_{\perp}$ [1 kHz, 20° C.]: | 5.3 |
| PYP-2-4 | 5.00% | $K_1$ [pN, 20° C.]: | 14.4 |
| B-2O-O5 | 4.00% | $K_3$ [pN, 20° C.]: | 15.5 |
| CC-3-V | 43.00% | $V_0$ [pN, 20° C.]: | 2.92 |
| CC-3-V1 | 7.50% | $\gamma_1$ [mPa · s, 20° C.]: | 75 |
| CY-3-O2 | 6.00% | | |

additionally comprises 0.025% of ST-8-1.

Example M143

The liquid-crystalline mixture

| | | | |
|---|---|---|---|
| CCY-3-O1 | 4.00% | Clearing point [° C.]: | 79.8 |
| CCY-3-O2 | 8.50% | Δn [589 nm, 20° C.]: | 0.1013 |
| CCY-4-O2 | 5.00% | Δε [1 kHz, 20° C.]: | −3.7 |
| CLY-3-O2 | 10.00% | $\varepsilon_{\parallel}$ [1 kHz, 20° C.]: | 3.6 |
| CLY-3-O3 | 4.00% | $\varepsilon_{\perp}$ [1 kHz, 20° C.]: | 7.3 |
| PGIY-2-O4 | 5.00% | $K_1$ [pN, 20° C.]: | 14.7 |
| PYP-2-3 | 1.00% | $K_3$ [pN, 20° C.]: | 16.3 |
| B-2O-O5 | 5.00% | $V_0$ [pN, 20° C.]: | 2.20 |
| CC-3-V | 34.50% | $\gamma_1$ [mPa · s, 20° C.]: | 97 |
| CC-3-V1 | 8.50% | | |
| CY-3-O2 | 5.00% | | |
| PY-3-O2 | 9.50% | | |

additionally comprises 0.02% of ST-9-1.

Example M144

The liquid-crystalline mixture

| | | | |
|---|---|---|---|
| CCY-3-O2 | 7.00% | Clearing point [° C.]: | 80 |
| CCY-4-O2 | 2.00% | Δn [589 nm, 20° C.]: | 0.1009 |
| CLY-3-O2 | 8.00% | Δε [1 kHz, 20° C.]: | −3.7 |
| CLY-3-O3 | 4.00% | $\varepsilon_{\parallel}$ [1 kHz, 20° C.]: | 3.6 |

-continued

| | | | |
|---|---|---|---|
| CPY-2-O2 | 3.00% | $\varepsilon_{\perp}$ [1 kHz, 20° C.]: | 7.3 |
| CPY-3-O2 | 8.00% | $K_1$ [pN, 20° C.]: | 14.4 |
| PGIY-2-O4 | 5.00% | $K_3$ [pN, 20° C.]: | 16.4 |
| PYP-2-3 | 1.00% | $V_0$ [pN, 20° C.]: | 2.21 |
| B-2O-O5 | 5.00% | $\gamma_1$ [mPa · s, 20° C.]: | 99 |
| CC-3-V | 35.00% | | |
| CC-3-V1 | 8.00% | | |
| CY-3-O2 | 12.00% | | |
| CY-5-O2 | 2.00% | | |

additionally comprises 0.025% of ST-8-1.

Example M145

The liquid-crystalline mixture

| | | | |
|---|---|---|---|
| CY-3-O2 | 4.00% | Clearing point [° C.]: | 100 |
| CY-3-O4 | 18.00% | Δn [589 nm, 20° C.]: | 0.0955 |
| CCY-3-O1 | 5.00% | Δε [1 kHz, 20° C.]: | −5.0 |
| CCY-3-O2 | 6.00% | $\varepsilon_{\parallel}$ [1 kHz, 20° C.]: | 3.8 |
| CCY-3-O3 | 6.00% | $\varepsilon_{\perp}$ [1 kHz, 20° C.]: | 8.8 |
| CCY-4-O2 | 6.00% | $K_1$ [pN, 20° C.]: | 15.2 |
| CLY-3-O2 | 2.50% | $K_3$ [pN, 20° C.]: | 16.0 |
| CPY-2-O2 | 8.00% | $V_0$ [pN, 20° C.]: | 1.90 |
| CC-4-V | 18.00% | $\gamma_1$ [mPa · s, 20° C.]: | 226 |
| CC-5-V | 4.00% | | |
| CH-33 | 3.00% | | |
| CH-35 | 3.00% | | |
| CCPC-33 | 4.50% | | |
| CCPC-34 | 4.50% | | |
| B-2O-O5 | 7.50% | | |

additionally comprises 0.025% of ST-8-1.

Example M146

The liquid-crystalline mixture

| | | | |
|---|---|---|---|
| CCY-3-O1 | 8.00% | Clearing point [° C.]: | 81.5 |
| CCY-4-O2 | 6.00% | Δn [589 nm, 20° C.]: | 0.1075 |
| CLY-3-O2 | 10.00% | Δε [1 kHz, 20° C.]: | −3.1 |
| CPY-3-O2 | 10.50% | $\varepsilon_{\parallel}$ [1 kHz, 20° C.]: | 3.5 |
| PYP-2-3 | 9.00% | $\varepsilon_{\perp}$ [1 kHz, 20° C.]: | 6.6 |
| B-2O-O5 | 5.00% | $K_1$ [pN, 20° C.]: | 14.3 |
| CC-3-V | 45.00% | $K_3$ [pN, 20° C.]: | 15.7 |
| PY-3-O2 | 5.00% | $V_0$ [pN, 20° C.]: | 2.38 |
| Y-4O-O4 | 1.50% | $\gamma_1$ [mPa · s, 20° C.]: | 90 |

additionally comprises 0.025% of ST-8-1.

Example M147

The liquid-crystalline mixture

| | | | |
|---|---|---|---|
| CC-3-V | 35.00% | Clearing point [° C.]: | 86 |
| CCY-3-O1 | 5.00% | Δn [589 nm, 20° C.]: | 0.1208 |
| CCY-3-O2 | 7.50% | Δε [1 kHz, 20° C.]: | −4.2 |
| CLY-3-O2 | 8.00% | $\varepsilon_{\parallel}$ [1 kHz, 20° C.]: | 3.8 |
| CPY-2-O2 | 10.00% | $\varepsilon_{\perp}$ [1 kHz, 20° C.]: | 8.0 |
| CPY-3-O2 | 10.00% | $K_1$ [pN, 20° C.]: | 14.3 |
| PY-3-O2 | 12.50% | $K_3$ [pN, 20° C.]: | 15.6 |
| PGIY-2-O4 | 8.00% | $V_0$ [pN, 20° C.]: | 2.04 |
| B-2O-O5 | 4.00% | $\gamma_1$ [mPa · s, 20° C.]: | 129 |

additionally comprises 0.025% of ST-8-1.

Example M148

The liquid-crystalline mixture

| | | | |
|---|---|---|---|
| CCY-3-O1 | 7.00% | Clearing point [° C.]: | 80 |
| CLY-3-O2 | 10.00% | Δn [589 nm, 20° C.]: | 0.1141 |
| CPY-2-O2 | 10.00% | Δε [1 kHz, 20° C.]: | −4.0 |
| CPY-3-O2 | 10.00% | $\varepsilon_{\parallel}$ [1 kHz, 20° C.]: | 3.7 |
| PYP-2-3 | 3.00% | $\varepsilon_{\perp}$ [1 kHz, 20° C.]: | 7.7 |
| B-2O-O5 | 4.00% | $K_1$ [pN, 20° C.]: | 14.9 |
| CC-3-V | 38.00% | $K_3$ [pN, 20° C.]: | 15.6 |
| PY-1-O4 | 10.00% | $V_0$ [pN, 20° C.]: | 2.09 |
| PY-3-O2 | 4.50% | $\gamma_1$ [mPa · s, 20° C.]: | 108 |
| CCY-3-O2 | 3.50% | | |

additionally comprises 0.025% of ST-8-1.

Example M149

The liquid-crystalline mixture

| | | | |
|---|---|---|---|
| CCY-3-O1 | 7.00% | Clearing point [° C.]: | 90 |
| CCY-4-O2 | 4.00% | Δn [589 nm, 20° C.]: | 0.1139 |
| CLY-3-O2 | 10.00% | Δε [1 kHz, 20° C.]: | −4.2 |
| CPY-2-O2 | 10.00% | $\varepsilon_{\parallel}$ [1 kHz, 20° C.]: | 3.7 |
| CPY-3-O2 | 10.00% | $\varepsilon_{\perp}$ [1 kHz, 20° C.]: | 7.9 |
| PYP-2-3 | 2.50% | $K_1$ [pN, 20° C.]: | 16.2 |
| B-2O-O5 | 4.00% | $K_3$ [pN, 20° C.]: | 17.0 |
| CC-3-V | 35.50% | $V_0$ [pN, 20° C.]: | 2.12 |
| PY-1-O4 | 10.00% | $\gamma_1$ [mPa · s, 20° C.]: | 131 |
| PY-3-O2 | 1.00% | | |
| CCY-3-O2 | 6.00% | | |

additionally comprises 0.025% of ST-12.

Example M150

The liquid-crystalline mixture

| | | | |
|---|---|---|---|
| B-2O-O5 | 5.00% | Clearing point [° C.]: | 80.1 |
| BCH-32 | 7.00% | Δn [589 nm, 20° C.]: | 0.1121 |
| CC-3-V | 34.50% | Δε [1 kHz, 20° C.]: | −3.9 |
| CCP-V-1 | 2.00% | $K_1$ [pN, 20° C.]: | 14.0 |
| CCY-3-O1 | 5.00% | $K_3$ [pN, 20° C.]: | 14.5 |
| CCY-3-O2 | 4.00% | $V_0$ [pN, 20° C.]: | 2.03 |
| CCY-4-O2 | 2.00% | $\gamma_1$ [mPa · s, 20° C.]: | 104 |
| CLY-3-O2 | 8.00% | | |
| CPY-2-O2 | 10.00% | | |
| CPY-3-O2 | 7.00% | | |
| PGIY-2-O4 | 6.00% | | |
| PY-3-O2 | 2.00% | | |
| Y-4O-O4 | 7.50% | | |

additionally comprises 0.025% of ST-8-1.

Example M151

The liquid-crystalline mixture

| | | | |
|---|---|---|---|
| CCY-3-O1 | 7.00% | Clearing point [° C.]: | 80.5 |
| CCY-4-O2 | 1.50% | Δn [589 nm, 20° C.]: | 0.1070 |
| CLY-3-O2 | 10.00% | Δε [1 kHz, 20° C.]: | −3.9 |
| CPY-2-O2 | 9.50% | $K_1$ [pN, 20° C.]: | 15.0 |
| CPY-3-O2 | 8.00% | $K_3$ [pN, 20° C.]: | 15.7 |
| B-2O-O5 | 4.00% | $V_0$ [pN, 20° C.]: | 2.12 |
| CC-3-V | 40.00% | $\gamma_1$ [mPa · s, 20° C.]: | 104 |

-continued

| | |
|---|---|
| PY-1-O4 | 9.50% |
| PY-3-O2 | 4.50% |
| CCY-3-O2 | 6.00% |

additionally comprises 0.025% of ST-12.

Example M152

The liquid-crystalline mixture

| | | | |
|---|---|---|---|
| CCY-3-O1 | 7.00% | Clearing point [° C.]: | 80.5 |
| CLY-3-O2 | 10.00% | Δn [589 nm, 20° C.]: | 0.1140 |
| CPY-2-O2 | 10.00% | Δε [1 kHz, 20° C.]: | −4.0 |
| CPY-3-O2 | 10.00% | $K_1$ [pN, 20° C.]: | 14.8 |
| PYP-2-3 | 3.00% | $K_3$ [pN, 20° C.]: | 15.6 |
| B-2O-O5 | 5.00% | $V_0$ [pN, 20° C.]: | 2.09 |
| CC-3-V | 38.50% | $\gamma_1$ [mPa · s, 20° C.]: | 107 |
| PY-1-O4 | 10.00% | | |
| PY-3-O2 | 3.00% | | |
| CCY-3-O2 | 3.50% | | |

additionally comprises 0.025% of ST-8-1.

Example M153

The liquid-crystalline mixture

| | | | |
|---|---|---|---|
| CCY-3-O1 | 7.00% | Clearing point [° C.]: | 78.5 |
| CLY-3-O2 | 10.00% | Δn [589 nm, 20° C.]: | 0.1142 |
| CPY-2-O2 | 10.00% | Δε [1 kHz, 20° C.]: | −4.0 |
| CPY-3-O2 | 10.00% | $K_1$ [pN, 20° C.]: | 14.3 |
| PGIY-2-O4 | 5.00% | $K_3$ [pN, 20° C.]: | 14.8 |
| PYP-2-3 | 1.00% | $V_0$ [pN, 20° C.]: | 45.66 |
| B-2O-O5 | 5.00% | $\gamma_1$ [mPa · s, 20° C.]: | 103 |
| CC-3-V | 39.50% | | |
| PY-1-O4 | 10.00% | | |
| Y-4O-O4 | 1.50% | | |
| CCY-3-O2 | 1.00% | | |

additionally comprises 0.025% of ST-8-1.

Example M154

The liquid-crystalline mixture

| | | | |
|---|---|---|---|
| CCY-3-O1 | 7.00% | Clearing point [° C.]: | 74.5 |
| CLY-3-O2 | 10.00% | Δn [589 nm, 20° C.]: | 0.1014 |
| CPY-2-O2 | 10.50% | Δε [1 kHz, 20° C.]: | −3.7 |
| CPY-3-O2 | 9.50% | $\gamma_1$ [mPa · s, 20° C.]: | 89 |
| B-2O-O5 | 3.50% | | |
| CC-3-V | 42.00% | | |
| PY-1-O4 | 10.00% | | |
| Y-4O-O4 | 3.50% | | |
| CCY-3-O2 | 4.00% | | |

additionally comprises 0.025% of ST-8-1.

Example M155

The liquid-crystalline mixture

| | | | |
|---|---|---|---|
| CCY-3-O1 | 7.00% | Clearing point [° C.]: | 76.5 |
| CLY-3-O2 | 10.00% | Δn [589 nm, 20° C.]: | 0.1003 |
| CPY-2-O2 | 10.50% | Δε [1 kHz, 20° C.]: | −3.7 |
| CPY-3-O2 | 10.00% | $K_1$ [pN, 20° C.]: | 14.0 |
| B-2O-O5 | 5.00% | $K_3$ [pN, 20° C.]: | 14.7 |
| CC-3-V | 43.50% | $V_0$ [pN, 20° C.]: | 2.09 |

-continued

| | | | |
|---|---|---|---|
| PY-1-O4 | 6.00% | $\gamma_1$ [mPa · s, 20° C.]: | 89 |
| Y-4O-O4 | 4.00% | | |
| CCY-3-O2 | 4.00% | | |

additionally comprises 0.025% of ST-8-1.

Example M156

The liquid-crystalline mixture

| | | | |
|---|---|---|---|
| B-2O-O5 | 5.00% | Clearing point [° C.]: | 80 |
| CC-3-V | 37.00% | Δn [589 nm, 20° C.]: | 0.1094 |
| CCP-V-1 | 4.50% | Δε [1 kHz, 20° C.]: | −3.7 |
| CCY-3-O1 | 5.00% | $\varepsilon_{\parallel}$ [1 kHz, 20° C.]: | 3.7 |
| CCY-3-O2 | 6.00% | $\varepsilon_{\perp}$ [1 kHz, 20° C.]: | 7.4 |
| CCY-4-O2 | 5.00% | $K_1$ [pN, 20° C.]: | 13.9 |
| CLY-3-O2 | 8.00% | $K_3$ [pN, 20° C.]: | 14.4 |
| CPY-2-O2 | 9.50% | $V_0$ [pN, 20° C.]: | 2.09 |
| PGIY-2-O4 | 6.00% | $\gamma_1$ [mPa · s, 20° C.]: | 106 |
| PY-3-O2 | 14.00% | | |

additionally comprises 0.025% of ST-8-1.

Example M157

| | | | |
|---|---|---|---|
| CCY-3-O1 | 7.00% | Clearing point [° C.]: | 90 |
| CCY-4-O2 | 4.00% | Δn [589 nm, 20° C.]: | 0.1139 |
| CLY-3-O2 | 10.00% | Δε [1 kHz, 20° C.]: | −4.2 |
| CPY-2-O2 | 10.00% | $\varepsilon_{\parallel}$ [1 kHz, 20° C.]: | 3.7 |
| CPY-3-O2 | 10.00% | $\varepsilon_{\perp}$ [1 kHz, 20° C.]: | 7.9 |
| PYP-2-3 | 2.50% | $K_1$ [pN, 20° C.]: | 16.2 |
| B-2O-O5 | 4.00% | $K_3$ [pN, 20° C.]: | 17.0 |
| CC-3-V | 35.50% | $V_0$ [pN, 20° C.]: | 2.12 |
| PY-1-O4 | 10.00% | $\gamma_1$ [mPa · s, 20° C.]: | 131 |
| PY-3-O2 | 1.00% | | |
| CCY-3-O2 | 6.00% | | |

additionally comprises 0.025% of ST-8-1.

Example M158

The liquid-crystalline mixture

| | | | |
|---|---|---|---|
| CC-3-V | 35.50% | Clearing point [° C.]: | 75.1 |
| CC-3-V1 | 10.00% | Δn [589 nm, 20° C.]: | 0.1096 |
| CCP-3-1 | 1.50% | Δε [1 kHz, 20° C.]: | −3.2 |
| CLY-3-O2 | 10.00% | $\varepsilon_{\parallel}$ [1 kHz, 20° C.]: | 3.5 |
| CLY-3-O3 | 3.00% | $\varepsilon_{\perp}$ [1 kHz, 20° C.]: | 6.7 |
| CPY-2-O2 | 9.00% | $K_1$ [pN, 20° C.]: | 14.3 |
| CPY-3-O2 | 10.50% | $K_3$ [pN, 20° C.]: | 15.9 |
| PY-3-O2 | 16.50% | $V_0$ [pN, 20° C.]: | 2.37 |
| PYP-2-3 | 1.00% | $\gamma_1$ [mPa · s, 20° C.]: | 84 |
| B-2O-O5 | 3.00% | | |

additionally comprises 0.025% of ST-8-1.

Example M159

For the preparation of a PS-VA mixture, 99.9% of the mixture according to Example M158 are mixed with 0.1% of the polymerisable compound of the formula

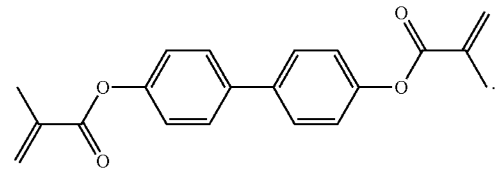

Example M160

For the preparation of a PS-VA mixture, 99.6% of the mixture according to Example M158 are mixed with 0.4% of the polymerisable compound of the formula

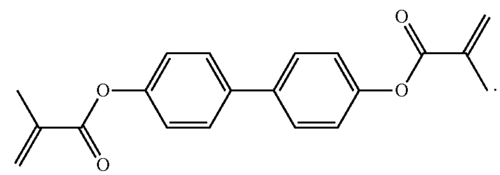 [SMILES: C=C(C)C(=O)Oc1ccc(-c2ccc(OC(=O)C(=C)C)cc2)cc1]

Example M161

For the preparation of a PS-VA mixture, 99.7% of the mixture according to Example M158 are mixed with 0.3% of the polymerisable compound of the formula

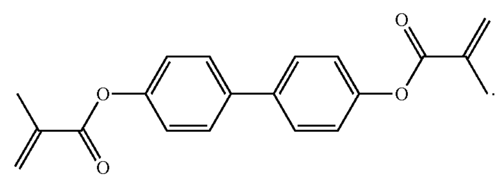 [SMILES: C=C(C)C(=O)Oc1ccc(-c2ccc(OC(=O)C(=C)C)cc2)cc1]

Example M162

For the preparation of a PS-VA mixture, 99.8% of the mixture according to Example M158 are mixed with 0.2% of the polymerisable compound of the formula

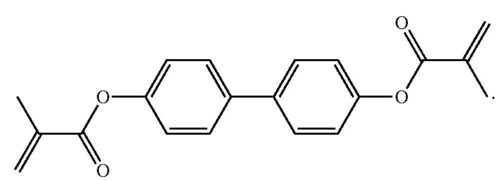

Example M163

The liquid-crystalline mixture

| | | | |
|---|---|---|---|
| CC-3-V | 35.50% | Clearing point [° C.]: | 75.1 |
| CC-3-V1 | 10.00% | Δn [589 nm, 20° C.]: | 0.1096 |
| CCP-3-1 | 1.50% | Δε [1 kHz, 20° C.]: | −3.2 |
| CLY-3-O2 | 10.00% | $\varepsilon_{\parallel}$ [1 kHz, 20° C.]: | 3.5 |
| CLY-3-O3 | 3.00% | $\varepsilon_{\perp}$ [1 kHz, 20° C.]: | 6.7 |

-continued

| | | | |
|---|---|---|---|
| CPY-2-O2 | 9.00% | $K_1$ [pN, 20° C.]: | 14.3 |
| CPY-3-O2 | 10.50% | $K_3$ [pN, 20° C.]: | 15.9 |
| PY-3-O2 | 16.50% | $V_0$ [pN, 20° C.]: | 2.37 |
| PYP-2-3 | 1.00% | $\gamma_1$ [mPa · s, 20° C.]: | 84 |
| B-2O-O5 | 3.00% | | |

additionally comprises 0.025% of ST-12.

Example M164

For the preparation of a PS-VA mixture, 99.9% of the mixture according to Example M163 are mixed with 0.1% of the polymerisable compound of the formula

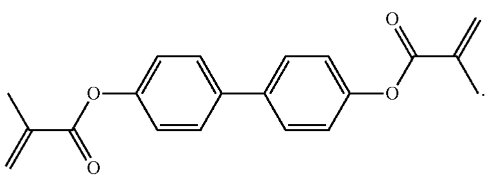

Example M165

For the preparation of a PS-VA mixture, 99.6% of the mixture according to Example M163 are mixed with 0.4% of the polymerisable compound of the formula

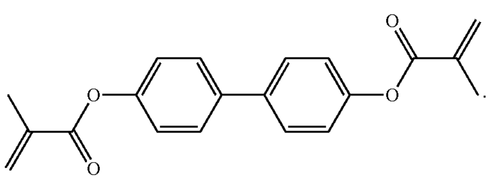

Example M166

For the preparation of a PS-VA mixture, 99.7% of the mixture according to Example M163 are mixed with 0.3% of the polymerisable compound of the formula

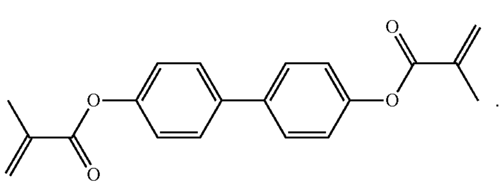 [SMILES: C=C(C)C(=O)Oc1ccc(-c2ccc(OC(=O)C(=C)C)cc2)cc1]

Example M167

For the preparation of a PS-VA mixture, 99.8% of the mixture according to Example M163 are mixed with 0.2% of the polymerisable compound of the formula

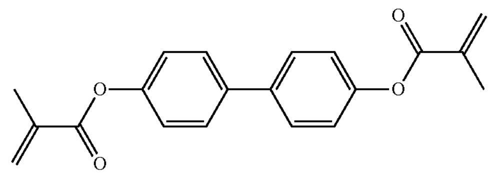

Example M168

The liquid-crystalline mixture

| | | | |
|---|---|---|---|
| CC-3-V | 36.50% | Clearing point [° C.]: | 74.1 |
| CC-3-V1 | 6.00% | Δn [589 nm, 20° C.]: | 0.1087 |
| CCY-3-O1 | 7.00% | Δε [1 kHz, 20° C.]: | −3.2 |
| CCY-3-O2 | 9.00% | $\varepsilon_{\parallel}$ [1 kHz, 20° C.]: | 3.6 |
| CCY-5-O2 | 2.00% | $\varepsilon_{\perp}$ [1 kHz, 20° C.]: | 6.8 |
| CLY-3-O2 | 10.00% | $K_1$ [pN, 20° C.]: | 14.1 |
| PY-1-O4 | 3.00% | $K_3$ [pN, 20° C.]: | 15.7 |
| PY-3-O2 | 14.00% | $V_0$ [pN, 20° C.]: | 2.33 |
| PYP-2-3 | 9.50% | $\gamma_1$ [mPa · s, 20° C.]: | 87 |
| B-2O-O5 | 3.00% | | |

additionally comprises 0.025% of ST-8-1.

Example M169

The liquid-crystalline mixture

| | | | |
|---|---|---|---|
| CY-3-O2 | 3.50% | Clearing point [° C.]: | 74.3 |
| CCY-3-O1 | 5.00% | Δn [589 nm, 20° C.]: | 0.1096 |
| CCY-3-O2 | 2.50% | Δε [1 kHz, 20° C.]: | −4.0 |
| CPY-2-O2 | 8.00% | $\varepsilon_{\parallel}$ [1 kHz, 20° C.]: | 4.0 |
| CPY-3-O2 | 10.00% | $\varepsilon_{\perp}$ [1 kHz, 20° C.]: | 8.0 |
| PYP-2-3 | 4.00% | $K_1$ [pN, 20° C.]: | 13.0 |
| CLY-3-O2 | 7.00% | $K_3$ [pN, 20° C.]: | 13.7 |
| CLY-3-O3 | 4.00% | $V_0$ [pN, 20° C.]: | 1.94 |
| Y-4O-O4 | 7.00% | $\gamma_1$ [mPa · s, 20° C.]: | 96 |
| PGIY-2-O4 | 7.00% | | |
| B-2O-O5 | 4.00% | | |
| CC-3-V | 38.00% | | |

additionally comprises 0.025% of ST-8-1.

Example M170

The liquid-crystalline mixture

| | | | |
|---|---|---|---|
| CCY-3-O1 | 6.00% | Clearing point [° C.]: | 80 |
| CCY-3-O2 | 8.00% | Δn [589 nm, 20° C.]: | 0.1010 |
| CCY-4-O2 | 4.00% | Δε [1 kHz, 20° C.]: | −3.7 |
| CCY-5-O2 | 2.50% | $\varepsilon_{\parallel}$ [1 kHz, 20° C.]: | 3.6 |
| CLY-3-O2 | 8.00% | $\varepsilon_{\perp}$ [1 kHz, 20° C.]: | 7.3 |
| CLY-3-O3 | 4.00% | $K_1$ [pN, 20° C.]: | 15.0 |
| PGIY-2-O4 | 5.00% | $K_3$ [pN, 20° C.]: | 16.3 |
| B-2O-O5 | 4.00% | $V_0$ [pN, 20° C.]: | 2.20 |
| CC-3-V | 36.00% | $\gamma_1$ [mPa · s, 20° C.]: | 98 |
| CC-3-V1 | 7.50% | | |
| CY-3-O2 | 2.00% | | |
| PY-3-O2 | 12.00% | | |

additionally comprises 0.025% of ST-8-1.

Example M171

The liquid-crystalline mixture

| | | | |
|---|---|---|---|
| CCY-3-O2 | 6.00% | Clearing point [° C.]: | 80.4 |
| CCY-4-O2 | 3.00% | Δn [589 nm, 20° C.]: | 0.1014 |
| CLY-3-O2 | 8.00% | Δε [1 kHz, 20° C.]: | −3.7 |
| CLY-3-O3 | 2.00% | $\varepsilon_{\parallel}$ [1 kHz, 20° C.]: | 3.6 |
| CPY-2-O2 | 6.50% | $\varepsilon_{\perp}$ [1 kHz, 20° C.]: | 7.3 |
| CPY-3-O2 | 8.00% | $K_1$ [pN, 20° C.]: | 13.9 |
| PGIY-2-O4 | 5.00% | $K_3$ [pN, 20° C.]: | 15.8 |
| B-2O-O5 | 5.00% | $V_0$ [pN, 20° C.]: | 2.20 |
| CC-3-V | 36.00% | $\gamma_1$ [mPa · s, 20° C.]: | 99 |
| CC-3-V1 | 7.50% | | |
| CY-3-O2 | 11.00% | | |
| CY-5-O2 | 2.00% | | |

additionally comprises 0.01% of ST-8-1.

Example M172

The liquid-crystalline mixture

| | | | |
|---|---|---|---|
| BCH-32 | 3.00% | Clearing point [° C.]: | 74.7 |
| CC-3-V | 15.00% | Δn [589 nm, 20° C.]: | 0.1086 |
| CC-3-V1 | 9.00% | Δε [1 kHz, 20° C.]: | −3.2 |
| CCH-34 | 4.00% | $\varepsilon_{\parallel}$ [1 kHz, 20° C.]: | 3.6 |
| CCH-35 | 5.00% | $\varepsilon_{\perp}$ [1 kHz, 20° C.]: | 6.7 |
| CCP-3-1 | 8.00% | $K_1$ [pN, 20° C.]: | 13.4 |
| CCP-3-3 | 5.00% | $K_3$ [pN, 20° C.]: | 15.6 |
| CPY-2-O2 | 10.50% | $V_0$ [pN, 20° C.]: | 2.31 |
| CPY-3-O2 | 10.50% | $\gamma_1$ [mPa · s, 20° C.]: | 109 |
| CY-3-O2 | 15.00% | | |
| PY-3-O2 | 12.00% | | |
| B-2O-O5 | 3.00% | | |

additionally comprises 0.025% of ST-8-1.

Example M173

The liquid-crystalline mixture

| | | | |
|---|---|---|---|
| BCH-32 | 2.50% | Clearing point [° C.]: | 74.4 |
| CCP-3-1 | 8.00% | Δn [589 nm, 20° C.]: | 0.1093 |
| CCY-3-O1 | 8.00% | Δε [1 kHz, 20° C.]: | −3.1 |
| CCY-3-O2 | 11.00% | $\varepsilon_{\parallel}$ [1 kHz, 20° C.]: | 3.5 |
| CCY-5-O2 | 1.50% | $\varepsilon_{\perp}$ [1 kHz, 20° C.]: | 6.6 |
| PGIY-2-O4 | 5.00% | $K_1$ [pN, 20° C.]: | 15.3 |
| B-2O-O5 | 4.00% | $K_3$ [pN, 20° C.]: | 15.8 |
| CC-3-V | 5.00% | $V_0$ [pN, 20° C.]: | 2.37 |
| CC-3-V1 | 7.00% | $\gamma_1$ [mPa · s, 20° C.]: | 105 |
| CCH-23 | 11.00% | | |
| CCH-34 | 9.00% | | |
| CCH-35 | 2.00% | | |
| CY-3-O2 | 2.50% | | |
| PCH-301 | 1.00% | | |
| PP-1-2V1 | 4.50% | | |
| PY-3-O2 | 18.00% | | |

additionally comprises 0.025% of ST-8-1.

Example M174

The liquid-crystalline mixture

| | | | |
|---|---|---|---|
| BCH-32 | 6.50% | Clearing point [° C.]: | 74.2 |
| CCP-3-1 | 8.00% | Δn [589 nm, 20° C.]: | 0.1086 |
| CCY-3-O2 | 11.00% | Δε [1 kHz, 20° C.]: | −3.2 |
| CCY-5-O2 | 7.50% | $\varepsilon_{\parallel}$ [1 kHz, 20° C.]: | 3.6 |
| PGIY-2-O4 | 5.00% | $\varepsilon_{\perp}$ [1 kHz, 20° C.]: | 6.8 |
| B-2O-O5 | 3.00% | $K_1$ [pN, 20° C.]: | 14.2 |
| CC-3-V | 10.00% | $K_3$ [pN, 20° C.]: | 15.9 |
| CC-3-V1 | 8.00% | $V_0$ [pN, 20° C.]: | 2.35 |
| CCH-23 | 10.00% | $\gamma_1$ [mPa · s, 20° C.]: | 105 |
| CCH-34 | 3.00% | | |
| CY-3-O2 | 9.00% | | |
| PCH-301 | 1.50% | | |
| PP-1-2V1 | 1.50% | | |
| PY-3-O2 | 16.00% | | |

additionally comprises 0.025% of ST-8-1.

Example M175

The liquid-crystalline mixture

| | | | |
|---|---|---|---|
| B-2O-O5 | 3.00% | Clearing point [° C.]: | 74.5 |
| CC-3-V | 15.00% | Δn [589 nm, 20° C.]: | 0.1092 |
| CC-3-V1 | 10.00% | Δε [1 kHz, 20° C.]: | −3.3 |
| CCH-34 | 9.00% | $\varepsilon_{\parallel}$ [1 kHz, 20° C.]: | 3.6 |
| CCP-3-1 | 8.00% | $\varepsilon_{\perp}$ [1 kHz, 20° C.]: | 6.9 |
| CCP-3-3 | 6.00% | $K_1$ [pN, 20° C.]: | 14.0 |
| CPY-2-O2 | 8.50% | $K_3$ [pN, 20° C.]: | 15.7 |
| CPY-3-O2 | 11.00% | $V_0$ [pN, 20° C.]: | 2.31 |
| CY-3-O2 | 15.00% | $\gamma_1$ [mPa · s, 20° C.]: | 102 |
| PGIY-2-O4 | 4.00% | | |
| PY-3-O2 | 10.50% | | |

additionally comprises 0.025% of ST-8-1.

Example M176

The liquid-crystalline mixture

| | | | |
|---|---|---|---|
| B-2O-O5 | 3.00% | Clearing point [° C.]: | 74.5 |
| BCH-32 | 2.00% | Δn [589 nm, 20° C.]: | 0.1090 |
| CC-3-V | 37.00% | Δε [1 kHz, 20° C.]: | −3.2 |
| CC-3-V1 | 6.50% | $\varepsilon_{\parallel}$ [1 kHz, 20° C.]: | 3.6 |
| CCY-3-O1 | 6.50% | $\varepsilon_{\perp}$ [1 kHz, 20° C.]: | 6.8 |
| CCY-3-O2 | 3.50% | $K_1$ [pN, 20° C.]: | 14.1 |
| CLY-3-O2 | 10.00% | $K_3$ [pN, 20° C.]: | 15.9 |
| CPY-3-O2 | 10.50% | $V_0$ [pN, 20° C.]: | 2.35 |
| PY-3-O2 | 18.00% | $\gamma_1$ [mPa · s, 20° C.]: | 86 |
| PYP-2-3 | 3.00% | | |

additionally comprises 0.025% of ST-12.

Example M177

The liquid-crystalline mixture

| | | | |
|---|---|---|---|
| B-2O-O5 | 3.00% | Clearing point [° C.]: | 74.6 |
| CC-3-V | 36.50% | Δn [589 nm, 20° C.]: | 0.1092 |
| CC-3-V1 | 9.00% | Δε [1 kHz, 20° C.]: | −3.2 |
| CCY-3-O1 | 5.50% | $\varepsilon_{\parallel}$ [1 kHz, 20° C.]: | 3.5 |
| CLY-3-O2 | 10.00% | $\varepsilon_{\perp}$ [1 kHz, 20° C.]: | 6.7 |
| CPY-2-O2 | 6.50% | $K_1$ [pN, 20° C.]: | 14.2 |
| CPY-3-O2 | 10.50% | $K_3$ [pN, 20° C.]: | 15.7 |
| PY-3-O2 | 16.00% | $V_0$ [pN, 20° C.]: | 2.34 |
| PYP-2-3 | 3.00% | $\gamma_1$ [mPa · s, 20° C.]: | 86 |

additionally comprises 0.025% of ST-8-1.

Example M178

The liquid-crystalline mixture

| | | | |
|---|---|---|---|
| B-2O-O5 | 4.00% | Clearing point [° C.]: | 74.6 |
| BCH-32 | 0.50% | Δn [589 nm, 20° C.]: | 0.1036 |
| CC-3-V | 33.00% | Δε [1 kHz, 20° C.]: | −3.4 |
| CC-3-V1 | 8.00% | $\varepsilon_{\parallel}$ [1 kHz, 20° C.]: | 3.6 |
| CCH-301 | 1.00% | $\varepsilon_{\perp}$ [1 kHz, 20° C.]: | 7.0 |
| CCY-3-1 | 2.50% | $K_1$ [pN, 20° C.]: | 13.4 |
| CCY-3-O1 | 9.00% | $K_3$ [pN, 20° C.]: | 14.9 |
| CCY-4-O2 | 5.00% | $V_0$ [pN, 20° C.]: | 2.21 |
| CPY-2-O2 | 5.50% | $\gamma_1$ [mPa · s, 20° C.]: | 92 |
| CPY-3-O2 | 12.50% | | |
| CY-3-O2 | 7.00% | | |
| PY-1-O4 | 1.50% | | |
| PY-3-O2 | 8.00% | | |
| PYP-2-3 | 2.50% | | |

additionally comprises 0.025% of ST-8-1.

Example M179

The liquid-crystalline mixture

| | | | |
|---|---|---|---|
| CC-3-V | 34.50% | Clearing point [° C.]: | 74.7 |
| CC-3-V1 | 10.00% | Δn [589 nm, 20° C.]: | 0.1094 |
| CCP-3-1 | 1.00% | Δε [1 kHz, 20° C.]: | −3.2 |
| CLY-3-O2 | 10.00% | $\varepsilon_{\parallel}$ [1 kHz, 20° C.]: | 3.5 |
| CLY-3-O3 | 3.00% | $\varepsilon_{\perp}$ [1 kHz, 20° C.]: | 6.8 |
| CPY-2-O2 | 8.00% | $K_1$ [pN, 20° C.]: | 13.9 |
| CPY-3-O2 | 10.50% | $K_3$ [pN, 20° C.]: | 15.8 |
| CY-3-O2 | 4.50% | $V_0$ [pN, 20° C.]: | 2.34 |
| PY-3-O2 | 12.50% | $\gamma_1$ [mPa · s, 20° C.]: | 87 |
| PYP-2-3 | 3.00% | | |
| B-2O-O5 | 3.00% | | |

additionally comprises 0.04% of ST-3b-1 and 0.02% of ST-9-1..

Example M180

The liquid-crystalline mixture

| | | | |
|---|---|---|---|
| B-2O-O5 | 3.00% | Clearing point [° C.]: | 74.8 |
| BCH-32 | 2.50% | Δn [589 nm, 20° C.]: | 0.1096 |
| CC-3-V | 42.00% | Δε [1 kHz, 20° C.]: | −3.2 |
| CC-3-V1 | 1.00% | $\varepsilon_{\parallel}$ [1 kHz, 20° C.]: | 3.5 |
| CCY-3-O2 | 9.00% | $\varepsilon_{\perp}$ [1 kHz, 20° C.]: | 6.7 |
| CLY-3-O2 | 10.00% | $K_1$ [pN, 20° C.]: | 14.1 |
| CPY-2-O2 | 2.00% | $K_3$ [pN, 20° C.]: | 15.7 |
| CPY-3-O2 | 10.50% | $V_0$ [pN, 20° C.]: | 2.34 |
| PY-3-O2 | 17.00% | $\gamma_1$ [mPa · s, 20° C.]: | 85 |
| PYP-2-3 | 3.00% | | |

additionally comprises 0.025% of ST-8-1.

Example M181

The liquid-crystalline mixture

| | | | |
|---|---|---|---|
| CY-3-O2 | 3.00% | Clearing point [° C.]: | 74.9 |
| CCY-3-O1 | 5.00% | Δn [589 nm, 20° C.]: | 0.1032 |
| CCY-3-O2 | 4.50% | Δε [1 kHz, 20° C.]: | −4.0 |
| CPY-2-O2 | 8.00% | $\varepsilon_{\parallel}$ [1 kHz, 20° C.]: | 3.9 |
| CPY-3-O2 | 10.00% | $\varepsilon_{\perp}$ [1 kHz, 20° C.]: | 7.9 |
| CLY-3-O2 | 7.00% | $K_1$ [pN, 20° C.]: | 13.2 |
| CLY-3-O3 | 4.00% | $K_3$ [pN, 20° C.]: | 13.9 |
| Y-4O-O4 | 7.00% | $V_0$ [pN, 20° C.]: | 1.96 |
| PGIY-2-O4 | 7.00% | $\gamma_1$ [mPa · s, 20° C.]: | 92 |

-continued

| | |
|---|---|
| B-2O-O5 | 4.00% |
| CC-3-V | 40.50% |

additionally comprises 0.025% of ST-8-1.

Example M182

The liquid-crystalline mixture

| | |
|---|---|
| CC-3-V | 37.50% |
| CCY-3-O1 | 5.00% |
| CCY-3-O2 | 13.75% |
| CCY-4-O2 | 4.25% |
| CPY-3-O2 | 13.50% |
| CY-3-O2 | 7.50% |
| PY-3-O2 | 15.50% |
| B-2O-O4 | 3.00% |

additionally comprises 0.025% of ST-8-1.

Example M183

The liquid-crystalline mixture

| | | | |
|---|---|---|---|
| CCP-V-1 | 2.00% | Clearing point [° C.]: | 75 |
| CCY-3-O1 | 7.00% | Δn [589 nm, 20° C.]: | 0.1050 |
| CCY-3-O2 | 7.00% | Δε [1 kHz, 20° C.]: | −3.7 |
| CCY-4-O2 | 3.00% | $\varepsilon_{\parallel}$ [1 kHz, 20° C.]: | 3.7 |
| CCY-5-O2 | 1.50% | $\varepsilon_{\perp}$ [1 kHz, 20° C.]: | 7.4 |
| CLY-3-O2 | 8.00% | $K_1$ [pN, 20° C.]: | 14.8 |
| CLY-3-O3 | 2.00% | $K_3$ [pN, 20° C.]: | 15.4 |
| PGIY-2-O4 | 5.00% | $V_0$ [pN, 20° C.]: | 2.15 |
| B-2O-O5 | 5.00% | $\gamma_1$ [mPa · s, 20° C.]: | 93 |
| CC-3-V | 34.00% | | |
| CC-3-V1 | 8.00% | | |
| PY-1-O4 | 3.50% | | |
| PY-3-O2 | 14.00% | | |

additionally comprises 0.025% of ST-8-1.

Example M184

The liquid-crystalline mixture

| | | | |
|---|---|---|---|
| CCP-V-1 | 2.00% | Clearing point [° C.]: | 75 |
| CCY-3-O1 | 5.00% | Δn [589 nm, 20° C.]: | 0.1013 |
| CCY-3-O2 | 7.50% | Δε [1 kHz, 20° C.]: | −3.7 |
| CCY-4-O2 | 3.50% | $\varepsilon_{\parallel}$ [1 kHz, 20° C.]: | 3.7 |
| CLY-3-O2 | 10.00% | $\varepsilon_{\perp}$ [1 kHz, 20° C.]: | 7.4 |
| CLY-3-O3 | 2.00% | $K_1$ [pN, 20° C.]: | 14.4 |
| PGIY-2-O4 | 5.00% | $K_3$ [pN, 20° C.]: | 15.5 |
| B-2O-O5 | 5.00% | $V_0$ [pN, 20° C.]: | 2.15 |
| CC-3-V | 34.00% | $\gamma_1$ [mPa · s, 20° C.]: | 91 |
| CC-3-V1 | 8.00% | | |
| CY-3-O2 | 6.00% | | |
| PY-3-O2 | 12.00% | | |

additionally comprises 0.025% of ST-8-1.

Example M185

The liquid-crystalline mixture

| | | | |
|---|---|---|---|
| CCP-V-1 | 1.00% | Clearing point [° C.]: | 75 |
| CCY-3-O1 | 7.00% | Δn [589 nm, 20° C.]: | 0.1081 |
| CCY-3-O2 | 7.00% | Δε [1 kHz, 20° C.]: | −3.7 |
| CCY-4-O2 | 3.00% | $\varepsilon_{\parallel}$ [1 kHz, 20° C.]: | 3.7 |

-continued

| | | | |
|---|---|---|---|
| CCY-5-O2 | 1.00% | $\varepsilon_\perp$ [1 kHz, 20° C.]: | 7.4 |
| CLY-3-O2 | 8.00% | $K_1$ [pN, 20° C.]: | 14.5 |
| CLY-3-O3 | 2.00% | $K_3$ [pN, 20° C.]: | 15.2 |
| PGIY-2-O4 | 5.00% | $V_0$ [pN, 20° C.]: | 2.14 |
| PYP-2-3 | 2.50% | $\gamma_1$ [mPa · s, 20° C.]: | 93 |
| B-2O-O5 | 5.00% | | |
| CC-3-V | 34.00% | | |
| CC-3-V1 | 7.50% | | |
| PY-1-O4 | 2.00% | | |
| PY-3-O2 | 15.00% | | |

additionally comprises 0.025% of ST-8-1.

Example M186

The liquid-crystalline mixture

| | | | |
|---|---|---|---|
| CY-3-O2 | 3.00% | Clearing point [° C.]: | 75.1 |
| CCY-3-O1 | 5.00% | Δn [589 nm, 20° C.]: | 0.1021 |
| CCY-3-O2 | 3.00% | Δε [1 kHz, 20° C.]: | −3.7 |
| CPY-2-O2 | 8.00% | $\varepsilon_\parallel$ [1 kHz, 20° C.]: | 3.8 |
| CPY-3-O2 | 10.00% | $\varepsilon_\perp$ [1 kHz, 20° C.]: | 7.5 |
| CLY-3-O2 | 7.00% | $K_1$ [pN, 20° C.]: | 13.3 |
| CLY-3-O3 | 4.00% | $K_3$ [pN, 20° C.]: | 14.0 |
| Y-4O-O4 | 6.00% | $V_0$ [pN, 20° C.]: | 2.04 |
| PGIY-2-O4 | 7.00% | $\gamma_1$ [mPa · s, 20° C.]: | 87 |
| B-2O-O5 | 4.00% | | |
| CC-3-V | 43.00% | | |

additionally comprises 0.025% of ST-8-1.

Example M187

The liquid-crystalline mixture

| | | | |
|---|---|---|---|
| CCY-3-O1 | 8.00% | Clearing point [° C.]: | 75.5 |
| CCY-4-O2 | 3.00% | Δn [589 nm, 20° C.]: | 0.1024 |
| CLY-3-O2 | 8.00% | Δε [1 kHz, 20° C.]: | −3.8 |
| CLY-3-O3 | 4.00% | $\varepsilon_\parallel$ [1 kHz, 20° C.]: | 3.7 |
| CPY-2-O2 | 7.50% | $\varepsilon_\perp$ [1 kHz, 20° C.]: | 7.5 |
| CPY-3-O2 | 3.00% | | |
| B-2O-O5 | 4.00% | | |
| CC-3-V | 41.50% | | |
| PY-1-O4 | 5.00% | | |
| PY-3-O2 | 11.50% | | |
| CCY-3-O2 | 4.50% | | |

additionally comprises 0.025% of ST-8-1.

Example M188

The liquid-crystalline mixture

| | | | |
|---|---|---|---|
| CCY-3-O1 | 6.50% | Clearing point [° C.]: | 79.5 |
| CLY-3-O2 | 10.00% | Δn [589 nm, 20° C.]: | 0.1070 |
| CPY-2-O2 | 10.00% | Δε [1 kHz, 20° C.]: | −3.9 |
| CPY-3-O2 | 10.00% | $\varepsilon_\parallel$ [1 kHz, 20° C.]: | 3.7 |
| PYP-2-3 | 5.50% | $\varepsilon_\perp$ [1 kHz, 20° C.]: | 7.6 |
| B-2O-O5 | 4.00% | $K_1$ [pN, 20° C.]: | 13.9 |
| CC-3-V | 37.00% | $K_3$ [pN, 20° C.]: | 15.5 |
| CY-3-O2 | 14.00% | $V_0$ [pN, 20° C.]: | 2.09 |
| CCY-3-O2 | 1.50% | $\gamma_1$ [mPa · s, 20° C.]: | 104 |
| CY-5-O2 | 1.50% | | |

additionally comprises 0.02% of ST-12.

Example M189

The liquid-crystalline mixture

| | | | |
|---|---|---|---|
| CCP-V2-1 | 5.00% | Clearing point [° C.]: | 79.5 |
| CLY-3-O2 | 10.00% | Δn [589 nm, 20° C.]: | 0.1079 |
| CPY-3-O2 | 9.00% | Δε [1 kHz, 20° C.]: | −2.0 |
| PGIY-2-O4 | 2.50% | $\varepsilon_\parallel$ [1 kHz, 20° C.]: | 3.2 |
| PYP-2-3 | 8.00% | $\varepsilon_\perp$ [1 kHz, 20° C.]: | 5.3 |
| PYP-2-4 | 5.00% | $K_1$ [pN, 20° C.]: | 14.4 |
| B-2O-O5 | 4.00% | $K_3$ [pN, 20° C.]: | 15.5 |
| CC-3-V | 43.00% | $V_0$ [pN, 20° C.]: | 2.92 |
| CC-3-V1 | 7.50% | $\gamma_1$ [mPa · s, 20° C.]: | 75 |
| CY-3-O2 | 6.00% | | |

additionally comprises 0.03% of ST-2a-1.

Example M190

The liquid-crystalline mixture

| | | | |
|---|---|---|---|
| CCY-3-O1 | 1.00% | Clearing point [° C.]: | 79.5 |
| CLY-3-O2 | 10.00% | Δn [589 nm, 20° C.]: | 0.1151 |
| CLY-3-O3 | 1.50% | Δε [1 kHz, 20° C.]: | −4.0 |
| CPY-2-O2 | 10.00% | $\varepsilon_\parallel$ [1 kHz, 20° C.]: | 3.7 |
| CPY-3-O2 | 10.00% | $\varepsilon_\perp$ [1 kHz, 20° C.]: | 7.7 |
| PGIY-2-O4 | 5.00% | $K_1$ [pN, 20° C.]: | 14.4 |
| PYP-2-3 | 6.00% | $K_3$ [pN, 20° C.]: | 15.7 |
| B-2O-O5 | 2.50% | $V_0$ [pN, 20° C.]: | 2.09 |
| CC-3-V | 27.00% | $\gamma_1$ [mPa · s, 20° C.]: | 115 |
| CC-3-V1 | 8.00% | | |
| CY-3-O2 | 11.00% | | |
| CY-5-O2 | 6.50% | | |
| CY-3-O4 | 1.50% | | |

additionally comprises 0.025% of ST-8-1.

Example M191

The liquid-crystalline mixture

| | | | |
|---|---|---|---|
| CLY-3-O2 | 10.00% | Clearing point [° C.]: | 79.5 |
| CLY-3-O3 | 2.00% | Δn [589 nm, 20° C.]: | 0.1157 |
| CPY-2-O2 | 10.50% | Δε [1 kHz, 20° C.]: | −4.0 |
| CPY-3-O2 | 9.50% | $\varepsilon_\parallel$ [1 kHz, 20° C.]: | 3.7 |
| PGIY-2-O4 | 5.00% | $\varepsilon_\perp$ [1 kHz, 20° C.]: | 7.7 |
| PYP-2-3 | 5.50% | $K_1$ [pN, 20° C.]: | 14.6 |
| B-2O-O5 | 5.00% | $K_3$ [pN, 20° C.]: | 15.5 |
| CC-3-V | 30.00% | $V_0$ [pN, 20° C.]: | 2.07 |
| CC-3-V1 | 7.50% | $\gamma_1$ [mPa · s, 20° C.]: | 111 |
| CY-3-O2 | 11.00% | | |
| CY-5-O2 | 4.00% | | |

additionally comprises 0.025% of ST-8-1.

Example M192

The liquid-crystalline mixture

| | | | |
|---|---|---|---|
| CCY-3-O1 | 4.00% | Clearing point [° C.]: | 79.8 |
| CCY-3-O2 | 8.50% | Δn [589 nm, 20° C.]: | 0.1013 |
| CCY-4-O2 | 5.00% | Δε [1 kHz, 20° C.]: | −3.7 |
| CLY-3-O2 | 10.00% | $\varepsilon_\parallel$ [1 kHz, 20° C.]: | 3.6 |
| CLY-3-O3 | 4.00% | $\varepsilon_\perp$ [1 kHz, 20° C.]: | 7.3 |
| PGIY-2-O4 | 5.00% | $K_1$ [pN, 20° C.]: | 14.7 |
| PYP-2-3 | 1.00% | $K_3$ [pN, 20° C.]: | 16.3 |
| B-2O-O5 | 5.00% | $V_0$ [pN, 20° C.]: | 2.20 |
| CC-3-V | 34.50% | $\gamma_1$ [mPa · s, 20° C.]: | 97 |

-continued

| | |
|---|---|
| CC-3-V1 | 8.50% |
| CY-3-O2 | 5.00% |
| PY-3-O2 | 9.50% |

additionally comprises 0.025% of ST-8-1.

Example M193

The liquid-crystalline mixture

| | | | |
|---|---|---|---|
| B-2O-O5 | 4.00% | Clearing point [° C.]: | 79.9 |
| CC-3-V | 32.00% | Δn [589 nm, 20° C.]: | 0.1036 |
| CCP-3-1 | 2.00% | Δε [1 kHz, 20° C.]: | −4.4 |
| CCY-3-O2 | 8.00% | $ε_{\|\|}$ [1 kHz, 20° C.]: | 4.0 |
| CCY-4-O2 | 8.00% | $ε_⊥$ [1 kHz, 20° C.]: | 8.3 |
| CLY-3-O2 | 6.50% | $K_1$ [pN, 20° C.]: | 13.4 |
| CLY-3-O3 | 6.50% | $K_3$ [pN, 20° C.]: | 14.4 |
| CPY-2-O2 | 8.00% | $V_0$ [pN, 20° C.]: | 1.92 |
| CPY-3-O2 | 8.00% | $γ_1$ [mPa · s, 20° C.]: | 89 |
| CY-3-O2 | 2.00% | | |
| PY-3-O2 | 10.00% | | |
| Y-4O-O4 | 5.00% | | |

additionally comprises 0.04% of ST-3b-1 and 0.01% of ST-9-1..

Example M194

The liquid-crystalline mixture

| | | | |
|---|---|---|---|
| B-2O-O5 | 4.00% | Clearing point [° C.]: | 79.9 |
| CC-3-V | 32.00% | Δn [589 nm, 20° C.]: | 0.1058 |
| CCP-3-1 | 2.00% | Δε [1 kHz, 20° C.]: | −4.6 |
| CCY-3-O2 | 8.00% | $K_1$ [pN, 20° C.]: | 14.3 |
| CCY-4-O2 | 8.00% | $K_3$ [pN, 20° C.]: | 15.1 |
| CLY-3-O2 | 6.50% | $V_0$ [pN, 20° C.]: | 1.91 |
| CLY-3-O3 | 6.50% | $γ_1$ [mPa · s, 20° C.]: | 113 |
| CPY-2-O2 | 8.00% | | |
| CPY-3-O2 | 8.00% | | |
| CY-3-O2 | 2.00% | | |
| PY-3-O2 | 10.00% | | |
| Y-4O-O4 | 5.00% | | |

additionally comprises 0.04% of ST-3b-1 and 0.01% of ST-9-1..

Example M195

The liquid-crystalline mixture

| | |
|---|---|
| CC-3-V | 22.00% |
| CC-3-V1 | 7.00% |
| COY-3-O1 | 4.00% |
| COY-3-O2 | 6.00% |
| COY-1V-O2 | 4.00% |
| CPP-V-3 | 6.50% |
| BCH-32 | 5.00% |
| PYP-2-3 | 8.00% |
| CCOY-V-O2 | 2.50% |
| CCOY-2-O2 | 10.00% |
| BCH-52 | 4.00% |
| CCOY-V-O3 | 3.00% |
| CCOY-3-O2 | 11.00% |
| CCOY-1V-O2 | 4.00% |
| B-2O-O5 | 3.00% |

additionally comprises 0.03% of ST-3a-1.

Example M196

The liquid-crystalline mixture

| | | | |
|---|---|---|---|
| B-2O-O5 | 5.00% | Clearing point [° C.]: | 80 |
| CC-3-V | 37.00% | Δn [589 nm, 20° C.]: | 0.1094 |
| CCP-V-1 | 4.50% | Δε [1 kHz, 20° C.]: | −3.7 |
| CCY-3-O1 | 5.00% | $ε_{\|\|}$ [1 kHz, 20° C.]: | 3.7 |
| CCY-3-O2 | 6.00% | $ε_⊥$ [1 kHz, 20° C.]: | 7.4 |
| CCY-4-O2 | 5.00% | $K_1$ [pN, 20° C.]: | 13.9 |
| CLY-3-O2 | 8.00% | $K_3$ [pN, 20° C.]: | 14.4 |
| CPY-2-O2 | 9.50% | $V_0$ [pN, 20° C.]: | 2.09 |
| PGIY-2-O4 | 6.00% | $γ_1$ [mPa · s, 20° C.]: | 106 |
| PY-3-O2 | 14.00% | | |

additionally comprises 0.025% of ST-8-1.

Example M197

The liquid-crystalline mixture

| | | | |
|---|---|---|---|
| B-2O-O5 | 5.00% | Clearing point [° C.]: | 80.1 |
| BCH-32 | 7.00% | Δn [589 nm, 20° C.]: | 0.1096 |
| CC-3-V | 34.50% | Δε [1 kHz, 20° C.]: | −3.7 |
| CCP-V-1 | 2.00% | $ε_{\|\|}$ [1 kHz, 20° C.]: | 3.9 |
| CCY-3-O1 | 5.00% | $ε_⊥$ [1 kHz, 20° C.]: | 7.6 |
| CCY-3-O2 | 4.00% | $K_1$ [pN, 20° C.]: | 13.3 |
| CCY-4-O2 | 2.00% | $K_3$ [pN, 20° C.]: | 13.7 |
| CLY-3-O2 | 8.00% | $V_0$ [pN, 20° C.]: | 2.04 |
| CPY-2-O2 | 10.00% | $γ_1$ [mPa · s, 20° C.]: | 104 |
| CPY-3-O2 | 7.00% | | |
| PGIY-2-O4 | 6.00% | | |
| PY-3-O2 | 2.00% | | |
| Y-4O-O4 | 7.50% | | |

additionally comprises 0.025% of ST-8-1.

Example M198

The liquid-crystalline mixture

| | | | |
|---|---|---|---|
| CCY-3-O1 | 7.00% | Clearing point [° C.]: | 80 |
| CCY-3-O2 | 6.00% | Δn [589 nm, 20° C.]: | 0.1073 |
| CCY-4-O2 | 6.50% | Δε [1 kHz, 20° C.]: | −3.9 |
| CCY-5-O2 | 3.00% | $ε_{\|\|}$ [1 kHz, 20° C.]: | 3.7 |
| CLY-3-O2 | 10.00% | $ε_⊥$ [1 kHz, 20° C.]: | 7.6 |
| PGIY-2-O4 | 5.00% | $γ_1$ [mPa · s, 20° C.]: | 90 |
| PYP-2-3 | 2.00% | | |
| B-2O-O5 | 5.00% | | |
| CC-3-V | 33.50% | | |
| CC-3-V1 | 7.00% | | |
| PY-1-O4 | 5.00% | | |
| PY-3-O2 | 10.00% | | |

additionally comprises 0.025% of ST-8-1.

Example M199

| | | | |
|---|---|---|---|
| CLY-3-O2 | 10.00% | Clearing point [° C.]: | 80 |
| CLY-3-O3 | 1.50% | Δn [589 nm, 20° C.]: | 0.1080 |
| CPY-2-O2 | 4.00% | Δε [1 kHz, 20° C.]: | −2.4 |
| CPY-3-O2 | 10.00% | $ε_{\|\|}$ [1 kHz, 20° C.]: | 3.3 |
| PGIY-2-O4 | 5.00% | $ε_⊥$ [1 kHz, 20° C.]: | 5.7 |
| PYP-2-3 | 8.00% | $K_1$ [pN, 20° C.]: | 14.0 |
| B-2O-O5 | 4.50% | $K_3$ [pN, 20° C.]: | 15.8 |
| CC-3-V | 44.50% | $V_0$ [pN, 20° C.]: | 2.68 |
| CC-3-V1 | 8.00% | $γ_1$ [mPa · s, 20° C.]: | 80 |
| CY-3-O2 | 2.50% | | |
| CY-5-O2 | 2.00% | | |

additionally comprises 0.025% of ST-8-1.

Example M200

The liquid-crystalline mixture

| | | | |
|---|---|---|---|
| CCY-3-O2 | 7.00% | Clearing point [° C.]: | 80 |
| CCY-4-O2 | 2.00% | Δn [589 nm, 20° C.]: | 0.1009 |
| CLY-3-O2 | 8.00% | Δε [1 kHz, 20° C.]: | −3.7 |
| CLY-3-O3 | 4.00% | $\varepsilon_{\parallel}$ [1 kHz, 20° C.]: | 3.6 |
| CPY-2-O2 | 3.00% | $\varepsilon_{\perp}$ [1 kHz, 20° C.]: | 7.3 |
| CPY-3-O2 | 8.00% | $K_1$ [pN, 20° C.]: | 14.4 |
| PGIY-2-O4 | 5.00% | $K_3$ [pN, 20° C.]: | 16.4 |
| PYP-2-3 | 1.00% | $V_0$ [pN, 20° C.]: | 2.21 |
| B-2O-O5 | 5.00% | $\gamma_1$ [mPa · s, 20° C.]: | 99 |
| CC-3-V | 35.00% | | |
| CC-3-V1 | 8.00% | | |
| CY-3-O2 | 12.00% | | |
| CY-5-O2 | 2.00% | | |

additionally comprises 0.025% of ST-8-1.

Example M201

The liquid-crystalline mixture

| | | | |
|---|---|---|---|
| CC-3-V | 37.50% | Clearing point [° C.]: | 80.2 |
| CCY-3-O1 | 5.00% | Δn [589 nm, 20° C.]: | 0.1097 |
| CCY-3-O2 | 3.00% | Δε [1 kHz, 20° C.]: | −3.9 |
| CCY-4-O2 | 7.00% | $\varepsilon_{\parallel}$ [1 kHz, 20° C.]: | 3.7 |
| CLY-3-O2 | 8.00% | $\varepsilon_{\perp}$ [1 kHz, 20° C.]: | 7.6 |
| CPY-2-O2 | 10.00% | $K_1$ [pN, 20° C.]: | 13.5 |
| CPY-3-O2 | 8.00% | $K_3$ [pN, 20° C.]: | 14.5 |
| PY-1-O4 | 3.50% | $V_0$ [pN, 20° C.]: | 1.08 |
| PY-3-O2 | 12.00% | $\gamma_1$ [mPa · s, 20° C.]: | 110 |
| PGIY-2-O4 | 2.00% | | |
| B-2O-O5 | 4.00% | | |

additionally comprises 0.025% of ST-8-1.

Example M202

The liquid-crystalline mixture

| | | | |
|---|---|---|---|
| B-2O-O5 | 4.00% | Clearing point [° C.]: | 80.4 |
| CC-3-V | 24.50% | Δn [589 nm, 20° C.]: | 0.1030 |
| CC-3-V1 | 5.00% | Δε [1 kHz, 20° C.]: | −4.4 |
| CCP-3-1 | 3.00% | $\varepsilon_{\parallel}$ [1 kHz, 20° C.]: | 4.0 |
| CCY-3-O2 | 8.00% | $\varepsilon_{\perp}$ [1 kHz, 20° C.]: | 8.4 |
| CCY-4-O2 | 8.00% | $K_1$ [pN, 20° C.]: | 13.3 |
| CLY-3-O2 | 6.00% | $K_3$ [pN, 20° C.]: | 14.3 |
| CLY-3-O3 | 6.00% | $V_0$ [pN, 20° C.]: | 1.91 |
| CPY-2-O2 | 6.50% | $\gamma_1$ [mPa · s, 20° C.]: | 96 |
| CPY-3-O2 | 8.00% | | |
| CY-3-O2 | 8.00% | | |
| PYP-2-3 | 5.00% | | |
| Y-4O-O4 | 8.00% | | |

additionally comprises 0.04% of ST-3b-1 and 0.01% of ST-9-1..

Example M203

The liquid-crystalline mixture

| | | | |
|---|---|---|---|
| BCH-32 | 0.50% | Clearing point [° C.]: | 80.4 |
| CC-3-V | 37.00% | Δn [589 nm, 20° C.]: | 0.1195 |
| CCY-3-O1 | 5.00% | Δε [1 kHz, 20° C.]: | −3.9 |
| CCY-3-O2 | 3.50% | $\varepsilon_{\parallel}$ [1 kHz, 20° C.]: | 3.8 |
| CLY-3-O2 | 8.00% | $\varepsilon_{\perp}$ [1 kHz, 20° C.]: | 7.7 |
| CPY-2-O2 | 10.00% | $K_1$ [pN, 20° C.]: | 13.5 |
| CPY-3-O2 | 10.00% | $K_3$ [pN, 20° C.]: | 14.5 |
| PY-3-O2 | 14.00% | $V_0$ [pN, 20° C.]: | 2.04 |
| PGIY-2-O4 | 8.00% | $\gamma_1$ [mPa · s, 20° C.]: | 114 |
| B-2O-O5 | 4.00% | | |

additionally comprises 0.01% of ST-8-1.

Example M204

The liquid-crystalline mixture

| | | | |
|---|---|---|---|
| CCY-3-O2 | 6.00% | Clearing point [° C.]: | 80.4 |
| CCY-4-O2 | 3.00% | Δn [589 nm, 20° C.]: | 0.1014 |
| CLY-3-O2 | 8.00% | Δε [1 kHz, 20° C.]: | −3.7 |
| CLY-3-O3 | 2.00% | $\varepsilon_{\parallel}$ [1 kHz, 20° C.]: | 3.6 |
| CPY-2-O2 | 6.50% | $\varepsilon_{\perp}$ [1 kHz, 20° C.]: | 7.3 |
| CPY-3-O2 | 8.00% | $K_1$ [pN, 20° C.]: | 13.9 |
| PGIY-2-O4 | 5.00% | $K_3$ [pN, 20° C.]: | 15.8 |
| B-2O-O5 | 5.00% | $V_0$ [pN, 20° C.]: | 2.20 |
| CC-3-V | 36.00% | $\gamma_1$ [mPa · s, 20° C.]: | 99 |
| CC-3-V1 | 7.50% | | |
| CY-3-O2 | 11.00% | | |
| CY-5-O2 | 2.00% | | |

additionally comprises 0.04% of ST-3b-1 and 0.01% of ST-9-1..

Example M205

The liquid-crystalline mixture

| | | | |
|---|---|---|---|
| CC-3-V | 25.00% | Clearing point [° C.]: | 80.5 |
| CC-3-V1 | 7.00% | Δn [589 nm, 20° C.]: | 0.0995 |
| CCP-3-1 | 7.00% | Δε [1 kHz, 20° C.]: | −3.8 |
| CCY-3-O1 | 4.50% | $\varepsilon_{\parallel}$ [1 kHz, 20° C.]: | 3.7 |
| CCY-3-O2 | 6.50% | $\varepsilon_{\perp}$ [1 kHz, 20° C.]: | 7.5 |
| CCY-4-O2 | 5.00% | $K_1$ [pN, 20° C.]: | 13.7 |
| CCY-5-O2 | 4.00% | $K_3$ [pN, 20° C.]: | 15.8 |
| CLY-3-O2 | 8.00% | $V_0$ [pN, 20° C.]: | 2.12 |
| CY-3-O2 | 12.00% | $\gamma_1$ [mPa · s, 20° C.]: | 111 |
| CY-3-O4 | 4.00% | | |
| PY-3-O2 | 7.00% | | |
| PGIY-2-O4 | 6.00% | | |
| B-2O-O5 | 4.00% | | |

additionally comprises 0.04% of ST-3b-1 and 0.01% of ST-9-1..

Example M206

The liquid-crystalline mixture

| | | | |
|---|---|---|---|
| CC-3-V | 26.00% | Clearing point [° C.]: | 80.8 |
| CC-3-V1 | 7.00% | Δn [589 nm, 20° C.]: | 0.1099 |
| CCP-3-1 | 6.00% | Δε [1 kHz, 20° C.]: | −3.9 |
| CCY-3-O1 | 2.00% | $\varepsilon_{\parallel}$ [1 kHz, 20° C.]: | 3.7 |
| CCY-3-O2 | 7.00% | $\varepsilon_{\perp}$ [1 kHz, 20° C.]: | 7.6 |
| CCY-4-O2 | 7.00% | $K_1$ [pN, 20° C.]: | 14.2 |
| CCY-5-O2 | 4.00% | $K_3$ [pN, 20° C.]: | 15.6 |
| CLY-3-O2 | 8.00% | $V_0$ [pN, 20° C.]: | 2.12 |
| CY-3-O2 | 4.00% | $\gamma_1$ [mPa · s, 20° C.]: | 121 |
| PY-1-O4 | 5.00% | | |
| PY-3-O2 | 12.00% | | |
| PGIY-2-O4 | 8.00% | | |
| B-2O-O5 | 4.00% | | |

additionally comprises 0.04% of ST-3b-1 and 0.01% of ST-9-1..

Example M207

The liquid-crystalline mixture

| | | | |
|---|---|---|---|
| CC-3-V | 44.50% | Clearing point [° C.]: | 73.5 |
| CCY-3-O1 | 3.00% | Δn [589 nm, 20° C.]: | 0.1009 |
| CCY-3-O2 | 11.00% | Δε [1 kHz, 20° C.]: | −3.5 |
| CCY-4-O2 | 3.00% | $\varepsilon_{\parallel}$ [1 kHz, 20° C.]: | 3.6 |
| CPY-2-O2 | 9.00% | $\varepsilon_{\perp}$ [1 kHz, 20° C.]: | 7.1 |
| CPY-3-O2 | 10.00% | $K_1$ [pN, 20° C.]: | 13.1 |
| CY-3-O2 | 3.50% | $K_3$ [pN, 20° C.]: | 14.4 |
| PY-3-O2 | 11.00% | $V_0$ [pN, 20° C.]: | 2.16 |
| B-2O-O5 | 5.00% | $\gamma_1$ [mPa · s, 20° C.]: | 81 |

additionally comprises 0.025% of ST-8-1.

| Comparison | VHR after UV |
|---|---|
| M207 without stabiliser | 54% |
| M207 with stabiliser (0.025% of ST-8-1) | 76% |

Example M208

The liquid-crystalline mixture

| | | | |
|---|---|---|---|
| CCY-3-O1 | 8.00% | Clearing point [° C.]: | 82 |
| CCY-3-O2 | 1.00% | Δn [589 nm, 20° C.]: | 0.1081 |
| CLY-3-O2 | 10.00% | Δε [1 kHz, 20° C.]: | −3.5 |
| CPY-2-O2 | 9.50% | $\varepsilon_{\parallel}$ [1 kHz, 20° C.]: | 3.6 |
| CPY-3-O2 | 10.00% | $\varepsilon_{\perp}$ [1 kHz, 20° C.]: | 7.2 |
| PGIY-2-O4 | 5.00% | $K_1$ [pN, 20° C.]: | 14.4 |
| PYP-2-3 | 1.00% | $K_3$ [pN, 20° C.]: | 15.3 |
| B-2O-O5 | 5.00% | $V_0$ [pN, 20° C.]: | 2.20 |
| CC-3-V | 44.50% | $\gamma_1$ [mPa · s, 20° C.]: | 95 |
| PY-1-O4 | 4.00% | | |
| Y-4O-O4 | 2.00% | | |

additionally comprises 0.04% of ST-3b-1 and 0.01% of ST-9-1..

Example M209

The liquid-crystalline mixture

| | | | |
|---|---|---|---|
| B-2O-O5 | 4.00% | Clearing point [° C.]: | 84.6 |
| CC-3-V | 31.00% | Δn [589 nm, 20° C.]: | 0.1069 |
| CC-3-V1 | 4.00% | Δε [1 kHz, 20° C.]: | −3.8 |
| CCP-3-1 | 3.00% | $\varepsilon_{\parallel}$ [1 kHz, 20° C.]: | 3.7 |
| CCY-3-O2 | 8.50% | $\varepsilon_{\perp}$ [1 kHz, 20° C.]: | 7.5 |
| CCY-4-O2 | 6.00% | $K_1$ [pN, 20° C.]: | 14.1 |
| CLY-3-O2 | 6.00% | $K_3$ [pN, 20° C.]: | 15.0 |
| CLY-3-O3 | 6.00% | $V_0$ [pN, 20° C.]: | 2.09 |
| CPY-2-O2 | 8.00% | $\gamma_1$ [mPa · s, 20° C.]: | 88 |
| CPY-3-O2 | 8.00% | | |
| PY-3-O2 | 8.00% | | |
| PY-4-O2 | 3.00% | | |
| PYP-2-4 | 1.50% | | |
| Y-4O-O4 | 3.00% | | |

additionally comprises 0.04% of ST-3b-1 and 0.015% of ST-9-1..

Example M210

The liquid-crystalline mixture

| | | | |
|---|---|---|---|
| CCY-3-O2 | 10.00% | Clearing point [° C.]: | 85 |
| CCY-5-O2 | 7.00% | Δn [589 nm, 20° C.]: | 0.1047 |
| CPY-2-O2 | 10.00% | Δε [1 kHz, 20° C.]: | −3.4 |
| CPY-3-O2 | 10.00% | $\varepsilon_{\parallel}$ [1 kHz, 20° C.]: | 3.5 |
| PYP-2-3 | 5.50% | $\varepsilon_{\perp}$ [1 kHz, 20° C.]: | 6.9 |
| B-2O-O5 | 4.00% | $K_1$ [pN, 20° C.]: | 14.6 |
| CC-3-V | 32.00% | $K_3$ [pN, 20° C.]: | 17.4 |
| CC-3-V1 | 10.00% | $V_0$ [pN, 20° C.]: | 2.37 |
| CY-3-O2 | 10.00% | $\gamma_1$ [mPa · s, 20° C.]: | 108 |
| CY-5-O2 | 1.50% | | |

additionally comprises 0.04% of ST-3b-1 and 0.01% of ST-9-1..

Example M211

The liquid-crystalline mixture

| | | | |
|---|---|---|---|
| CC-3-V | 35.00% | Clearing point [° C.]: | 86 |
| CCY-3-O1 | 5.00% | Δn [589 nm, 20° C.]: | 0.1208 |
| CCY-3-O2 | 7.50% | Δε [1 kHz, 20° C.]: | −4.2 |
| CLY-3-O2 | 8.00% | $\varepsilon_{\parallel}$ [1 kHz, 20° C.]: | 3.8 |
| CPY-2-O2 | 10.00% | $\varepsilon_{\perp}$ [1 kHz, 20° C.]: | 8.0 |
| CPY-3-O2 | 10.00% | $K_1$ [pN, 20° C.]: | 14.3 |
| PY-3-O2 | 12.50% | $K_3$ [pN, 20° C.]: | 15.6 |
| PGIY-2-O4 | 8.00% | $V_0$ [pN, 20° C.]: | 2.04 |
| B-2O-O5 | 4.00% | $\gamma_1$ [mPa · s, 20° C.]: | 129 |

additionally comprises 0.04% of ST-3b-1 and 0.01% of ST-9-1..

Example M212

The liquid-crystalline mixture

| | | | |
|---|---|---|---|
| CC-3-V | 35.00% | Clearing point [° C.]: | 86.1 |
| CCY-3-O1 | 5.00% | Δn [589 nm, 20° C.]: | 0.1103 |
| CCY-3-O2 | 6.00% | Δε [1 kHz, 20° C.]: | −4.1 |
| CCY-3-O3 | 2.00% | $\varepsilon_{\parallel}$ [1 kHz, 20° C.]: | 3.7 |
| CCY-4-O2 | 6.00% | $\varepsilon_{\perp}$ [1 kHz, 20° C.]: | 7.8 |
| CLY-3-O2 | 8.00% | $K_1$ [pN, 20° C.]: | 14.2 |
| CPY-2-O2 | 10.00% | $K_3$ [pN, 20° C.]: | 15.7 |
| CPY-3-O2 | 9.50% | $V_0$ [pN, 20° C.]: | 2.06 |
| PY-1-O4 | 3.50% | $\gamma_1$ [mPa · s, 20° C.]: | 125 |
| PY-3-O2 | 11.00% | | |
| B-2O-O5 | 4.00% | | |

additionally comprises 0.04% of ST-3b-1 and 0.01% of ST-9-1..

Example M213

The liquid-crystalline mixture

| | | | |
|---|---|---|---|
| CCY-3-O1 | 3.50% | Clearing point [° C.]: | 86.5 |
| CCY-3-O2 | 4.50% | Δn [589 nm, 20° C.]: | 0.1053 |
| CLY-3-O2 | 9.00% | Δε [1 kHz, 20° C.]: | −3.4 |
| CPY-2-O2 | 10.50% | $\varepsilon_{\parallel}$ [1 kHz, 20° C.]: | 3.5 |
| CPY-3-O2 | 11.00% | $\varepsilon_{\perp}$ [1 kHz, 20° C.]: | 6.9 |
| PYP-2-3 | 3.50% | $K_1$ [pN, 20° C.]: | 14.8 |
| CC-3-V | 32.00% | $K_3$ [pN, 20° C.]: | 17.8 |
| CC-3-V1 | 12.00% | $V_0$ [pN, 20° C.]: | 2.41 |
| CY-3-O2 | 10.00% | $\gamma_1$ [mPa · s, 20° C.]: | 105 |
| B-2O-O5 | 4.00% | | |

additionally comprises 0.04% of ST-3b-1 and 0.01% of ST-9-1..

Example M214

The liquid-crystalline mixture

| | | | |
|---|---|---|---|
| CC-3-V | 22.50% | Clearing point [° C.]: | 97.2 |
| CC-3-V1 | 7.00% | Δn [589 nm, 20° C.]: | 0.1005 |

| | | | |
|---|---|---|---|
| CCP-3-1 | 2.00% | Δε [1 kHz, 20° C.]: | −4.6 |
| CCY-3-O1 | 5.00% | $ε_{\|\|}$ [1 kHz, 20° C.]: | 3.6 |
| CCY-3-O2 | 7.00% | $ε_⊥$ [1 kHz, 20° C.]: | 8.2 |
| CCY-3-O3 | 5.00% | $K_1$ [pN, 20° C.]: | 15.8 |
| CCY-4-O2 | 7.00% | $K_3$ [pN, 20° C.]: | 18.6 |
| CCY-5-O2 | 5.00% | $V_0$ [pN, 20° C.]: | 2.13 |
| CLY-3-O2 | 8.00% | $γ_1$ [mPa · s, 20° C.]: | 172 |
| CPY-3-O2 | 8.00% | | |
| CY-3-O2 | 12.00% | | |
| CY-5-O2 | 4.50% | | |
| PGIY-2-O4 | 3.00% | | |
| B-2O-O5 | 4.00% | | |

additionally comprises 0.04% of ST-3b-1 and 0.01% of ST-9-1..

Example M215

The liquid-crystalline mixture

| | | | |
|---|---|---|---|
| CC-3-V | 21.50% | Clearing point [° C.]: | 98.6 |
| CC-3-V1 | 7.00% | Δn [589 nm, 20° C.]: | 0.1103 |
| CCP-3-1 | 3.00% | Δε [1 kHz, 20° C.]: | −4.6 |
| CCY-3-O1 | 5.00% | $ε_{\|\|}$ [1 kHz, 20° C.]: | 3.7 |
| CCY-3-O2 | 7.00% | $ε_⊥$ [1 kHz, 20° C.]: | 8.3 |
| CCY-4-O2 | 7.00% | $K_1$ [pN, 20° C.]: | 16.3 |
| CCY-5-O2 | 4.00% | $K_3$ [pN, 20° C.]: | 18.7 |
| CLY-3-O2 | 8.00% | $V_0$ [pN, 20° C.]: | 2.12 |
| CPY-3-O2 | 10.50% | $γ_1$ [mPa · s, 20° C.]: | 175 |
| CY-3-O2 | 12.00% | | |
| CY-5-O2 | 3.00% | | |
| PGIY-2-O4 | 8.00% | | |
| B-2O-O5 | 4.00% | | |

additionally comprises 0.04% of ST-3b-1 and 0.01% of ST-9-1..

Example M216

The liquid-crystalline mixture

| | | | |
|---|---|---|---|
| CC-3-V1 | 7.00% | Clearing point [° C.]: | 109 |
| CCP-3-1 | 10.00% | Δn [589 nm, 20° C.]: | 0.1012 |
| CCP-3-3 | 6.50% | Δε [1 kHz, 20° C.]: | −5.2 |
| CCY-3-O1 | 5.00% | $ε_{\|\|}$ [1 kHz, 20° C.]: | 3.7 |
| CCY-3-O2 | 6.00% | $ε_⊥$ [1 kHz, 20° C.]: | 8.9 |
| CCY-3-O3 | 7.50% | $K_1$ [pN, 20° C.]: | 18.2 |
| CCY-4-O2 | 8.00% | $K_3$ [pN, 20° C.]: | 21.4 |
| CCY-5-O2 | 4.00% | $V_0$ [pN, 20° C.]: | 2.13 |
| CCY-3-1 | 8.00% | $γ_1$ [mPa · s, 20° C.]: | 287 |
| CLY-3-O2 | 8.00% | | |
| CY-3-O2 | 12.00% | | |
| CY-3-O4 | 14.00% | | |
| B-2O-O5 | 4.00% | | |

additionally comprises 0.04% of ST-3b-1 and 0.01% of ST-9-1..

Example M217

The liquid-crystalline mixture

| | | | |
|---|---|---|---|
| CC-3-V | 10.75% | Clearing point [° C.]: | 111.8 |
| CC-3-V1 | 3.50% | Δn [589 nm, 20° C.]: | 0.1104 |
| CCP-3-1 | 7.50% | Δε [1 kHz, 20° C.]: | −5.2 |
| CCY-3-O1 | 5.00% | $ε_{\|\|}$ [1 kHz, 20° C.]: | 3.7 |
| CCY-3-O2 | 7.50% | $ε_⊥$ [1 kHz, 20° C.]: | 8.9 |
| CCY-4-O2 | 7.50% | $K_1$ [pN, 20° C.]: | 17.9 |
| CCY-5-O2 | 4.50% | $K_3$ [pN, 20° C.]: | 21.0 |
| CLY-3-O2 | 8.00% | $V_0$ [pN, 20° C.]: | 2.13 |
| CPY-3-O2 | 8.00% | $γ_1$ [mPa · s, 20° C.]: | 267 |
| CY-3-O2 | 12.00% | | |
| CY-5-O2 | 5.00% | | |
| PGIY-2-O4 | 4.00% | | |

| | |
|---|---|
| B-2O-O5 | 4.00% |
| CCP-3-3 | 1.75% |
| CCY-3-O3 | 3.00% |
| CCY-2-1 | 4.00% |
| CCY-3-1 | 4.00% |

additionally comprises 0.04% of ST-3b-1 and 0.01% of ST-9-1..

Example M218

The liquid-crystalline mixture

| | | | |
|---|---|---|---|
| CCP-3-1 | 12.00% | Clearing point [° C.]: | 126 |
| CCP-3-3 | 3.50% | Δn [589 nm, 20° C.]: | 0.1103 |
| CCY-3-O1 | 5.00% | Δε [1 kHz, 20° C.]: | −5.8 |
| CCY-3-O2 | 8.00% | $ε_{\|\|}$ [1 kHz, 20° C.]: | 3.7 |
| CCY-3-O3 | 6.00% | $ε_⊥$ [1 kHz, 20° C.]: | 9.5 |
| CCY-4-O2 | 8.00% | $K_1$ [pN, 20° C.]: | 20.3 |
| CCY-5-O2 | 5.00% | $K_3$ [pN, 20° C.]: | 23.8 |
| CCY-2-1 | 8.00% | $V_0$ [pN, 20° C.]: | 2.14 |
| CCY-3-1 | 8.00% | $γ_1$ [mPa · s, 20° C.]: | 422 |
| CLY-3-O2 | 8.00% | | |
| CPY-3-O2 | 5.50% | | |
| CY-3-O2 | 12.00% | | |
| CY-5-O2 | 7.00% | | |
| B-2O-O5 | 4.00% | | |

additionally comprises 0.04% of ST-3b-1 and 0.01% of ST-9-1..

Example M219

The liquid-crystalline mixture

| | | | |
|---|---|---|---|
| CC-3-V | 12.50% | Clearing point [° C.]: | 110.3 |
| CC-3-V1 | 6.50% | Δn [589 nm, 20° C.]: | 0.1100 |
| CCP-3-1 | 12.50% | Δε [1 kHz, 20° C.]: | −4.8 |
| CCY-3-O1 | 5.00% | $ε_{\|\|}$ [1 kHz, 20° C.]: | 3.6 |
| CCY-3-O2 | 7.50% | $ε_⊥$ [1 kHz, 20° C.]: | 8.4 |
| CCY-4-O2 | 3.00% | $K_1$ [pN, 20° C.]: | 17.9 |
| CCY-5-O2 | 3.50% | $K_3$ [pN, 20° C.]: | 20.8 |
| CLY-2-O4 | 5.00% | $V_0$ [pN, 20° C.]: | 2.22 |
| CLY-3-O2 | 7.00% | $γ_1$ [mPa · s, 20° C.]: | 233 |
| CLY-3-O3 | 6.00% | | |
| CPY-3-O2 | 8.00% | | |
| CY-3-O2 | 12.00% | | |
| CY-5-O2 | 4.00% | | |
| PGIY-2-O4 | 3.50% | | |
| B-2O-O5 | 4.00% | | |

additionally comprises 0.04% of ST-3b-1 and 0.01% of ST-9-1..

Example M220

The liquid-crystalline mixture

| | | | |
|---|---|---|---|
| CC-3-V | 14.00% | Clearing point [° C.]: | 111 |
| CC-3-V1 | 6.00% | Δn [589 nm, 20° C.]: | 0.1102 |
| CCP-3-1 | 7.00% | Δε [1 kHz, 20° C.]: | −5.2 |
| CCY-3-O1 | 5.00% | $ε_{\|\|}$ [1 kHz, 20° C.]: | 3.7 |
| CCY-3-O2 | 8.00% | $ε_⊥$ [1 kHz, 20° C.]: | 8.9 |
| CCY-4-O2 | 5.50% | $K_1$ [pN, 20° C.]: | 18.5 |
| CCY-5-O2 | 2.00% | $K_3$ [pN, 20° C.]: | 20.5 |
| CLY-2-O4 | 7.00% | $V_0$ [pN, 20° C.]: | 2.10 |
| CLY-3-O2 | 8.00% | $γ_1$ [mPa · s, 20° C.]: | 241 |
| CLY-3-O3 | 7.00% | | |
| CPY-3-O2 | 10.00% | | |
| CY-3-O2 | 12.00% | | |
| CY-5-O2 | 2.50% | | |
| PGIY-2-O4 | 2.00% | | |
| B-2O-O5 | 4.00% | | |

Example M221

The liquid-crystalline mixture

| | | | |
|---|---|---|---|
| CC-3-V | 12.25% | Clearing point [° C.]: | 110.9 |
| CC-3-V1 | 6.00% | Δn [589 nm, 20° C.]: | 0.1101 |
| CCP-3-1 | 11.00% | Δε [1 kHz, 20° C.]: | −5.0 |
| CCY-3-O1 | 5.00% | $ε_{\|\|}$ [1 kHz, 20° C.]: | 3.6 |
| CCY-3-O2 | 7.75% | $ε_{⊥}$ [1 kHz, 20° C.]: | 8.6 |
| CCY-4-O2 | 5.00% | $K_1$ [pN, 20° C.]: | 18.5 |
| CCY-5-O2 | 3.50% | $K_3$ [pN, 20° C.]: | 20.8 |
| CLY-2-O4 | 5.00% | $V_0$ [pN, 20° C.]: | 2.16 |
| CLY-3-O2 | 7.00% | $γ_1$ [mPa · s, 20° C.]: | 240 |
| CLY-3-O3 | 6.00% | | |
| CPY-3-O2 | 8.00% | | |
| CY-3-O2 | 12.00% | | |
| CY-5-O2 | 4.25% | | |
| PGIY-2-O4 | 3.25% | | |
| B-2O-O5 | 4.00% | | |

additionally comprises 0.04% of ST-3b-1 and 0.01% of ST-9-1..

Example M222

The liquid-crystalline mixture

| | | | |
|---|---|---|---|
| CC-3-V | 12.00% | Clearing point [° C.]: | 111.6 |
| CC-3-V1 | 5.50% | Δn [589 nm, 20° C.]: | 0.1101 |
| CCP-3-1 | 9.50% | Δε [1 kHz, 20° C.]: | −5.2 |
| CCY-3-O1 | 5.00% | $ε_{\|\|}$ [1 kHz, 20° C.]: | 3.7 |
| CCY-3-O2 | 8.00% | $ε_{⊥}$ [1 kHz, 20° C.]: | 8.9 |
| CCY-4-O2 | 7.00% | $K_1$ [pN, 20° C.]: | 18.6 |
| CCY-5-O2 | 3.50% | $K_3$ [pN, 20° C.]: | 20.6 |
| CLY-2-O4 | 5.00% | $V_0$ [pN, 20° C.]: | 2.11 |
| CLY-3-O2 | 7.00% | $γ_1$ [mPa · s, 20° C.]: | 252 |
| CLY-3-O3 | 6.00% | | |
| CPY-3-O2 | 8.00% | | |
| CY-3-O2 | 12.00% | | |
| CY-5-O2 | 4.50% | | |
| PGIY-2-O4 | 3.00% | | |
| B-2O-O5 | 4.00% | | |

additionally comprises 0.04% of ST-3b-1 and 0.01% of ST-9-1..

Example M223

The liquid-crystalline mixture

| | | | |
|---|---|---|---|
| CC-3-V1 | 8.50% | Clearing point [° C.]: | 74 |
| CCH-23 | 18.00% | Δn [589 nm, 20° C.]: | 0.0975 |
| CCH-34 | 3.00% | Δε [1 kHz, 20° C.]: | −3.4 |
| CCH-35 | 6.00% | $ε_{\|\|}$ [1 kHz, 20° C.]: | 3.5 |
| CCP-3-1 | 10.50% | $ε_{⊥}$ [1 kHz, 20° C.]: | 6.9 |
| CCY-3-O2 | 11.00% | $K_1$ [pN, 20° C.]: | 15.1 |
| CCY-3-O1 | 9.00% | $K_3$ [pN, 20° C.]: | 15.5 |
| CPY-3-O2 | 4.50% | $V_0$ [pN, 20° C.]: | 2.27 |
| CY-3-O2 | 8.00% | $γ_1$ [mPa · s, 20° C.]: | 101 |
| PY-3-O2 | 13.00% | | |
| PY-4-O2 | 5.50% | | |
| B-2O-O5 | 3.00% | | |

additionally comprises 0.025% of ST-8-1.

| Comparison | VHR after UV |
|---|---|
| M223 without stabiliser | 88% |
| M223 with stabiliser (0.025% of ST-8-1) | 92% |

Example M224

The liquid-crystalline mixture

| | | | |
|---|---|---|---|
| CC-3-V1 | 8.50% | Clearing point [° C.]: | 74 |
| CCH-23 | 18.00% | Δn [589 nm, 20° C.]: | 0.0975 |
| CCH-34 | 3.00% | Δε [1 kHz, 20° C.]: | −3.4 |
| CCH-35 | 6.00% | $ε_{\|\|}$ [1 kHz, 20° C.]: | 3.5 |
| CCP-3-1 | 10.50% | $ε_{⊥}$ [1 kHz, 20° C.]: | 6.9 |
| CCY-3-O2 | 11.00% | $K_1$ [pN, 20° C.]: | 15.1 |
| CCY-3-O1 | 9.00% | $K_3$ [pN, 20° C.]: | 15.5 |
| CPY-3-O2 | 4.50% | $V_0$ [pN, 20° C.]: | 2.27 |
| CY-3-O2 | 8.00% | $γ_1$ [mPa · s, 20° C.]: | 101 |
| PY-3-O2 | 13.00% | | |
| PY-4-O2 | 5.50% | | |
| B-2O-O5 | 3.00% | | |

additionally comprises 0.01% of ST-9-1.

| Comparison | VHR after UV |
|---|---|
| M224 without stabiliser | 88% |
| M224 with stabiliser (0.025% of ST-9-1) | 93% |

Example M225

The liquid-crystalline mixture

| | | | |
|---|---|---|---|
| CY-3-O2 | 3.00% | Clearing point [° C.]: | 75.1 |
| CCY-3-O1 | 5.00% | Δn [589 nm, 20° C.]: | 0.10215 |
| CCY-3-O2 | 3.00% | Δε [1 kHz, 20° C.]: | −3.7 |
| CPY-2-O2 | 8.00% | $ε_{\|\|}$ [1 kHz, 20° C.]: | 3.8 |
| CPY-3-O2 | 10.00% | $ε_{⊥}$ [1 kHz, 20° C.]: | 7.5 |
| CLY-3-O2 | 7.00% | $K_1$ [pN, 20° C.]: | 13.3 |
| CLY-3-O3 | 4.00% | $K_3$ [pN, 20° C.]: | 14.0 |
| Y-4O-O4 | 6.00% | $V_0$ [pN, 20° C.]: | 2.04 |
| PGIY-2-O4 | 7.00% | $γ_1$ [mPa · s, 20° C.]: | 87 |
| B-2O-O5 | 4.00% | | |
| CC-3-V | 43.00% | | |

additionally comprises 0.04% of ST-3b-1 and 0.01% of ST-9-1..

Example M226

The liquid-crystalline mixture

| | | | |
|---|---|---|---|
| CY-3-O2 | 3.00% | Clearing point [° C.]: | 74.9 |
| CCY-3-O1 | 5.00% | Δn [589 nm, 20° C.]: | 0.1032 |
| CCY-3-O2 | 4.50% | Δε [1 kHz, 20° C.]: | −4.0 |
| CPY-2-O2 | 8.00% | $ε_{\|\|}$ [1 kHz, 20° C.]: | 3.9 |
| CPY-3-O2 | 10.00% | $ε_{⊥}$ [1 kHz, 20° C.]: | 7.9 |
| CLY-3-O2 | 7.00% | $K_1$ [pN, 20° C.]: | 13.2 |
| CLY-3-O3 | 4.00% | $K_3$ [pN, 20° C.]: | 13.9 |
| Y-4O-O4 | 7.00% | $V_0$ [pN, 20° C.]: | 1.96 |
| PGIY-2-O4 | 7.00% | $γ_1$ [mPa · s, 20° C.]: | 92 |
| B-2O-O5 | 4.00% | | |
| CC-3-V | 40.50% | | |

additionally comprises 0.04% of ST-3b-1 and 0.01% of ST-9-1..

Example M227

The liquid-crystalline mixture

| | | | |
|---|---|---|---|
| CY-3-O2 | 3.50% | Clearing point [° C.]: | 74.3 |
| CCY-3-O1 | 5.00% | Δn [589 nm, 20° C.]: | 0.1096 |

-continued

| | | | |
|---|---|---|---|
| CCY-3-O2 | 2.50% | Δε [1 kHz, 20° C.]: | −4.0 |
| CPY-2-O2 | 8.00% | $\varepsilon_{\parallel}$ [1 kHz, 20° C.]: | 4.0 |
| CPY-3-O2 | 10.00% | $\varepsilon_{\perp}$ [1 kHz, 20° C.]: | 8.0 |
| PYP-2-3 | 4.00% | $K_1$ [pN, 20° C.]: | 13.0 |
| CLY-3-O2 | 7.00% | $K_3$ [pN, 20° C.]: | 13.7 |
| CLY-3-O3 | 4.00% | $V_0$ [pN, 20° C.]: | 1.94 |
| Y-4O-O4 | 7.00% | $\gamma_1$ [mPa · s, 20° C.]: | 96 |
| PGIY-2-O4 | 7.00% | | |
| B-2O-O5 | 4.00% | | |
| CC-3-V | 38.00% | | |

additionally comprises 0.04% of ST-3b-1 and 0.01% of ST-9-1..

Example M228

The liquid-crystalline mixture

| | | | |
|---|---|---|---|
| B-2O-O5 | 4.00% | Clearing point [° C.]: | 84.6 |
| CC-3-V | 31.00% | Δn [589 nm, 20° C.]: | 0.1069 |
| CC-3-V1 | 4.00% | Δε [1 kHz, 20° C.]: | −3.8 |
| CCP-3-1 | 3.00% | $\varepsilon_{\parallel}$ [1 kHz, 20° C.]: | 3.7 |
| CCY-3-O2 | 8.50% | $\varepsilon_{\perp}$ [1 kHz, 20° C.]: | 7.5 |
| CCY-4-O2 | 6.00% | $K_1$ [pN, 20° C.]: | 14.1 |
| CLY-3-O2 | 6.00% | $K_3$ [pN, 20° C.]: | 15.0 |
| CLY-3-O3 | 6.00% | $V_0$ [pN, 20° C.]: | 2.09 |
| CPY-2-O2 | 8.00% | $\gamma_1$ [mPa · s, 20° C.]: | 88 |
| CPY-3-O2 | 8.00% | | |
| PY-3-O2 | 8.00% | | |
| PY-4-O2 | 3.00% | | |
| PYP-2-4 | 1.50% | | |
| Y-4O-O4 | 3.00% | | |

additionally comprises 0.04% of ST-3b-1 and 0.015% ST-9-1..

Example M229

The liquid-crystalline mixture

| | | | |
|---|---|---|---|
| CC-3-V | 5.00% | Clearing point [° C.]: | 75.5 |
| CC-3-V1 | 8.00% | Δn [589 nm, 20° C.]: | 0.1082 |
| CCH-23 | 11.50% | Δε[1 kHz, 20° C.]: | −3.3 |
| CCH-34 | 5.00% | $\varepsilon_{\parallel}$ [1 kHz, 20° C.]: | 3.6 |
| CCP-3-1 | 10.00% | $K_1$ [pN, 20° C.]: | 15.2 |
| CCP-3-3 | 5.00% | $K_3$ [pN, 20° C.]: | 16.0 |
| CCY-3-O1 | 4.00% | $\gamma_1$ [mPa · s, 20° C.]: | 104 |
| CCY-3-O2 | 11.50% | $V_0$ [20° C., V]: | 2.31 |
| CY-3-O2 | 14.50% | | |
| PY-3-O2 | 8.00% | | |
| PYP-2-3 | 8.00% | | |
| B-2O-O5 | 3.50% | | |
| B(S)-2O-O5 | 3.50% | | |
| PP-1-2V1 | 2.50% | | |

additionally comprises 0.04% of ST-3b-1 and 0.01% of ST-9-1..

Example M230

The liquid-crystalline mixture

| | | | |
|---|---|---|---|
| CC-3-V | 20.00% | Clearing point [° C.]: | 99 |
| CC-3-V1 | 6.00% | Δn [589 nm, 20° C.]: | 0.1008 |
| CCP-3-1 | 5.50% | Δε [1 kHz, 20° C.]: | −4.7 |
| CCY-3-O1 | 4.00% | $\varepsilon_{\parallel}$ [1 kHz, 20° C.]: | 3.6 |
| CCY-3-O2 | 5.00% | $K_1$ [pN, 20° C.]: | 16.4 |
| CCY-3-O3 | 4.00% | $K_3$ [pN, 20° C.]: | 18.6 |
| CCY-4-O2 | 5.00% | $\gamma_1$ [mPa · s, 20° C.]: | 183 |
| CCY-5-O2 | 3.00% | $V_0$ [20° C., V]: | 2.12 |
| CLY-2-O4 | 4.00% | | |
| CLY-3-O2 | 7.00% | | |
| CLY-3-O3 | 5.00% | | |

-continued

| | |
|---|---|
| CPY-3-O2 | 10.00% |
| CY-3-O2 | 10.00% |
| CY-5-O2 | 8.00% |
| B-2O-O5 | 4.00% |

additionally comprises 0.04% of ST-3b-1 and 0.01% of ST-9-1.

Example M231

For the preparation of a PS (polymer-stabilised) mixture, for example for PS-IPS, PS-VA, PS-FFS applications, 99.7% of the mixture according to Example M230 are mixed with 0.001% of Irganox 1076 and 0.3% of the polymerisable compound of the formula

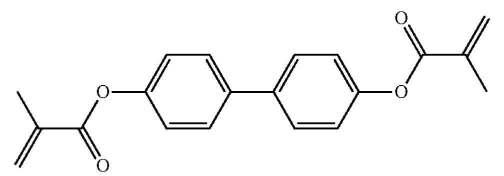

Example M232

The liquid-crystalline mixture

| | | | |
|---|---|---|---|
| CC-3-V | 42.00% | Clearing point [° C.]: | 74 |
| CCY-3-O2 | 11.00% | Δn [589 nm, 20° C.]: | 0.1008 |
| CPY-2-O2 | 10.00% | Δε [1 kHz, 20° C.]: | −3.7 |
| CPY-3-O2 | 11.00% | $\varepsilon_{\perp}$ [1 kHz, 20° C.]: | 7.3 |
| CY-3-O2 | 17.00% | $K_1$ [pN, 20° C.]: | 12.8 |
| PGIY-2-O4 | 5.00% | $K_3$ [pN, 20° C.]: | 14.6 |
| B(S)-2O-O5 | 4.00% | $\gamma_1$ [mPa · s, 20° C.]: | 86 |
| | | $V_0$ [20° C., V]: | 2.11 |

additionally comprises 0.03% of ST-8-1.

Example M233

The liquid-crystalline mixture

| | | | |
|---|---|---|---|
| CY-3-O2 | 17.00% | Clearing point [° C.]: | 74.4 |
| CCY-3-O2 | 6.00% | Δn [589 nm, 20° C.]: | 0.1116 |
| CLY-3-O2 | 7.00% | Δε [1 kHz, 20° C.]: | −3.7 |
| CPY-2-O2 | 3.00% | $\varepsilon_{\perp}$ [1 kHz, 20° C.]: | 7.4 |
| CPY-3-O2 | 10.00% | $K_1$ [pN, 20° C.]: | 13.5 |
| PYP-2-3 | 6.50% | $K_3$ [pN, 20° C.]: | 15.2 |
| PGIY-2-O4 | 7.00% | $\gamma_1$ [mPa · s, 20° C.]: | 97 |
| B-2O-O5 | 4.00% | $V_0$ [20° C., V]: | 2.14 |
| CC-3-V | 33.00% | $\varepsilon_{\perp}$ [1 kHz, 20° C.]: | 7.4 |
| CC-3-V1 | 6.50% | | |

additionally comprises 0.025% of ST-8-1.

Example M234

The liquid-crystalline mixture

| | | | |
|---|---|---|---|
| CY-3-O2 | 15.00% | Clearing point [° C.]: | 80.1 |
| CY-5-O2 | 3.50% | Δn [589 nm, 20° C.]: | 0.0951 |
| CCY-3-O1 | 5.00% | Δε [1 kHz, 20° C.]: | −4.0 |
| CCY-3-O2 | 6.00% | $\varepsilon_{\perp}$ [1 kHz, 20° C.]: | 7.7 |
| CCY-3-O3 | 5.50% | $K_1$ [pN, 20° C.]: | 13.9 |

-continued

| | | | |
|---|---|---|---|
| CCY-4-O2 | 6.00% | $K_3$ [pN, 20° C.]: | 15.5 |
| PYP-2-3 | 6.00% | $\gamma_1$ [mPa · s, 20° C.]: | 111 |
| CLY-3-O2 | 7.00% | $V_0$ [20° C., V]: | 2.05 |
| CLY-3-O3 | 7.00% | | |
| B-2O-O5 | 4.00% | | |
| CC-3-V | 35.00% | | |

additionally comprises 0.015% of ST-9-1.

Example M235

The liquid-crystalline mixture

| | | | |
|---|---|---|---|
| B-2O-O5 | 4.00% | Clearing point [° C.]: | 74.2 |
| BCH-32 | 8.00% | Δn [589 nm, 20° C.]: | 0.1091 |
| CC-3-V1 | 9.00% | Δε [1 kHz, 20° C.]: | −3.1 |
| CCH-301 | 2.00% | $\varepsilon_\perp$ [1 kHz, 20° C.]: | 6.7 |
| CCH-34 | 8.00% | $K_1$ [pN, 20° C.]: | 14.5 |
| CCH-35 | 7.00% | $K_3$ [pN, 20° C.]: | 16.5 |
| CCP-3-1 | 8.00% | $\gamma_1$ [mPa · s, 20° C.]: | 108 |
| CCP-V2-1 | 5.00% | $V_0$ [20° C., V]: | 2.41 |
| CCY-3-O2 | 10.50% | | |
| CLY-3-O2 | 1.00% | | |
| CPY-3-O2 | 2.50% | | |
| CY-3-O2 | 11.50% | | |
| PCH-301 | 5.50% | | |
| PY-3-O2 | 18.00% | | |

additionally comprises 0.005% of ST-3a-1.

Example M235a

For the preparation of a PS (polymer stabilised) mixture, for example for PS-IPS, PS-VA, PS-FFS applications, 99.65% of the mixture according to Example M235 are mixed with 0.35% of the polymerisable compound of the formula

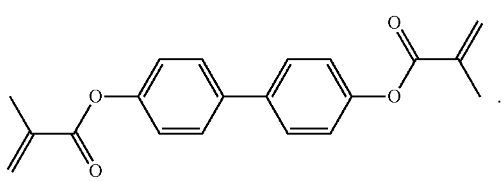 [SMILES: C=C(C)C(=O)Oc1ccc(-c2ccc(OC(=O)C(=C)C)cc2)cc1]

Example M236

The liquid-crystalline mixture

| | | | |
|---|---|---|---|
| CLY-2-O4 | 2.00% | Clearing point [° C.]: | 79.5 |
| CLY-3-O2 | 7.50% | Δn [589 nm, 20° C.]: | 0.1151 |
| CLY-3-O3 | 4.50% | Δε [1 kHz, 20° C.]: | −4.0 |
| CPY-2-O2 | 10.00% | $\varepsilon_\parallel$ [1 kHz, 20° C.]: | |
| CPY-3-O2 | 10.00% | $\varepsilon_\perp$ [1 kHz, 20° C.]: | 7.7 |
| PGIY-2-O4 | 8.00% | $K_1$ [pN, 20° C.]: | 14.3 |
| PYP-2-3 | 3.00% | $K_3$ [pN, 20° C.]: | 14.9 |
| B-2O-O5 | 5.00% | $\gamma_1$ [mPa · s, 20° C.]: | 107 |
| CC-3-V | 38.50% | $V_0$ [20° C., V]: | 2.02 |
| CY-3-O2 | 11.50% | | |

additionally comprises 0.015% of ST-3a-1.

Example M236

For the preparation of a PS (polymer stabilised) mixture, for example for PS-IPS, PS-VA, PS-FFS applications, 99.75% of the mixture according to Example M236 are mixed with 0.25% of the polymerisable compound of the formula

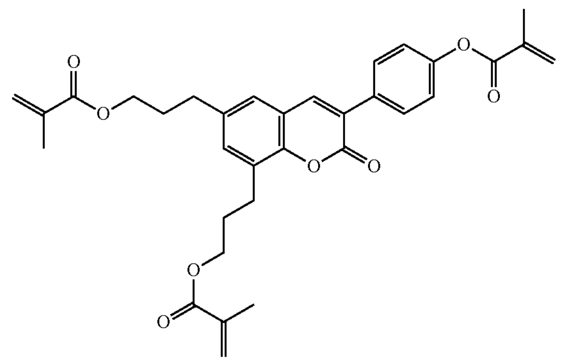

Example M237

The liquid-crystalline mixture

| | | | |
|---|---|---|---|
| CCY-3-O1 | 3.50% | Clearing point [° C.]: | 84.5 |
| CCY-3-O2 | 7.50% | Δn [589 nm, 20° C.]: | 0.1184 |
| CCY-4-O2 | 8.00% | Δε [1 kHz, 20° C.]: | −4.8 |
| CCY-5-O2 | 7.50% | $\varepsilon_\perp$ [1 kHz, 20° C.]: | 8.7 |
| CLY-3-O2 | 10.00% | $K_1$ [pN, 20° C.]: | 16.7 |
| PGIY-2-O4 | 5.00% | $K_3$ [pN, 20° C.]: | 17.3 |
| PYP-2-3 | 3.00% | $V_0$ [20° C., V]: | 1.99 |
| B-2O-O5 | 5.00% | | |
| CC-3-V | 23.00% | | |
| CC-3-V1 | 8.00% | | |
| PY-1-O4 | 5.50% | | |
| PY-3-O2 | 14.00% | | |

additionally comprises 0.03% of ST-3a-1.

Example M238

The liquid-crystalline mixture

| | | | |
|---|---|---|---|
| CCY-3-O1 | 3.00% | Clearing point [° C.]: | 84.5 |
| CCY-3-O2 | 8.00% | Δn [589 nm, 20° C.]: | 0.1223 |
| CCY-4-O2 | 8.00% | Δε [1 kHz, 20° C.]: | −4.9 |
| CCY-5-O2 | 7.00% | $\varepsilon_\perp$ [1 kHz, 20° C.]: | 8.8 |
| CLY-3-O2 | 10.00% | $K_1$ [pN, 20° C.]: | 16.7 |
| PGIY-2-O4 | 5.00% | $K_3$ [pN, 20° C.]: | 17.3 |
| PYP-2-3 | 4.50% | $V_0$ [20° C., V]: | 1.98 |
| B-2O-O5 | 5.00% | | |
| CC-3-V | 21.50% | | |
| CC-3-V1 | 8.00% | | |
| PY-1-O4 | 5.00% | | |
| PY-3-O2 | 15.00% | | |

additionally comprises 0.03% of ST-3a-1.

Example M239

The liquid-crystalline mixture

| | | | |
|---|---|---|---|
| CCY-3-O2 | 8.50% | Clearing point [° C.]: | 79.0 |
| CCY-4-O2 | 8.00% | Δn [589 nm, 20° C.]: | 0.1125 |
| CLY-2-O4 | 5.00% | Δε [1 kHz, 20° C.]: | −4.5 |
| CLY-3-O2 | 8.00% | $\varepsilon_\perp$ [1 kHz, 20° C.]: | 8.3 |
| CLY-3-O3 | 5.00% | $K_1$ [pN, 20° C.]: | 15.6 |
| PGIY-2-O4 | 5.00% | $K_3$ [pN, 20° C.]: | 15.6 |

-continued

| | | | |
|---|---|---|---|
| PYP-2-3 | 1.00% | $\gamma_1$ [mPa · s, 20° C.]: | 116 |
| B-2O-O5 | 5.00% | $V_0$ [20° C., V]: | 1.96 |
| CC-3-V | 27.50% | | |
| CC-3-V1 | 8.00% | | |
| PY-1-O4 | 4.00% | | |
| PY-3-O2 | 15.00% | | |

additionally comprises 0.025% of ST-3a-1.

Example M240

The liquid-crystalline mixture

| | | | |
|---|---|---|---|
| CCY-3-O1 | 5.00% | Clearing point [° C.]: | 79.5 |
| CCY-3-O2 | 8.00% | Δn [589 nm, 20° C.]: | 0.1047 |
| CCY-4-O2 | 8.00% | Δε [1 kHz, 20° C.]: | −4.4 |
| CLY-2-O4 | 5.00% | $\varepsilon_\perp$ [1 kHz, 20° C.]: | 8.2 |
| CLY-3-O2 | 8.00% | $K_1$ [pN, 20° C.]: | 15.5 |
| CLY-3-O3 | 5.00% | $K_3$ [pN, 20° C.]: | 15.9 |
| B-2O-O5 | 5.00% | $\gamma_1$ [mPa · s, 20° C.]: | 115 |
| CC-3-V | 28.50% | $V_0$ [20° C., V]: | 1.99 |
| CC-3-V1 | 7.50% | | |
| PY-1-O4 | 5.00% | | |
| PY-3-O2 | 15.00% | | |

additionally comprises 0.025% of ST-3a-1.

Example M241

The liquid-crystalline mixture

| | | | |
|---|---|---|---|
| CCY-3-O1 | 2.00% | Clearing point [° C.]: | 79.0 |
| CCY-3-O2 | 8.00% | Δn [589 nm, 20° C.]: | 0.1048 |
| CCY-4-O2 | 8.00% | Δε [1 kHz, 20° C.]: | −4.1 |
| CLY-2-O4 | 5.00% | $\varepsilon_\perp$ [1 kHz, 20° C.]: | 7.9 |
| CLY-3-O2 | 8.00% | $K_1$ [pN, 20° C.]: | 15.6 |
| CLY-3-O3 | 5.00% | $K_3$ [pN, 20° C.]: | 15.7 |
| PGIY-2-O4 | 2.50% | $\gamma_1$ [mPa · s, 20° C.]: | 107 |
| B-2O-O5 | 5.00% | | |
| CC-3-V | 31.00% | | |
| CC-3-V1 | 8.00% | | |
| PY-1-O4 | 2.50% | | |
| PY-3-O2 | 15.00% | | |

additionally comprises 0.02% of ST-2a-1.

Example M242

The liquid-crystalline mixture

| | | | |
|---|---|---|---|
| CCY-3-O2 | 8.00% | Clearing point [° C.]: | 79.5 |
| CCY-4-O2 | 3.50% | Δn [589 nm, 20° C.]: | 0.1050 |
| CCY-5-O2 | 3.50% | Δε [1 kHz, 20° C.]: | −3.8 |
| CLY-2-O4 | 5.00% | $\varepsilon_\perp$ [1 kHz, 20° C.]: | 7.5 |
| CLY-3-O2 | 8.00% | $K_1$ [pN, 20° C.]: | 15.6 |
| CLY-3-O3 | 5.00% | $K_3$ [pN, 20° C.]: | 15.8 |
| PGIY-2-O4 | 5.00% | $\gamma_1$ [mPa · s, 20° C.]: | 102 |
| B-2O-O5 | 5.00% | $V_0$ [20° C., V]: | 2.13 |
| CC-3-V | 34.00% | | |
| CC-3-V1 | 8.00% | | |
| PY-3-O2 | 15.00% | | |

additionally comprises 0.025% of ST-3a-1.

Example M243

The liquid-crystalline mixture

| | | | |
|---|---|---|---|
| CCY-3-O2 | 8.00% | Clearing point [° C.]: | 75.0 |
| CCY-4-O2 | 8.00% | Δn [589 nm, 20° C.]: | 0.1047 |
| CLY-2-O4 | 5.00% | Δε [1 kHz, 20° C.]: | −4.2 |
| CLY-3-O2 | 8.00% | $\varepsilon_\perp$ [1 kHz, 20° C.]: | 8.0 |
| CLY-3-O3 | 5.00% | $K_1$ [pN, 20° C.]: | 15.0 |
| PGIY-2-O4 | 2.00% | $K_3$ [pN, 20° C.]: | 15.2 |
| B-2O-O5 | 5.00% | $\gamma_1$ [mPa · s, 20° C.]: | 105 |
| CC-3-V | 30.00% | $V_0$ [20° C., V]: | 1.99 |
| CC-3-V1 | 8.00% | | |
| CY-5-O2 | 2.00% | | |
| PY-1-O4 | 4.00% | | |
| PY-3-O2 | 15.00% | | |

additionally comprises 0.03% of ST-3a-1.

Example M244

The liquid-crystalline mixture

| | | | |
|---|---|---|---|
| CCP-3-1 | 7.00% | Clearing point [° C.]: | 75.5 |
| CLY-3-O2 | 10.00% | Δn [589 nm, 20° C.]: | 0.0992 |
| CPY-2-O2 | 9.50% | Δε [1 kHz, 20° C.]: | −3.2 |
| CPY-3-O2 | 10.50% | $\varepsilon_\perp$ [1 kHz, 20° C.]: | 6.7 |
| B-2O-O5 | 5.00% | $K_1$ [pN, 20° C.]: | 13.1 |
| CC-3-V | 42.50% | $K_3$ [pN, 20° C.]: | 15.4 |
| CY-3-O2 | 12.00% | $\gamma_1$ [mPa · s, 20° C.]: | 85 |
| PY-3-O2 | 3.50% | $V_0$ [20° C., V]: | 2.32 |

additionally comprises 0.03% of ST-3a-1.

Example M245

The liquid-crystalline mixture

| | | | |
|---|---|---|---|
| CC-3-V | 32.50% | Clearing point [° C.]: | 79.8 |
| CC-3-V1 | 2.00% | Δn [589 nm, 20° C.]: | 0.1043 |
| CCP-3-1 | 2.50% | Δε [1 kHz, 20° C.]: | −3.5 |
| CCY-3-O2 | 8.00% | $K_1$ [pN, 20° C.]: | 13.7 |
| CCY-4-O2 | 3.00% | $K_3$ [pN, 20° C.]: | 14.8 |
| CLY-3-O2 | 6.00% | $\gamma_1$ [mPa · s, 20° C.]: | 102 |
| CLY-3-O3 | 6.00% | $V_0$ [20° C., V]: | 2.16 |
| CPY-2-O2 | 8.00% | | |
| CPY-3-O2 | 8.00% | | |
| CY-3-O2 | 9.00% | | |
| PYP-2-3 | 6.00% | | |
| PYP-2-4 | 3.00% | | |
| Y-4O-O4 | 6.00% | | |

additionally comprises 0.04% of ST-3b-1 and 0.015% of ST-9-1.

Example M246

The liquid-crystalline mixture

| | | | |
|---|---|---|---|
| CY-3-O2 | 10.00% | Clearing point [° C.]: | 69.7 |
| PY-3-O2 | 13.50% | Δn [589 nm, 20° C.]: | 0.1077 |
| CLY-3-O2 | 8.00% | Δε [1 kHz, 20° C.]: | −3.8 |
| CLY-3-O3 | 4.00% | $\varepsilon_\perp$ [1 kHz, 20° C.]: | 7.7 |
| CPY-2-O2 | 10.00% | $K_1$ [pN, 20° C.]: | 12.3 |
| CPY-3-O2 | 10.00% | $K_3$ [pN, 20° C.]: | 13.7 |
| B-2O-O5 | 5.00% | $\gamma_1$ [mPa · s, 20° C.]: | 76 |
| CC-3-V | 32.00% | $V_0$ [20° C., V]: | 1.98 |
| CC-3-V1 | 4.00% | | |
| CCP-3-1 | 2.50% | | |
| BCH-32 | 1.00% | | |

additionally comprises 0.02% of ST-3a-1.

Example M247

The liquid-crystalline mixture

| | | | |
|---|---|---|---|
| PY-3-O2 | 16.00% | Clearing point [° C.]: | 69.8 |
| PY-4-O2 | 6.50% | Δn [589 nm, 20° C.]: | 0.1075 |
| CCY-3-O1 | 4.00% | Δε [1 kHz, 20° C.]: | −3.9 |
| CCY-3-O2 | 6.00% | $\varepsilon_\perp$ [1 kHz, 20° C.]: | 7.8 |
| CPY-4-O2 | 6.00% | $K_1$ [pN, 20° C.]: | 12.6 |
| CLY-3-O2 | 8.00% | $K_3$ [pN, 20° C.]: | 13.0 |
| CLY-3-O3 | 4.00% | $V_0$ [20° C., V]: | 2.17 |
| B-2O-O5 | 5.00% | | |
| PGIY-2-O4 | 6.00% | | |
| CC-3-V | 32.00% | | |
| CC-3-V1 | 5.50% | | |
| BCH-32 | 1.00% | | |

additionally comprises 0.02% of ST-3a-1.

Example M248

The liquid-crystalline mixture

| | | | |
|---|---|---|---|
| CY-3-O2 | 12.00% | Clearing point [° C.]: | 75.6 |
| CY-5-O2 | 8.00% | Δn [589 nm, 20° C.]: | 0.1024 |
| CCY-3-O2 | 5.00% | Δε [1 kHz, 20° C.]: | −4.0 |
| CCY-4-O2 | 2.00% | $\varepsilon_\perp$ [1 kHz, 20° C.]: | 7.9 |
| CLY-3-O2 | 8.00% | $K_1$ [pN, 20° C.]: | 12.5 |
| CPY-2-O2 | 10.00% | $K_3$ [pN, 20° C.]: | 14.0 |
| CPY-3-O2 | 10.00% | $\gamma_1$ [mPa · s, 20° C.]: | 83 |
| B-2O-O5 | 4.00% | $V_0$ [20° C., V]: | 1.96 |
| PGIY-2-O4 | 5.00% | | |
| CC-3-V | 36.00% | | |

additionally comprises 0.02% of ST-3a-1 and 0.05% of ST-3b-1.

Example M249

The liquid-crystalline mixture

| | | | |
|---|---|---|---|
| B-O2-O5 | 5.00% | Clearing point [° C.]: | 74.5 |
| BCH-52 | 8.00% | Δn [589 nm, 20° C.]: | 0.1033 |
| CC-3-V | 22.50% | Δε [1 kHz, 20° C.]: | −3.0 |
| CCH-13 | 9.40% | $\varepsilon_\perp$ [1 kHz, 20° C.]: | 6.5 |
| CCH-34 | 5.50% | $K_1$ [pN, 20° C.]: | 13.4 |
| CCY-3-O1 | 8.20% | $K_3$ [pN, 20° C.]: | 13.5 |
| CCY-3-O2 | 8.80% | $\gamma_1$ [mPa · s, 20° C.]: | 96 |
| CCY-4-O2 | 11.60% | $V_0$ [20° C., V]: | 2.26 |
| PP-1-2V1 | 2.00% | | |
| PY-3-O2 | 15.00% | | |
| PY-4-O2 | 1.00% | | |
| PYP-2-3 | 3.00% | | |

additionally comprises 0.02% of ST-3a-1.

Example M249a

For the preparation of a PS (polymer stabilised) mixture, for example for PS-IPS, PS-VA, PS-FFS applications, 99.7% of the mixture according to Example M249 are mixed with 0.001% of Irganox 1076 and 0.3% of the polymerisable compound of the formula

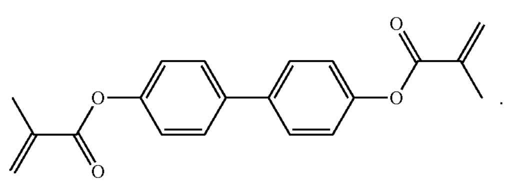

Example M250

The liquid-crystalline mixture

| | | | |
|---|---|---|---|
| CY-3-O2 | 17.00% | Clearing point [° C.]: | 74.4 |
| CCY-3-O2 | 6.00% | Δn [589 nm, 20° C.]: | 0.1116 |
| CLY-3-O2 | 7.00% | Δε [1 kHz, 20° C.]: | −3.7 |
| CPY-2-O2 | 3.00% | $\varepsilon_\perp$ [1 kHz, 20° C.]: | 7.4 |
| CPY-3-O2 | 10.00% | $K_1$ [pN, 20° C.]: | 13.5 |
| PYP-2-3 | 6.50% | $K_3$ [pN, 20° C.]: | 15.2 |
| PGIY-2-O4 | 7.00% | $\gamma_1$ [mPa · s, 20° C.]: | 97 |
| B2O-O5 | 4.00% | $V_0$ [20° C., V]: | 2.14 |
| CC-3-V | 33.00% | | |
| CC-3-V1 | 6.50% | | |

additionally comprises 0.02% of ST-3a-1.

Example M251

The liquid-crystalline mixture

| | | | |
|---|---|---|---|
| B-2O-O5 | 4.00% | Clearing point [° C.]: | 75.2 |
| BCH-32 | 7.00% | Δn [589 nm, 20° C.]: | 0.1040 |
| CC-3-V | 35.00% | Δε [1 kHz, 20° C.]: | −3.3 |
| CCY-3-O2 | 8.00% | $\varepsilon_\perp$ [1 kHz, 20° C.]: | 7.0 |
| CCY-4-O2 | 8.00% | $K_1$ [pN, 20° C.]: | 13.0 |
| CLY-3-O2 | 6.00% | $K_3$ [pN, 20° C.]: | 13.7 |
| CLY-3-O3 | 6.00% | $\gamma_1$ [mPa · s, 20° C.]: | 76 |
| CY-3-O2 | 5.50% | $V_0$ [20° C., V]: | 2.14 |
| CY-5-O2 | 3.00% | | |
| PY-3-O2 | 13.00% | | |
| PYP-2-3 | 4.50% | | |

additionally comprises 0.02% of ST-3a-1.

Example M252

The liquid-crystalline mixture

| | | | |
|---|---|---|---|
| CC-3-V | 42.00% | Clearing point [° C.]: | 74.0 |
| CCY-3-O2 | 11.00% | Δn [589 nm, 20° C.]: | 0.1008 |
| CPY-2-O2 | 10.00% | Δε [1 kHz, 20° C.]: | −3.7 |
| CPY-3-O2 | 11.00% | $\varepsilon_\perp$ [1 kHz, 20° C.]: | 7.3 |
| CY-3-O2 | 17.00% | $K_1$ [pN, 20° C.]: | 12.8 |
| PGIY-2-O4 | 5.00% | $K_3$ [pN, 20° C.]: | 14.6 |
| B(S)-2O-O5 | 4.00% | $\gamma_1$ [mPa · s, 20° C.]: | 86 |
| | | $V_0$ [20° C., V]: | 2.11 |

additionally comprises 0.025% of ST-3a-1.

Example M253

The liquid-crystalline mixture

| | | | |
|---|---|---|---|
| B-2O-O5 | 4.00% | Clearing point [° C.]: | 89.6 |
| BCH-32 | 3.50% | Δn [589 nm, 20° C.]: | 0.1096 |
| CC-3-V | 25.00% | Δε [1 kHz, 20° C.]: | −4.2 |
| CCP-3-1 | 11.00% | $\varepsilon_\perp$ [1 kHz, 20° C.]: | 7.8 |
| CCY-3-O1 | 3.00% | $K_1$ [pN, 20° C.]: | 16.3 |
| CCY-3-O2 | 8.00% | $K_3$ [pN, 20° C.]: | 17.6 |
| CCY-4-O2 | 8.00% | $\gamma_1$ [mPa · s, 20° C.]: | 139 |
| CLY-3-O2 | 6.50% | $V_0$ [20° C., V]: | 2.17 |
| CLY-3-O3 | 6.50% | | |
| CY-3-O2 | 8.50% | | |
| PGIY-2-O4 | 3.00% | | |
| PY-3-O2 | 13.00% | | |

additionally comprises 0.025% of ST-9-1.

Example M254

The liquid-crystalline mixture

| | | | |
|---|---|---|---|
| CC-3-V | 37.00% | Clearing point [° C.]: | 80.0 |
| CY-3-O2 | 15.00% | Δn [589 nm, 20° C.]: | 0.1079 |
| CCY-3-O1 | 5.00% | Δε [1 kHz, 20° C.]: | −3.7 |
| CCY-3-O2 | 11.00% | $\varepsilon_{\parallel}$ [1 kHz, 20° C.]: | 3.7 |
| CPY-2-O2 | 9.50% | $\varepsilon_{\perp}$ [1 kHz, 20° C.]: | 7.4 |
| CPY-3-O2 | 10.50% | $K_1$ [pN, 20° C.]: | 13.5 |
| PYP-2-3 | 4.00% | $K_3$ [pN, 20° C.]: | 15.3 |
| PGIY-2-O4 | 4.00% | $\gamma_1$ [mPa · s, 20° C.]: | 104 |
| B(S)-1-O5 | 4.00% | $V_0$ [20° C., V]: | 2.14 |
| | | LTS [bulk, −20° C.]: | >1000 h |

additionally comprises 0.02% of ST-3a-1.

Example M255

The liquid-crystalline mixture

| | | | |
|---|---|---|---|
| CC-3-V | 37.00% | Clearing point [° C.]: | 80.0 |
| CY-3-O2 | 14.50% | Δn [589 nm, 20° C.]: | 0.1077 |
| CCY-3-O1 | 5.00% | Δε [1 kHz, 20° C.]: | −3.7 |
| CCY-3-O2 | 11.00% | $\varepsilon_{\parallel}$ [1 kHz, 20° C.]: | 3.7 |
| CPY-2-O2 | 10.00% | $\varepsilon_{\perp}$ [1 kHz, 20° C.]: | 7.4 |
| CPY-3-O2 | 10.50% | $K_1$ [pN, 20° C.]: | 13.4 |
| PYP-2-3 | 4.00% | $K_3$ [pN, 20° C.]: | 15.2 |
| PGIY-2-O4 | 4.00% | $\gamma_1$ [mPa · s, 20° C.]: | 104 |
| B(S)-2-O5 | 4.00% | $V_0$ [20° C., V]: | 2.14 |
| | | LTS [bulk, −20° C.]: | >1000 h |

additionally comprises 0.02% of ST-3a-1 and 0.01% of ST-8-1.

Example M256

The liquid-crystalline mixture

| | | | |
|---|---|---|---|
| CC-3-V | 40.00% | Clearing point [° C.]: | 80.5 |
| CY-3-O2 | 10.50% | Δn [589 nm, 20° C.]: | 0.1076 |
| CCY-3-O1 | 5.00% | Δε [1 kHz, 20° C.]: | −3.6 |
| CCY-3-O2 | 11.00% | $\varepsilon_{\parallel}$ [1 kHz, 20° C.]: | 3.6 |
| CPY-2-O2 | 7.50% | $\varepsilon_{\perp}$ [1 kHz, 20° C.]: | 7.2 |
| CPY-3-O2 | 11.00% | $K_1$ [pN, 20° C.]: | 14.2 |
| PYP-2-3 | 3.00% | $K_3$ [pN, 20° C.]: | 15.5 |
| PGIY-2-O4 | 4.00% | $\gamma_1$ [mPa · s, 20° C.]: | 99 |
| B(S)-5-O3 | 4.00% | $V_0$ [20° C., V]: | 2.20 |
| B(S)-5-O4 | 4.00% | LTS [bulk, −20° C.]: | >1000 h |

additionally comprises 0.02% of ST-3a-1.

Example M257

The liquid-crystalline mixture

| | | | |
|---|---|---|---|
| CC-3-V | 38.00% | Clearing point [° C.]: | 79.0 |
| CY-3-O2 | 7.50% | Δn [589 nm, 20° C.]: | 0.1075 |
| CCY-3-O1 | 5.00% | Δε [1 kHz, 20° C.]: | −3.5 |
| CCY-3-O2 | 11.00% | $\varepsilon_{\parallel}$ [1 kHz, 20° C.]: | 3.7 |
| CCY-4-O2 | 3.00% | $\varepsilon_{\perp}$ [1 kHz, 20° C.]: | 7.2 |
| CPY-2-O2 | 9.00% | $K_1$ [pN, 20° C.]: | 13.4 |
| CPY-3-O2 | 11.00% | $K_3$ [pN, 20° C.]: | 14.7 |
| PGIY-2-O4 | 4.50% | $\gamma_1$ [mPa · s, 20° C.]: | 103 |
| B(S)-2-3 | 11.00% | $V_0$ [20° C., V]: | 2.17 |
| | | LTS [bulk, −20° C.]: | >1000 h |

additionally comprises 0.02% of ST-3a-1.

Example M258

The liquid-crystalline mixture

| | | | |
|---|---|---|---|
| B-2O-O5 | 4.00% | Clearing point [° C.]: | 74.3 |
| BCH-32 | 11.00% | Δn [589 nm, 20° C.]: | 0.1108 |
| CC-3-V1 | 7.00% | Δε [1 kHz, 20° C.]: | −3.5 |
| CCH-301 | 8.00% | $\varepsilon_{\parallel}$ [1 kHz, 20° C.]: | |
| CCH-34 | 10.00% | $\varepsilon_{\perp}$ [1 kHz, 20° C.]: | 7.2 |
| CCH-35 | 4.50% | $K_1$ [pN, 20° C.]: | 13.7 |
| CCY-4-O2 | 10.50% | $K_3$ [pN, 20° C.]: | 13.4 |
| CLY-2-O4 | 1.00% | $\gamma_1$ [mPa · s, 20° C.]: | 121 |
| CPY-2-O2 | 11.00% | | |
| CPY-3-O2 | 6.00% | | |
| CY-3-O2 | 9.50% | | |
| PCH-301 | 6.00% | | |
| PY-3-O2 | 3.00% | | |
| PY-4-O2 | 8.50% | | |

additionally comprises 0.02% of ST-3a-1 and 0.01% of ST-8-1.

Example M259

The liquid-crystalline mixture

| | | | |
|---|---|---|---|
| B-2O-O5 | 4.00% | Clearing point [° C.]: | 74.6 |
| BCH-32 | 8.00% | Δn [589 nm, 20° C.]: | 0.1090 |
| CC-3-V1 | 7.00% | Δε [1 kHz, 20° C.]: | −3.1 |
| CCH-34 | 8.00% | $\varepsilon_{\perp}$ [1 kHz, 20° C.]: | 6.7 |
| CCH-35 | 7.00% | $K_1$ [pN, 20° C.]: | 14.2 |
| CCP-3-1 | 8.00% | $K_3$ [pN, 20° C.]: | 16.5 |
| CCP-V2-1 | 5.00% | $\gamma_1$ [mPa · s, 20° C.]: | 112 |
| CCY-3-O2 | 8.50% | $V_0$ [20° C., V]: | 2.42 |
| CCY-4-O2 | 1.50% | | |
| CLY-3-O2 | 5.00% | | |
| CY-3-O2 | 11.00% | | |
| PCH-301 | 10.00% | | |
| PY-3-O2 | 17.00% | | |

additionally comprises 0.01% of ST-3a-1.

Example M259a

For the preparation of a PS (polymer stabilised) mixture, for example for PS-IPS, PS-VA, PS-FFS applications, 99.65% of the mixture according to Example M259 are mixed with 0.35% of the polymerisable compound of the formula

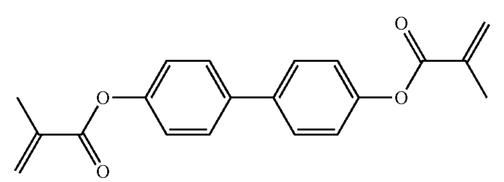

Example M260

The liquid-crystalline mixture

| | | | |
|---|---|---|---|
| CLY-3-O2 | 8.00% | Clearing point [° C.]: | 81.5 |
| CLY-5-O2 | 6.00% | Δn [589 nm, 20° C.]: | 0.1017 |
| CPY-3-O2 | 10.00% | Δε [1 kHz, 20° C.]: | −4.1 |
| B(S)-2O-O4 | 6.00% | $\varepsilon_{\perp}$ [1 kHz, 20° C.]: | 7.7 |
| B(S)-2O-O5 | 6.00% | $K_1$ [pN, 20° C.]: | 15.5 |
| CC-3-V | 36.00% | $K_3$ [pN, 20° C.]: | 17.0 |
| CC-3-V1 | 9.00% | $\gamma_1$ [mPa · s, 20° C.]: | 98 |

-continued

| | | | |
|---|---|---|---|
| CY-3-O2 | 13.00% | $V_0$ [20° C., V]: | 2.15 |
| PGIY-2-O4 | 1.00% | | |
| CCY-3-O2 | 5.00% | | |

additionally comprises 0.03% of ST-3a-1.

Example M261

The liquid-crystalline mixture

| | | | |
|---|---|---|---|
| CC-3-V | 30.00% | Clearing point [° C.]: | 87.0 |
| CC-3-V1 | 10.00% | Δn [589 nm, 20° C.]: | 0.1019 |
| CCH-34 | 2.50% | Δε [1 kHz, 20° C.]: | −3.7 |
| CCP-V-1 | 1.50% | $ε_⊥$ [1 kHz, 20° C.]: | 7.1 |
| PGIY-2-O4 | 4.00% | $K_1$ [pN, 20° C.]: | 15.2 |
| CCY-3-O2 | 10.00% | $K_3$ [pN, 20° C.]: | 18.0 |
| CCY-5-O2 | 2.00% | $γ_1$ [mPa · s, 20° C.]: | 112 |
| CLY-3-O2 | 8.00% | $V_0$ [20° C., V]: | 2.35 |
| CPY-2-O2 | 6.00% | | |
| CPY-3-O2 | 10.00% | | |
| CY-3-O2 | 12.00% | | |
| B-2O-O5 | 4.00% | | |

additionally comprises 0.15% of ST-12.

Example M262

The liquid-crystalline mixture

| | | | |
|---|---|---|---|
| CCY-3-O2 | 6.00% | Clearing point [° C.]: | 84.0 |
| CCY-5-O2 | 6.00% | Δn [589 nm, 20° C.]: | 0.1018 |
| CLY-3-O2 | 8.00% | Δε [1 kHz, 20° C.]: | −3.6 |
| CLY-3-O3 | 8.00% | $ε_⊥$ [1 kHz, 20° C.]: | 7.0 |
| CPY-3-O2 | 10.00% | $K_1$ [pN, 20° C.]: | 15.1 |
| PGIY-2-O4 | 2.00% | $K_3$ [pN, 20° C.]: | 18.2 |
| B-2O-O5 | 4.00% | $γ_1$ [mPa · s, 20° C.]: | 107 |
| CC-3-V | 29.50% | $V_0$ [20° C., V]: | 2.38 |
| CC-3-V1 | 10.00% | | |
| CY-3-O2 | 12.00% | | |
| PP-1-3 | 4.50% | | |

additionally comprises 0.03% of ST-3a-1.

Example M263

The liquid-crystalline mixture

| | | | |
|---|---|---|---|
| CY-3-O2 | 4.00% | Clearing point [° C.]: | 80.4 |
| CCY-3-O1 | 3.50% | Δn [589 nm, 20° C.]: | 0.1007 |
| CCY-3-O2 | 6.00% | Δε [1 kHz, 20° C.]: | −4.0 |
| CCY-4-O2 | 6.00% | $ε_⊥$ [1 kHz, 20° C.]: | 7.8 |
| CPY-3-O2 | 10.00% | $K_1$ [pN, 20° C.]: | 14.9 |
| PYP-2-3 | 1.00% | $K_3$ [pN, 20° C.]: | 15.7 |
| CLY-3-O2 | 6.00% | $γ_1$ [mPa · s, 20° C.]: | 101 |
| CLY-3-O3 | 6.00% | $V_0$ [20° C., V]: | 2.07 |
| Y-4O-O4 | 6.00% | | |
| PGIY-2-O4 | 5.50% | | |
| B-2O-O5 | 5.00% | | |
| CC-3-V | 33.00% | | |
| CC-3-V1 | 8.00% | | |

additionally comprises 0.015% of ST-9-1.

Example M264

The liquid-crystalline mixture

| | | | |
|---|---|---|---|
| CCY-3-O1 | 6.50% | Clearing point [° C.]: | 84.5 |
| CCY-3-O2 | 9.00% | Δn [589 nm, 20° C.]: | 0.1106 |

-continued

| | | | |
|---|---|---|---|
| CCY-4-O2 | 4.00% | Δε [1 kHz, 20° C.]: | −4.5 |
| CCY-5-O2 | 4.00% | $ε_⊥$ [1 kHz, 20° C.]: | 8.3 |
| CLY-3-O2 | 8.00% | $K_1$ [pN, 20° C.]: | 15.6 |
| CLY-3-O3 | 7.00% | $K_3$ [pN, 20° C.]: | 16.2 |
| PGIY-2-O4 | 5.50% | $γ_1$ [mPa · s, 20° C.]: | 127 |
| PGP-2-3 | 1.00% | $V_0$ [20° C., V]: | 2.01 |
| B-2O-O5 | 5.00% | | |
| CC-3-V | 33.50% | | |
| CC-3-V1 | 1.00% | | |
| PY-2-O4 | 5.00% | | |
| PY-3-O2 | 10.50% | | |

additionally comprises 0.02% of ST-3a-1.

Example M265

The liquid-crystalline mixture

| | | | |
|---|---|---|---|
| B-2O-O5 | 4.00% | Clearing point [° C.]: | 75 |
| BCH-32 | 3.00% | Δn [589 nm, 20° C.]: | 0.1096 |
| CC-3-V1 | 9.00% | Δε [1 kHz, 20° C.]: | −3.1 |
| CCH-301 | 2.00% | $ε_⊥$ [1 kHz, 20° C.]: | 6.6 |
| CCH-34 | 8.00% | $K_1$ [pN, 20° C.]: | 13.6 |
| CCH-35 | 8.00% | $K_3$ [pN, 20° C.]: | 16.3 |
| CCP-V2-1 | 5.00% | $γ_1$ [mPa · s, 20° C.]: | 109 |
| CCY-3-O2 | 1.50% | $V_0$ [20° C., V]: | 2.39 |
| CLY-3-O2 | 10.00% | | |
| CPY-2-O2 | 8.00% | | |
| CPY-3-O2 | 8.00% | | |
| CY-3-O2 | 6.50% | | |
| PCH-301 | 17.50% | | |
| PY-3-O2 | 9.50% | | |

additionally comprises 0.02% of ST-3a-1 and 0.3% of the compound of the formula

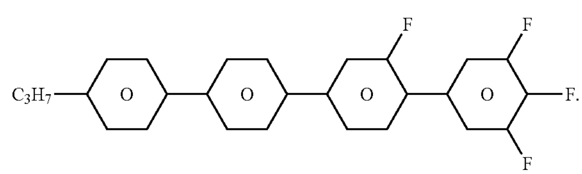

Example M265a

For the preparation of a PS (polymer stabilised) mixture, for example for PS-IPS, PS-VA, PS-FFS applications, 99.65% of the mixture according to Example M265 are mixed with 0.35% of the polymerisable compound of the formula

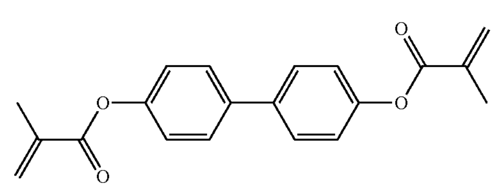

Example M266

The liquid-crystalline mixture

| | | | |
|---|---|---|---|
| B-2O-O5 | 4.00% | Clearing point [° C.]: | 74.4 |
| BCH-32 | 8.00% | Δn [589 nm, 20° C.]: | 0.1087 |
| CC-3-V1 | 9.00% | Δε [1 kHz, 20° C.]: | −3.1 |
| CCH-301 | 2.00% | $\varepsilon_\perp$ [1 kHz, 20° C.]: | 6.6 |
| CCH-34 | 8.00% | $K_1$ [pN, 20° C.]: | 14.3 |
| CCH-35 | 7.00% | $K_3$ [pN, 20° C.]: | 16.5 |
| CCP-3-1 | 8.00% | $\gamma_1$ [mPa · s, 20° C.]: | 107 |
| CCY-3-O2 | 4.00% | $V_0$ [20° C., V]: | 2.42 |
| CCY-4-O2 | 2.50% | | |
| CLY-3-O2 | 10.00% | | |
| CPY-3-O2 | 2.00% | | |
| CY-3-O2 | 8.50% | | |
| PCH-301 | 11.00% | | |
| PY-3-O2 | 16.00% | | |

additionally comprises 0.02% of ST-3a-1.

Example M267

The liquid-crystalline mixture

| | | | |
|---|---|---|---|
| B-2O-O5 | 4.00% | Clearing point [° C.]: | 74.1 |
| BCH-32 | 3.00% | Δn [589 nm, 20° C.]: | 0.1090 |
| CC-3-V1 | 9.00% | Δε [1 kHz, 20° C.]: | −3.1 |
| CCH-301 | 2.00% | $\varepsilon_\perp$ [1 kHz, 20° C.]: | 6.7 |
| CCH-34 | 8.00% | $K_1$ [pN, 20° C.]: | 14.2 |
| CCH-35 | 8.00% | $K_3$ [pN, 20° C.]: | 16.5 |
| CCP-3-1 | 5.00% | $\gamma_1$ [mPa · s, 20° C.]: | 109 |
| CCY-3-O2 | 1.50% | $V_0$ [20° C., V]: | 2.43 |
| CPY-3-O2 | 10.00% | | |
| CY-3-O2 | 8.00% | | |
| PCH-301 | 8.00% | | |
| PY-3-O2 | 6.50% | | |

additionally comprises 0.01% of ST-8-1.

Example M268

The liquid-crystalline mixture

| | | | |
|---|---|---|---|
| B-2O-O5 | 4.00% | Clearing point [° C.]: | 74.2 |
| BCH-32 | 8.00% | Δn [589 nm, 20° C.]: | 0.1088 |
| CC-3-V1 | 9.00% | Δε [1 kHz, 20° C.]: | −3.1 |
| CCH-301 | 2.00% | $\varepsilon_\perp$ [1 kHz, 20° C.]: | 6.7 |
| CCH-34 | 9.00% | $K_1$ [pN, 20° C.]: | 14.1 |
| CCH-35 | 7.00% | $K_3$ [pN, 20° C.]: | 16.5 |
| CCP-3-1 | 8.50% | $\gamma_1$ [mPa · s, 20° C.]: | 109 |
| CCY-3-O2 | 11.49% | $V_0$ [20° C., V]: | 2.43 |
| CLY-3-O2 | 0.01% | | |
| CPY-3-O2 | 6.50% | | |
| CY-3-O2 | 10.00% | | |
| PCH-301 | 9.00% | | |
| PY-3-O2 | 15.50% | | |

additionally comprises 0.01% of ST-3a-1.

Example M269

The liquid-crystalline mixture

| | | | |
|---|---|---|---|
| B-2O-O5 | 4.00% | Clearing point [° C.]: | 74.2 |
| BCH-32 | 8.00% | Δn [589 nm, 20° C.]: | 0.1085 |
| CC-3-V1 | 9.00% | Δε [1 kHz, 20° C.]: | −3.1 |
| CCH-301 | 2.00% | $\varepsilon_\perp$ [1 kHz, 20° C.]: | 6.7 |
| CCH-34 | 9.00% | $K_1$ [pN, 20° C.]: | 14.2 |
| CCH-35 | 7.00% | $K_3$ [pN, 20° C.]: | 16.5 |
| CCP-3-1 | 8.50% | $\gamma_1$ [mPa · s, 20° C.]: | 109 |
| CCY-3-O2 | 11.45% | $V_0$ [20° C., V]: | 2.42 |
| CLY-3-O2 | 0.05% | | |
| CPY-3-O2 | 6.50% | | |
| CY-3-O2 | 10.00% | | |
| PCH-301 | 9.00% | | |
| PY-3-O2 | 15.50% | | |

additionally comprises 0.03% of ST-3a-1.

Example M270

The liquid-crystalline mixture

| | | | |
|---|---|---|---|
| B-2O-O5 | 4.00% | Clearing point [° C.]: | 74.2 |
| BCH-32 | 8.00% | Δn [589 nm, 20° C.]: | 0.1088 |
| CC-3-V1 | 9.00% | Δε [1 kHz, 20° C.]: | −3.1 |
| CCH-301 | 2.00% | $\varepsilon_\perp$ [1 kHz, 20° C.]: | 6.7 |
| CCH-34 | 9.00% | $K_1$ [pN, 20° C.]: | 14.2 |
| CCH-35 | 7.00% | $K_3$ [pN, 20° C.]: | 16.5 |
| CCP-3-1 | 8.50% | $\gamma_1$ [mPa · s, 20° C.]: | 109 |
| CCY-3-O2 | 11.40% | $V_0$ [20° C., V]: | 2.43 |
| CLY-3-O2 | 0.10% | | |
| CPY-3-O2 | 6.50% | | |
| CY-3-O2 | 10.00% | | |
| PCH-301 | 9.00% | | |
| PY-3-O2 | 15.50% | | |

additionally comprises 0.01% of ST-17.

Example M271

The liquid-crystalline mixture

| | | | |
|---|---|---|---|
| B-2O-O5 | 4.00% | Clearing point [° C.]: | 74.2 |
| BCH-32 | 8.00% | Δn [589 nm, 20° C.]: | 0.1091 |
| CC-3-V1 | 9.00% | Δε [1 kHz, 20° C.]: | −3.1 |
| CCH-301 | 2.00% | $\varepsilon_\perp$ [1 kHz, 20° C.]: | 6.7 |
| CCH-34 | 8.00% | $K_1$ [pN, 20° C.]: | 14.5 |
| CCH-35 | 7.00% | $K_3$ [pN, 20° C.]: | 16.5 |
| CCP-3-1 | 8.00% | $\gamma_1$ [mPa · s, 20° C.]: | 108 |
| CCP-V2-1 | 5.00% | $V_0$ [20° C., V]: | 2.41 |
| CCY-3-O2 | 10.50% | | |
| CLY-3-O2 | 1.00% | | |
| CPY-3-O2 | 2.50% | | |
| CY-3-O2 | 11.50% | | |
| PCH-301 | 5.50% | | |
| PY-3-O2 | 18.00% | | |

additionally comprises 0.02% of ST-3a-1 and 0.3% of the compound of the formula

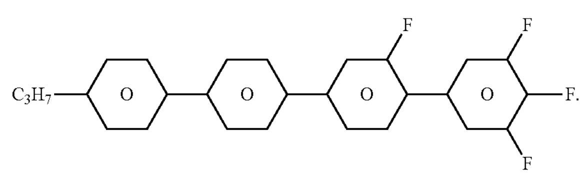

Example M271a

For the preparation of a PS (polymer stabilised) mixture, for example for PS-IPS, PS-VA, PS-FFS applications, 99.65% of the mixture according to Example M271 are mixed with 0.35% of the polymerisable compound of the formula

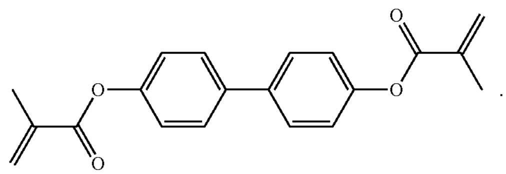

Example M272

The liquid-crystalline mixture

| | | | |
|---|---|---|---|
| B-2O-O5 | 2.00% | Clearing point [° C.]: | 100.0 |
| BCH-32 | 2.00% | Δn [589 nm, 20° C.]: | 0.1166 |
| CC-3-V | 29.00% | Δε [1 kHz, 20° C.]: | −3.4 |
| CCP-3-1 | 7.50% | $ε_⊥$ [1 kHz, 20° C.]: | 6.9 |
| CCY-3-O1 | 4.00% | $K_1$ [pN, 20° C.]: | 15.9 |
| CCY-3-O2 | 6.50% | $K_3$ [pN, 20° C.]: | 17.4 |
| CCY-4-O2 | 6.00% | $γ_1$ [mPa · s, 20° C.]: | 116 |
| CLY-3-O2 | 4.00% | $V_0$ [20° C., V]: | 2.41 |
| CPY-2-O2 | 7.50% | | |
| CPY-3-O2 | 10.00% | | |
| CY-3-O2 | 10.00% | | |
| PGIY-2-O4 | 4.00% | | |
| PYP-2-3 | 7.50% | | |

additionally comprises 0.02% of ST-3a-1.

Example M273

The liquid-crystalline mixture

| | | | |
|---|---|---|---|
| B-2O-O5 | 2.00% | Clearing point [° C.]: | 100.4 |
| BCH-32 | 4.00% | Δn [589 nm, 20° C.]: | 0.1146 |
| CC-3-V | 22.00% | Δε [1 kHz, 20° C.]: | −4.1 |
| CC-3V-1 | 4.00% | $ε_⊥$ [1 kHz, 20° C.]: | 7.7 |
| CCP-V-1 | 4.00% | $K_1$ [pN, 20° C.]: | 16.4 |
| CCY-3-O1 | 5.00% | $K_3$ [pN, 20° C.]: | 18.4 |
| CCY-3-O2 | 9.00% | $γ_1$ [mPa · s, 20° C.]: | 170 |
| CCY-4-O2 | 5.00% | $V_0$ [20° C., V]: | 2.23 |
| CCY-5-O2 | 4.50% | | |
| CLY-2-O4 | 5.00% | | |
| CPY-2-O2 | 8.00% | | |
| CPY-3-O2 | 8.00% | | |
| CY-3-O2 | 13.00% | | |
| PGIY-2-O4 | 2.00% | | |
| PYP-2-3 | 3.00% | | |
| PYP-2-4 | 1.50% | | |

additionally comprises 0.03% of ST-3a-1.

Example M274

The liquid-crystalline mixture

| | | | |
|---|---|---|---|
| CLY-3-O2 | 7.00% | Clearing point [° C.]: | 71.1 |
| CLY-3-O3 | 5.00% | Δn [589 nm, 20° C.]: | 0.1079 |
| CPY-3-O2 | 11.00% | Δε [1 kHz, 20° C.]: | −2.6 |
| PGIY-2-O4 | 7.00% | $ε_⊥$ [1 kHz, 20° C.]: | 6.1 |
| PYP-2-3 | 9.50% | $K_1$ [pN, 20° C.]: | 13.1 |
| B-2O-O5 | 4.00% | $K_3$ [pN, 20° C.]: | 13.7 |
| CC-3-V | 41.50% | $γ_1$ [mPa · s, 20° C.]: | 70 |
| CC-3-V1 | 9.00% | $V_0$ [20° C., V]: | 2.41 |
| Y-4O-O4 | 6.00% | | |

additionally comprises 0.03% of ST-3a-1.

Example M274a

For the preparation of a PS (polymer stabilised) mixture, for example for PS-IPS, PS-VA, PS-FFS applications, 99.55% of the mixture according to Example M274 are mixed with 0.25% of the polymerisable compound of the formula

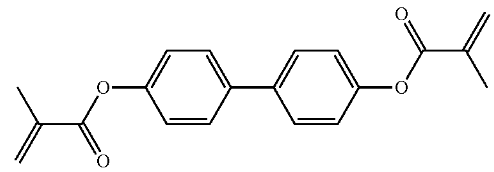

and with 0.20% of the compound of the formula

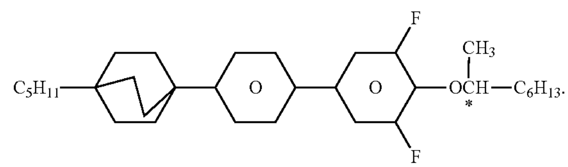

Example M275

The liquid-crystalline mixture

| | | | |
|---|---|---|---|
| CY-3-O2 | 8.00% | Clearing point [° C.]: | 89.5 |
| CY-3-O4 | 10.00% | Δn [589 nm, 20° C.]: | 0.1050 |
| CCY-3-O1 | 4.00% | Δε [1 kHz, 20° C.]: | −4.3 |
| CCY-3-O2 | 5.00% | $ε_⊥$ [1 kHz, 20° C.]: | 8.0 |
| CCY-4-O2 | 4.00% | $K_1$ [pN, 20° C.]: | 15.7 |
| CLY-3-O2 | 8.00% | $K_3$ [pN, 20° C.]: | 17.0 |
| CLY-3-O3 | 8.00% | $γ_1$ [mPa · s, 20° C.]: | 141 |
| CPY-3-O2 | 2.00% | $V_0$ [20° C., V]: | 2.11 |
| PYP-2-3 | 2.00% | | |
| B-2O-O5 | 5.00% | | |
| PGIY-2-O4 | 6.00% | | |
| CC-3-V | 27.00% | | |
| CCP-3-1 | 11.00% | | |

additionally comprises 0.03% of ST-3a-1.

Example M276

The liquid-crystalline mixture

| | | | |
|---|---|---|---|
| CCY-3-O2 | 6.00% | Clearing point [° C.]: | 75.0 |
| CLY-3-O2 | 8.00% | Δn [589 nm, 20° C.]: | 0.1019 |
| CLY-3-O3 | 3.50% | Δε [1 kHz, 20° C.]: | −3.6 |
| CPY-2-O2 | 10.00% | $ε_⊥$ [1 kHz, 20° C.]: | 7.1 |
| CPY-3-O2 | 10.00% | $K_1$ [pN, 20° C.]: | 14.1 |
| B-2O-O5 | 5.00% | $K_3$ [pN, 20° C.]: | 15.2 |
| CC-3-V | 33.50% | $γ_1$ [mPa · s, 20° C.]: | 97 |
| CC-3-V1 | 5.50% | $V_0$ [20° C., V]: | 2.17 |
| CY-3-O4 | 10.00% | | |
| CY-5-O4 | 4.50% | | |
| PP-1-3 | 4.00% | | |

additionally comprises 0.03% of ST-9-1.

Example M277

The liquid-crystalline mixture

| | | | |
|---|---|---|---|
| CC-3-V | 28.00% | Clearing point [° C.]: | 84.8 |
| CC-3-V1 | 6.50% | Δn [589 nm, 20° C.]: | 0.1111 |

-continued

| | | | |
|---|---|---|---|
| CCY-3-O1 | 5.50% | Δε [1 kHz, 20° C.]: | −4.0 |
| CCY-3-O2 | 7.00% | $\varepsilon_\perp$ [1 kHz, 20° C.]: | 7.7 |
| CCY-4-O2 | 7.00% | $K_1$ [pN, 20° C.]: | 14.4 |
| CPY-2-O2 | 8.00% | $K_3$ [pN, 20° C.]: | 16.5 |
| CPY-3-O2 | 11.00% | $\gamma_1$ [mPa · s, 20° C.]: | 124 |
| PYP-2-3 | 8.50% | $V_0$ [20° C., V]: | 2.15 |
| CY-3-O2 | 14.50% | | |
| B-2O-O5 | 4.00% | | |

additionally comprises 0.015% of ST-9-1.

Example M278

The liquid-crystalline mixture

| | | | |
|---|---|---|---|
| CY-3-O2 | 8.00% | Clearing point [° C.]: | 89.6 |
| CY-3-O4 | 10.00% | Δn [589 nm, 20° C.]: | 0.1030 |
| CCY-3-O2 | 3.00% | Δε [1 kHz, 20° C.]: | −3.4 |
| CCY-4-O2 | 1.50% | $\varepsilon_\perp$ [1 kHz, 20° C.]: | 7.0 |
| CLY-3-O2 | 8.00% | $K_1$ [pN, 20° C.]: | 14.8 |
| CLY-3-O3 | 8.00% | $K_3$ [pN, 20° C.]: | 16.7 |
| CPY-3-O2 | 4.00% | $\gamma_1$ [mPa · s, 20° C.]: | 97 |
| B-2O-O5 | 5.00% | $V_0$ [20° C., V]: | 2.32 |
| PGIY-2-O4 | 6.00% | | |
| CC-3-V | 22.00% | | |
| CC-3-V1 | 6.00% | | |
| CCP-V-1 | 14.00% | | |
| CCP-V2-1 | 4.50% | | |

additionally comprises 0.01% of ST-8-1.

Example M279

The liquid-crystalline mixture

| | | | |
|---|---|---|---|
| CCY-3-O2 | 6.00% | Clearing point [° C.]: | 75.5 |
| CLY-3-O2 | 8.00% | Δn [589 nm, 20° C.]: | 0.1014 |
| CLY-3-O3 | 4.00% | Δε [1 kHz, 20° C.]: | −3.8 |
| CPY-2-O2 | 10.00% | $\varepsilon_\perp$ [1 kHz, 20° C.]: | 7.4 |
| CPY-3-O2 | 10.00% | $K_1$ [pN, 20° C.]: | 13.7 |
| PGIY-2-O4 | 1.00% | $K_3$ [pN, 20° C.]: | 14.7 |
| B-2O-O5 | 5.00% | $\gamma_1$ [mPa · s, 20° C.]: | 99 |
| CC-3-V | 38.50% | $V_0$ [20° C., V]: | 2.09 |
| CY-3-O4 | 10.00% | | |
| CY-5-O4 | 5.00% | | |
| PP-1-3 | 2.50% | | |

additionally comprises 0.03% of ST-3a-1.

Example M280

The liquid-crystalline mixture

| | | | |
|---|---|---|---|
| CCY-3-O2 | 8.00% | Clearing point [° C.]: | 84.5 |
| CLY-2-O4 | 3.50% | Δn [589 nm, 20° C.]: | 0.1020 |
| CLY-3-O2 | 8.00% | Δε [1 kHz, 20° C.]: | −3.8 |
| CLY-3-O3 | 5.00% | $\varepsilon_\perp$ [1 kHz, 20° C.]: | 7.4 |
| CPY-3-O2 | 10.00% | $K_1$ [pN, 20° C.]: | 15.7 |
| PGIY-2-O4 | 5.00% | $K_3$ [pN, 20° C.]: | 17.2 |
| B-2O-O5 | 5.00% | $\gamma_1$ [mPa · s, 20° C.]: | 109 |
| CC-3-V | 27.00% | $V_0$ [20° C., V]: | 2.24 |
| CC-3-V1 | 10.00% | | |
| CCH-34 | 5.00% | | |
| CY-3-O2 | 12.50% | | |
| PP-1-3 | 1.00% | | |

additionally comprises 0.03% of ST-3a-1.

Example M281

The liquid-crystalline mixture

| | | | |
|---|---|---|---|
| CCY-3-O2 | 6.00% | Clearing point [° C.]: | 75.0 |
| CLY-3-O2 | 8.00% | Δn [589 nm, 20° C.]: | 0.1019 |
| CLY-3-O3 | 3.50% | Δε [1 kHz, 20° C.]: | −3.6 |
| CPY-2-O2 | 10.00% | $\varepsilon_\perp$ [1 kHz, 20° C.]: | 7.1 |
| CPY-3-O2 | 10.00% | $K_1$ [pN, 20° C.]: | 14.1 |
| B-2O-O5 | 5.00% | $K_3$ [pN, 20° C.]: | 15.2 |
| CC-3-V | 33.50% | $\gamma_1$ [mPa · s, 20° C.]: | 97 |
| CC-3-V1 | 5.50% | $V_0$ [20° C., V]: | 2.17 |
| CY-3-O4 | 10.00% | | |
| CY-5-O4 | 4.50% | | |
| PP-1-3 | 4.00% | | |

additionally comprises 0.03% of ST-3a-1.

Example M282

The liquid-crystalline mixture

| | | | |
|---|---|---|---|
| CY-3-O2 | 8.00% | Clearing point [° C.]: | 70.6 |
| CY-5-O2 | 6.00% | Δn [589 nm, 20° C.]: | 0.1079 |
| PY-3-O2 | 12.00% | Δε [1 kHz, 20° C.]: | −4.1 |
| CLY-3-O2 | 10.00% | $\varepsilon_\perp$ [1 kHz, 20° C.]: | 8.0 |
| CPY-2-O2 | 10.00% | $K_1$ [pN, 20° C.]: | 12.6 |
| CPY-3-O2 | 10.00% | $K_3$ [pN, 20° C.]: | 14.1 |
| B-2O-O5 | 5.00% | $\gamma_1$ [mPa · s, 20° C.]: | 80 |
| CCY-3-1 | 4.00% | $V_0$ [20° C., V]: | 1.94 |
| CC-3-V | 28.00% | | |
| CC-3-V1 | 4.00% | | |
| CCP-3-1 | 3.00% | | |

additionally comprises 0.02% of ST-9-1.

Example M283

The liquid-crystalline mixture

| | | | |
|---|---|---|---|
| CY-3-O2 | 10.00% | Clearing point [° C.]: | 70.3 |
| CY-5-O2 | 8.00% | Δn [589 nm, 20° C.]: | 0.1105 |
| PY-3-O2 | 10.00% | Δε [1 kHz, 20° C.]: | −4.4 |
| CLY-3-O2 | 10.00% | $\varepsilon_\perp$ [1 kHz, 20° C.]: | 8.3 |
| CPY-2-O2 | 10.00% | $K_1$ [pN, 20° C.]: | 13.4 |
| CPY-3-O2 | 10.00% | $K_3$ [pN, 20° C.]: | 14.9 |
| B-2O-O5 | 5.00% | $\gamma_1$ [mPa · s, 20° C.]: | 106 |
| CC-3-V | 26.00% | $V_0$ [20° C., V]: | 1.96 |
| CC-3-V1 | 5.00% | | |
| CCP-3-1 | 4.00% | | |
| BCH-32 | 2.00% | | |

additionally comprises 0.02% of ST-9-1.

Example M284

The liquid-crystalline mixture

| | | | |
|---|---|---|---|
| CY-3-O2 | 8.00% | Clearing point [° C.]: | 70.0 |
| CY-5-O2 | 8.00% | Δn [589 nm, 20° C.]: | 0.1106 |
| PY-3-O2 | 12.00% | Δε [1 kHz, 20° C.]: | −4.4 |
| CLY-3-O2 | 10.00% | $\varepsilon_\perp$ [1 kHz, 20° C.]: | 8.3 |
| CPY-2-O2 | 10.00% | $K_1$ [pN, 20° C.]: | 13.4 |
| CPY-3-O2 | 10.00% | $K_3$ [pN, 20° C.]: | 15.0 |
| B-2O-O5 | 5.00% | $\gamma_1$ [mPa · s, 20° C.]: | 106 |
| CC-3-V | 27.00% | | |
| CC-3-V1 | 4.00% | | |
| CCP-3-1 | 6.00% | | |

additionally comprises 0.03% of ST-3a-1 and 0.01% of ST-8-1.

Example M285

The liquid-crystalline mixture

| | | | |
|---|---|---|---|
| CCP-V-1 | 7.50% | Clearing point [° C.]: | 88.0 |
| CCY-3-O2 | 10.00% | Δn [589 nm, 20° C.]: | 0.1020 |
| CCY-5-O2 | 3.50% | Δε [1 kHz, 20° C.]: | −3.6 |
| CLY-3-O2 | 8.00% | $\varepsilon_\perp$ [1 kHz, 20° C.]: | 7.2 |
| CPY-2-O2 | 3.50% | $K_1$ [pN, 20° C.]: | 15.2 |
| CPY-3-O2 | 10.00% | $K_3$ [pN, 20° C.]: | 18.1 |
| PGIY-2-O4 | 4.00% | $\gamma_1$ [mPa · s, 20° C.]: | 112 |
| B-O2-O5 | 4.00% | $V_0$ [20° C., V]: | 2.36 |
| CC-3-V | 26.50% | | |
| CC-3-V1 | 10.00% | | |
| CCH-34 | 2.00% | | |
| CY-3-O2 | 7.00% | | |
| Y-4O-O4 | 4.00% | | |

additionally comprises 0.05% of ST-3b-1 und 0.15% of ST-12.

Example M286

| | |
|---|---|
| B(S)-2O-O4 | 4.00% |
| B(S)-2O-O5 | 4.00% |
| CC-3-V | 35.00% |
| CCP-3-1 | 4.50% |
| CCY-3-O2 | 7.00% |
| CCY-4-O2 | 4.50% |
| CLY-3-O2 | 6.00% |
| CLY-3-O3 | 6.00% |
| CPY-3-O2 | 10.00% |
| CY-3-O2 | 13.00% |
| PYP-2-4 | 6.00% |

additionally comprises 0.05% of ST-3b-1 and 0.15% of ST-12.

Example M287

The liquid-crystalline mixture

| | |
|---|---|
| B(S)-2O-O4 | 4.00% |
| B(S)-2O-O5 | 4.00% |
| BCH-32 | 5.50% |
| CC-3-V | 35.00% |
| CCP-3-1 | 6.00% |
| CCY-3-O2 | 8.00% |
| CLY-3-O2 | 6.00% |
| CLY-3-O3 | 6.00% |
| CPY-3-O2 | 10.00% |
| CY-3-O2 | 13.00% |
| PYP-2-4 | 2.50% |

additionally comprises 0.03% of ST-3a-1.

Example M288

The liquid-crystalline mixture

| | |
|---|---|
| B(S)-2O-O4 | 4.00% |
| B(S)-2O-O5 | 4.00% |
| CC-3-V | 36.50% |
| CC-3-V1 | 4.00% |
| CCP-3-1 | 3.00% |
| CCY-3-O2 | 5.50% |
| CLY-3-O2 | 6.00% |
| CLY-3-O3 | 6.00% |
| CPY-2-O2 | 8.00% |
| CPY-3-O2 | 8.00% |
| CY-3-O2 | 5.00% |
| PGIY-2-O4 | 5.00% |
| Y-4O-O4 | 5.00% |

additionally comprises 0.03% of ST-3a-1.

Example M289

The liquid-crystalline mixture

| | |
|---|---|
| B(S)-2O-O4 | 4.00% |
| B(S)-2O-O5 | 4.00% |
| BCH-32 | 6.00% |
| CC-3-V | 35.50% |
| CCP-3-1 | 4.50% |
| CCY-3-O2 | 5.50% |
| CLY-3-O2 | 6.00% |
| CLY-3-O3 | 6.00% |
| CPY-3-O2 | 9.00% |
| CY-3-O2 | 13.00% |
| CY-5-O2 | 2.50% |
| PYP-2-O4 | 4.00% |

additionally comprises 0.03% of ST-3a-1.

Example M290

The liquid-crystalline mixture

| | | | |
|---|---|---|---|
| CCY-3-O1 | 2.00% | Clearing point [° C.]: | 80.0 |
| CCY-3-O2 | 5.00% | Δn [589 nm, 20° C.]: | 0.1065 |
| CCY-4-O2 | 5.00% | Δε [1 kHz, 20° C.]: | −3.8 |
| CLY-2-O4 | 5.00% | $\varepsilon_\perp$ [1 kHz, 20° C.]: | 7.4 |
| CLY-3-O2 | 8.00% | $K_1$ [pN, 20° C.]: | 15.5 |
| CLY-3-O3 | 5.00% | $K_3$ [pN, 20° C.]: | 15.0 |
| PGIY-2-O4 | 6.00% | $\gamma_1$ [mPa · s, 20° C.]: | 93 |
| B(S)-2O-O5 | 4.00% | $V_0$ [20° C., V]: | 2.08 |
| B(S)-2O-O4 | 4.00% | | |
| CC-3-V | 39.50% | | |
| CC-3-V1 | 4.00% | | |
| PY-3-O2 | 12.50% | | |

additionally comprises 0.03% of ST-3a-1.

Example M291

The liquid-crystalline mixture

| | |
|---|---|
| CLY-2-O4 | 3.50% |
| CLY-3-O2 | 8.00% |
| CLY-3-O3 | 5.00% |
| B(S)-2O-O5 | 4.00% |
| B(S)-2O-O4 | 4.00% |
| CC-3-V | 35.00% |
| CC-3-V1 | 6.50% |
| CY-3-O4 | 12.00% |
| CY-5-O4 | 1.50% |
| CPY-3-O2 | 8.00% |
| CPY-2-O2 | 8.00% |
| PYP-2-3 | 4.50% |

additionally comprises 0.03% of ST-3a-1.

Example M292

The liquid-crystalline mixture

| | | | |
|---|---|---|---|
| B(S)-2O-O4 | 4.50% | Clearing point [° C.]: | 74.6 |
| B(S)-2O-O5 | 4.00% | Δn [589 nm, 20° C.]: | 0.1096 |

-continued

| | | | |
|---|---|---|---|
| BCH-32 | 7.00% | Δε [1 kHz, 20° C.]: | −3.1 |
| CC-3-V1 | 6.00% | $\varepsilon_{\perp}$ [1 kHz, 20° C.]: | 6.7 |
| CCH-301 | 2.00% | $K_1$ [pN, 20° C.]: | 14.1 |
| CCH-34 | 8.00% | $K_3$ [pN, 20° C.]: | 16.2 |
| CCH-35 | 7.50% | $\gamma_1$ [mPa · s, 20° C.]: | 104 |
| CCP-3-1 | 8.00% | $V_0$ [20° C., V]: | 2.39 |
| CCP-V2-1 | 5.00% | | |
| CCY-3-O2 | 11.00% | | |
| CLY-3-O2 | 1.00% | | |
| CY-3-O2 | 8.00% | | |
| PCH-301 | 13.00% | | |
| PY-3-O2 | 15.00% | | |

additionally comprises 0.02% of ST-3a-1.

Example M293

The liquid-crystalline mixture

| | | | |
|---|---|---|---|
| B(S)-2O-O4 | 4.50% | Clearing point [° C.]: | 75.0 |
| B(S)-2O-O5 | 4.00% | Δn [589 nm, 20° C.]: | 0.1088 |
| BCH-32 | 6.50% | Δε [1 kHz, 20° C.]: | −3.1 |
| CC-3-V1 | 6.00% | $\varepsilon_{\perp}$ [1 kHz, 20° C.]: | 6.6 |
| CCH-301 | 2.00% | $K_1$ [pN, 20° C.]: | 14.1 |
| CCH-34 | 8.00% | $K_3$ [pN, 20° C.]: | 16.3 |
| CCH-35 | 8.00% | $\gamma_1$ [mPa · s, 20° C.]: | 108 |
| CCP-3-1 | 8.00% | $V_0$ [20° C., V]: | 2.41 |
| CCP-3-3 | 3.00% | | |
| CCY-3-O2 | 11.00% | | |
| CLY-3-O2 | 1.00% | | |
| CPY-3-O2 | 2.50% | | |
| CY-3-O2 | 7.50% | | |
| PCH-301 | 15.00% | | |
| PY-3-O2 | 13.00% | | |

additionally comprises 0.02% of ST-3a-1.

Example M294

The liquid-crystalline mixture

| | | | |
|---|---|---|---|
| B(S)-2O-O4 | 4.00% | Clearing point [° C.]: | 74.5 |
| B(S)-2O-O5 | 4.00% | Δn [589 nm, 20° C.]: | 0.1092 |
| BCH-32 | 2.50% | Δε [1 kHz, 20° C.]: | −3.1 |
| CC-3-V1 | 6.00% | $\varepsilon_{\parallel}$ [1 kHz, 20° C.]: | |
| CCH-301 | 2.00% | $\varepsilon_{\perp}$ [1 kHz, 20° C.]: | 6.7 |
| CCH-34 | 8.00% | $K_1$ [pN, 20° C.]: | 14.0 |
| CCH-35 | 8.00% | $K_3$ [pN, 20° C.]: | 16.1 |
| CCP-3-1 | 8.00% | $\gamma_1$ [mPa · s, 20° C.]: | 106 |
| CCP-3-3 | 6.00% | | |
| CCY-3-O2 | 11.00% | | |
| CLY-3-O2 | 1.00% | | |
| CPY-3-O2 | 4.50% | | |
| CY-3-O2 | 3.00% | | |
| PCH-301 | 15.00% | | |
| PY-3-O2 | 8.00% | | |
| PY-2-O2 | 9.00% | | |

additionally comprises 0.02% of ST-17.

Example M295

The liquid-crystalline mixture

| | | | |
|---|---|---|---|
| B(S)-2O-O4 | 4.00% | Clearing point [° C.]: | 74.4 |
| B(S)-2O-O5 | 4.00% | Δn [589 nm, 20° C.]: | 0.1093 |
| BCH-32 | 3.00% | Δε [1 kHz, 20° C.]: | −3.1 |
| CC-3-V1 | 6.00% | $\varepsilon_{\perp}$ [1 kHz, 20° C.]: | 6.7 |
| CCH-301 | 2.00% | $K_1$ [pN, 20° C.]: | 14.0 |
| CCH-34 | 8.00% | $K_3$ [pN, 20° C.]: | 16.0 |

-continued

| | | | |
|---|---|---|---|
| CCH-35 | 8.00% | $\gamma_1$ [mPa · s, 20° C.]: | 104 |
| CCP-3-1 | 8.00% | $V_0$ [20° C., V]: | 2.38 |
| CCP-3-3 | 6.00% | | |
| CCY-3-O2 | 11.00% | | |
| CLY-3-O2 | 1.00% | | |
| CPY-3-O2 | 4.00% | | |
| CY-3-O2 | 3.00% | | |
| PCH-301 | 15.00% | | |
| PY-3-O2 | 7.00% | | |
| PY-2-O2 | 10.00% | | |

additionally comprises 0.02% of ST-3a-1.

Example M296

The liquid-crystalline mixture

| | | | |
|---|---|---|---|
| B(S)-2O-O4 | 4.50% | Clearing point [° C.]: | 74.3 |
| B(S)-2O-O5 | 4.00% | Δn [589 nm, 20° C.]: | 0.1093 |
| BCH-32 | 3.50% | Δε [1 kHz, 20° C.]: | −3.3 |
| CC-3-V1 | 6.00% | $\varepsilon_{\perp}$ [1 kHz, 20° C.]: | 7.0 |
| CCH-301 | 2.00% | $K_1$ [pN, 20° C.]: | 13.7 |
| CCH-34 | 8.00% | $K_3$ [pN, 20° C.]: | 16.0 |
| CCH-35 | 8.00% | $\gamma_1$ [mPa · s, 20° C.]: | 108 |
| CCP-3-1 | 8.00% | $V_0$ [20° C., V]: | 2.30 |
| CCP-3-3 | 3.00% | | |
| CCY-3-O2 | 11.00% | | |
| CLY-3-O2 | 1.00% | | |
| CPY-3-O2 | 6.00% | | |
| CY-3-O2 | 6.50% | | |
| PCH-301 | 15.00% | | |
| PY-3-O2 | 4.00% | | |
| PY-2-O2 | 9.50% | | |

additionally comprises 0.02% of ST-3a-1.

Example M297

The liquid-crystalline mixture

| | | | |
|---|---|---|---|
| B(S)-2O-O4 | 4.00% | Clearing point [° C.]: | 74.3 |
| B(S)-2O-O5 | 4.00% | Δn [589 nm, 20° C.]: | 0.1089 |
| BCH-32 | 1.50% | Δε [1 kHz, 20° C.]: | −3.3 |
| CC-3-V1 | 6.00% | $\varepsilon_{\perp}$ [1 kHz, 20° C.]: | 7.0 |
| CCH-301 | 2.00% | $K_1$ [pN, 20° C.]: | 14.0 |
| CCH-34 | 8.00% | $K_3$ [pN, 20° C.]: | 16.0 |
| CCH-35 | 8.00% | $\gamma_1$ [mPa · s, 20° C.]: | 108 |
| CCP-3-1 | 8.00% | $V_0$ [20° C., V]: | 2.31 |
| CCP-3-3 | 5.00% | | |
| CCY-3-O1 | 2.50% | | |
| CCY-3-O2 | 11.00% | | |
| CLY-3-O2 | 1.00% | | |
| CPY-3-O2 | 4.00% | | |
| CY-3-O2 | 3.00% | | |
| PCH-301 | 14.50% | | |
| PY-3-O2 | 7.50% | | |
| PY-2-O2 | 10.00% | | |

additionally comprises 0.02% of ST-3a-1.

Example M298

The liquid-crystalline mixture

| | |
|---|---|
| CC-3-V | 30.00% |
| CC-3-V1 | 8.00% |
| CCP-V-1 | 10.00% |
| CCY-3-O2 | 5.00% |
| CLY-3-O2 | 8.00% |
| CLY-4-O2 | 5.00% |

-continued

| | |
|---|---|
| CLY-5-O2 | 6.00% |
| CY-3-O2 | 12.00% |
| CY-5-O2 | 2.50% |
| PYP-2-3 | 3.50% |
| B(S)-2O-O4 | 5.00% |
| B(S)-2O-O5 | 5.00% |

additionally comprises 0.02% of ST-3a-1.

Example M299

The liquid-crystalline mixture

| | |
|---|---|
| CC-3-V | 30.00% |
| CC-3-V1 | 8.50% |
| CCP-V-1 | 10.00% |
| CCY-3-O2 | 5.00% |
| CCY-5-O2 | 4.00% |
| CLY-3-O2 | 9.00% |
| CPY-3-O2 | 8.00% |
| CY-3-O2 | 8.50% |
| CY-5-O2 | 5.50% |
| PYP-2-3 | 1.50% |
| B(S)-2O-O4 | 5.00% |
| B(S)-2O-O5 | 5.00% |

additionally comprises 0.02% of ST-3a-1.

Example M300

The liquid-crystalline mixture

| | | | |
|---|---|---|---|
| CC-3-V | 30.00% | Clearing point [° C.]: | 93 |
| CC-3-V1 | 8.00% | Δn [589 nm, 20° C.]: | 0.0993 |
| CCP-V2-1 | 3.50% | Δε [1 kHz, 20° C.]: | −4.2 |
| CCY-3-O2 | 5.00% | $\varepsilon_\perp$ [1 kHz, 20° C.]: | 7.7 |
| CCY-5-O2 | 6.00% | $K_1$ [pN, 20° C.]: | 17.3 |
| CLY-3-O2 | 8.00% | $K_3$ [pN, 20° C.]: | 18.6 |
| CLY-4-O2 | 8.00% | $\gamma_1$ [mPa · s, 20° C.]: | 2.21 |
| CLY-5-O2 | 8.00% | $V_0$ [20° C., V]: | 118 |
| CY-3-O2 | 11.50% | | |
| CPY-3-O2 | 1.50% | | |
| B(S)-2O-O4 | 5.50% | | |
| B(S)-2O-O5 | 5.00% | | |

additionally comprises 0.03% of ST-3a-1.

Example M301

The liquid-crystalline mixture

| | |
|---|---|
| CC-3-V | 40.00% |
| CC-3-V1 | 7.50% |
| CCP-V-1 | 1.50% |
| PGIY-2-O4 | 2.00% |
| CCY-3-O2 | 2.00% |
| CLY-3-O2 | 8.00% |
| CLY-4-O2 | 4.00% |
| CLY-5-O2 | 7.00% |
| CY-3-O2 | 8.00% |
| CPY-3-O2 | 10.00% |
| B(S)-2O-O4 | 5.00% |
| B(S)-2O-O5 | 5.00% |

additionally comprises 0.03% of ST-3a-1.

Example M302

The liquid-crystalline mixture

| | |
|---|---|
| CC-3-V | 38.00% |
| CC-3-V1 | 8.00% |
| CCP-V-1 | 2.50% |
| CCY-3-O2 | 5.00% |
| CCY-5-O2 | 6.00% |
| CLY-3-O2 | 8.00% |
| CPY-3-O2 | 9.50% |
| CY-3-O2 | 9.00% |
| PGIY-2-O4 | 4.00% |
| B(S)-2O-O4 | 5.00% |
| B(S)-2O-O5 | 5.00% |

additionally comprises 0.03% of ST-3a-1.

Example M303

The liquid-crystalline mixture

| | |
|---|---|
| CC-3-V | 30.00% |
| CC-3-V1 | 8.00% |
| CCY-3-O2 | 6.00% |
| CCY-5-O2 | 5.00% |
| CLY-3-O2 | 9.00% |
| CLY-4-O2 | 9.00% |
| CLY-5-O2 | 9.50% |
| CY-3-O2 | 10.00% |
| CPY-3-O2 | 3.00% |
| B(S)-2O-O4 | 5.00% |
| B(S)-2O-O5 | 5.00% |

additionally comprises 0.03% of ST-3a-1.

Example M304

The liquid-crystalline mixture

| | | | |
|---|---|---|---|
| CLY-3-O2 | 8.00% | Clearing point [° C.]: | 82.0 |
| CLY-5-O2 | 6.50% | Δn [589 nm, 20° C.]: | 10.19 |
| CPY-3-O2 | 10.00% | Δε [1 kHz, 20° C.]: | −4.2 |
| B(S)-2O-O4 | 5.00% | $\varepsilon_\perp$ [1 kHz, 20° C.]: | 7.8 |
| B(S)-2O-O5 | 5.00% | $K_1$ [pN, 20° C.]: | 15.5 |
| CC-3-V | 35.00% | $K_3$ [pN, 20° C.]: | 17.3 |
| CC-3-V1 | 8.00% | $\gamma_1$ [mPa · s, 20° C.]: | 2.15 |
| CY-3-O2 | 14.50% | $V_0$ [20° C., V]: | 102 |
| PGIY-2-O2 | 2.00% | | |
| CCY-3-O2 | 6.00% | | |

additionally comprises 0.03% of ST-3a-1.

Example M305

The liquid-crystalline mixture

| | |
|---|---|
| CLY-3-O2 | 8.00% |
| CPY-3-O2 | 10.00% |
| B(S)-2O-O4 | 5.00% |
| B(S)-2O-O5 | 5.00% |
| CC-3-V | 34.00% |
| CC-3-V1 | 7.50% |
| CCP-V-1 | 1.50% |
| CY-3-O2 | 14.50% |
| CCY-3-O2 | 6.00% |
| CCY-5-O2 | 6.00% |
| PGIY-2-O4 | 2.50% |

additionally comprises 0.03% of ST-3a-1.

Example M306

The liquid-crystalline mixture

| | |
|---|---|
| CLY-3-O2 | 8.00% |
| CLY-4-O2 | 1.50% |
| CLY-5-O2 | 5.00% |
| CPY-3-O2 | 10.00% |
| B(S)-2O-O4 | 5.00% |
| B(S)-2O-O5 | 5.00% |
| CC-3-V | 35.00% |
| CC-3-V1 | 8.00% |
| CY-3-O2 | 14.50% |
| CCY-3-O2 | 6.00% |
| PGIY-2-O4 | 2.00% |

additionally comprises 0.03% of ST-3a-1.

Example M307

The liquid-crystalline mixture

| | | | |
|---|---|---|---|
| CLY-3-O2 | 8.00% | Clearing point [° C.]: | 81.5 |
| CLY-5-O2 | 6.00% | Δn [589 nm, 20° C.]: | 0.1015 |
| CPY-3-O2 | 10.00% | Δε [1 kHz, 20° C.]: | −4.1 |
| B(S)-2O-O4 | 5.00% | $\varepsilon_\perp$ [1 kHz, 20° C.]: | 7.7 |
| B(S)-2O-O5 | 5.00% | $K_1$ [pN, 20° C.]: | 15.7 |
| B-2O-O5 | 2.00% | $K_3$ [pN, 20° C.]: | 17.1 |
| CC-3-V | 37.00% | $\gamma_1$ [mPa · s, 20° C.]: | 98 |
| CC-3-V1 | 8.00% | $V_0$ [20° C., V]: | 2.14 |
| CY-3-O2 | 12.00% | | |
| CCY-3-O2 | 6.00% | | |
| PGIY-2-O4 | 1.00% | | |

additionally comprises 0.02% of ST-8-1.

Example M308

The liquid-crystalline mixture

| | | | |
|---|---|---|---|
| CCY-3-O2 | 8.00% | Clearing point [° C.]: | 80.0 |
| CCY-5-O2 | 6.00% | Δn [589 nm, 20° C.]: | 0.1071 |
| CLY-2-O4 | 10.00% | Δε [1 kHz, 20° C.]: | −3.8 |
| CLY-3-O2 | 5.00% | $\varepsilon_\perp$ [1 kHz, 20° C.]: | 7.4 |
| CLY-3-O3 | 5.00% | $K_1$ [pN, 20° C.]: | 16.0 |
| PGIY-2-O4 | 2.00% | $K_3$ [pN, 20° C.]: | 15.3 |
| B(S)-2O-O5 | 37.00% | $\gamma_1$ [mPa · s, 20° C.]: | 90 |
| B(S)-2O-O4 | 8.00% | $V_0$ [20° C., V]: | 2.11 |
| CC-3-V | 12.00% | | |
| CC-3-V1 | 6.00% | | |
| PY-3-O2 | 1.00% | | |

additionally comprises 0.03% of ST-3a-1.

Example M309

The liquid-crystalline mixture

| | | | |
|---|---|---|---|
| CLY-3-O2 | 8.00% | Clearing point [° C.]: | 84.0 |
| CLY-4-O2 | 3.00% | Δn [589 nm, 20° C.]: | 0.1016 |
| CLY-5-O2 | 5.00% | Δε [1 kHz, 20° C.]: | −4.2 |
| CPY-3-O2 | 10.00% | $\varepsilon_\perp$ [1 kHz, 20° C.]: | 7.7 |
| B(S)-2O-O4 | 5.00% | $K_1$ [pN, 20° C.]: | 15.9 |
| B(S)-2O-O5 | 5.00% | $K_3$ [pN, 20° C.]: | 17.5 |
| CC-3-V | 35.00% | $\gamma_1$ [mPa · s, 20° C.]: | 104 |
| CC-3-V1 | 8.00% | $V_0$ [20° C., V]: | 2.16 |
| CY-3-O2 | 13.50% | | |
| CCY-3-O2 | 6.00% | | |
| PGIY-2-O4 | 1.50% | | |

additionally comprises 0.02% of ST-3b-1.

Example M309a

For the preparation of a PS-VA mixture, 99.7% of the mixture according to Example M309 are mixed with 0.3% of the polymerisable compound of the formula

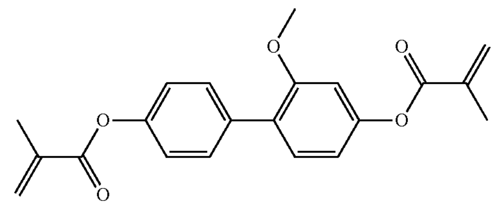

.

Example M310

The liquid-crystalline mixture

| | |
|---|---|
| CLY-3-O2 | 8.00% |
| CLY-4-O2 | 1.50% |
| CLY-5-O2 | 6.00% |
| CPY-3-O2 | 10.00% |
| B(S)-2O-O4 | 5.00% |
| B(S)-2O-O5 | 5.00% |
| B-2O-O5 | 2.50% |
| CC-3-V | 37.00% |
| CC-3-V1 | 8.00% |
| CY-3-O2 | 11.00% |
| CCY-3-O2 | 6.00% |

additionally comprises 0.03% of ST-3a-1.

Example M311

The liquid-crystalline mixture

| | | | |
|---|---|---|---|
| CLY-3-O2 | 8.00% | Clearing point [° C.]: | 83.0 |
| CLY-5-O2 | 6.50% | Δn [589 nm, 20° C.]: | 0.1017 |
| CPY-3-O2 | 10.50% | Δε [1 kHz, 20° C.]: | −4.1 |
| B(S)-2O-O4 | 6.00% | $\varepsilon_\perp$ [1 kHz, 20° C.]: | 7.7 |
| B(S)-2O-O5 | 6.00% | $K_1$ [pN, 20° C.]: | 15.6 |
| CC-3-V | 36.50% | $K_3$ [pN, 20° C.]: | 17.5 |
| CC-3-V1 | 8.50% | $\gamma_1$ [mPa · s, 20° C.]: | 2.18 |
| CY-3-O2 | 12.00% | $V_0$ [20° C., V]: | 100 |
| CCY-3-O2 | 5.50% | | |
| PGIY-2-O4 | 0.50% | | |

additionally comprises 0.03% of ST-3a-1.

Example M312

The liquid-crystalline mixture

| | |
|---|---|
| CCY-3-O2 | 6.00% |
| CPY-3-O2 | 5.50% |
| CCY-4-O2 | 4.00% |
| CLY-2-O4 | 5.00% |
| CLY-3-O2 | 8.00% |
| CLY-3-O3 | 5.00% |
| PGIY-2-O4 | 5.00% |
| B(S)-2O-O5 | 5.00% |
| B(S)-2O-O4 | 5.00% |
| CC-3-V | 30.00% |
| CY-5-O2 | 6.50% |
| CY-3-O2 | 15.00% |

additionally comprises 0.03% of ST-3a-1.

Example M313

The liquid-crystalline mixture

| | |
|---|---|
| CC-3-V | 6.00% |
| B(S)-2O-O5 | 5.50% |
| B(S)-2O-O4 | 4.00% |
| CLY-2-O4 | 5.00% |
| CLY-3-O2 | 8.00% |
| CLY-3-O3 | 5.00% |
| CY-3-O4 | 5.00% |
| CY-5-O4 | 5.00% |
| CPY-2-O2 | 5.00% |
| CPY-3-O2 | 30.00% |
| CCY-3-O1 | 6.50% |

additionally comprises 0.015% of ST-3a-1.

Example M314

The liquid-crystalline mixture

| | | | |
|---|---|---|---|
| CLY-3-O2 | 7.00% | Clearing point [° C.]: | 82.0 |
| CLY-5-O2 | 5.00% | Δn [589 nm, 20° C.]: | 0.1016 |
| CLY-4-O2 | 4.00% | Δε [1 kHz, 20° C.]: | −4.1 |
| CPY-3-O2 | 10.00% | $\varepsilon_\perp$ [1 kHz, 20° C.]: | 7.7 |
| B(S)-2O-O4 | 5.00% | $K_1$ [pN, 20° C.]: | 15.7 |
| B(S)-2O-O5 | 5.00% | $K_3$ [pN, 20° C.]: | 17.2 |
| CC-3-V | 36.00% | $\gamma_1$ [mPa · s, 20° C.]: | 101 |
| CC-3-V1 | 7.50% | | |
| CY-3-O2 | 14.00% | | |
| PGIY-2-O4 | 2.00% | | |
| CCY-3-O2 | 4.50% | | |

additionally comprises 0.03% of ST-3a-1.

Example M315

The liquid-crystalline mixture

| | | | |
|---|---|---|---|
| CLY-3-O2 | 7.00% | Clearing point [° C.]: | 82.0 |
| CLY-4-O2 | 4.50% | Δn [589 nm, 20° C.]: | 0.1016 |
| CLY-5-O2 | 5.00% | Δε [1 kHz, 20° C.]: | −4.1 |
| CPY-3-O2 | 10.00% | $\varepsilon_\perp$ [1 kHz, 20° C.]: | 7.7 |
| B(S)-2O-O4 | 5.00% | $K_1$ [pN, 20° C.]: | 15.8 |
| B(S)-2O-O5 | 5.00% | $K_3$ [pN, 20° C.]: | 17.2 |
| CC-3-V | 35.50% | $\gamma_1$ [mPa · s, 20° C.]: | 102 |
| CC-3-V1 | 8.00% | $V_0$ [20° C., V]: | 2.16 |
| CY-3-O2 | 13.50% | | |
| CCY-3-O2 | 5.00% | | |
| PGIY-2-O4 | 1.50% | | |

additionally comprises 0.03% of ST-3a-1.

Example M316

The liquid-crystalline mixture

| | | | |
|---|---|---|---|
| CCY-3-O2 | 6.00% | Clearing point [° C.]: | 79.5 |
| CPY-3-O2 | 8.00% | Δn [589 nm, 20° C.]: | 0.1066 |
| CPY-2-O2 | 6.00% | Δε [1 kHz, 20° C.]: | −5.5 |
| CLY-2-O4 | 5.00% | $\varepsilon_\perp$ [1 kHz, 20° C.]: | 9.5 |
| CLY-3-O2 | 8.00% | $K_1$ [pN, 20° C.]: | 17.7 |
| CLY-3-O3 | 5.00% | $K_3$ [pN, 20° C.]: | 15.5 |
| B(S)-2O-O5 | 5.00% | $\gamma_1$ [mPa · s, 20° C.]: | 127 |
| B(S)-2O-O4 | 5.00% | $V_0$ [20° C., V]: | 1.76 |
| CC-3-V | 30.00% | | |
| CY-5-O2 | 7.00% | | |
| CY-3-O2 | 15.00% | | |

additionally comprises 0.03% of ST-3a-1.

Example M317

The liquid-crystalline mixture

| | |
|---|---|
| CCY-3-O2 | 6.00% |
| CPY-2-O2 | 6.00% |
| CPY-3-O2 | 8.00% |
| CLY-2-O4 | 5.00% |
| CLY-3-O2 | 8.00% |
| CLY-3-O3 | 5.00% |
| B(S)-2O-O5 | 5.00% |
| B(S)-2O-O4 | 5.00% |
| CC-3-V | 30.00% |
| CY-5-O2 | 7.00% |
| CY-3-O2 | 15.00% |

additionally comprises 0.03% of ST-3a-1.

Example M318

The liquid-crystalline mixture

| | | | |
|---|---|---|---|
| CCY-3-O2 | 6.00% | Clearing point [° C.]: | 79.0 |
| CCY-4-O2 | 5.50% | Δn [589 nm, 20° C.]: | 10.65 |
| CPY-3-O2 | 8.00% | Δε [1 kHz, 20° C.]: | −5.2 |
| CPY-2-O2 | 8.00% | $\varepsilon_\perp$ [1 kHz, 20° C.]: | 9.1 |
| CLY-2-O4 | 5.00% | $K_1$ [pN, 20° C.]: | 14.1 |
| CLY-3-O3 | 5.00% | $K_3$ [pN, 20° C.]: | 14.8 |
| B(S)-2O-O5 | 5.00% | $\gamma_1$ [mPa · s, 20° C.]: | 121 |
| B(S)-2O-O4 | 5.00% | $V_0$ [20° C., V]: | 1.78 |
| CC-3-V | 31.50% | | |
| CY-5-O2 | 4.50% | | |
| CY-3-O2 | 15.00% | | |
| PYP-2-3 | 1.50% | | |

additionally comprises 0.03% of ST-3a-1.

Example M319

The liquid-crystalline mixture

| | |
|---|---|
| B(S)-2O-O4 | 4.00% |
| BCH-32 | 8.00% |
| CC-3-V1 | 9.00% |
| CCH-301 | 2.00% |
| CCH-34 | 8.00% |
| CCH-35 | 7.00% |
| CCP-3-1 | 8.00% |
| CCP-V2-1 | 5.00% |
| CCY-3-O2 | 10.50% |
| CLY-3-O2 | 1.00% |
| CPY-3-O2 | 2.50% |
| CY-3-O2 | 11.50% |
| PCH-301 | 5.00% |
| PY-3-O2 | 18.00% |

additionally comprises 0.015% of ST-3a-1.

Example M320

The liquid-crystalline mixture

| | |
|---|---|
| B(S)-2O-O4 | 2.00% |
| B(S)-2O-O5 | 2.00% |
| BCH-32 | 8.00% |
| CC-3-V1 | 9.00% |
| CCH-301 | 2.00% |
| CCH-34 | 8.00% |
| CCH-35 | 7.00% |
| CCP-3-1 | 8.00% |
| CCP-V2-1 | 5.00% |

-continued

| | |
|---|---|
| CCY-3-O2 | 10.50% |
| CLY-3-O2 | 1.00% |
| CPY-3-O2 | 2.50% |
| CY-3-O2 | 11.50% |
| PCH-301 | 5.50% |
| PY-3-O2 | 18.00% |

additionally comprises 0.03% of ST-3a-1.

Example M321

The liquid-crystalline mixture

| | | | |
|---|---|---|---|
| B(S)-2O-O4 | 4.00% | Clearing point [° C.]: | 74.2 |
| B(S)-2O-O5 | 4.00% | Δn [589 nm, 20° C.]: | 0.1096 |
| BCH-32 | 2.50% | Δε [1 kHz, 20° C.]: | −3.1 |
| CC-3-V1 | 6.00% | $\varepsilon_{\perp}$ [1 kHz, 20° C.]: | 6.6 |
| CCH-301 | 2.00% | $K_1$ [pN, 20° C.]: | 14.2 |
| CCH-34 | 8.00% | $K_3$ [pN, 20° C.]: | 16.5 |
| CCH-35 | 8.00% | $\gamma_1$ [mPa · s, 20° C.]: | 105 |
| CCP-3-1 | 8.00% | $V_0$ [20° C., V]: | 2.43 |
| CCP-3-3 | 1.50% | | |
| CCP-V2-1 | 5.00% | | |
| CCY-3-O2 | 11.00% | | |
| CLY-3-O2 | 1.00% | | |
| CPY-3-O2 | 2.50% | | |
| CY-3-O2 | 3.00% | | |
| PCH-301 | 15.50% | | |
| PY-3-O2 | 18.00% | | |

additionally comprises 0.03% of ST-3a-1.

Example M322

The liquid-crystalline mixture

| | | | |
|---|---|---|---|
| B(S)-2O-O4 | 5.00% | Clearing point [° C.]: | 74.8 |
| B(S)-2O-O5 | 3.00% | Δn [589 nm, 20° C.]: | 0.1092 |
| BCH-32 | 4.50% | Δε [1 kHz, 20° C.]: | −3.0 |
| CC-3-V1 | 6.00% | $\varepsilon_{\perp}$ [1 kHz, 20° C.]: | 6.6 |
| CCH-301 | 2.00% | $K_1$ [pN, 20° C.]: | 13.7 |
| CCH-34 | 8.00% | $K_3$ [pN, 20° C.]: | 15.8 |
| CCH-35 | 8.00% | $\gamma_1$ [mPa · s, 20° C.]: | 101 |
| CCP-3-1 | 8.00% | $V_0$ [20° C., V]: | 2.42 |
| CCP-3-3 | 6.00% | | |
| CCY-3-O2 | 11.00% | | |
| CLY-3-O2 | 1.00% | | |
| CPY-3-O2 | 3.00% | | |
| CY-3-O2 | 3.00% | | |
| PCH-301 | 15.00% | | |
| PY-3-O2 | 4.00% | | |
| PY-2-O2 | 12.50% | | |

additionally comprises 0.015% of ST-3a-1.

Example M323

The liquid-crystalline mixture

| | | | |
|---|---|---|---|
| B(S)-2O-O4 | 4.00% | Clearing point [° C.]: | 74.7 |
| B(S)-2O-O5 | 4.00% | Δn [589 nm, 20° C.]: | 0.1095 |
| BCH-32 | 5.00% | Δε [1 kHz, 20° C.]: | −3.5 |
| CC-3-V1 | 6.00% | $\varepsilon_{\perp}$ [1 kHz, 20° C.]: | 7.1 |
| CCH-34 | 9.00% | $K_1$ [pN, 20° C.]: | 14.1 |
| CCH-35 | 7.00% | $K_3$ [pN, 20° C.]: | 16.0 |
| CCP-3-1 | 8.00% | $\gamma_1$ [mPa · s, 20° C.]: | 111 |
| CCP-3-3 | 3.50% | $V_0$ [20° C., V]: | 2.26 |
| CCY-3-O2 | 10.50% | | |
| CLY-3-O2 | 1.00% | | |
| CPY-3-O2 | 5.50% | | |

-continued

| | |
|---|---|
| CY-3-O2 | 11.50% |
| PCH-301 | 13.00% |
| PY-3-O2 | 2.00% |
| PY-2-O2 | 10.00% |

additionally comprises 0.015% of ST-3a-1.

Example M324

The liquid-crystalline mixture

| | |
|---|---|
| CCY-3-O2 | 6.00% |
| CCY-3-O1 | 7.00% |
| CCY-4-O2 | 6.00% |
| CLY-2-O4 | 5.00% |
| CLY-3-O2 | 8.00% |
| CLY-3-O3 | 5.00% |
| PGIY-2-O4 | 3.50% |
| B(S)-2O-O5 | 4.00% |
| B(S)-2O-O4 | 4.00% |
| CC-3-V | 28.00% |
| PY-3-O2 | 8.50% |
| CY-3-O2 | 15.00% |

additionally comprises 0.03% of ST-3a-1.

Example M325

The liquid-crystalline mixture

| | | | |
|---|---|---|---|
| B(S)-2O-O4 | 5.00% | Clearing point [° C.]: | 74.2 |
| B(S)-2O-O5 | 3.00% | Δn [589 nm, 20° C.]: | 0.1090 |
| BCH-32 | 6.00% | Δε [1 kHz, 20° C.]: | −3.1 |
| CC-3-V1 | 6.00% | $\varepsilon_{\perp}$ [1 kHz, 20° C.]: | 6.7 |
| CCH-301 | 2.00% | $K_1$ [pN, 20° C.]: | 14.4 |
| CCH-34 | 8.00% | $K_3$ [pN, 20° C.]: | 16.3 |
| CCH-35 | 8.50% | $\gamma_1$ [mPa · s, 20° C.]: | 104 |
| CCP-3-1 | 7.50% | $V_0$ [20° C., V]: | 2.40 |
| CCP-V2-1 | 5.00% | | |
| CCY-3-O2 | 12.00% | | |
| CLY-3-O2 | 1.00% | | |
| CY-3-O2 | 6.50% | | |
| PCH-301 | 13.00% | | |
| PY-3-O2 | 16.50% | | |

additionally comprises 0.015% of ST-3a-1.

Example M326

The liquid-crystalline mixture

| | | | |
|---|---|---|---|
| B(S)-2O-O4 | 3.50% | Clearing point [° C.]: | 75.2 |
| B(S)-2O-O5 | 4.00% | Δn [589 nm, 20° C.]: | 0.1101 |
| CC-3-V1 | 6.00% | Δε [1 kHz, 20° C.]: | −3.1 |
| CCH-34 | 9.00% | $\varepsilon_{\perp}$ [1 kHz, 20° C.]: | 6.7 |
| CCH-35 | 8.50% | $K_1$ [pN, 20° C.]: | 14.0 |
| CCP-3-1 | 8.00% | $K_3$ [pN, 20° C.]: | 16.5 |
| CCP-3-3 | 6.00% | $\gamma_1$ [mPa · s, 20° C.]: | 107 |
| CCY-3-O2 | 11.50% | $V_0$ [20° C., V]: | 2.42 |
| CLY-3-O2 | 1.00% | | |
| CPY-3-O2 | 6.50% | | |
| PCH-301 | 17.50% | | |
| PY-3-O2 | 8.50% | | |
| PY-2-O2 | 10.00% | | |

additionally comprises 0.015% of ST-3a-1.

Example M327

The liquid-crystalline mixture

| | | | |
|---|---|---|---|
| B(S)-2O-O4 | 3.50% | Clearing point [° C.]: | 75.0 |
| B(S)-2O-O5 | 5.00% | Δn [589 nm, 20° C.]: | 0.1094 |
| CC-3-V1 | 6.00% | Δε [1 kHz, 20° C.]: | −3.4 |
| CCH-301 | 3.00% | $\varepsilon_\perp$ [1 kHz, 20° C.]: | 7.0 |
| CCH-34 | 9.00% | $K_1$ [pN, 20° C.]: | 13.9 |
| CCH-35 | 8.00% | $K_3$ [pN, 20° C.]: | 16.4 |
| CCP-3-1 | 8.50% | $\gamma_1$ [mPa · s, 20° C.]: | 108 |
| CCY-3-O2 | 11.50% | $V_0$ [20° C., V]: | 2.32 |
| CLY-3-O2 | 1.00% | | |
| CPY-3-O2 | 11.50% | | |
| CY-3-O2 | 1.50% | | |
| PCH-301 | 18.50% | | |
| PY-3-O2 | 4.00% | | |
| PY-2-O2 | 9.50% | | |

additionally comprises 0.015% of ST-3a-1.

Example M328

The liquid-crystalline mixture

| | | | |
|---|---|---|---|
| B(S)-2O-O4 | 5.00% | Clearing point [° C.]: | 74.4 |
| B(S)-2O-O5 | 5.00% | Δn [589 nm, 20° C.]: | 0.1089 |
| BCH-32 | 1.00% | Δε [1 kHz, 20° C.]: | −3.4 |
| CC-3-V1 | 6.00% | $\varepsilon_\perp$ [1 kHz, 20° C.]: | 7.0 |
| CCH-301 | 3.00% | $K_1$ [pN, 20° C.]: | 14.3 |
| CCH-34 | 9.00% | $K_3$ [pN, 20° C.]: | 16.5 |
| CCH-35 | 8.00% | $\gamma_1$ [mPa · s, 20° C.]: | 109 |
| CCP-3-1 | 7.00% | $V_0$ [20° C., V]: | 2.31 |
| CCP-3-3 | 2.50% | | |
| CCY-3-O2 | 12.00% | | |
| CLY-3-O2 | 1.00% | | |
| CPY-3-O2 | 6.50% | | |
| CY-3-O2 | 3.00% | | |
| PCH-301 | 17.50% | | |
| PY-3-O2 | 13.50% | | |

additionally comprises 0.015% of ST-3a-1.

Example M329

The liquid-crystalline mixture

| | |
|---|---|
| CY-3-O2 | 15.00% |
| PY-3-O2 | 5.50% |
| CCY-3-O1 | 7.50% |
| CCY-3-O2 | 11.00% |
| CCY-4-O2 | 6.00% |
| CPY-3-O2 | 11.00% |
| CC-3-V | 34.00% |
| B(S)-2O-O5 | 3.00% |
| B(S)-2O-O4 | 3.00% |
| B-2O-O5 | 4.00% |

additionally comprises 0.03% of ST-3a-1.

Example M330

The liquid-crystalline mixture

| | | | |
|---|---|---|---|
| CY-3-O2 | 10.00% | Clearing point [° C.]: | 75.5 |
| CCY-3-O1 | 7.50% | Δn [589 nm, 20° C.]: | 0.1019 |
| CCY-3-O2 | 11.00% | Δε [1 kHz, 20° C.]: | −5.1 |
| CCY-4-O2 | 5.00% | $\varepsilon_\perp$ [1 kHz, 20° C.]: | 9.3 |
| CPY-3-O2 | 11.50% | $K_1$ [pN, 20° C.]: | 14.0 |
| CC-3-V | 36.00% | $K_3$ [pN, 20° C.]: | 14.7 |
| B(S)-2O-O5 | 3.00% | $\gamma_1$ [mPa · s, 20° C.]: | 103 |

-continued

| | | | |
|---|---|---|---|
| B(S)-2O-O4 | 3.00% | $V_0$ [20° C., V]: | 1.79 |
| B-2O-O5 | 4.00% | LTS [bulk, −20° C.]: | >1000 h |
| PGIY-2O-O4 | 4.50% | | |
| Y-4O-O4 | 4.50% | | |

additionally comprises 0.03% of ST-3a-1.

Example M331

The liquid-crystalline mixture

| | |
|---|---|
| B(S)-2O-O4 | 5.00% |
| B(S)-2O-O5 | 5.00% |
| B-2O-O5 | 3.50% |
| BCH-52 | 12.00% |
| CCY-5-O2 | 12.00% |
| CCH-301 | 6.50% |
| CCH-34 | 23.00% |
| PCH-302 | 12.00% |
| PCH-53 | 13.00% |
| PGIY-2-O4 | 8.00% |
| PCH-301 | 17.50% |
| PY-3-O2 | 13.50% |

additionally comprises 0.03% of ST-3a-1.

Example M332

The liquid-crystalline mixture

| | | | |
|---|---|---|---|
| CCY-3-O1 | 1.00% | Clearing point [° C.]: | 96.5 |
| CLY-4-O2 | 5.50% | Δn [589 nm, 20° C.]: | 0.1039 |
| CLY-3-O2 | 9.00% | Δε [1 kHz, 20° C.]: | −3.9 |
| CLY-3-O3 | 5.50% | $\varepsilon_\perp$ [1 kHz, 20° C.]: | 7.4 |
| CPY-3-O2 | 10.00% | $K_1$ [pN, 20° C.]: | 17.7 |
| CLY-5-O2 | 10.00% | $K_3$ [pN, 20° C.]: | 18.8 |
| CC-3-V | 35.00% | $\gamma_1$ [mPa · s, 20° C.]: | 122 |
| CC-3-V1 | 7.00% | $V_0$ [20° C., V]: | 2.31 |
| CY-3-O2 | 8.00% | | |
| B(S)-2O-O4 | 3.00% | | |
| B(S)-2O-O5 | 4.00% | | |
| PGIY-2-O4 | 2.00% | | |

additionally comprises 0.03% of ST-3a-1.

Example M333

The liquid-crystalline mixture

| | | | |
|---|---|---|---|
| CC-3-V | 42.50% | Clearing point [° C.]: | 80.0 |
| B(S)-2O-O5 | 4.00% | Δn [589 nm, 20° C.]: | 0.1078 |
| B(S)-2O-O4 | 4.00% | Δε [1 kHz, 20° C.]: | −3.9 |
| CY-3-O2 | 2.00% | $\varepsilon_\perp$ [1 kHz, 20° C.]: | 7.5 |
| CCY-3-O2 | 7.00% | $K_1$ [pN, 20° C.]: | 15.1 |
| CLY-2-O4 | 4.00% | $K_3$ [pN, 20° C.]: | 15.0 |
| CLY-3-O2 | 6.00% | $\gamma_1$ [mPa · s, 20° C.]: | 92 |
| CLY-3-O3 | 5.00% | $V_0$ [20° C., V]: | 2.08 |
| CLY-4-O2 | 4.00% | LTS [bulk, −20° C.]: | >1000 h |
| CLY-5-O2 | 4.00% | | |
| PGIY-2-O4 | 5.00% | | |
| PYP-2-3 | 2.00% | | |
| PY-3-O2 | 10.50% | | |

additionally comprises 0.03% of ST-3a-1.

Example M334

The liquid-crystalline mixture

| | | | |
|---|---|---|---|
| CC-3-V | 40.50% | Clearing point [° C.]: | 80.0 |
| CCP-V-1 | 7.00% | Δn [589 nm, 20° C.]: | 0.1020 |
| CLY-2-O4 | 4.00% | Δε [1 kHz, 20° C.]: | −3.6 |
| CLY-3-O2 | 6.00% | $ε_⊥$ [1 kHz, 20° C.]: | 7.3 |
| CLY-3-O3 | 5.00% | $K_1$ [pN, 20° C.]: | 14.1 |
| CLY-4-O2 | 4.00% | $K_3$ [pN, 20° C.]: | 14.8 |
| CLY-5-O2 | 4.00% | $γ_1$ [mPa · s, 20° C.]: | 79 |
| CPY-3-O2 | 3.50% | $V_0$ [20° C., V]: | 2.14 |
| CY-3-O2 | 6.00% | | |
| PY-3-O2 | 4.00% | | |
| PY-1-O2 | 8.00% | | |
| B(S)-2O-O5 | 4.00% | | |
| B(S)-2O-O4 | 4.00% | | |

additionally comprises 0.03% of ST-3a-1.

Example M335

The liquid-crystalline mixture

| | | | |
|---|---|---|---|
| B-2O-O5 | 4.50% | Clearing point [° C.]: | 75.5 |
| CC-3-V | 34.50% | Δn [589 nm, 20° C.]: | 0.1014 |
| CCP-3-1 | 3.00% | Δε [1 kHz, 20° C.]: | −5.1 |
| CLY-3-O2 | 8.00% | $ε_⊥$ [1 kHz, 20° C.]: | 9.2 |
| CLY-3-O3 | 6.00% | $K_1$ [pN, 20° C.]: | 14.2 |
| CLY-5-O2 | 6.00% | $K_3$ [pN, 20° C.]: | 14.8 |
| CLY-4-O2 | 6.00% | $γ_1$ [mPa · s, 20° C.]: | 100 |
| CPY-3-O2 | 8.50% | $V_0$ [20° C., V]: | 1.80 |
| Y-4O-O4 | 5.00% | | |
| CY-3-O2 | 12.00% | | |
| B(S)-2O-O5 | 4.00% | | |
| B(S)-2O-O4 | 3.00% | | |

additionally comprises 0.03% of ST-3a-1.

Example M336

The liquid-crystalline mixture

| | | | |
|---|---|---|---|
| CC-3-V | 40.00% | Clearing point [° C.]: | 76.0 |
| CCP-V-1 | 6.50% | Δn [589 nm, 20° C.]: | 0.1017 |
| CLY-2-O4 | 4.00% | Δε [1 kHz, 20° C.]: | −3.6 |
| CLY-3-O2 | 6.00% | $ε_⊥$ [1 kHz, 20° C.]: | 7.3 |
| CLY-3-O3 | 5.00% | $K_1$ [pN, 20° C.]: | 14.2 |
| CLY-4-O2 | 4.00% | $K_3$ [pN, 20° C.]: | 14.7 |
| CLY-5-O2 | 4.00% | $γ_1$ [mPa · s, 20° C.]: | 83 |
| CPY-3-O2 | 4.50% | $V_0$ [20° C., V]: | 2.12 |
| CY-3-O2 | 7.00% | | |
| PY-3-O2 | 11.00% | | |
| B(S)-2O-O5 | 4.00% | | |
| B(S)-2O-O4 | 4.00% | | |

additionally comprises 0.03% of ST-3a-1.

Example M337

The liquid-crystalline mixture

| | | | |
|---|---|---|---|
| CC-3-V | 39.00% | Clearing point [° C.]: | 75.5 |
| CCP-V-1 | 8.50% | Δn [589 nm, 20° C.]: | 0.1011 |
| CLY-2-O4 | 4.00% | Δε [1 kHz, 20° C.]: | −3.6 |
| CLY-3-O2 | 6.00% | $ε_⊥$ [1 kHz, 20° C.]: | 7.2 |
| CLY-3-O3 | 5.00% | $K_1$ [pN, 20° C.]: | 13.8 |
| CLY-4-O2 | 4.00% | $K_3$ [pN, 20° C.]: | 14.4 |
| CLY-5-O2 | 4.00% | $γ_1$ [mPa · s, 20° C.]: | 79 |
| CPY-3-O2 | 3.50% | $V_0$ [20° C., V]: | 2.12 |
| CY-3-O2 | 6.50% | LTS [bulk, −20° C.]: | >1000 h |
| PY-3-O2 | 3.50% | | |
| PY-2-O2 | 8.00% | | |
| B(S)-2O-O5 | 4.00% | | |
| B(S)-2O-O4 | 4.00% | | |

-continued additionally comprises 0.03% of ST-3a-1.

Example M338

The liquid-crystalline mixture

| | | | |
|---|---|---|---|
| CCY-3-O1 | 0.50% | Clearing point [° C.]: | 96.5 |
| CLY-4-O2 | 5.50% | Δn [589 nm, 20° C.]: | 0.1041 |
| CLY-3-O2 | 9.00% | Δε [1 kHz, 20° C.]: | −4.0 |
| CLY-3-O3 | 5.50% | $ε_⊥$ [1 kHz, 20° C.]: | 7.4 |
| CLY-5-O2 | 10.00% | $K_1$ [pN, 20° C.]: | 17.7 |
| CPY-3-O2 | 10.50% | $K_3$ [pN, 20° C.]: | 18.9 |
| CC-3-V | 35.50% | $γ_1$ [mPa · s, 20° C.]: | 119 |
| CC-3-V1 | 7.00% | $V_0$ [20° C., V]: | 2.31 |
| CY-3-O2 | 7.50% | LTS [bulk, −20° C.]: | >1000 h |
| B(S)-2O-O5 | 4.00% | | |
| B(S)-2O-O4 | 4.00% | | |
| PGIY-2-O4 | 1.00% | | |

additionally comprises 0.02% of ST-3a-1.

Example M339

The liquid-crystalline mixture

| | | | |
|---|---|---|---|
| CLY-4-O2 | 5.50% | Clearing point [° C.]: | 96.5 |
| CLY-3-O2 | 9.00% | Δn [589 nm, 20° C.]: | 0.1039 |
| CLY-3-O3 | 5.50% | Δε [1 kHz, 20° C.]: | −4.0 |
| CLY-5-O2 | 10.00% | $ε_⊥$ [1 kHz, 20° C.]: | 7.4 |
| CPY-2-O2 | 2.00% | $K_1$ [pN, 20° C.]: | 17.5 |
| CPY-3-O2 | 10.00% | $K_3$ [pN, 20° C.]: | 18.7 |
| CC-3-V | 35.50% | $γ_1$ [mPa · s, 20° C.]: | 119 |
| CC-3-V1 | 7.00% | $V_0$ [20° C., V]: | 2.30 |
| CY-3-O2 | 7.50% | | |
| B(S)-2O-O5 | 4.00% | | |
| B(S)-2O-O4 | 4.00% | | |

additionally comprises 0.03% of ST-3a-1 und 0.01% of ST-8-1.

Example M340

The liquid-crystalline mixture

| | | | |
|---|---|---|---|
| CLY-4-O2 | 5.00% | Clearing point [° C.]: | 93.5 |
| CLY-3-O2 | 9.00% | Δn [589 nm, 20° C.]: | 0.1041 |
| CLY-3-O3 | 5.50% | Δε [1 kHz, 20° C.]: | −3.9 |
| CLY-5-O2 | 10.00% | $ε_⊥$ [1 kHz, 20° C.]: | 7.4 |
| CPY-3-O2 | 8.50% | $K_1$ [pN, 20° C.]: | 17.2 |
| CC-3-V | 36.00% | $K_3$ [pN, 20° C.]: | 18.3 |
| CC-3-V1 | 7.00% | $γ_1$ [mPa · s, 20° C.]: | 113 |
| CY-3-O2 | 8.50% | $V_0$ [20° C., V]: | 2.28 |
| B(S)-2O-O4 | 4.00% | | |
| B(S)-2O-O5 | 4.00% | | |
| PGIY-2-O4 | 2.50% | | |

additionally comprises 0.02% of ST-8-1.

Example M341

The liquid-crystalline mixture

| | |
|---|---|
| CC-3-V | 18.50% |
| CC-3-V1 | 7.00% |

-continued

| | |
|---|---|
| CCP-3-1 | 11.00% |
| CCY-3-O1 | 5.00% |
| CCY-3-O2 | 8.00% |
| CCY-4-O2 | 2.50% |
| CLY-2-O4 | 4.50% |
| CLY-3-O2 | 7.50% |
| CLY-3-O3 | 6.50% |
| CPY-3-O2 | 8.00% |
| CY-3-O2 | 11.50% |
| PGIY-2-O4 | 3.00% |
| B(S)-2O-O4 | 4.00% |
| B(S)-2O-O5 | 3.00% |

additionally comprises 0.02% of ST-3a-1.

Example M342

The liquid-crystalline mixture

| | |
|---|---|
| CC-3-V | 35.50% |
| CCP-3-1 | 2.50% |
| CCY-3-O2 | 9.50% |
| CLY-3-O2 | 8.00% |
| CPY-2-O2 | 4.50% |
| CPY-3-O2 | 10.50% |
| CY-3-O2 | 14.50% |
| PGIY-2-O4 | 6.00% |
| PYP-2-3 | 2.00% |
| B(S)-2O-O4 | 4.00% |
| B(S)-2O-O5 | 3.00% |

additionally comprises 0.03% of ST-3a-1.

Example M343

The liquid-crystalline mixture

| | | | |
|---|---|---|---|
| B(S)-2O-O5 | 4.00% | Clearing point [° C.]: | 74.5 |
| B(S)-2O-O4 | 3.00% | Δn [589 nm, 20° C.]: | 0.1091 |
| BCH-32 | 8.00% | Δε [1 kHz, 20° C.]: | −3.1 |
| CC-3-V1 | 9.00% | $\varepsilon_\perp$ [1 kHz, 20° C.]: | 6.7 |
| CCH-301 | 2.00% | $K_1$ [pN, 20° C.]: | 15.2 |
| CCH-34 | 8.00% | $K_3$ [pN, 20° C.]: | 16.2 |
| CCH-35 | 7.00% | $\gamma_1$ [mPa · s, 20° C.]: | 100 |
| CCP-3-1 | 11.00% | $V_0$ [20° C., V]: | 2.41 |
| CCP-V2-1 | 5.00% | LTS [bulk, −20° C.]: | >1000 h |
| CCY-3-O2 | 7.00% | | |
| CLY-3-O2 | 1.00% | | |
| CY-3-O2 | 13.00% | | |
| PCH-301 | 5.50% | | |
| PY-3-O2 | 16.50% | | |

additionally comprises 0.015% of ST-3a-1.

Example M344

The liquid-crystalline mixture

| | | | |
|---|---|---|---|
| CY-3-O2 | 7.50% | Clearing point [° C.]: | 74.5 |
| CCY-3-O1 | 6.00% | Δn [589 nm, 20° C.]: | 0.1031 |
| CCY-3-O2 | 11.00% | Δε [1 kHz, 20° C.]: | −5.0 |
| CCY-4-O2 | 4.50% | $\varepsilon_\perp$ [1 kHz, 20° C.]: | 9.1 |
| CPY-3-O2 | 10.50% | $K_1$ [pN, 20° C.]: | 13.5 |
| CC-3-V | 39.00% | $K_3$ [pN, 20° C.]: | 14.4 |
| B(S)-2O-O5 | 4.00% | $\gamma_1$ [mPa · s, 20° C.]: | 95 |
| B(S)-2O-O4 | 4.00% | $V_0$ [20° C., V]: | 1.79 |
| B-2O-O5 | 5.00% | | |
| PGIY-2-O4 | 4.50% | | |
| Y-4O-O4 | 4.00% | | |

additionally comprises 0.025% of ST-3a-1.

Example M345

The liquid-crystalline mixture

| | | | |
|---|---|---|---|
| CY-3-O2 | 2.50% | Clearing point [° C.]: | 80.1 |
| CCY-3-O2 | 6.00% | Δn [589 nm, 20° C.]: | 0.1104 |
| CCY-4-O2 | 1.50% | Δε [1 kHz, 20° C.]: | −4.0 |
| CPY-2-O2 | 8.00% | $\varepsilon_\perp$ [1 kHz, 20° C.]: | 7.8 |
| CPY-3-O2 | 10.00% | $K_1$ [pN, 20° C.]: | 14.5 |
| PYP-2-3 | 3.00% | $K_3$ [pN, 20° C.]: | 15.3 |
| CLY-3-O2 | 6.00% | $\gamma_1$ [mPa · s, 20° C.]: | 102 |
| CLY-3-O3 | 6.00% | $V_0$ [20° C., V]: | 2.05 |
| Y-4O-O4 | 6.00% | | |
| PGIY-2-O4 | 6.00% | | |
| B-2O-O5 | 5.00% | | |
| CC-3-V | 32.00% | | |
| CC-3-V1 | 8.00% | | |

additionally comprises 0.015% of ST-9-1.

Example M346

The liquid-crystalline mixture

| | | | |
|---|---|---|---|
| B-2O-O5 | 5.00% | Clearing point [° C.]: | 75.5 |
| CC-3-V | 39.00% | Δn [589 nm, 20° C.]: | 0.1047 |
| CCY-3-O2 | 11.00% | Δε [1 kHz, 20° C.]: | −5.9 |
| CCY-3-O1 | 6.00% | $\varepsilon_\perp$ [1 kHz, 20° C.]: | 10.2 |
| CCY-4-O2 | 4.50% | $K_1$ [pN, 20° C.]: | 14.8 |
| CLY-3-O2 | 3.00% | $K_3$ [pN, 20° C.]: | 14.4 |
| CPY-3-O2 | 7.50% | $\gamma_1$ [mPa · s, 20° C.]: | 96 |
| Y-4O-O4 | 5.00% | $V_0$ [20° C., V]: | 1.65 |
| B(S)-2O-O5 | 8.00% | | |
| B(S)-2O-O4 | 8.00% | | |
| CY-3-O2 | 3.00% | | |

additionally comprises 0.03% of ST-3a-1.

Example M347

The liquid-crystalline mixture

| | |
|---|---|
| B(S)-2O-O5 | 4.00% |
| B(S)-2O-O4 | 3.00% |
| BCH-32 | 8.00% |
| CC-3-V | 15.00% |
| CC-3-V1 | 9.00% |
| CCP-3-1 | 8.00% |
| CCY-3-O1 | 7.00% |
| CCY-3-O2 | 11.50% |
| CLY-3-O2 | 1.00% |
| CY-3-O2 | 15.00% |
| PCH-301 | 5.00% |
| PY-3-O2 | 13.50% |

additionally comprises 0.025% of ST-3a-1.

Example M348

The liquid-crystalline mixture

| | |
|---|---|
| B(S)-2O-O5 | 4.00% |
| B(S)-2O-O4 | 3.00% |
| BCH-32 | 8.00% |
| CC-3-V | 15.00% |

-continued

| | |
|---|---|
| CC-3-V1 | 9.00% |
| CCP-3-1 | 7.00% |
| CCY-3-O1 | 7.00% |
| CCY-3-O2 | 11.00% |
| CCY-4-O2 | 2.50% |
| CLY-3-O2 | 1.00% |
| CY-3-O2 | 14.00% |
| PCH-301 | 5.00% |
| PY-1-O2 | 6.50% |
| PY-2-O2 | 7.00% |

Example M349

The liquid-crystalline mixture

| | | | |
|---|---|---|---|
| B(S)-2O-O5 | 4.00% | Clearing point [° C.]: | 74.0 |
| B(S)-2O-O4 | 3.00% | Δn [589 nm, 20° C.]: | 0.1094 |
| BCH-32 | 8.00% | Δε [1 kHz, 20° C.]: | −3.7 |
| CC-3-V1 | 9.00% | $\varepsilon_\perp$ [1 kHz, 20° C.]: | 7.4 |
| CCH-301 | 2.00% | $K_1$ [pN, 20° C.]: | 14.6 |
| CCH-34 | 8.00% | $K_3$ [pN, 20° C.]: | 16.0 |
| CCH-35 | 7.00% | $\gamma_1$ [mPa · s, 20° C.]: | 107 |
| CCP-3-1 | 9.50% | $V_0$ [20° C., V]: | 2.20 |
| CCY-3-O1 | 3.50% | | |
| CCY-3-O2 | 11.00% | | |
| CLY-3-O2 | 1.00% | | |
| CY-3-O2 | 12.50% | | |
| PCH-301 | 5.50% | | |
| PY-1-O2 | 8.00% | | |
| PY-2-O2 | 8.00% | | |

additionally comprises 0.02% of ST-3a-1.

Example M350

The liquid-crystalline mixture

| | |
|---|---|
| B(S)-2O-O5 | 4.00% |
| B(S)-2O-O4 | 4.00% |
| BCH-32 | 16.00% |
| CCH-23 | 19.00% |
| CCH-301 | 6.50% |
| CCH-34 | 5.00% |
| CCH-35 | 5.00% |
| CCP-3-1 | 11.50% |
| CLY-3-O2 | 8.00% |
| PY-3-O2 | 10.00% |
| PYP-2-3 | 4.00% |
| Y-4O-O4 | 7.00% |

additionally comprises 0.025% of ST-2a-1.

Example M351

The liquid-crystalline mixture

| | |
|---|---|
| CC-3-V | 47.00% |
| CC-3-V1 | 6.50% |
| CC-3-2V1 | 1.00% |
| CCP-V-1 | 6.50% |
| PGP-2-2V | 13.00% |
| PGP-3-2V | 3.50% |
| PGU-2-F | 6.00% |
| PGUQU-3-F | 4.50% |
| CLP-3-T | 5.00% |
| B(S)-2O-O5 | 3.50% |
| B(S)-2O-O4 | 3.50% |

additionally comprises 0.025% of ST-2a-1.

Example M352

The liquid-crystalline mixture

| | |
|---|---|
| B(S)-2O-O5 | 4.00% |
| B(S)-2O-O4 | 4.00% |
| BCH-32 | 16.00% |
| CCH-23 | 19.50% |
| CCH-301 | 7.00% |
| CCH-34 | 5.00% |
| CCH-35 | 5.00% |
| CCP-3-1 | 11.00% |
| CLY-3-O2 | 8.00% |
| PYP-3-O2 | 5.50% |
| Y-4O-O4 | 7.00% |
| PY-1-O2 | 4.00% |
| PY-2-O2 | 4.00% |

additionally comprises 0.025% of ST-3b-1.

Example M353

The liquid-crystalline mixture

| | |
|---|---|
| B(S)-2O-O5 | 4.00% |
| B(S)-2O-O4 | 4.00% |
| BCH-32 | 16.00% |
| CCH-23 | 18.00% |
| CCH-301 | 3.00% |
| CCH-34 | 4.00% |
| CCH-35 | 4.00% |
| CCP-3-1 | 13.50% |
| CCP-3-3 | 4.00% |
| CLY-3-O2 | 8.00% |
| CPY-3-O2 | 1.50% |
| PY-3-O2 | 2.00% |
| PYP-2-3 | 5.50% |
| Y-4O-O4 | 12.50% |

additionally comprises 0.025% of ST-3b-1.

Example M354

The liquid-crystalline mixture

| | |
|---|---|
| B(S)-2O-O5 | 4.00% |
| B(S)-2O-O4 | 4.00% |
| BCH-32 | 14.00% |
| CCH-23 | 18.00% |
| CCH-301 | 2.00% |
| CCH-34 | 4.50% |
| CCH-35 | 3.00% |
| CCP-3-1 | 15.50% |
| CCP-3-3 | 6.00% |
| CLY-3-O2 | 8.00% |
| PY-1-O2 | 4.00% |
| PY-2-O2 | 4.00% |
| PYP-2-3 | 3.00% |
| Y-4O-O4 | 10.00% |

additionally comprises 0.025% of ST-3b-1.

Example M355

The liquid-crystalline mixture

| | | | |
|---|---|---|---|
| CCY-3-O1 | 7.00% | Clearing point [° C.]: | 92.5 |
| CCY-3-O2 | 11.00% | Δn [589 nm, 20° C.]: | 0.0992 |
| CCY-4-O2 | 5.00% | Δε [1 kHz, 20° C.]: | −4.5 |
| CLY-3-O2 | 5.00% | $\varepsilon_\perp$ [1 kHz, 20° C.]: | 8.1 |
| CLY-3-O3 | 5.00% | $K_1$ [pN, 20° C.]: | 16.0 |

-continued

| | | | |
|---|---|---|---|
| CLY-5-O2 | 5.00% | $K_3$ [pN, 20° C.]: | 17.8 |
| CPY-3-O2 | 2.50% | $\gamma_1$ [mPa · s, 20° C.]: | 124 |
| PGIY-2-O4 | 4.00% | $V_0$ [20° C., V]: | 2.10 |
| CC-3-V | 37.00% | | |
| CY-3-O2 | 11.50% | | |
| B(S)-2O-O5 | 4.00% | | |
| B(S)-2O-O4 | 3.00% | | |

additionally comprises 0.03% of ST-3a-1.

Example M356

The liquid-crystalline mixture

| | | | |
|---|---|---|---|
| CCY-3-O1 | 6.50% | Clearing point [° C.]: | 91.5 |
| CCY-3-O2 | 11.00% | Δn [589 nm, 20° C.]: | 0.0995 |
| CLY-3-O2 | 5.00% | Δε [1 kHz, 20° C.]: | −4.5 |
| CLY-3-O3 | 5.00% | $\varepsilon_\perp$ [1 kHz, 20° C.]: | 8.1 |
| CLY-4-O2 | 5.00% | $K_1$ [pN, 20° C.]: | 16.1 |
| CLY-5-O2 | 5.00% | $K_3$ [pN, 20° C.]: | 17.5 |
| CPY-3-O2 | 2.00% | $\gamma_1$ [mPa · s, 20° C.]: | 120 |
| PGIY-2-O4 | 4.00% | $V_0$ [20° C., V]: | 2.09 |
| CC-3-V | 37.50% | | |
| CY-3-O2 | 12.00% | | |
| B(S)-2O-O5 | 4.00% | | |
| B(S)-2O-O4 | 3.00% | | |

additionally comprises 0.03% of ST-3a-1.

Example M357

The liquid-crystalline mixture

| | | | |
|---|---|---|---|
| B(S)-2O-O5 | 4.00% | Clearing point [° C.]: | 74.5 |
| B(S)-2O-O4 | 3.00% | Δn [589 nm, 20° C.]: | 0.1094 |
| BCH-32 | 8.00% | Δε [1 kHz, 20° C.]: | −3.4 |
| CC-3-V1 | 9.00% | $\varepsilon_\perp$ [1 kHz, 20° C.]: | 7.1 |
| CCH-301 | 2.00% | $K_1$ [pN, 20° C.]: | 15.4 |
| CCH-34 | 8.00% | $K_3$ [pN, 20° C.]: | 16.4 |
| CCH-35 | 7.00% | $\gamma_1$ [mPa · s, 20° C.]: | 104 |
| CCP-3-1 | 12.00% | $V_0$ [20° C., V]: | 2.31 |
| CCY-3-O2 | 11.00% | | |
| CLY-3-O2 | 1.00% | | |
| CY-3-O2 | 13.00% | | |
| PCH-301 | 5.50% | | |
| PY-2-3 | 16.50% | | |

additionally comprises 0.02% of ST-3a-1.

Example M358

The liquid-crystalline mixture

| | | | |
|---|---|---|---|
| CC-3-V | 45.50% | Clearing point [° C.]: | 76.0 |
| CCY-3-O2 | 1.00% | Δn [589 nm, 20° C.]: | 0.1036 |
| CLY-3-O2 | 7.00% | Δε [1 kHz, 20° C.]: | −3.5 |
| CLY-3-O3 | 7.00% | $\varepsilon_\perp$ [1 kHz, 20° C.]: | 7.1 |
| CPY-3-O2 | 11.00% | $K_1$ [pN, 20° C.]: | 13.5 |
| CY-3-O2 | 13.00% | $K_3$ [pN, 20° C.]: | 14.6 |
| B(S)-2O-O4 | 3.00% | $\gamma_1$ [mPa · s, 20° C.]: | 80 |
| B(S)-2O-O5 | 4.00% | $V_0$ [20° C., V]: | 2.16 |
| PGIY-2-O4 | 7.50% | | |
| PYP-2-3 | 1.50% | | |

additionally comprises 0.03% of ST-3a-1.

Example M359

The liquid-crystalline mixture

| | | | |
|---|---|---|---|
| CC-3-V | 44.00% | Clearing point [° C.]: | 75.0 |
| CCY-3-O2 | 7.50% | Δn [589 nm, 20° C.]: | 0.1035 |
| CLY-3-O2 | 7.00% | Δε [1 kHz, 20° C.]: | −3.7 |
| CPY-3-O2 | 11.00% | $\varepsilon_\perp$ [1 kHz, 20° C.]: | 7.3 |
| CY-3-O2 | 15.00% | $K_1$ [pN, 20° C.]: | 13.4 |
| B(S)-2O-O4 | 3.00% | $K_3$ [pN, 20° C.]: | 14.9 |
| B(S)-2O-O5 | 4.00% | $\gamma_1$ [mPa · s, 20° C.]: | 82 |
| PGIY-2-O4 | 7.00% | $V_0$ [20° C., V]: | 2.13 |
| PYP-2-3 | 1.50% | | |

additionally comprises 0.03% of ST-3a-1.

Example M360

The liquid-crystalline mixture

| | | | |
|---|---|---|---|
| CC-3-V | 41.00% | Clearing point [° C.]: | 74 |
| CCY-3-O1 | 3.00% | Δn [589 nm, 20° C.]: | 0.1007 |
| CCY-3-O2 | 10.00% | Δε [1 kHz, 20° C.]: | −3.8 |
| CPY-2-O2 | 10.50% | $\varepsilon_\perp$ [1 kHz, 20° C.]: | 7.5 |
| CPY-3-O2 | 11.00% | $K_1$ [pN, 20° C.]: | 12.7 |
| CY-3-O2 | 16.00% | $K_3$ [pN, 20° C.]: | 14.6 |
| PGIY-2-O4 | 4.50% | $\gamma_1$ [mPa · s, 20° C.]: | 90 |
| B-2O-O5 | 4.00% | $V_0$ [20° C., V]: | 2.07 |

additionally comprises 0.03% of ST-3a-1.

Example M361

The liquid-crystalline mixture

| | | | |
|---|---|---|---|
| B-2O-O5 | 4.00% | Clearing point [° C.]: | 109.8 |
| BCH-32 | 2.00% | Δn [589 nm, 20° C.]: | 0.1059 |
| CC-3-V | 25.00% | Δε [1 kHz, 20° C.]: | −4.1 |
| CC-3-V1 | 4.00% | $\varepsilon_\perp$ [1 kHz, 20° C.]: | 7.6 |
| CCP-3-1 | 4.00% | $K_1$ [pN, 20° C.]: | 19.0 |
| CCY-3-O1 | 5.00% | $K_3$ [pN, 20° C.]: | 18.9 |
| CCY-3-O2 | 6.00% | $\gamma_1$ [mPa · s, 20° C.]: | 145 |
| CCY-4-O2 | 6.00% | $V_0$ [20° C., V]: | 2.28 |
| CCY-5-O2 | 6.00% | | |
| CLY-3-O2 | 6.00% | | |
| CLY-3-O3 | 6.00% | | |
| CPY-2-O2 | 9.00% | | |
| CPY-3-O2 | 9.00% | | |
| CY-5-O4 | 8.00% | | |

additionally comprises 0.04% of ST-3b-1.

Example M362

The liquid-crystalline mixture

| | | |
|---|---|---|
| B-2O-O5 | 4.00% | Clearing point [° C.]: |
| CC-3-V | 37.00% | Δn [589 nm, 20° C.]: |
| CCP-3-1 | 4.00% | Δε [1 kHz, 20° C.]: |
| CCY-3-O2 | 8.00% | $\varepsilon_\perp$ [1 kHz, 20° C.]: |
| CCY-4-O2 | 3.00% | $K_1$ [pN, 20° C.]: |
| CLY-3-O2 | 6.00% | $K_3$ [pN, 20° C.]: |
| CLY-3-O3 | 6.00% | $\gamma_1$ [mPa · s, 20° C.]: |
| CPY-3-O2 | 9.50% | $V_0$ [20° C., V]: |
| CY-3-O2 | 13.00% | |
| PGIY-2-O4 | 2.00% | |
| PYP-2-3 | 4.00% | |
| PYP-2-4 | 3.50% | |

additionally comprises 0.03% of ST-3a-1.

Example M363

The liquid-crystalline mixture

| | | | |
|---|---|---|---|
| B-2O-O5 | 4.00% | Clearing point [° C.]: | 104 |
| CC-3-V | 14.00% | Δn [589 nm, 20° C.]: | 0.1059 |
| CC-3-V1 | 5.00% | Δε [1 kHz, 20° C.]: | −5.2 |
| CCP-3-1 | 7.00% | $\varepsilon_\perp$ [1 kHz, 20° C.]: | 9.0 |
| CCY-3-O1 | 6.00% | $K_1$ [pN, 20° C.]: | 17.5 |
| CCY-3-O2 | 7.50% | $K_3$ [pN, 20° C.]: | 19.0 |
| CCY-4-O2 | 7.00% | $\gamma_1$ [mPa · s, 20° C.]: | 171 |
| CCY-5-O2 | 4.00% | $V_0$ [20° C., V]: | 2.02 |
| CLY-2-O4 | 4.00% | | |
| CLY-3-O2 | 6.00% | | |
| CLY-3-O3 | 6.00% | | |
| CPY-3-O2 | 8.00% | | |
| CY-3-O2 | 12.00% | | |
| CY-5-O4 | 7.50% | | |
| PGIY-2-O4 | 2.00% | | |

additionally comprises 0.04% of ST-3b-1.

Example M364

The liquid-crystalline mixture

| | | | |
|---|---|---|---|
| B-2O-O5 | 3.00% | Clearing point [° C.]: | 75.4 |
| CC-3-V | 39.00% | Δn [589 nm, 20° C.]: | 0.1074 |
| CC-3-V1 | 8.00% | Δε [1 kHz, 20° C.]: | −2.7 |
| CCP-V-1 | 4.50% | $\varepsilon_\perp$ [1 kHz, 20° C.]: | 6.2 |
| CLY-3-O2 | 8.00% | $K_1$ [pN, 20° C.]: | 13.7 |
| CPY-2-O2 | 10.00% | $K_3$ [pN, 20° C.]: | 14.3 |
| CPY-3-O2 | 10.00% | $\gamma_1$ [mPa · s, 20° C.]: | 77 |
| PGIY-2-O4 | 6.00% | $V_0$ [20° C., V]: | 2.44 |
| PYP-2-3 | 3.50% | | |
| PYP-2-4 | 2.00% | | |
| Y-4O-O4 | 6.00% | | |

additionally comprises 0.03% of ST-3a-1.

Example M365

The liquid-crystalline mixture

| | | | |
|---|---|---|---|
| B-2O-O5 | 4.00% | Clearing point [° C.]: | 70.6 |
| CC-3-V | 40.00% | Δn [589 nm, 20° C.]: | 0.1072 |
| CC-3-V1 | 1.50% | Δε [1 kHz, 20° C.]: | −2.5 |
| CC-4-V | 10.50% | $\varepsilon_\perp$ [1 kHz, 20° C.]: | 5.9 |
| CLY-3-O2 | 8.00% | $K_1$ [pN, 20° C.]: | 13.1 |
| CPY-2-O2 | 6.50% | $K_3$ [pN, 20° C.]: | 13.1 |
| CPY-3-O2 | 10.00% | $\gamma_1$ [mPa · s, 20° C.]: | 70 |
| PGIY-2-O4 | 6.00% | $V_0$ [20° C., V]: | 2.40 |
| PY-3-O2 | 9.50% | | |
| PYP-2-3 | 4.00% | | |

additionally comprises 0.03% of ST-3a-1.

Example M366

The liquid-crystalline mixture

| | | | |
|---|---|---|---|
| B-2O-O5 | 4.00% | Clearing point [° C.]: | 75.5 |
| CC-3-V | 40.00% | Δn [589 nm, 20° C.]: | 0.1083 |
| CC-3-V1 | 3.00% | Δε [1 kHz, 20° C.]: | −2.7 |
| CC-4-V | 6.50% | $\varepsilon_\perp$ [1 kHz, 20° C.]: | 6.1 |
| CCP-V-1 | 2.50% | $K_1$ [pN, 20° C.]: | 13.7 |
| CLY-3-O2 | 8.00% | $K_3$ [pN, 20° C.]: | 14.2 |
| CPY-2-O2 | 10.00% | $\gamma_1$ [mPa · s, 20° C.]: | 76 |
| CPY-3-O2 | 10.00% | $V_0$ [20° C., V]: | 2.42 |

-continued

| | |
|---|---|
| PGIY-2-O4 | 6.00% |
| PY-3-O2 | 9.00% |
| PYP-2-3 | 1.00% |

additionally comprises 0.02% of ST-2a-1.

Example M367

The liquid-crystalline mixture

| | | | |
|---|---|---|---|
| B-2O-O5 | 4.00% | Clearing point [° C.]: | 70.2 |
| CC-3-V | 40.00% | Δn [589 nm, 20° C.]: | 0.1066 |
| CC-3-V1 | 6.00% | Δε [1 kHz, 20° C.]: | −2.5 |
| CC-4-V | 3.50% | $\varepsilon_\perp$ [1 kHz, 20° C.]: | 6.0 |
| CCP-V-1 | 3.00% | $K_1$ [pN, 20° C.]: | 12.8 |
| CLY-3-O2 | 8.00% | $K_3$ [pN, 20° C.]: | 13.2 |
| CPY-2-O2 | 4.50% | $\gamma_1$ [mPa · s, 20° C.]: | 69 |
| CPY-3-O2 | 10.00% | $V_0$ [20° C., V]: | 2.43 |
| PGIY-2-O4 | 6.00% | | |
| PYP-2-3 | 9.00% | | |
| Y-4O-O4 | 6.00% | | |

additionally comprises 0.03% of ST-3a-1.

Example M368

The liquid-crystalline mixture

| | | | |
|---|---|---|---|
| CY-3-O2 | 12.00% | Clearing point [° C.]: | 74.8 |
| CY-5-O2 | 12.00% | Δn [589 nm, 20° C.]: | 0.1026 |
| CCY-3-O2 | 3.50% | Δε [1 kHz, 20° C.]: | −4.0 |
| CLY-3-O2 | 10.00% | $\varepsilon_\perp$ [1 kHz, 20° C.]: | 7.9 |
| CPY-2-O21 | 10.00% | $K_1$ [pN, 20° C.]: | 12.8 |
| CPY-3-O2 | 10.00% | $K_3$ [pN, 20° C.]: | 14.2 |
| B-2O-O5 | 5.00% | $\gamma_1$ [mPa · s, 20° C.]: | 83 |
| CC-3-V | 32.00% | $V_0$ [20° C., V]: | 1.98 |
| BCH-32 | 5.50% | | |

additionally comprises 0.03% of ST-3a-1.

Example M369

The liquid-crystalline mixture

| | | | |
|---|---|---|---|
| B-2O-O5 | 4.00% | Clearing point [° C.]: | 74.2 |
| BCH-32 | 8.00% | Δn [589 nm, 20° C.]: | 0.1089 |
| CC-3-V1 | 9.00% | Δε [1 kHz, 20° C.]: | −3.1 |
| CCH-301 | 2.00% | $\varepsilon_\perp$ [1 kHz, 20° C.]: | 6.7 |
| CCH-34 | 9.00% | $K_1$ [pN, 20° C.]: | 14.1 |
| CCH-35 | 7.00% | $K_3$ [pN, 20° C.]: | 16.5 |
| CCP-3-1 | 8.50% | $\gamma_1$ [mPa · s, 20° C.]: | 109 |
| CCY-3-O2 | 11.00% | $V_0$ [20° C., V]: | 2.43 |
| CLY-3-O2 | 0.50% | | |
| CPY-3-O2 | 6.50% | | |
| CY-3-O2 | 10.00% | | |
| PCH-301 | 9.00% | | |
| PY-3-O2 | 15.50% | | |

additionally comprises 0.015% of ST-3a-1.

Example M370

The liquid-crystalline mixture

| | | | |
|---|---|---|---|
| B-2O-O5 | 4.00% | Clearing point [° C.]: | 74.2 |
| BCH-32 | 8.00% | Δn [589 nm, 20° C.]: | 0.1094 |
| CC-3-V1 | 9.00% | Δε [1 kHz, 20° C.]: | −3.1 |
| CCH-301 | 2.00% | $\varepsilon_\perp$ [1 kHz, 20° C.]: | 6.7 |
| CCH-34 | 9.00% | $K_1$ [pN, 20° C.]: | 14.2 |

-continued

| | | | |
|---|---|---|---|
| CCH-35 | 7.00% | $K_3$ [pN, 20° C.]: | 16.5 |
| CCP-3-1 | 8.50% | $\gamma_1$ [mPa · s, 20° C.]: | 108 |
| CCY-3-O2 | 10.00% | $V_0$ [20° C., V]: | 2.43 |
| CLY-3-O2 | 1.50% | | |
| CPY-3-O2 | 6.50% | | |
| CY-3-O2 | 10.00% | | |
| PCH-301 | 9.00% | | |
| PY-3-O2 | 15.50% | | |

additionally comprises 0.015% of ST-3a-1.

Example M371

The liquid-crystalline mixture

| | | | |
|---|---|---|---|
| CC-3-V | 44.50% | Clearing point [° C.]: | 74.0 |
| CCY-3-O2 | 11.00% | Δn [589 nm, 20° C.]: | 0.1010 |
| CPY-2-O2 | 9.50% | Δε [1 kHz, 20° C.]: | −3.7 |
| CPY-3-O2 | 11.00% | $\varepsilon_{\parallel}$ [1 kHz, 20° C.]: | 3.7 |
| CY-3-O2 | 13.00% | $\varepsilon_{\perp}$ [1 kHz, 20° C.]: | 7.4 |
| PGIY-2-O4 | 4.00% | $K_1$ [pN, 20° C.]: | 13.0 |
| B-2O-O5 | 4.00% | $K_3$ [pN, 20° C.]: | 14.5 |
| B(S)-2O-O4 | 3.00% | $\gamma_1$ [mPa · s, 20° C.]: | 83 |
| | | $V_0$ [20° C., V]: | 2.09 |

additionally comprises 0.02% of ST-8-1.

The mixtures of Examples M1 to M371 comprising one or more stabilisers are distinguished by very good reliability.

The invention claimed is:

1. A liquid-crystalline medium, consisting of at least one compound of formula I,

I

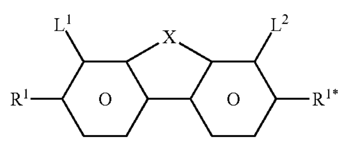

in which $R^1$ and $R^{1*}$ each, independently of one another, denote H, an alkyl or alkoxy radical having 1 to 15 C atoms, in which one or more $CH_2$ groups may each be replaced, independently of one another, by —C≡C—, —$CF_2$O—, —O$CF_2$—, —CH═CH—,

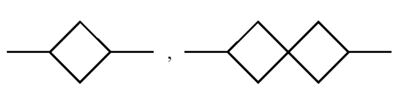

—O—, —CO—O—, or —O—CO— in such a way that O atoms are not linked directly to one another, and in which one or more H atoms may be replaced by halogen, X denotes —O—, and $L^2$ and $L^2$ each, independently of one another, denote F, Cl, $CF_3$ or $CHF_2$, and at least one compound of the following formulae ST,

ST-1

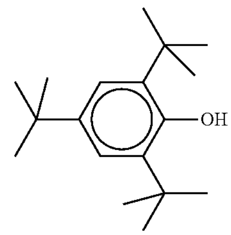

ST-2

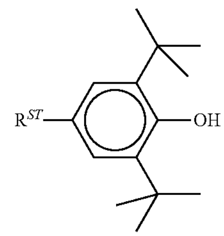

ST-3

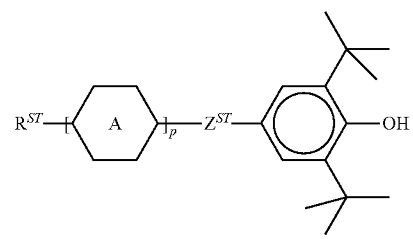

ST-4

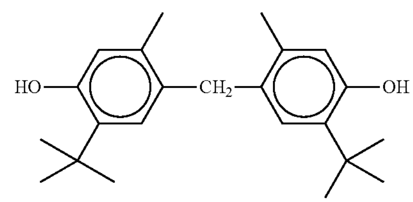

ST-5

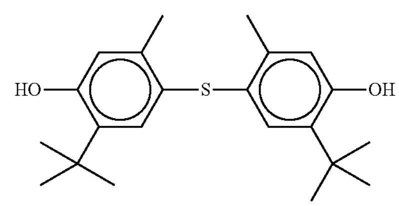

ST-6

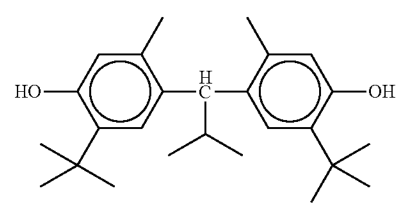

ST-7

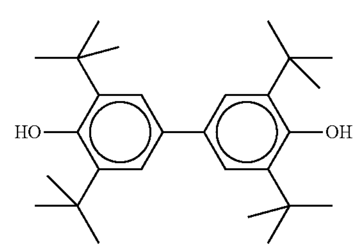

-continued
ST-8
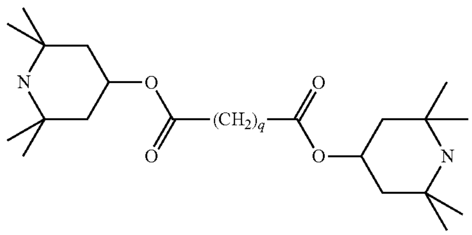
ST-9
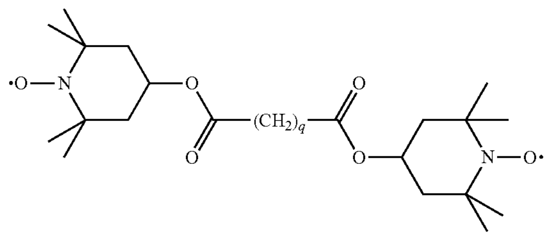
ST-10
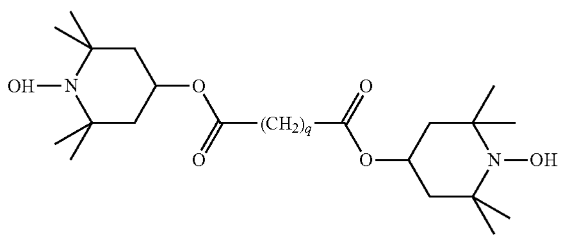
ST-11
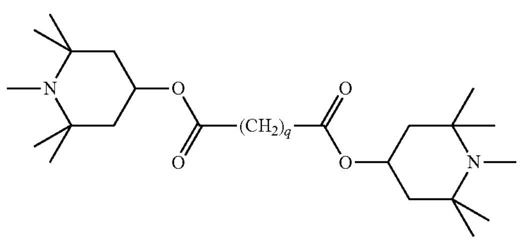
ST-12
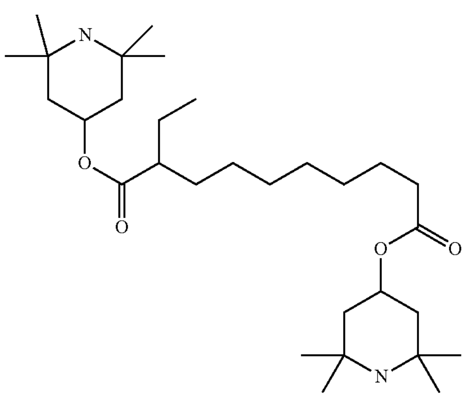
ST-13
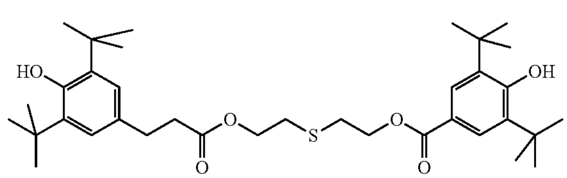
-continued
ST-14
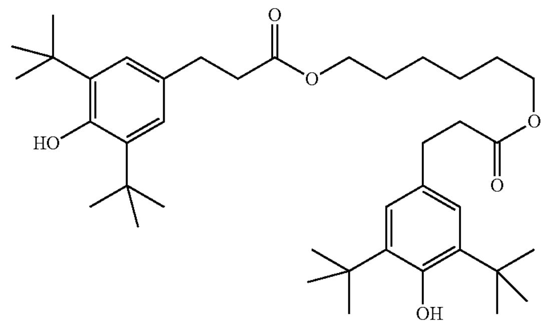
ST-15
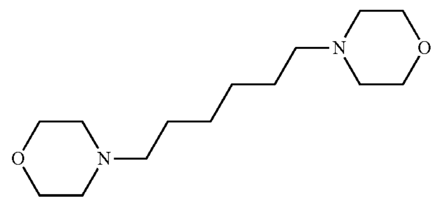
ST-16
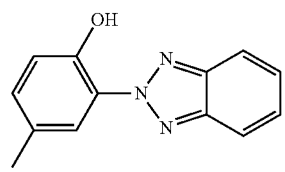
ST-17
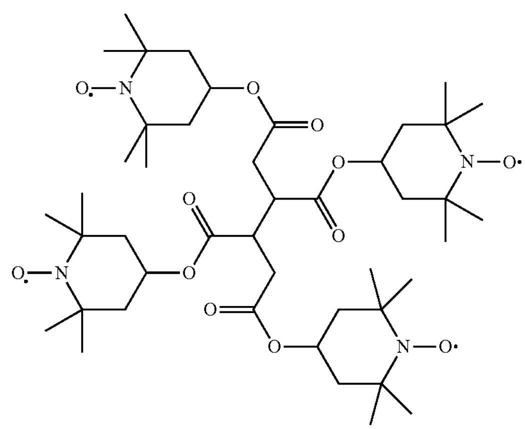
in which
$R^{ST}$ denotes H, an alkyl or alkoxy radical having 1 to 15 C atoms, in which one or more $CH_2$ groups may each be replaced, independently of one another, by —C≡C—, —$CF_2$O—, —O$CF_2$—, —CH═CH—,
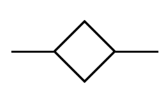 , 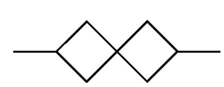 ,
—O—, —CO—O—, or —O—CO— in such a way that O atoms are not linked directly to one another, and in which one or more H atoms may be replaced by halogen,

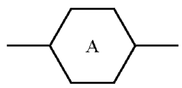
denotes
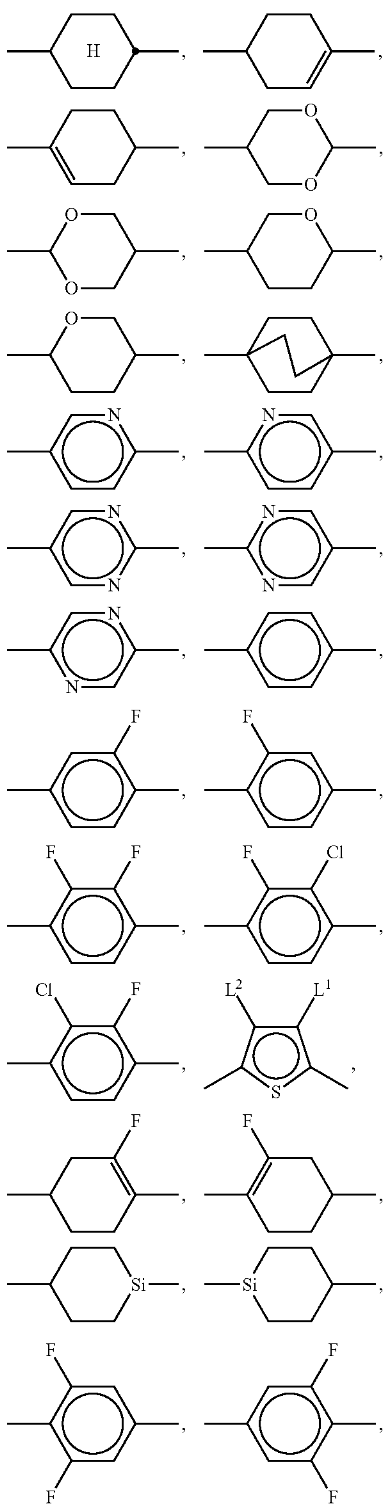
-continued
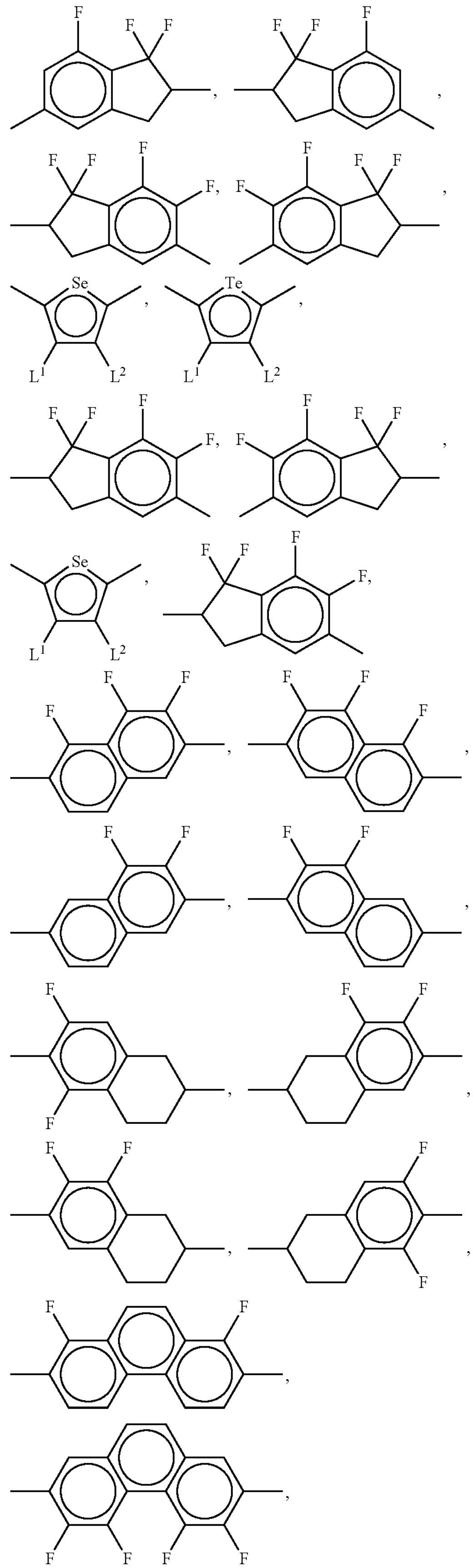

-continued

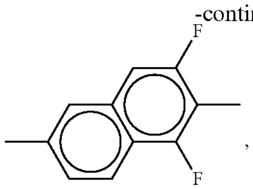

,

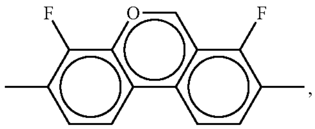

,

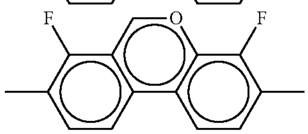

,

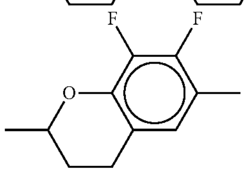

,

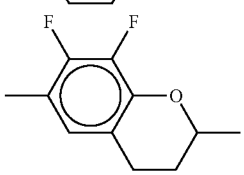

, or

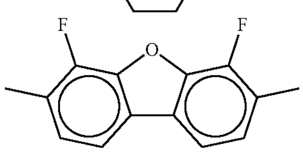

$Z^{ST}$ each, independently of one another, denotes —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, $L^2$ and $L^2$ each, independently of one another, denote F, Cl, $CF_3$ or $CHF_2$, p denotes 1 or 2, and q denotes 1, 2, 3, 4, 5, 6, 7, 8, 9 or 10, and at least one compound of formula IIA or IIB

IIA

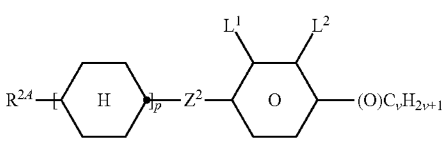

IIB

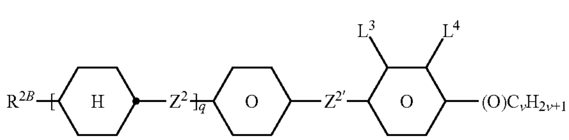

in which $R^{2A}$ and $R^{2B}$ each, independently of one another, denote H, a $C_{1-15}$-alkyl or $C_{2-15}$-alkenyl radical which is unsubstituted, monosubstituted by CN or $CF_3$ or at least monosubstituted by halogen, in which one or more $CH_2$ groups may be replaced by —O—, —S—,

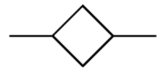

,

—C≡C—, —$CF_2O$—, —$OCF_2$—, —OC—O— or —O—CO— in such a way that O atoms are not linked directly to one another, $L^{1-4}$ each, independently of one another, denote F or Cl, $Z^2$ and $Z^{2'}$ each, independently of one another, denote a single bond, —$CH_2CH_2$—, —CH═CH—, —$CF_2O$—, —$OCF_2$—, —$CH_2O$—, —$OCH_2$—, —COO—, —OCO—, —$C_2F_4$—, —CF═CF—, or —CH═$CHCH_2O$—, p denotes 0, 1 or 2, q denotes 0 or 1, and denotes 1 to 6, and one or more compounds of formulae L-1 to L-11,

L-1

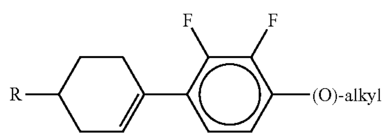

L-2

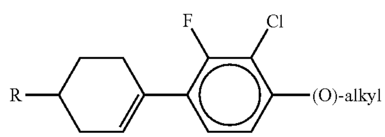

L-3

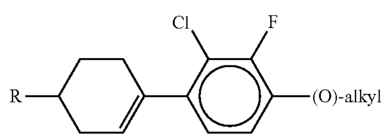

L-4

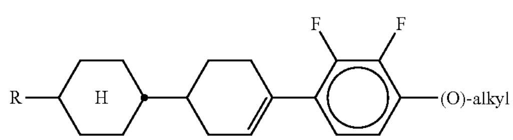

L-5

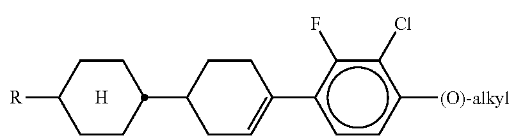

L-6

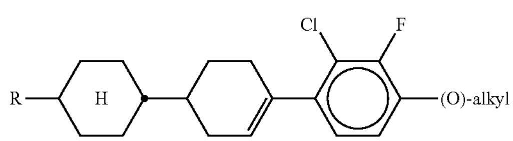

L-7

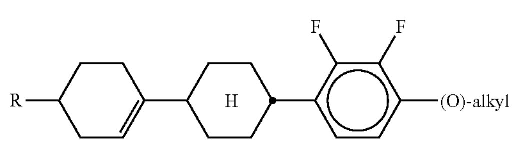

-continued

L-8

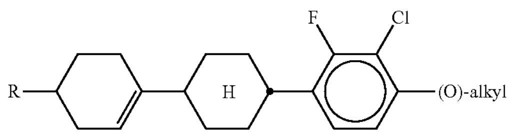

L-9

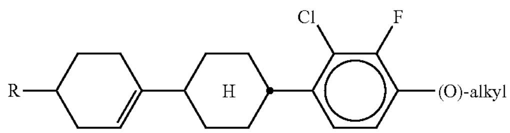

L-10

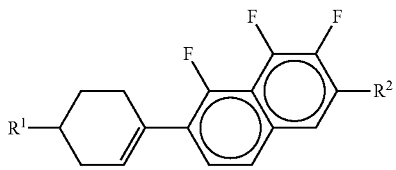

L-11

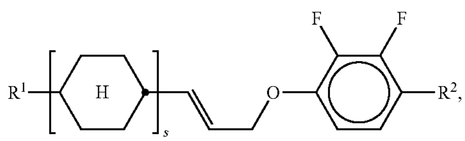

in which

R, $R^1$ and $R^2$ each, independently of one another, denote H, a $C_{1-15}$-alkyl or $C_{2-15}$-alkenyl radical which is unsubstituted, monosubstituted by CN or $CF_3$ or at least monosubstituted by halogen, in which one or more $CH_2$ groups may be replaced by —O—, —S—,

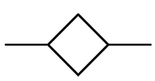,

—C≡C—, —$CF_2$O—, —O$CF_2$—, —OC—O— or —O—CO— in such a way that O atoms are not linked directly to one another, alkyl denotes an alkyl radical having 1-6 C atoms, (O) represents an optionally present oxygen atom, and s denotes 1 or 2.

2. The liquid-crystalline medium according to claim 1, wherein the medium contains at least one compound of formulae I-1 to I-20,

I-1

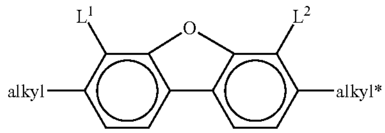

I-2

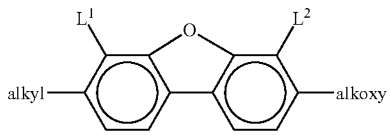

-continued

I-3

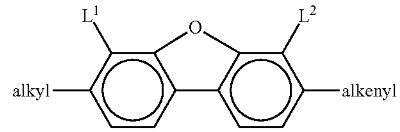

I-4

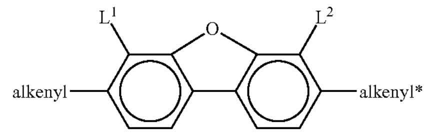

I-5

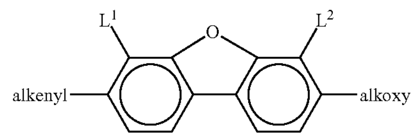

I-6

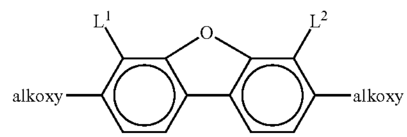

I-7

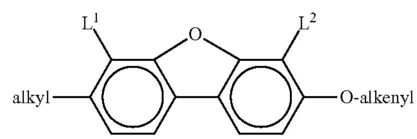

I-8

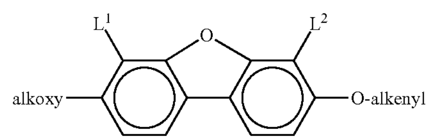

I-9

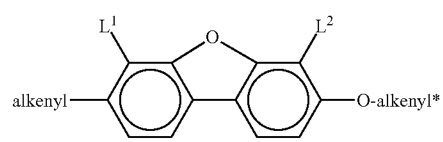 or

I-10

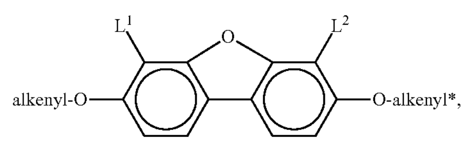, in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F, CI, $CF_3$ or $CHF_2$.

3. The liquid-crystalline medium according to claim 1, wherein $L^1$ and $L^2$ in formula I each denote F.

4. The liquid-crystalline medium according to claim 1, which contains one or more compounds of formulae ST-1, ST-2a, ST-3a, ST-3b, ST-8-1, ST-9-1, ST-12, ST-15, and/or ST-16

-continued

ST-1

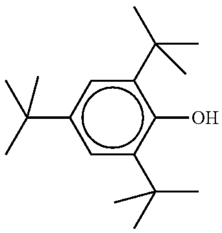

ST-2a

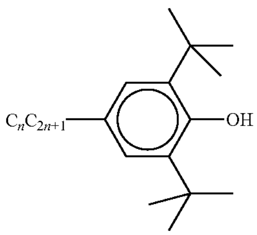

ST-3a

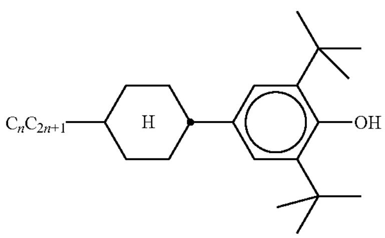

ST-3b

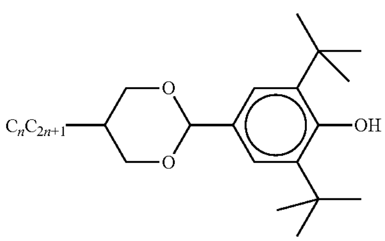

ST-8-1

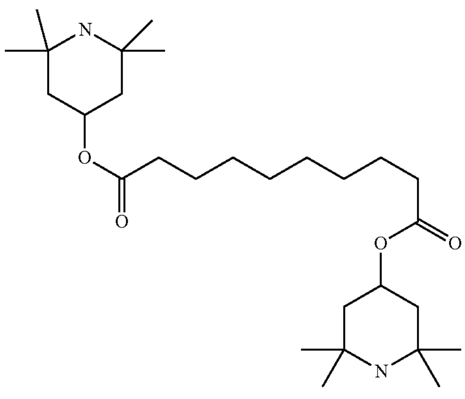

ST-9-1

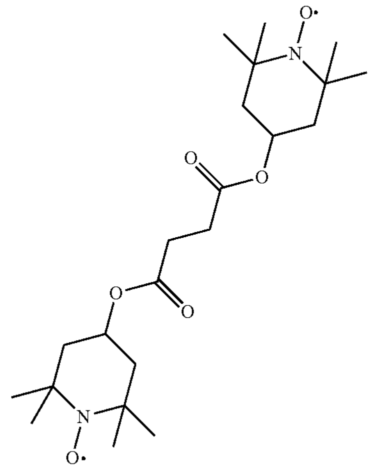

ST-12

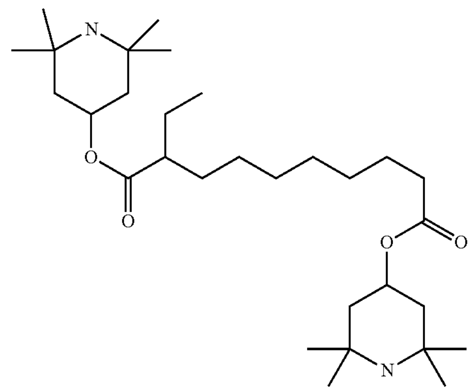

ST-15

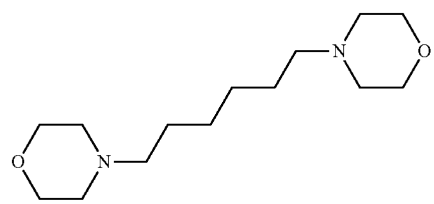

ST-16

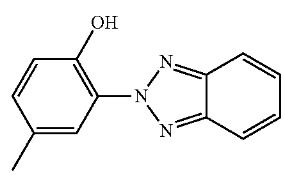

where n=1, 2, 3, 4, 5, 6 or 7.

5. The liquid-crystalline medium according to claim 1, having a proportion of compounds of formula I in the medium as a whole of 1-40% by weight.

6. A process for preparing the liquid-crystalline medium according to claim 1, comprising mixing at least one compound of formula I with at least one compound of formulae ST and at least one compound of formula IIA or IIB and one or more compounds of formulae L-1 to L-11.

7. An electro-optical display having active-matrix addressing, comprising, as dielectric, the liquid-crystalline medium according to claim 1.

8. The electro-optical display according to claim 7, that is a VA, PSA, PA-VA, SS-VA, SA-VA, PS-VA, PALC, IPS, PS-IPS, FFS, UB-FFS, U-IPS or PS-FFS display.

9. The liquid crystalline medium according to claim 1, wherein 0.005-0.5% of a single compound of formulae ST-1 to ST-17 is present, based on the medium, or 0.01-1% of two or more compounds of formulae ST-1 to ST-17 are present, based on the medium.

* * * * *